(12) United States Patent
Kondo

(10) Patent No.: US 8,228,995 B2
(45) Date of Patent: Jul. 24, 2012

(54) IMAGE PROCESSING APPARATUS, IMAGE PROCESSING METHOD, AND PROGRAM

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1615 days.

(21) Appl. No.: 11/614,652

(22) Filed: Dec. 21, 2006

(65) Prior Publication Data

US 2007/0165140 A1    Jul. 19, 2007

(30) Foreign Application Priority Data

Jan. 6, 2006    (JP) .................................. 2006-001580

(51) Int. Cl.
*H04N 7/18* (2006.01)
(52) U.S. Cl. .......... 375/240.21; 375/240.01; 375/240.26
(58) Field of Classification Search . 375/240.01–240.29
See application file for complete search history.

(56) References Cited

U.S. PATENT DOCUMENTS

| 7,369,284 B1* | 5/2008 | Inuzuka et al. ............... 358/512 |
| 2004/0169751 A1* | 9/2004 | Takemura et al. ............ 348/294 |

FOREIGN PATENT DOCUMENTS

| JP | 10-301537 | 11/1998 |
| JP | 2003-52051 | 2/2003 |
| JP | 2003-198970 | 7/2003 |
| JP | 2005-12772 | 1/2005 |

\* cited by examiner

*Primary Examiner* — Andy Rao
(74) *Attorney, Agent, or Firm* — Oblon, Spivak, McClelland, Maier & Neustadt, L.L.P.

(57) ABSTRACT

An image processing apparatus, image processing method, and program are provided. The image processing apparatus of processing an image includes: means for acquiring a display format operable to acquire a display format which displays an image on means for displaying an image; means for acquiring a shot image signal operable to acquire a shot image signal that is an image signal from means for shooting an object; and means for converting a signal operable to convert the shot image signal in a first signal format into an image signal in a second signal format that is a signal format associated with a display format acquired at the means for acquiring a display format, based on correspondence information which associates a signal format for the image signal with a display format.

18 Claims, 58 Drawing Sheets

IMAGE PROCESSING APPARATUS, IMAGE PROCESSING METHOD, AND PROGRAM

CROSS REFERENCES TO RELATED APPLICATIONS

The present invention contains subject matter related to Japanese Patent Application JP 2006-001580 filed in the Japanese Patent Office on Jan. 6, 2006, the entire contents of which being incorporated herein by reference.

BACKGROUND OF THE INVENTION

1. Field of the Invention

The present invention relates to an image processing apparatus, an image processing method, and a program, and to an image processing apparatus, an image processing method, and a program, which can maximize the performance of a system configured of a plurality of units.

2. Description of the Related Art

For example, a broadcasting system which sends and receives broadcast programs is configured of a plurality of units such as a camera (video camera) which shoots images, a transmitter which sends image signals outputted from the camera, a receiver which receives the image signals from the transmitter, and a display device which displays images corresponding to the image signals received at the receiver.

As described above, in a system configured of a plurality of units, signals are sent and received between the units. For example, in a broadcasting system, image signals are sent from the camera to the transmitter, and are received at the transmitter. In addition, the image signals are sent from the transmitter to the receiver, and are received at the receiver. Furthermore, the image signals are sent from the receiver to the display device, and are received at the display device.

Between the units configuring the broadcasting system, the image signals are sent and received as described above. In this manner, in order to allow sending and receiving the image signals between the units, and in order to send and receive the image signals between units even though the camera, the transmitter, the receiver, or the display device configuring the broadcasting system is replaced by another camera, another transmitter, another receiver, or another display device, the format for image signals is normalized or standardized.

For the format for the image signals, there is a format called D1 (the format in which Y:Cb:Cr=4:2:2), for instance. For example, between the units having an interface which can input and output the image signal in the D1 format, the image signal can be sent and received between any units.

On the other hand, in the camera, the transmitter, the receiver and the display device, an inherent process is performed in each unit.

In other words, for example, when a camera is a single plate camera having a single imager (a photoelectric conversion element such as a single-chip CCD (Charge Coupled Device), or a CMOS (Complementary Metal Oxide Semiconductor) imager), for example, a color filter in the Bayer array is adapted in consideration of human visual characteristics. When the color filter in the Bayer array is adapted, obtained are from the imager image signals in accordance with the Bayer array in which there are a greater number of G components and a fewer number of R components and B components among R (Red), G (Green), and B (Blue) components (hereinafter, also properly called the Bayer format). In the image signal in the Bayer format, the pixel value of a single pixel has only a single color component among any one of R, G, and B components, and does not have the other two color components. Therefore, in the single plate camera, such a process is performed that the other two color components are interpolated for each of the pixels and an image signal having all the color components of R, G, and B components as the pixel value of a single pixel.

In addition, the transmitter, for example, in order to intend so-called coexistence of monochrome broadcasting and color broadcasting, such a process is performed that a component signal having a brightness signal and a color signal different from each other is converted into a composite signal having a brightness signal superimposed with a color signal.

Furthermore, in the receiver, for example, a so-called Y/C separation process is performed for composite signals in which the composite signals are converted into component signals.

In addition, in the display device, for example, such a process is performed that R, G, and B components of R, G, and B component signals are arranged in a display format of a display which displays images thereon. Moreover, for the display format to display images on a display, that is, for the arrangement of R, G, and B components, for example, there are the stripe array, the mosaic array, the delta array, and so on.

Furthermore, for example, JP-A-10-301537 (Patent Reference 1) discloses a color liquid crystal display device in a fixed display format such as the stripe array (particularly, in Paragraph 0014).

SUMMARY OF THE INVENTION

As long as the units configuring the broadcasting system including the camera, the transmitter, the receiver, and the display device have an interface which can send and receive image signals in the normalized or standardized signal format such as the D1 format as described above, the image signals can be still sent and received. However, even though a plurality of units having the interface like this are used to configure a system, the performance of the system is not always maximized.

In addition, various processes are performed in the individual units configuring the system, but the processes are performed with no consideration given to the performance of the overall system. In other words, for example, in the camera configuring the broadcasting system, such a process is performed that an image signal in the Bayer format having only any one of R, G, and B components as the pixel value of a single pixel is converted into an image signal having all the three color components of R, G, and B components as the pixel value of a single pixel (hereinafter, referred to an RGB image signal, if necessary). This process affects the performance of the camera itself, but it does not always affect the improvement of the performance of the overall broadcasting system.

In short, in the camera, when the process in which the image signal in the Bayer format is converted into the RGB image signal is a so-called advanced process, that is, for example, when the process yields the RGB image signal with high resolution or a high signal to noise ratio, it can be said that the performance of the camera itself is excellent.

On the other hand, in the broadcasting system, an image is finally displayed on the display device, and the image is viewed by a user. Therefore, for example, when the user who views the image displayed on the display device feels that the image is a high quality image, it can be said that the performance of the overall broadcasting system is excellent.

However, even though the camera itself is a high performance camera, that is, for example, even though the camera can output the RGB image signal with high resolution or a high signal to noise ratio, after that, processes are performed in the transmitter, the receiver, and the display device. Then, in the broadcasting system, the image that the user feels to be in high quality is not always finally displayed on the display device.

Instead, there is a possibility that when in the camera, the image signal in the Bayer format is not converted into the RGB image signal and is outputted as it is, and the image signal in the Bayer format is processed in the transmitter, the receiver, or the display device in the subsequent stage, the user feels the image in high quality on the display device.

In view of the circumstances, it is desirable to improve the performance of a system configured of a plurality of units, preferably to allow the maximized performance.

An image processing apparatus according to a first facet of an embodiment of the invention is an image processing apparatus of processing an image including: a means for acquiring a display format operable to acquire a display format which displays an image on a means for displaying an image; a means for acquiring a shot image signal operable to acquire a shot image signal that is an image signal from a means for shooting an object; and a means for converting a signal operable to convert the shot image signal in a first signal format into an image signal in a second signal format that is a signal format associated with a display format acquired at the means for acquiring a display format, based on correspondence information which associates a signal format for the image signal with a display format, wherein the image signal is a target for an image conversion process to convert an image signal into a high quality image signal of a higher quality image than an image corresponding to the image signal, and wherein the display format displays an image corresponding to a high quality image signal obtained in the image conversion process.

An image processing method or a program according to a first facet of an embodiment of the invention is an image processing method of processing an image or a program which allows a computer to run an image process for image processing including the steps of: acquiring a display format which displays an image on a means for displaying an image; acquiring a shot image signal that is an image signal from a means for shooting an object; and converting the shot image signal in a first signal format into an image signal in a second signal format that is a display format associated with an acquired signal, based on correspondence information which associates a signal format for the image signal with a display format, wherein the image signal is a target for an image conversion process to convert an image signal into a high quality image signal of a higher quality image than an image corresponding to the image signal, and wherein the display format displays an image corresponding to a high quality image signal obtained in the image conversion process.

In the image processing apparatus, the image processing method or the program according to the first facet, a display format is acquired which displays an image on a display means for displaying an image as well as a shot image signal that is the image signal from the means for shooting an object. Then, the shot image signal in a first signal format is converted into an image signal in a second signal format that is a signal format associated with a display format acquired at the means for acquiring a display format, based on correspondence information which associates a signal format for the image signal with a display format, wherein the image signal is a target for an image conversion process to convert an image signal into a high quality image signal of a higher quality image than an image corresponding to the image signal, and wherein the display format displays an image corresponding to a high quality image signal obtained in the image conversion process.

An image processing apparatus according to a second facet of an embodiment of the invention is an image processing apparatus of processing an image including: a means for deciding an image process to be applied to a shot image signal that is an image signal from a means for shooting an object; a means for acquiring a signal format operable to acquire a signal format for the shot image signal; a means for acquiring a display format operable to acquire a display format which displays an image on a means for display, the image obtained by applying to the shot image signal an image process decided at the means for deciding an image process; and a means for processing an image operable to apply an image process decided at the means for deciding an image process to the shot image signal by performing different processes, in accordance with a signal format for the shot image signal, a display format which displays an image on the means for display, and an image process decided at the means for deciding an image process.

An image processing method or a program according to a second facet of an embodiment of the invention is an image processing method of processing an image or a program which allows a computer to run a process including the steps of: deciding an image process to be applied to a shot image signal that is an image signal from means for shooting an object; acquiring a signal format for the shot image signal; acquiring a display format which displays an image on means for display, the image obtained by applying an image process decided for the shot image signal; and performing different processes in accordance with a signal format for the shot image signal, a display format which displays an image on the means for display, and a decided image process to apply an image process decided for the shot image signal.

In the image processing apparatus, the image processing method, or the program according to the second facet, the image process is decided that is applied to a shot image signal that is an image signal from means for shooting an object. Furthermore, a signal format for the shot image signal is acquired as well as a display format which displays an image on means for display, the image obtained by applying an image process decided for the shot image signal. Then, different processes are performed in accordance with a signal format for the shot image signal, a display format which displays an image on the means for display, and a decided image process to apply a decided image process to the shot image signal.

In accordance with the first and second facets according to an embodiment of the invention, the performance of the system can be improved.

DETAILED DESCRIPTION OF THE INVENTION

Hereinafter, an embodiment of the invention will be described. The following is examples of the correspondence between configuration requirements for the invention and the embodiments of the specification or the drawings. This is described for confirming that the embodiments supporting the invention are described in the specification or the drawings. Therefore, even though there is an embodiment that is described in the specification or the drawings but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration requirements other than those configuration requirements.

Figure 25:
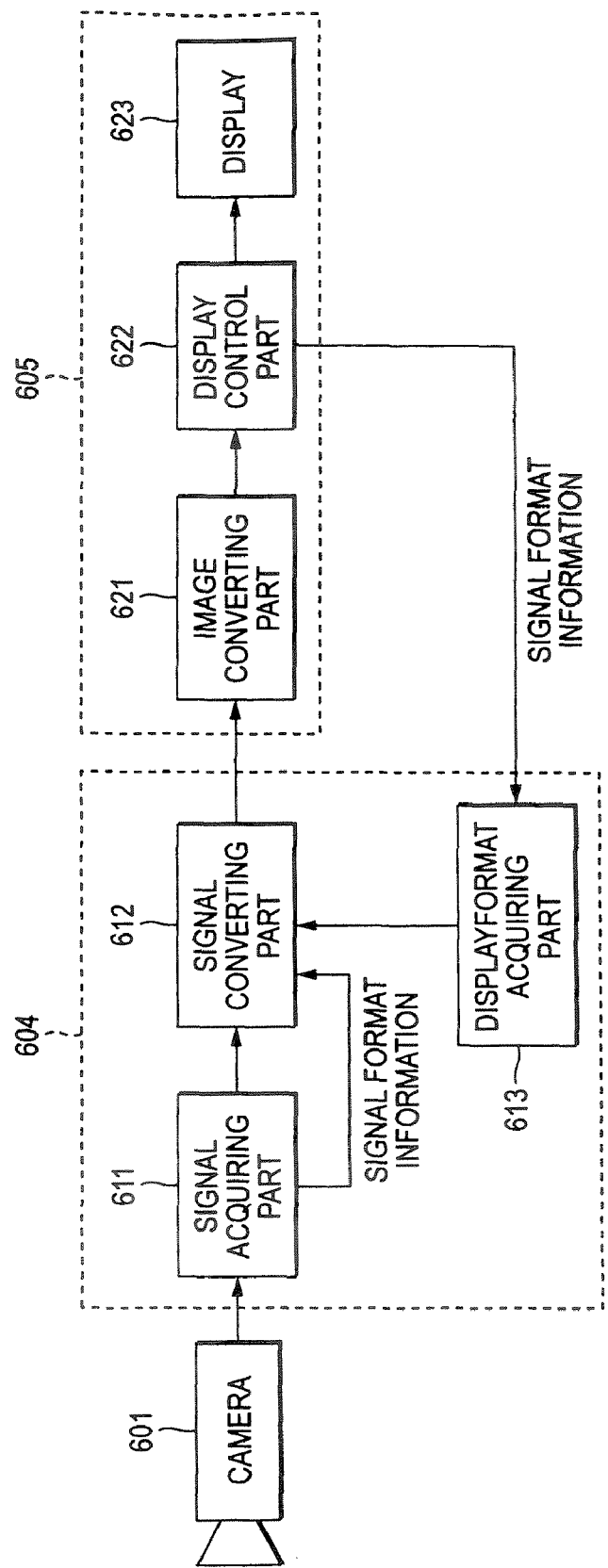
FIG. 25 shows a block diagram depicting an exemplary configuration of a format converting part 604 and a display device 605.

An image processing apparatus according to a first facet of an embodiment of the invention is an image processing apparatus operable to process an image (for example, a format converting part 604 shown in FIG. 25) including: a mechanism for acquiring a display format operable to acquire a display format which displays an image on a mechanism for displaying an image (for example, a display format acquiring part 613 shown in FIG. 25); a mechanism for acquiring a shot image signal operable to acquire a shot image signal that is an image signal from a mechanism for shooting an object (for example, a signal acquiring part 611 shown in FIG. 25); and a mechanism for converting a signal operable to convert the shot image signal in a first signal format into an image signal in a second signal format that is a signal format associated with a display format acquired at the mechanism for acquiring a display format, based on correspondence information which associates a signal format for the image signal with a display format, wherein the image signal is a target for an image conversion process to convert an image signal into a high quality image signal of a higher quality image than an image corresponding to the image signal, and wherein the display format displays an image corresponding to a high quality image signal obtained in the image conversion process (for example, a signal converting part 612 shown in FIG. 25).

The image processing apparatus according to the first facet further includes the shooting mechanism (for example, a camera 601 shown in FIG. 25).

Figure 26:
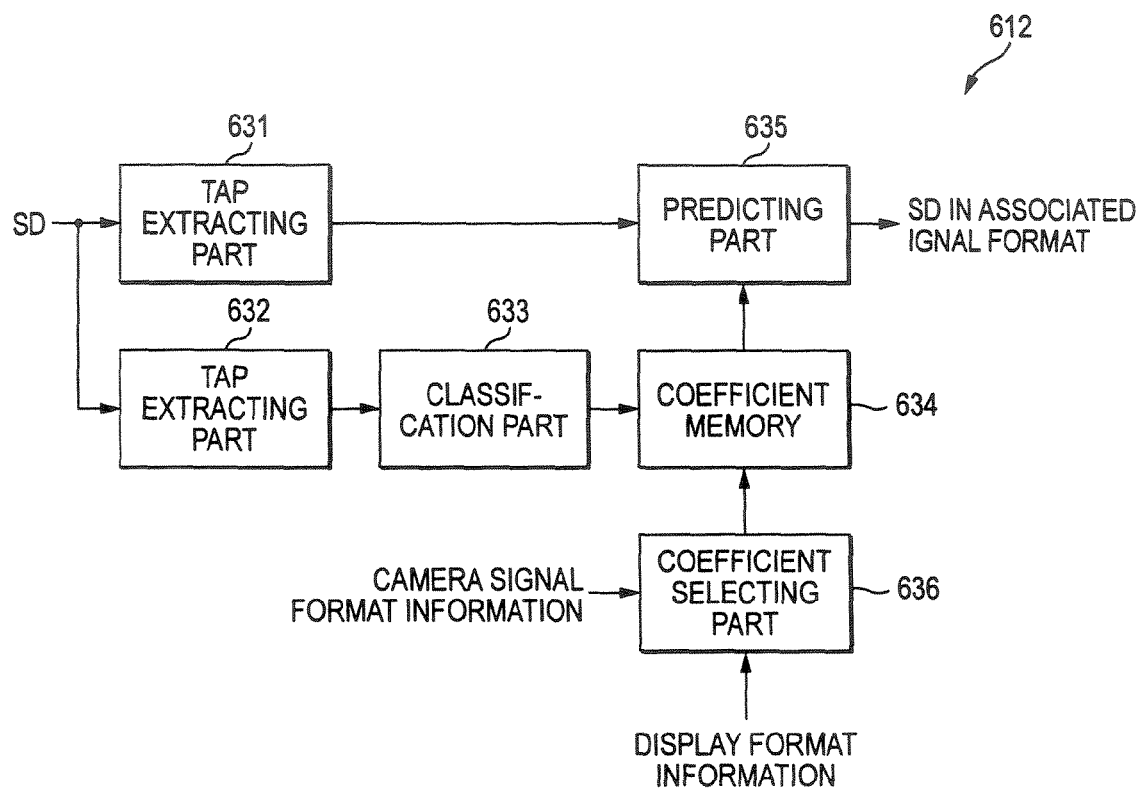
FIG. 26 shows a block diagram depicting an exemplary configuration of a signal converting part 612.

In the image processing apparatus according to the first facet, the mechanism for converting a signal includes: a mechanism for extracting a prediction tap operable to extract a prediction tap that is a set of pixel values of a plurality of pixels for use in predicting a pixel value of an attention pixel of an image signal in the second signal format from the shot image signal (for example, a tap extracting part 631 shown in FIG. 26); a mechanism for extracting a class tap operable to extract a class tap that is a set of pixel values of a plurality of pixels for use in classification to classify the attention pixel into any one of a plurality of classes from the shot image signal (for example, a tap extracting part 632 shown in FIG. 26); a mechanism for classification operable to classify the attention pixel based on the class tap (for example, a classification part 633 shown in FIG. 26); a mechanism for outputting a coefficient operable to output a set of tap coefficients for a class of the attention pixel from a plurality of sets of tap coefficients each corresponding to each of a plurality of classes and determined by learning performed beforehand (for example, a coefficient memory 634 shown in FIG. 26); and a mechanism for computation operable to determine a pixel value of the attention pixel by a prediction computation using a set of tap coefficients for the class of the attention pixel and the prediction tap (for example, a predicting part 635 shown in FIG. 26).

Figure 28:
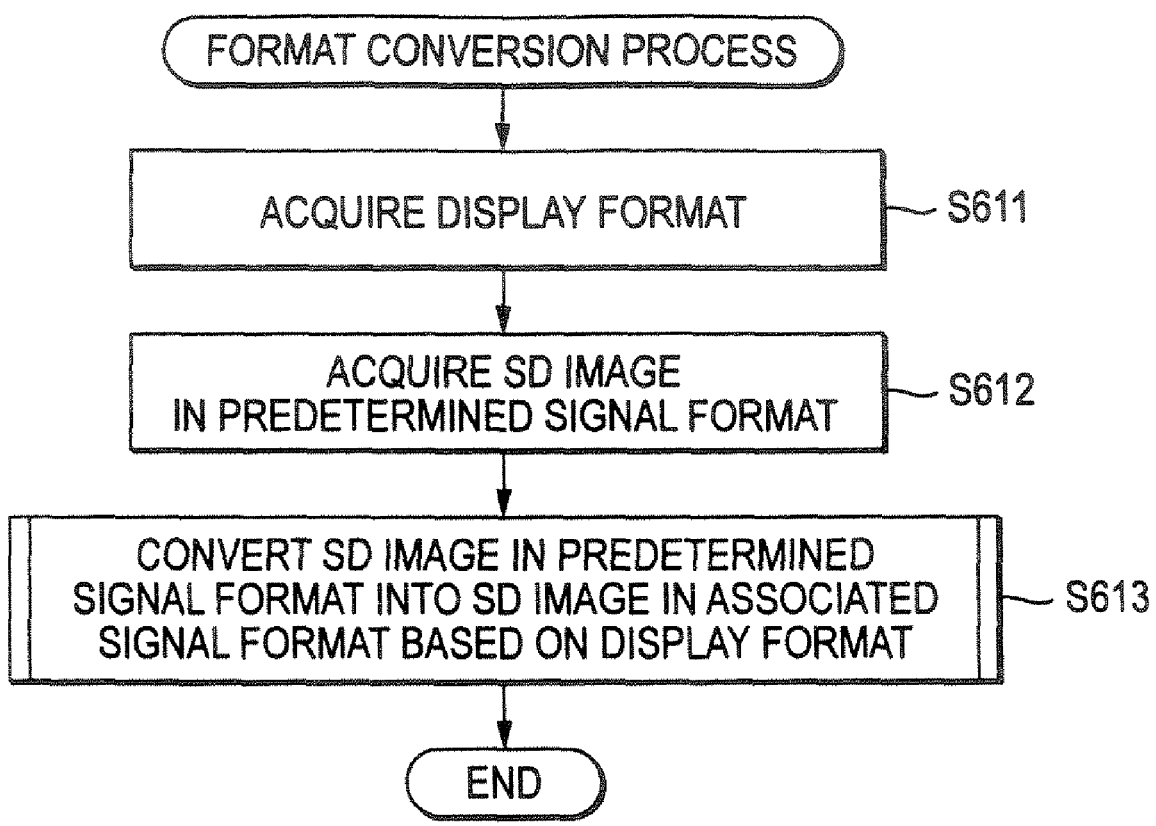
FIG. 28 shows a flow chart illustrative of the process steps performed by the format converting part 604.

An image processing method or a program according to a first facet of an embodiment of the invention is an image processing method of processing an image or a program which allows a computer to run an image process for image processing including the steps of: acquiring a display format which displays an image on a mechanism for displaying an image (for example, Step S611 shown in FIG. 28); acquiring a shot image signal that is an image signal from a mechanism for shooting an object (for example, Step S612 shown in FIG. 28); and converting the shot image signal in a first signal format into an image signal in a second signal format that is a display format associated with an acquired signal format based on correspondence information which associates a signal format for the image signal with a display format, wherein the image signal is a target for an image conversion process to convert an image signal into a high quality image signal of a higher quality image than an image corresponding to the image signal, and wherein the display format displays an image corresponding to a high quality image signal obtained in the image conversion process (for example, Step S613 shown in FIG. 28).

Figure 39:
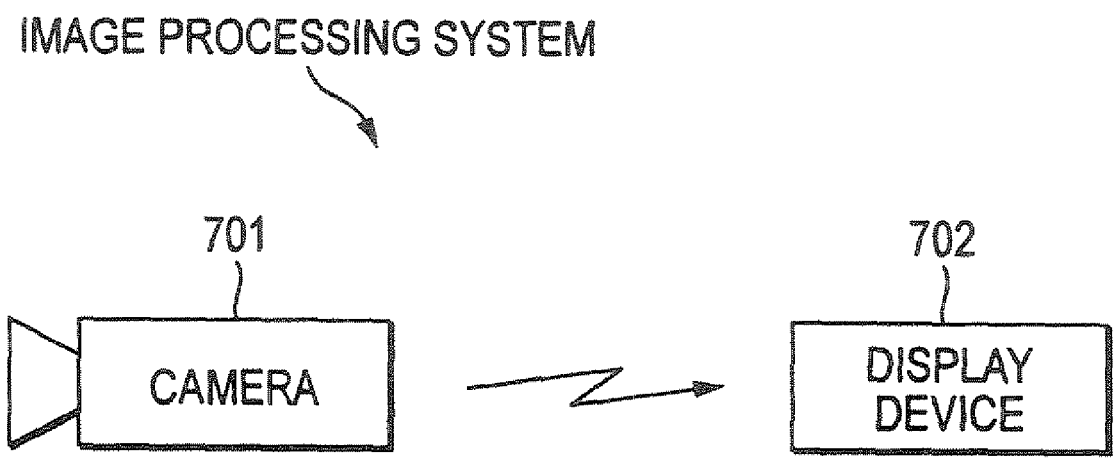
FIG. 39 shows a block diagram depicting a fourth exemplary configuration of an image processing system which performs image processing.
Figure 40:
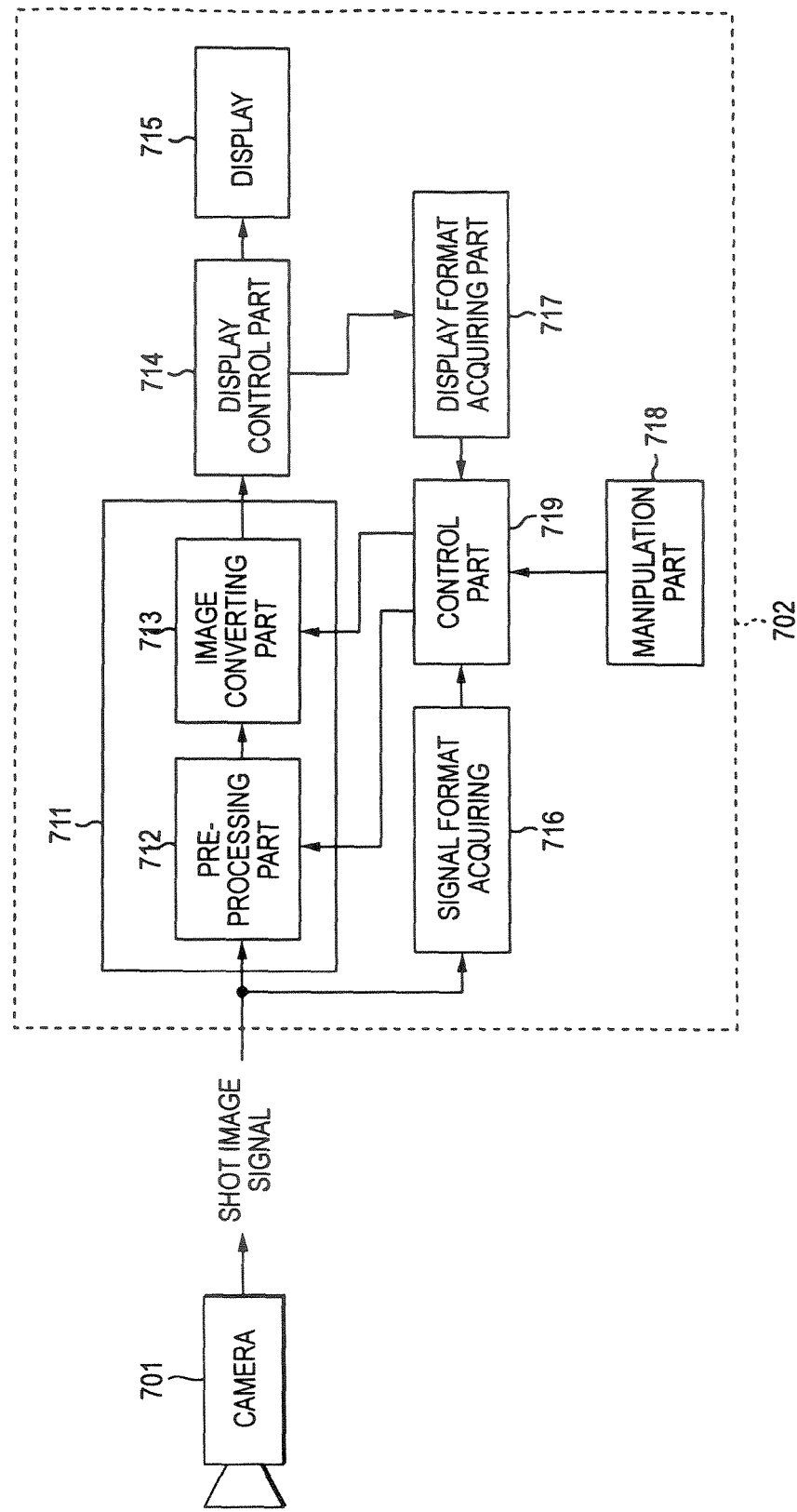
FIG. 40 shows a block diagram depicting an exemplary configuration of a display device 702.

An image processing apparatus according to a second facet of an embodiment of the invention is an image processing apparatus of processing an image (for example, a display device 702 shown in FIG. 39) including: a mechanism for deciding an image process to operable to decide an image process to be applied to a shot image signal that is an image signal from a mechanism for shooting an object (for example, a control part 719 shown in FIG. 40); a mechanism for acquiring a signal format operable to acquire a signal format for the shot image signal (for example, a signal format acquiring part 716 shown in FIG. 40); a mechanism for acquiring a display format operable to acquire a display format which displays an image on a mechanism for display, the image obtained by applying to the shot image signal an image process decided at the mechanism for deciding an image process (for example, a display format acquiring part 717 shown in FIG. 40); and a mechanism for processing an image operable to apply an image process decided at the mechanism for deciding an image process to the shot image signal by performing different processes, in accordance with a signal format in the shot image signal, a display format which displays an image on the mechanism for display, and an image process decided at the mechanism for deciding an image process (for example, an image processing part 711 shown in FIG. 40).

In the image processing apparatus according to the second facet, the image process mechanism includes: a pre-processing mechanism operable to pre-process the shot image signal to output a pre-processed image signal (for example, a pre-processing part 712 shown in FIG. 40); and a mechanism for converting an image operable to convert a first image signal that is the pre-processed image signal into a second image signal by a computation with a set of tap coefficients obtained by learning performed beforehand (for example, an image converting part 713 shown in FIG. 40).

Figure 41:
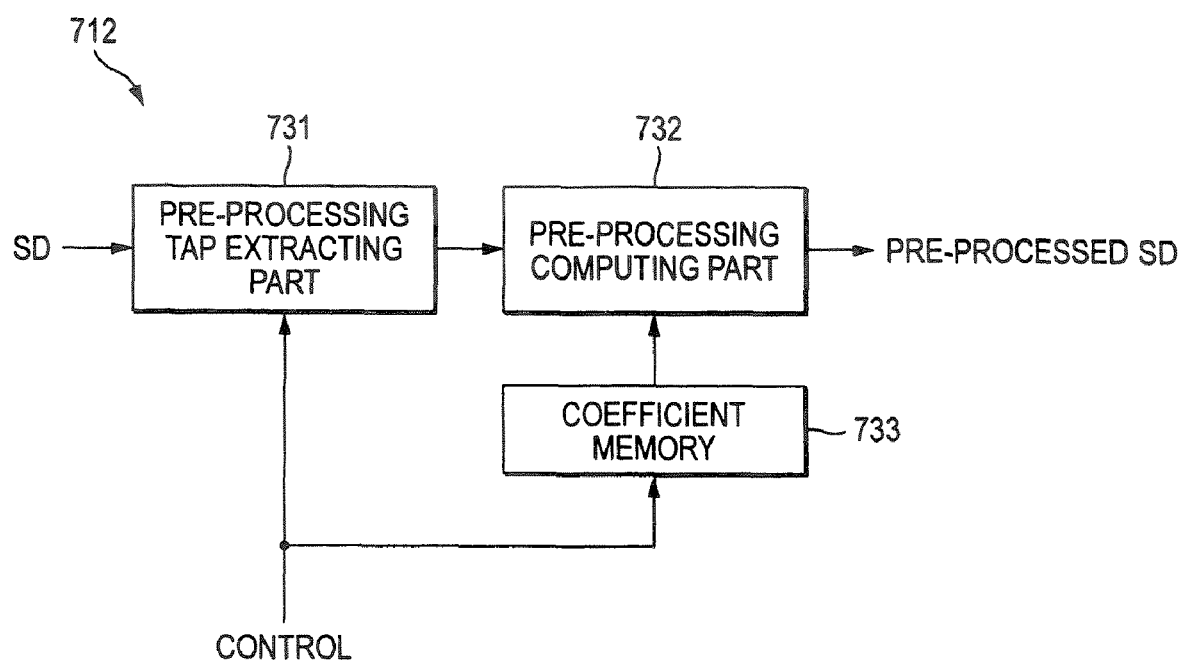
FIG. 41 shows a block diagram depicting an exemplary configuration of a pre-processing part 712.

In the image processing apparatus according to the second facet, the pre-processing mechanism includes: a mechanism for extracting a pre-processing tap operable to extract a pre-processing tap that is a set of pixel values of a plurality of pixels for use to determine a pixel value of an attention pixel of the pre-processed image signal from the shot image signal by the pre-process (for example, a pre-processing tap extracting part 731 shown in FIG. 41); and a pre-processing mechanism for computation operable to determine a pixel value of the attention pixel by a computation using a set of pre-processing coefficients for use in computation as the pre-process and the pre-processing tap (for example, a pre-processing computing part 732 shown in FIG. 41).

Figure 42:
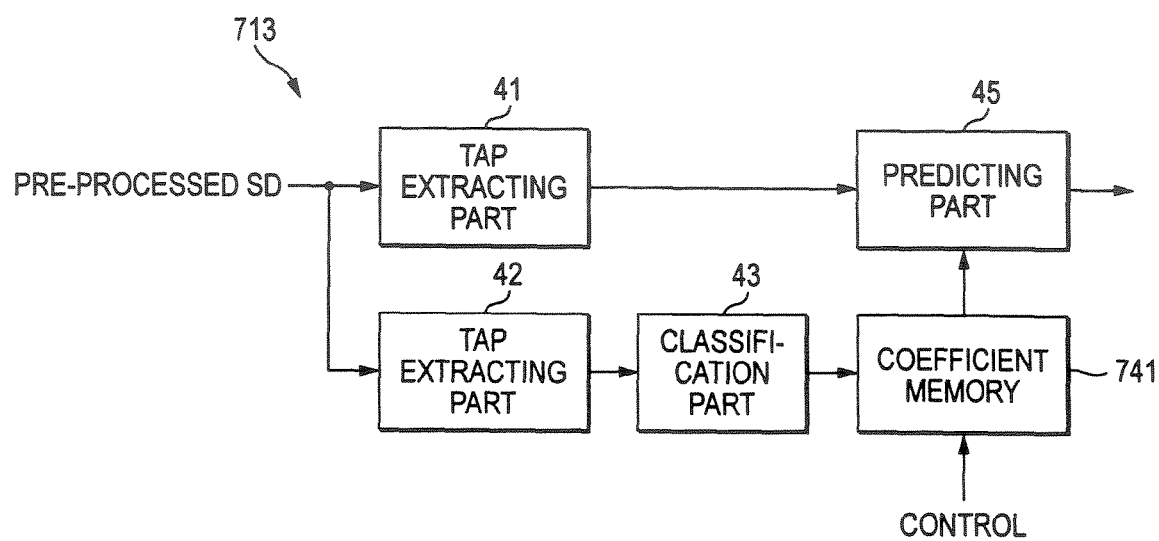
FIG. 42 shows a block diagram depicting an exemplary configuration of an image converting part 713.

In the image processing apparatus according to the second facet, the mechanism for converting an image includes: a mechanism for extracting a prediction tap operable to extract a prediction tap that is a pixel value of a plurality of pixels for use in predicting a pixel value of the attention pixel of a second image signal from the first image signal (for example, a tap extracting part 41 shown in FIG. 42); a mechanism for extracting a class tap operable to extract a class tap that is a pixel value of a plurality of pixels for use in classification to classify the attention pixel into any one of a plurality of classes from the first image signal (for example, a tap extracting part 42 shown in FIG. 42); a mechanism for classification operable to classify the attention pixel based on the class tap (for example, a classification part 43 shown in FIG. 42); a mechanism for outputting a coefficient operable to output a tap coefficient for a class of the attention pixel from tap coefficients for each of a plurality of classes determined by learning performed beforehand (for example, a coefficient memory 741 shown in FIG. 42); and a mechanism for computation operable to determine a pixel value of the attention pixel by a prediction computation using a tap coefficient for the class of the attention pixel and the prediction tap (for example, a predicting part 45 shown in FIG. 42).

Figure 43:
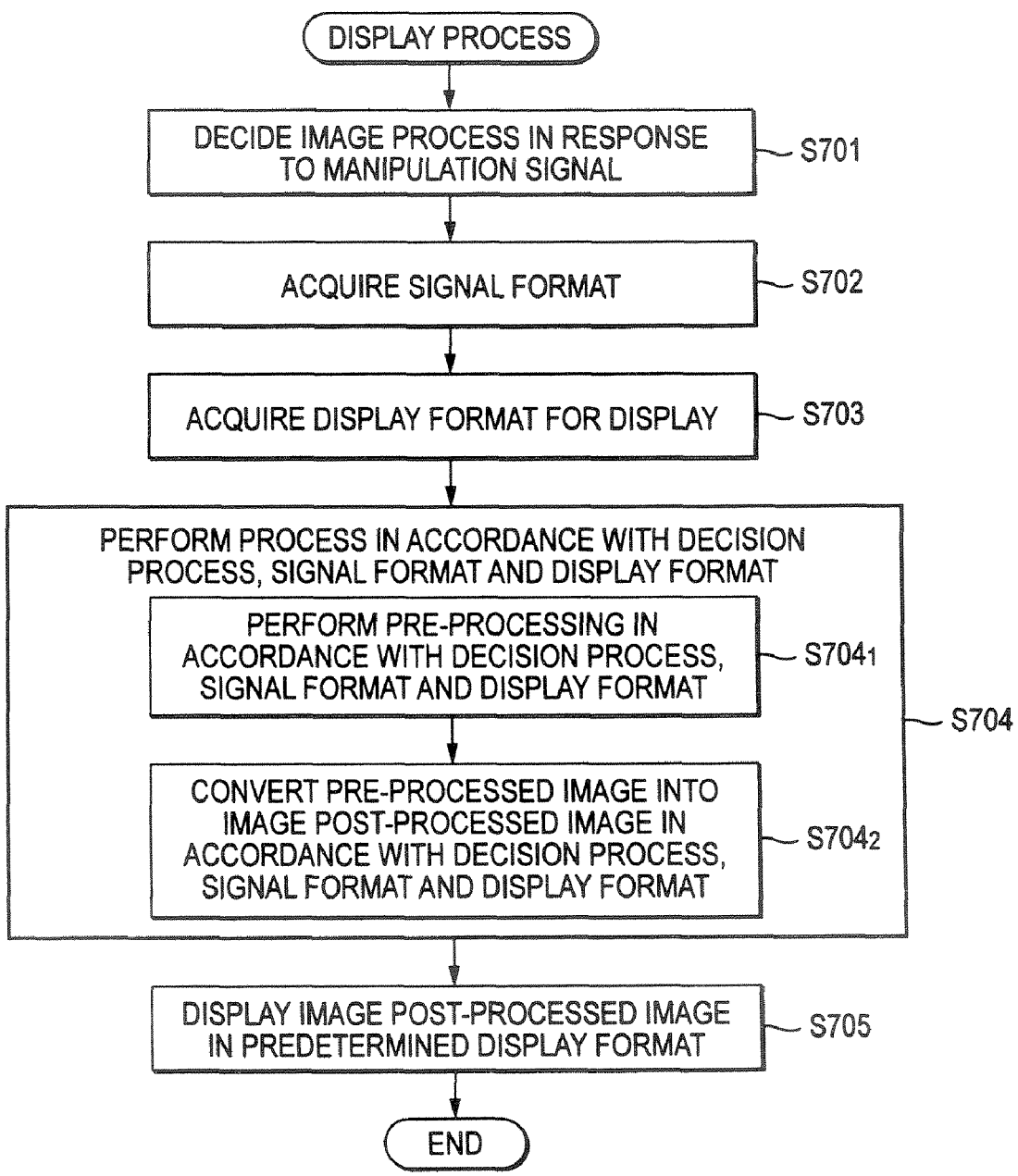
FIG. 43 shows a flow chart illustrative of the process steps performed by the display device 702.

An image processing method or a program according to a second facet of an embodiment of the invention is an image processing method of processing an image or a program which allows a computer to run a process including the steps of: deciding an image process to be applied to a shot image signal that is an image signal from a mechanism for shooting an object (for example, Step S701 shown in FIG. 43); acquiring a signal format for the shot image signal (for example, shown in FIG. 43 Step S702); acquiring a display format which displays an image on a mechanism for display, the image obtained by applying an image process decided for the shot image signal (for example, Step S703 shown in FIG. 43); and performing different processes in accordance with a signal format in the shot image signal, a display format which displays an image on the mechanism for display, and a decided image process to apply an image process decided for the shot image signal (for example, Step S704 shown in FIG. 43).

Next, the following will be described: an image processing system in which image signals in a certain signal format are processed and an image corresponding to the image signals resulted from the process is displayed in a certain display format, and a method of determining a signal format and a display format adapted in the image processing system.

Figure 1:
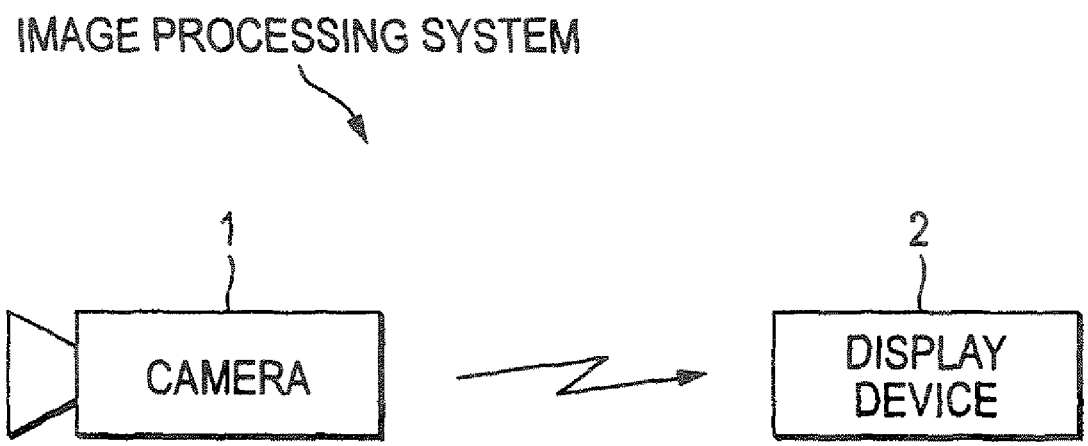
FIG. 1 shows a block diagram depicting a first exemplary configuration of an image processing system which performs image processing.

FIG. 1 shows a first exemplary configuration of an image processing system which processes an image (the system means an object that a plurality of units is logically assembled, regardless whether the units in individual configurations are placed in the same cabinet or not).

In FIG. 1, the image processing system is configured of a camera (video camera) 1 and a display device 2.

The camera 1 shoots an object (subject), and outputs a shot image signal that is an image signal obtained by the shooting. The display device 2 receives the shot image signal outputted from the camera 1, converts the shot image signal into a high quality image signal that is an image signal of a higher quality image than the image corresponding to the shot image signal, and displays the image corresponding to the high quality image signal.

Moreover, for example, the camera 1 is a single plate camera, which outputs the shot image signal in a signal format decided by learning, described later.

In other words, suppose the signal format for the shot image signal decided by learning is the Bayer format, for example. For the camera 1, a color filter in the Bayer array is adapted, and the camera 1 outputs the shot image signal in the Bayer format obtained by the color filter in the Bayer array as it is, not converting it into an RGB image signal.

Here, it is assumed that the shot image signal outputted from the camera 1 is an SD (Standard Definition) image signal which is an image signal in standard resolution, for example, and that the high quality image signal obtained by converting the SD image signal is an HD (High Definition) image signal which is an image signal in high resolution. Hereinafter, the image corresponding to the SD image signal is also properly called an SD image, and the image corresponding to the HD image signal is also called an HD image.

Figure 2:
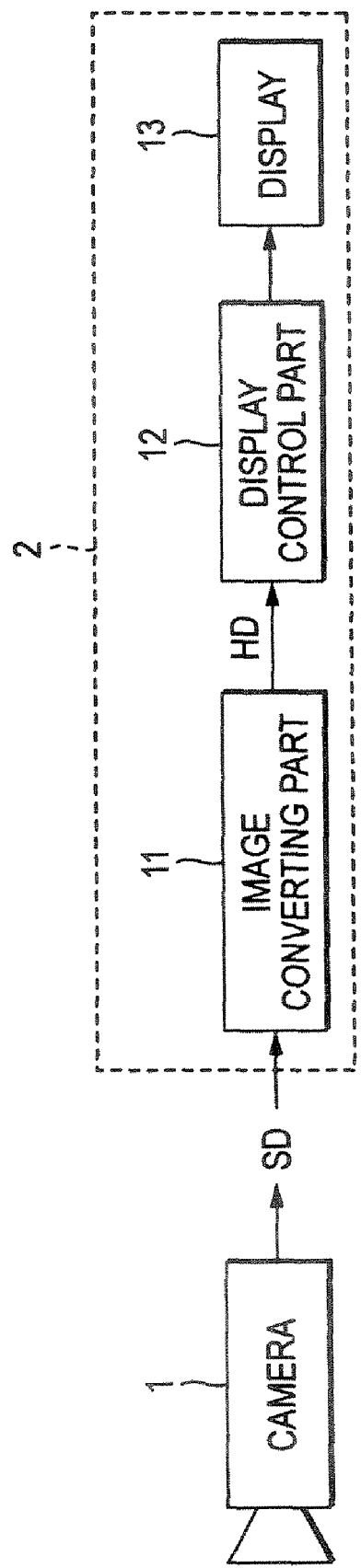
FIG. 2 shows a block diagram depicting an exemplary configuration of a display device 2.

FIG. 2 shows an exemplary configuration of the display device 2 shown in FIG. 1.

The display device 2 is configured of an image converting part 11, a display control part 12, and a display 13.

The image converting part 11 converts the SD image signal from the camera 1 into the HD image signal by a computation with the tap coefficient obtained by learning performed beforehand, and supplies it to the display control part 12.

The display control part 12 performs display control in which the HD image corresponding to the HD image signal supplied from the image converting part 11 is displayed on the display 13 in the display format decided by learning that is performed using a higher quality image than the HD image.

Here, hereinafter, a higher quality image than the HD image is also properly called an SHD image (Super HD image), and the image signal is called an SHD image signal.

The display 13 is a display mechanism configured of a CRT (Cathode Ray Tube) or an LCD (Liquid Crystal Display) panel, for example, which displays images under control by the display control part 12.

Figure 3:
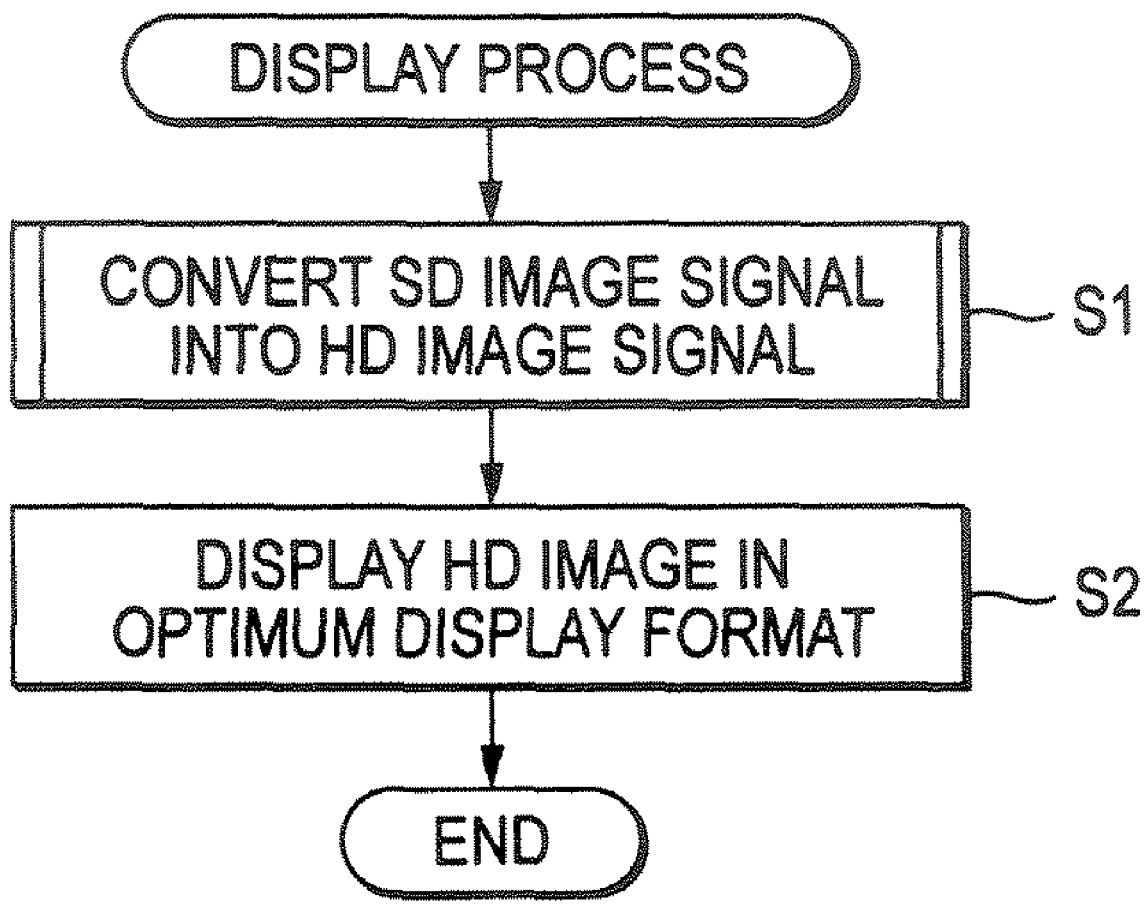
FIG. 3 shows a flow chart illustrative of the process steps performed by the display device 2.

Next, the operation of the display device 2 shown in FIG. 2 will be described with reference to a flow chart shown in FIG. 3.

To the display device 2, the SD image signal is supplied from the camera 1. In the display device 2, the SD image signal from the camera 1 is received, and supplied to the image converting part 11.

At Step S1, the image converting part 11 performs an image conversion process in which the SD image signal from the camera 1 is converted into the HD image signal by a computation using the tap coefficient obtained by learning, described later, for example, and supplies the resulted HD image signal to the display control part 12, and the process goes to Step S2.

At Step S2, the display control part 12 displays the HD image corresponding to the HD image signal supplied from the image converting part 11 on the display 13 in the display format decided by learning that is performed by using the SHD image, described later.

As described above, the HD image is displayed on the display 13.

Next, the image conversion process performed by the image converting part 11 shown in FIG. 2 will be described.

The image converting part 11 performs the image conversion process in which a first image signal is converted into a second image signal that is a signal of a higher quality image than the image corresponding to the first image signal.

Here, the image converting part 11 performs the image conversion process in which the SD image signal from the camera 1 is considered to be a first image signal as well as the HD image signal is considered to be a second image signal to convert the first image signal into the second image signal. According to the image conversion process like this, various processes can be implemented depending on how the first and second image signals are defined.

In other words, for example, when the second image signal is considered to be the HD image signal as well as the first image signal is considered to be the SD image signal which has a reduced resolution and a reduced number of the pixels of the second image signal, it can be said that the image conversion process is a process in which the SD image is converted into the HD image. In addition, for example, when the second image signal is considered to be an image signal of a high signal to noise ratio as well as the first image signal is considered to be an image signal of a low signal to noise ratio which has a reduced signal to noise ratio of the second image signal (noise is added to the second image signal), it can be said that the image conversion process is a noise removal process in which noise is removed. Furthermore, for example, when the second image signal is considered to be a certain image signal as well as the first image signal is considered to be an image signal which the number of the pixels of the second image signal is thinned out, it can be said that the image conversion process is a scale up process in which an image is enlarged.

Figure 4:
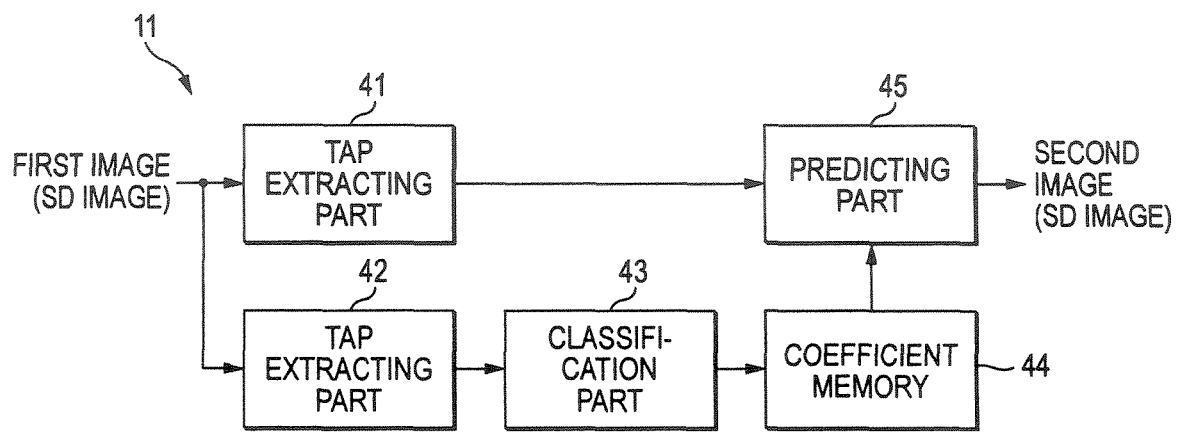
FIG. 4 shows a block diagram depicting an exemplary configuration of an image converting part 12.

FIG. 4 shows an exemplary configuration of the image converting part 11 shown in FIG. 2.

The image converting part 11 is configured of a tap extracting parts 41 and 42, a classification part 43, a coefficient memory 44, and a predicting part 45.

To the image converting part 11, the SD image signal from the camera 1 is supplied as the first image signal. Then, the SD image signal as the first image signal is supplied to the tap extracting parts 41 and 42.

The tap extracting part 41 sequentially sets a pixel to an attention pixel, the pixel which configures the second image signal that is to be obtained by converting the first image signal (since the HD image signal as the second image signal is an image signal that is to be found and it does not exist at the current state, it is virtually assumed), and extracts a prediction tap from the first image signal, the prediction tap which is the pixel value of a plurality of pixels for use in predicting the pixel value of the attention pixel.

More specifically, as a prediction tap, the tap extracting part 41 extracts the pixel value of a plurality of the pixels having the spatially or temporally close positional relation (for example, a pixel closest to the position on the image of the first image signal corresponding to the attention pixel, a pixel spatially adjacent to the pixel, etc.) with respect to the position on the image of the first image signal corresponding to the attention pixel (for example, the position on the image of the first image signal at which a subject portion is seen that is the same as the one seen at the position of the attention pixel).

The tap extracting part 42 extracts from the first image signal a class tap which is the pixel value of a plurality of pixels for use in classification to classify the attention pixel into any one of some (a plurality of) classes.

Here, for the sake of simplified explanations, for the prediction tap and the class tap, the pixel value of a plurality of the pixels having the same tap structure is adapted, that is, the pixel value of a plurality of pixels having the same positional relation for the position corresponding to the attention pixel is adapted. However, the prediction tap and the class tap can have different tap structures.

The prediction tap obtained at the tap extracting part 41 is supplied to the predicting part 45, and the class tap obtained at the tap extracting part 42 is supplied to the classification part 43.

The classification part 43 classifies the attention pixel based on the class tap from the tap extracting part 42, and supplies a class code corresponding to the resulted class to the coefficient memory 44.

Here, for a scheme of classification, ADRC (Adaptive Dynamic Range Coding), for example, can be adapted.

In the scheme using ADRC, the pixel values of the pixels configuring the class tap are processed in ADRC processing, and the class of the attention pixel is decided in accordance with the resulted ADRC code.

Moreover, in K-bit ADRC, for example, a maximum value MAX and a minimum value MIN of the pixel values of the pixels configuring the class tap are detected, DR=MAX−MIN is considered to be a local dynamic range of a set of a plurality of the pixel values as the class tap, and a plurality of the pixel values as the class tap is each requantized into K bits based on the dynamic range DR. In other words, the minimum value MTN is subtracted from each of the pixel values as the class tap, and the subtracted value is divided (quantized) by $DR/2^K$. Then, the bit string in which K bits of each of the pixel values obtained in this manner is arranged in a predetermined order is outputted as an ADRC code. Therefore, for example, when the class tap is processed by one-bit ADRC processing, each of the pixel values as the class tap is subtracted by the minimum value MTN, and then it is divided by ½ of the difference between the maximum value MAX and the minimum value MIN (the fractional portion of the number is dropped), whereby each of the pixel values is one bit (binarized). Then, the bit string in which this one bit of the pixel value is arranged in a predetermined order is outputted as the ADRC code.

Moreover, for example, the level distribution pattern of a plurality of the pixel values as the class tap may be outputted from the classification part 43 as the class code unchanged. However, in this case, it is supposed that the class tap is configured of N pixel values and each of the pixels is assigned K bits, the number of the class codes outputted by the classification part 43 is $(2^N)^K$ ways, which becomes an enormous number exponentially proportional to the bit number K of the pixel value.

Therefore, preferably in the classification part 43, the information volume of the class tap is decompressed by ADRC processing or vector quantization, for example, for classification.

In addition to the class tap, classification can be performed based on a vector (motion vector) which indicates the motion near the position on the image of the first image signal corresponding to the attention pixel (hereinafter, properly called a corresponding position), a vector (positional relation vector) which indicates the positional relation between the pixel of the first image signal closest to the corresponding position and the corresponding position, etc. In other words, for example, such a bit string can be used as the class code indicating the class of the attention pixel that the ADRC code of the class tap is arranged together with a bit string indicating a code (symbol) as the vector quantization result of the motion vector or the positional relation vector.

The coefficient memory 44 stores therein a tap coefficient for every class found beforehand by learning, described later. In other words, the coefficient memory 44 stores therein the tap coefficient for each of a plurality of classes into which the attention pixel is possibly classified by the classification part 43. The coefficient memory 44 outputs the class indicated by the class code supplied from the classification part 43 among the tap coefficients for every class, that is, the tap coefficient for the class of the attention pixel.

Moreover, for example, the tap coefficient is equivalent to the coefficient which is multiplied by input data in a so-called the tap in a digital filter.

The predicting part 45 acquires the prediction tap outputted from the tap extracting part 41 and the tap coefficient outputted from the coefficient memory 44, and uses the prediction tap and the tap coefficient to perform a predetermined prediction computation to determine the predicted value of the true value of the attention pixel. Therefore, the predicting part 45 outputs it for finding (the predicted value of) the pixel value of the attention pixel, that is, the pixel value of the pixel configuring the second image signal.

Figure 5:
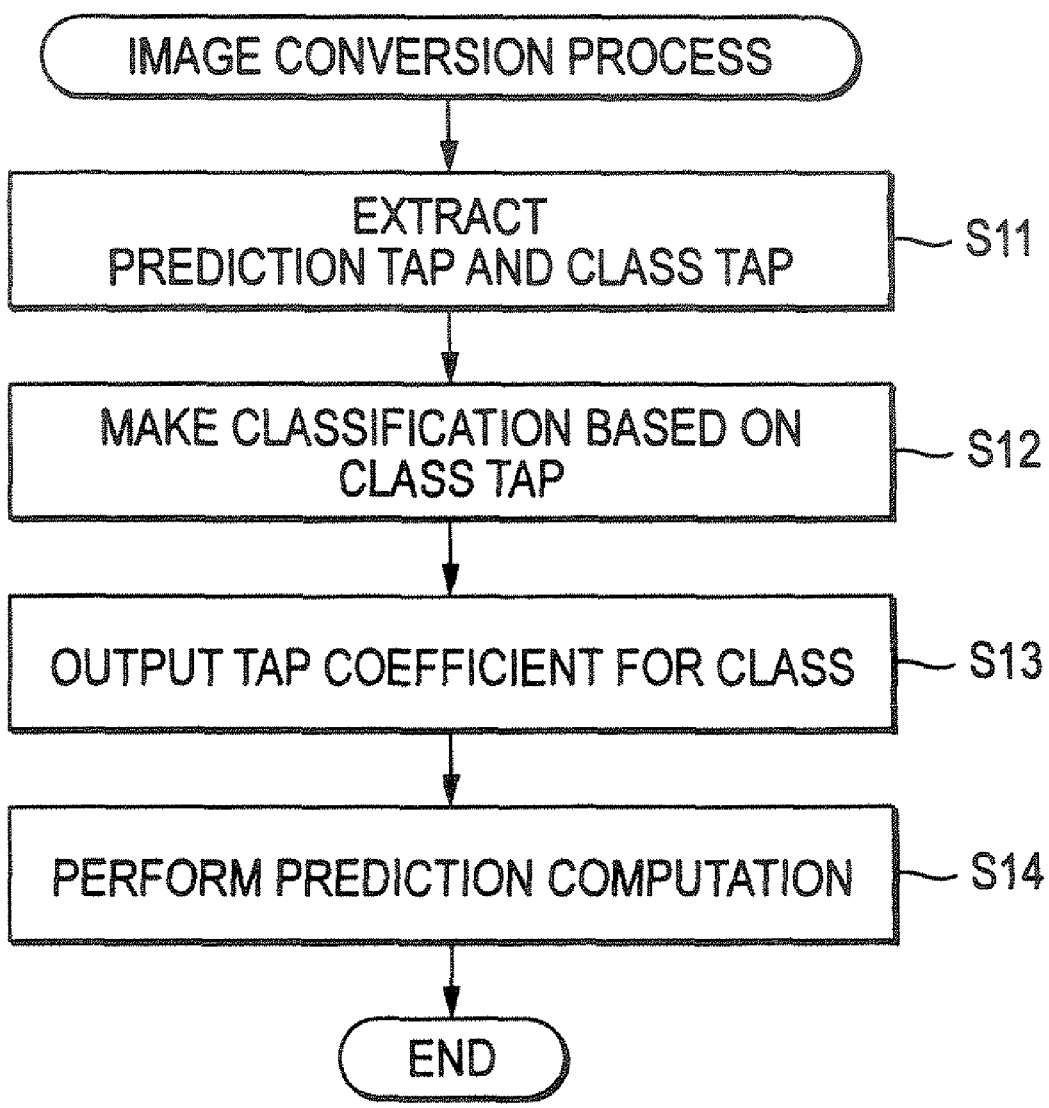
FIG. 5 shows a flow chart illustrative of the process steps performed by the image converting part 12.

Next, the image conversion process at Step S1 shown in FIG. 3 performed by the image converting part 11 shown in FIG. 4 will be described with reference to a flow chart shown in FIG. 5.

The tap extracting part 41 sequentially sets each of the pixels configuring the HD image signal as the second image signal for the SD image signal as the first image signal supplied from the camera 1 to an attention pixel. Then, at Step S11, the tap extracting parts 41 and 42 each extract the pixel values of the pixels to be the prediction tap and the class tap of the attention pixel from the first image signal supplied thereto. Then, the prediction tap is supplied from the tap extracting part 41 to the predicting part 45, and the class tap is supplied from the tap extracting part 42 to the classification part 43.

The classification part 43 receives the class tap of the attention pixel from the tap extracting part 42. At Step S12, it classifies the attention pixel based on the class tap. Furthermore, the classification part 43 outputs the class code indicating the class of the attention pixel resulted from the classification to the coefficient memory 44, and the process goes to Step S13.

At Step S13, the coefficient memory 44 reads and outputs the tap coefficient for the class indicted by the class code supplied from the classification part 43, that is, the tap coefficient for the class of the attention pixel, and the process goes to Step S14. The tap coefficient outputted from the coefficient memory 44 is received (acquired) at the predicting part 45.

At Step S14, the predicting part 45 uses the prediction tap outputted from the tap extracting part 41 and the tap coefficient acquired from the coefficient memory 44 to perform a predetermined prediction computation to determine the pixel value of the attention pixel, that is, the pixel value of the pixel of the second image signal. As described above, the predicting part 45 outputs the HD image signal that is the second image signal to the display control part 12 (FIG. 2) every time when the pixel value of the pixel of the second image signal is determined for every single frame, for example.

As described above, in the image converting part 11, the prediction tap and the class tap of the attention pixel of the second image signal are extracted from the first image signal, the class of the attention pixel is determined based on the class tap, and the tap coefficient for the class and the prediction tap are used for computation to determine (the predicted value of) the pixel value of the attention pixel of the second image signal, whereby the first image signal is converted into the second image signal. As described above, the process is called a classification adaptive process, in which the class of the attention pixel is determined to perform a computation using the tap coefficient for the class and the first image signal (prediction tap), whereby the pixel value of the attention pixel is determined.

As described above, in the classification adaptive process, the tap coefficient is used, but the tap coefficient can be determined by learning that uses the least squares method, for example.

In other words, for example, now it is considered that for the image conversion process, the HD image signal is set to the second image signal as well as the pixels of the HD image signal are thinned out and filtered by an LPF (Low Pass Filter) to obtain a SD image signal, the SD image signal is set to the first image signal, the prediction tap is extracted from the first image signal, and the prediction tap and the tap coefficient are used to determine (predict) the pixel value of the second image signal by a predetermined prediction computation.

For a predetermined prediction computation, for example, suppose a first-order linear prediction computation is to be adapted. A pixel value y of the pixel of the second image signal (hereinafter, properly called a second pixel) is to be determined by the following first-order linear equation.

$$y = \sum_{n=1}^{N} w_n x_n \tag{1}$$

However, in Equation (1), $x_n$ expresses the pixel value of the pixel of the nth first image signal configuring the prediction tap of the second pixel y (hereinafter, properly called a first pixel), and $w_n$ expresses the nth tap coefficient which is multiplied by the pixel value of the nth first pixel. Moreover, in Equation (1), the prediction tap is configured of the pixel values $x_1, x_2, \ldots, X_N$ of multiple first pixels (the number=N). In this case, N tap coefficients exist per class.

Here, the pixel value y of the second pixel may be determined by a quadratic equation or higher order equations, not by the first-order linear equation expressed in Equation (1).

Now, when the true value of the pixel value of the second pixel of the kth sample is denoted by $y_k$, and the predicted value of the true value $y_k$ obtained by Equation (1) is denoted by $y_k'$, a prediction error $e_k$ thereof is expressed by the following equation.

$$e_k = y_k - y_k' \tag{2}$$

Now, since the predicted value $y_k'$ in Equation (2) can be determined in accordance with Equation (1), the following equation can be obtained when $y_k'$ in Equation (2) is replaced in accordance with Equation (1).

$$e_k = y_k - \left( \sum_{n=1}^{N} w_n x_{n,k} \right) \tag{3}$$

However, in Equation (3), $x_{n,k}$ represents the pixel value of the nth first pixel configuring the prediction tap of the second pixel of the kth sample.

Although the tap coefficient $w_n$ that the prediction error $e_k$ in Equation (3) (or Equation (2)) is zero is the optimum one to predict the pixel value of the second pixel, generally it is difficult to determine the tap coefficient $w_n$ like this for all the second pixels.

Then, for the rule showing that the tap coefficient $w_n$ is the optimum one, suppose that the least squares method is adapted, for example. The optimum tap coefficient $w_n$ can be determined by minimizing the total sum E of the square errors expressed by the following equation.

$$E = \sum_{k=2}^{K} e_k^2 \qquad (4)$$

However, in Equation (4), K represents the number of samples (the number of samples for learning) for a set of the pixel value $y_k$ of the second pixel and the pixel values of the first pixels $x_{1,k}, x_{2,k}, \ldots, X_{N,k}$ configuring the prediction tap of the second pixel.

As shown in (5), the total sum E of the minimum value of the square errors in Equation (4) is given by $w_n$ that the total sum E is partially differentiated by the tap coefficient $w_n$ to be zero.

$$\frac{\partial E}{\partial w_n} = e_1 \frac{\partial e_1}{\partial w_n} + e_2 \frac{\partial e_2}{\partial w_n} + \ldots + e_K \frac{\partial e_K}{\partial w_n} = 0 \, (n = 1, 2, \ldots, N) \qquad (5)$$

On the other hand, when Equation (3) described above is partially differentiated by the tap coefficient $w_n$, the following equation is obtained.

$$\frac{\partial e_k}{\partial w_1} = -x_{1,k}, \frac{\partial e_k}{\partial w_2} \qquad (6)$$
$$= -x_{2,k}, \ldots, \frac{\partial e_k}{\partial w_N}$$
$$= -x_{N,k}, \quad (k = 1, 2, \ldots, K)$$

From Equations (5) and (6), the following equation is obtained.

$$\sum_{k=1}^{K} e_k x_{1,k} = 0, \qquad (7)$$
$$\sum_{k=1}^{K} e_k x_{2,k} = 0,$$
$$\sum_{k=1}^{K} e_k x_{N,k} = 0,$$

Equation (3) is substituted into $e_k$ in Equation (7), and thus Equation (7) can be expressed by the normal equation expressed in Equation (8).

$$\begin{bmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{bmatrix} \begin{bmatrix} w_1 \\ w_2 \\ \vdots \\ w_N \end{bmatrix} = \qquad (8)$$

$$\begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix}$$

The normal equation of Equation (8) can be solved with respect to the tap coefficient $w_n$ by using a sweep out method (Gauss-Jordan elimination method), for example.

The normal equation in Equation (8) is formed and solved for every class, whereby the optimum tap coefficient $w_n$ (here, the tap coefficient that minimizes the total sum E of the square errors) can be determined for every class.

According to the classification adaptive process, the tap coefficient for every class thus determined is used to compute Equation (1), whereby the SD image signal as the first image signal is converted into the HD image signal as the second image signal.

Moreover, the scheme in which the normal equation of Equation (8) is formed and solved for every class to determine the tap coefficient for every class (hereinafter, properly called a learning method using the normal equation) is an example of learning to determine the tap coefficient for every class. The coefficient memory 44 shown in FIG. 4 stores therein the tap coefficient for every class determined by round-robin learning, described later, not by the learning method using the normal equation.

Hereinafter, it is considered that the image conversion process means the process in which the first image signal is converted into the second image signal by the classification adaptive process, not particularly stated.

As long as only Equation (1) is viewed, the classification adaptive process seemingly looks like filtering by an FIR (Finite Impulse Response) filter. However, the tap coefficient w corresponding to the coefficient of the FTR filter (the filter coefficient) is determined by learning in which for example, the HD image signal is set to the second image signal as well as the SD image signal that is obtained by reducing the number of the pixels of the HD image signal is set to the second image signal to use the first image signal and the second image signal. Therefore, the signal component can be recreated which is not contained in the first image signal but in the second image signal. Hence, it can be said that (the image conversion process performed by) the classification adaptive process is a so-called process having the creation effect of the signal component not contained in the first image signal.

Next, in the image processing system shown in FIG. 1, the signal format of the SD image signal (the shot image signal) outputted from the camera 1, the display format of the HD image displayed on the display 13 by the display control part 12 of the display device 2 (FIG. 2), and the tap coefficient for use in the image conversion process by the image converting part 11 of the display device 2 (FIG. 4) will be described.

As described above, the camera 1 outputs the SD image signal in the signal format decided by learning, and the display control part 12 of the display device 2 (FIG. 2) displays the HD image in the display format decided by learning on the display 13. Furthermore, the image converting part 11 of the display device 2 (FIG. 4) uses the tap coefficient decided by learning to perform the image conversion process in which the SD image signal from the camera 1 is converted into the HD image signal.

Therefore, the signal format for the SD image signal outputted from the camera 1, the tap coefficient for use in the image conversion process in which the SD image signal is converted into the HD image signal, and the display format which displays the HD image corresponding to the HD image signal obtained in the image conversion process are all decided by learning. The learning of the signal format, the tap coefficient, and the display format is performed so that the performance of the overall image processing system shown in FIG. 1 is improved, that is, the image to be finally displayed on the display 13 of the display device 2 (FIG. 2) is a suited image (the image that the user feels it in high quality).

Figure 6:
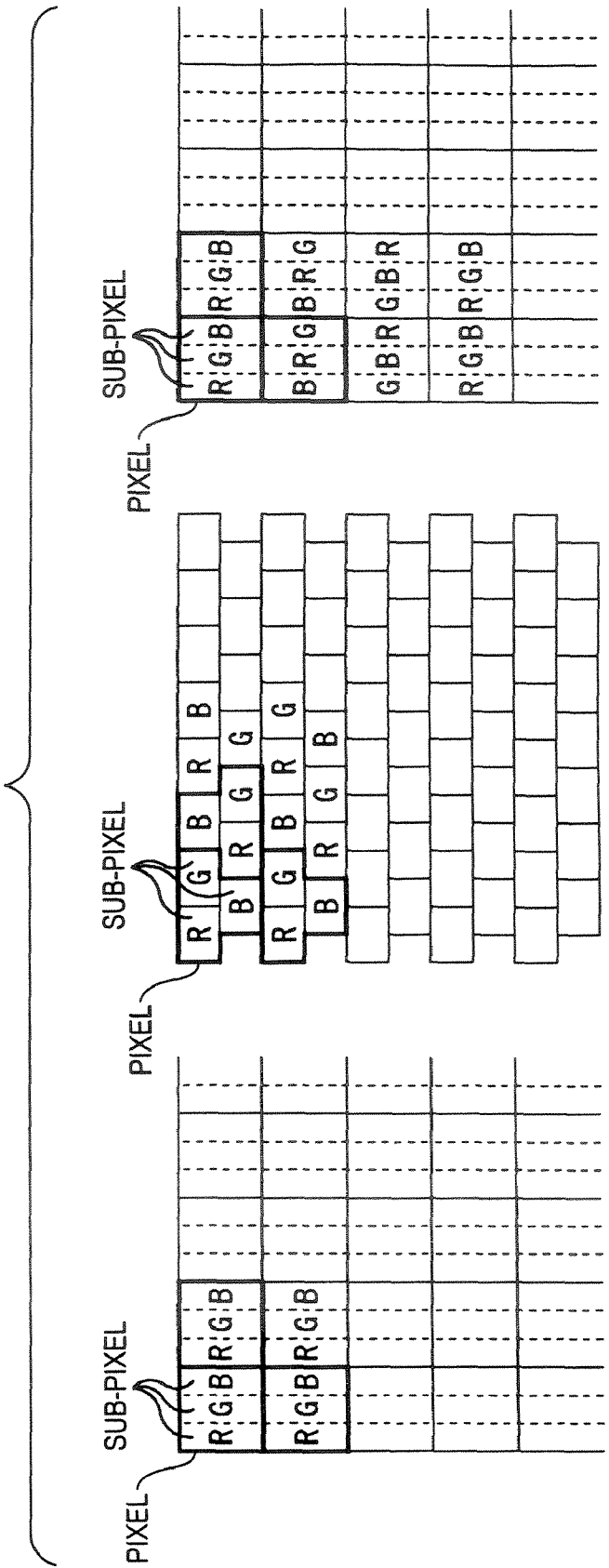
FIG. 6 shows a diagram depicting exemplary display formats.

Here, for existing display formats, for example, there are display formats shown in FIG. 6.

In other words, FIG. 6 shows existing exemplary display formats.

In the typical display device, for example, when an image is displayed that corresponds to the image signal (the RGB image signal) having all the three color components of R, G, and B components as the pixel value of a single pixel, it is physically difficult to display the three color components of R, G, and B components at the same position. Thus, in the display device, the three color components of R, G, and B components as the pixel value of a single pixel are arranged and displayed at different positions.

In other words, in the display device, a small area as a single pixel on the display screen is further divided into smaller areas for each of the R, G, and B components (hereinafter, properly called a sub-pixel), and the R, G, and B components for the pixel value of a single pixel are each displayed in the sub-pixels for R, G, and B components.

For the array pattern of the sub-pixels, for example, array patterns shown in FIG. 6 are known, as shown from the left to the right (the first right) in the drawing.

In the first left in FIG. 6, a square area is a single pixel, and the single pixel is laterally divided into three areas that are sub-pixels. Then, in each of the pixels, the first, the second, and the third sub-pixels from the left are sub-pixels for R, G, and B components, respectively, and the sub-pixel array (display format) like this is called the stripe array.

In the second left in FIG. 6, a single pixel is configured of first and second sub-pixels laterally arranged in an oblong, rectangular sub-pixel and of a third pixel arranged at the position that is above or below the first and second sub-pixels and shifted by a half of the length of the sub-pixel. Then, the first to third sub-pixels are sub-pixels for any of R, G, and B components. The sub-pixels of the same color component are arranged so as not to be adjacent to each other. The sub-pixel array (display format) like this is called the delta array.

In the third left in FIG. 6, as similar to the stripe array at the first left in FIG. 6, a square area is a single pixel, and the single pixel is laterally divided into three areas that are sub-pixels. However, in the stripe array in the first left in FIG. 6, the sub-pixels of the same color component are vertically arranged. In the third left in FIG. 6, the sub-pixels of the same color component are arranged obliquely so as not to arrange the sub-pixels of the same color component vertically adjacent to each other. The sub-pixel array (display format) like this is called the mosaic array.

Among the display formats as described above, for example, it is said that the stripe array is suitable for display of lines, graphics, and characters. In addition, it is said that the mosaic array can obtain a more natural image than the stripe array does. It is said that the delta array can obtain a more natural image.

The existing display formats described above are defined by the convenience of the process performed by display devices to display images, for example. Therefore, an image displayed in the existing display format is not always the image that the user feels to be in high quality. In other words, there might be a display format that is not any of the existing display formats and in which a user feels an image is higher quality than an image displayed in the existing display format.

Figure 7:
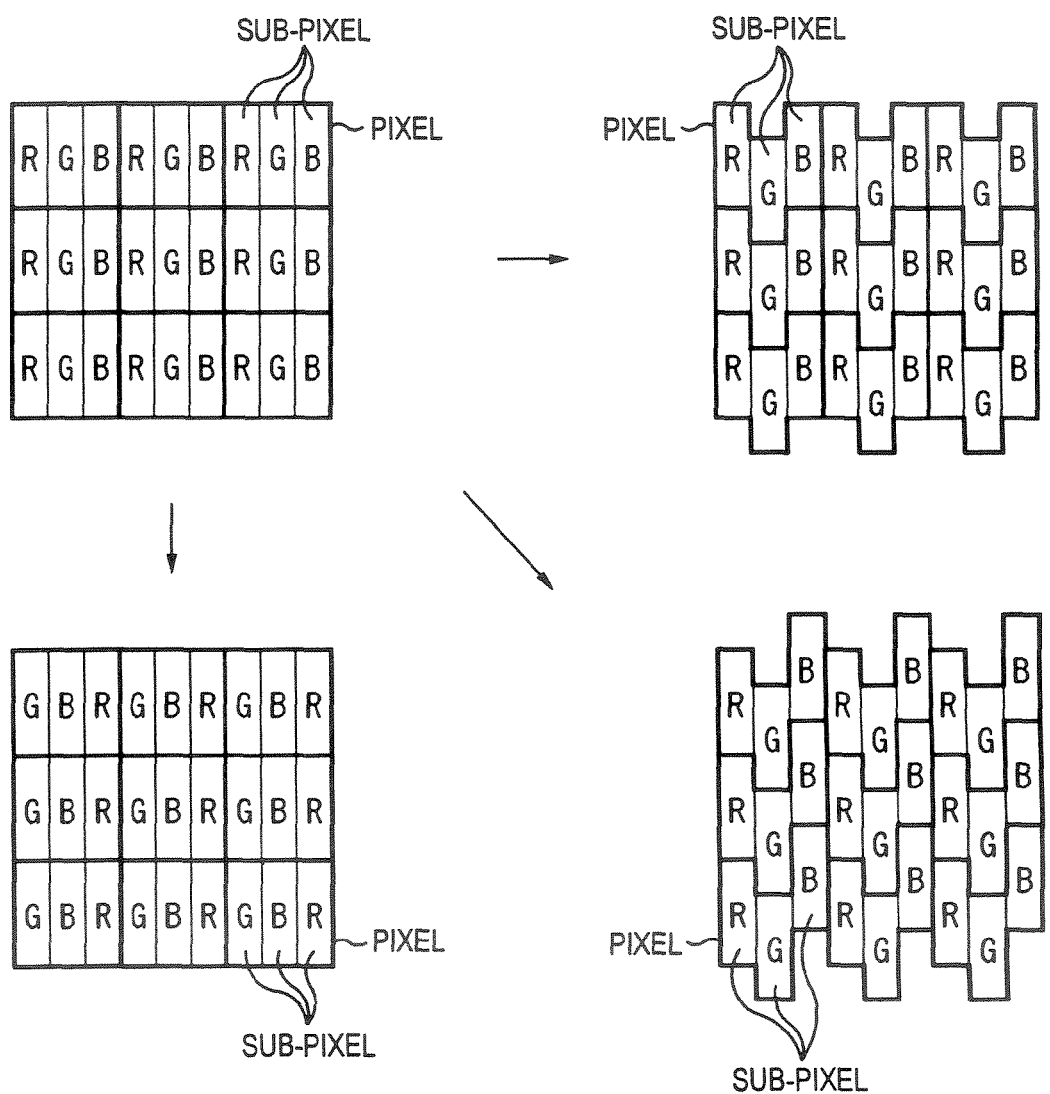
FIG. 7 shows a diagram depicting exemplary display formats modified with reference to the stripe format.

Here, FIG. 7 shows exemplary display formats which are not the existing display formats.

In other words, FIG. 7 shows new display formats that are obtained by modifying the stripe array based on the stripe array.

The upper left shown in FIG. 7 shows a display format of the same stripe array as the first left in FIG. 6.

The lower left shown in FIG. 7 shows the display format in which the color components displayed in the sub-pixels in the stripe array shown at the upper left in FIG. 7 is modified. In other words, in the stripe array shown at the upper left in FIG. 7, three sub-pixels laterally arranged in a single pixel are arranged in order of the sub-pixels displaying the individual R, G, and B components, whereas in the display format at lower left shown in FIG. 7, sub-pixels are arranged in order of displaying G, B and R components.

The upper right shown in FIG. 7 shows a display format in which the positions of the sub-pixels in the stripe array shown in the upper left in FIG. 7 are vertically shifted. In other words, in the stripe array shown in the upper left in FIG. 7, three sub-pixels laterally arranged in order of R, G, and B components in a single pixel are vertically arranged at the same position. In the display format shown in the upper right in FIG. 7, the sub-pixel of a G component is arranged at the position lower than the sub-pixels of R and B components among three sub-pixels laterally arranged in order of R, G, and B components in a single pixel.

The lower right shown in FIG. 7 shows the display format in which the positions of the sub-pixels in the stripe array shown at upper left in FIG. 7 are vertically shifted, as similar to the display format shown in the upper right in FIG. 7. However, in the display format shown in the lower right in FIG. 7, the sub-pixel of a G component is arranged at the position lower than the sub-pixels of R and B components among three sub-pixels laterally arranged in order of R, G, and B components in a single pixel and the sub-pixel of a B component is arranged at the position upper than the sub-pixel of a R component.

The display format for the image displayed on the display 13 by the display control part 12 is decided by learning so as to display the image that a user feels to be in high quality on the display device 2 (FIG. 2).

Figure 8:
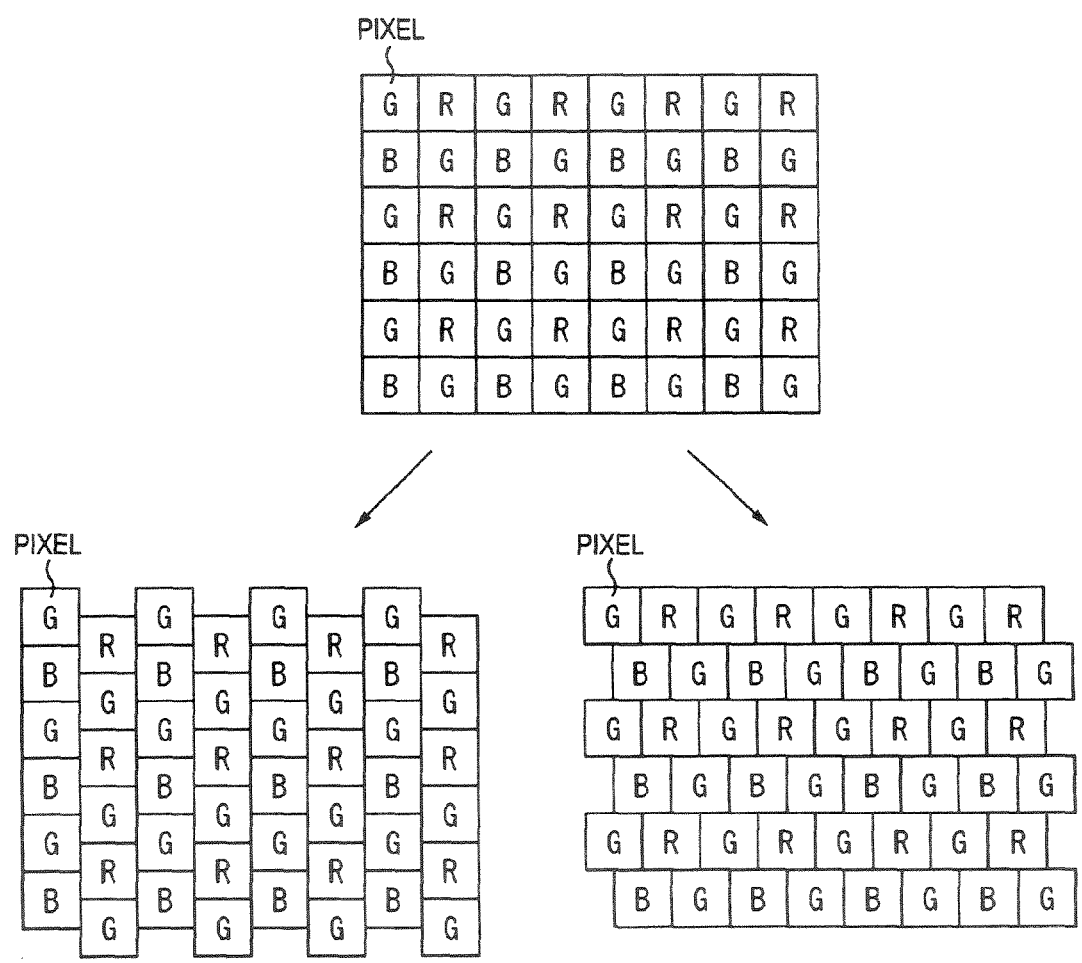
FIG. 8 shows a diagram depicting exemplary signal formats modified with reference to the Bayer format.

Next, FIG. 8 (schematically) shows exemplary signal formats for image signals.

The top shown in FIG. 8 shows the image signal in the Bayer format.

As described above, in the single plate camera, the Bayer format is a signal format which is defined for the convenience of the process for interpolating the other two color components, since only any one of color components of R, G, and B components can be obtained as the pixel value of a single pixel. Therefore, when the image signal in the Bayer format is converted into the HD image signal at the image converting part 11 of the display device 2, and the HD image is finally displayed on the display 13, the result is not always a suited image. In other words, there might be a display format which displays the HD image finally displayed on the display 13 in an image more suited than an image displayed in the existing display format.

Here, the lower ones shown in FIG. 8 show exemplary signal formats which are not the existing signal formats.

In other words, the lower ones shown in FIG. 8 (schematically) show new signal formats obtained by modifying the Bayer format based on the Bayer format.

The lower left shown in FIG. 8 shows a signal format in which the positions of the pixels in the Bayer format shown in the top in FIG. 8 are shifted at every other row downward. In addition, the lower right shown in FIG. 8 shows a signal format in which the positions of the pixels in the Bayer format shown in the top in FIG. 8 are shifted at every other column rightward (or leftward).

Figure 9:
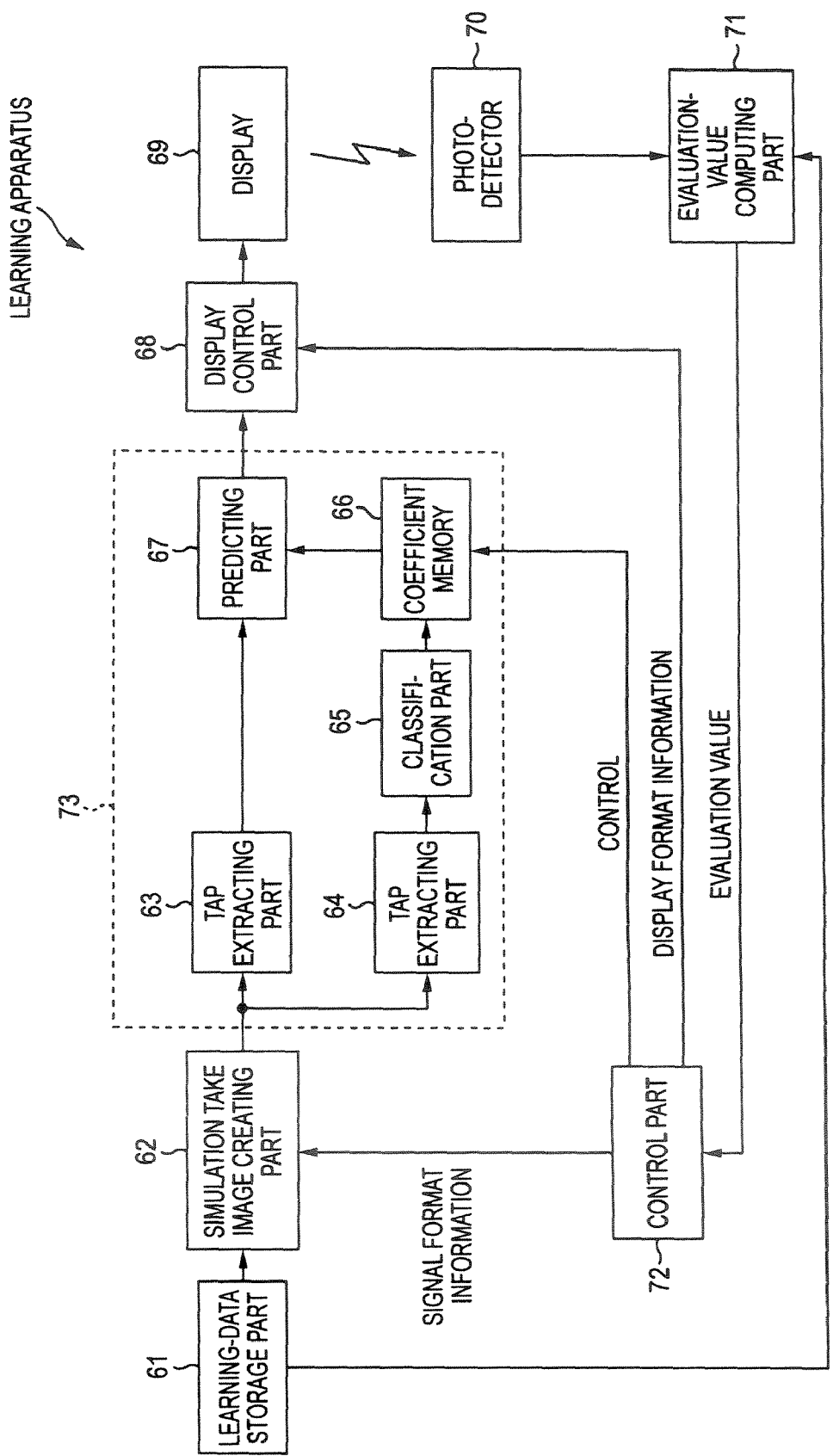
FIG. 9 shows a block diagram depicting an exemplary configuration of a learning apparatus which learns an optimum signal format, display format, and an optimum tap coefficient.

As described above, the learning of the signal format for the SD image signal outputted from the camera 1, the tap coefficient for use in the image conversion process in which the SD image signal is converted into the HD image signal, and the display format which displays the HD image corresponding to the HD image signal obtained in the image conversion process is performed so that the performance of the overall image processing system shown in FIG. 1 is improved, that is, the image finally displayed on the display 13 of the display device 2 (FIG. 2) is a suited image (the image that the user feels it in high quality). FIG. 9 shows an exemplary configuration of a learning apparatus which performs such learning.

In other words, in the learning apparatus shown in FIG. 9, learning is performed so that the image displayed on the display 13 (FIG. 2) is a suited image, the learning which determines the tap coefficient used at the image converting part 11 (FIG. 2) for the image conversion process in which the SD image signal (the shot image signal) outputted from the camera 1 (FIG. 1) is converted into the high quality image signal (the HD image signal) that is a higher quality image (the HD image) than the SD image corresponding to the SD image signal. Furthermore, in the learning apparatus shown in FIG. 9, the learning of the signal format for the SD image signal outputted from the camera 1 and of the display format in which the HD image corresponding to the HD image signal obtained by the image conversion process on the target SD image signal is performed so that the image displayed on the display 13 (FIG. 2) becomes a suited image.

More specifically, in the learning apparatus shown in FIG. 9, a learning data storage part 61 stores an SHD image signal (an SHD image) as learning data for use in learning of the tap coefficient, the signal format, and the display format.

To a simulation take image creating part 62, signal format information which indicates the signal format is supplied from a control part 72, described later. The simulation take image creating part 62 sequentially selects the image signal in each frame of the SHD image signal stored in the learning data storage part 61 as an attention SHD image signal, thins out the number of the pixels of the attention SHD image signal, for example, to generate the SD image signal in the signal format indicated by signal format information from the control part 72, and supplies it as the simulation take image signal corresponding to the shot image signal outputted from the camera 1 (FIG. 1) to tap extracting parts 63 and 64.

The tap extracting parts 63 and 64, a classification part 65, a coefficient memory 66, and a predicting part 67 configure an image converting part 73 which performs the similar image conversion process as the image converting part 11 shown in FIG. 4. In the image converting part 73, the simulation take image signal (the SD image signal) supplied from the simulation take image creating part 62 is converted into the HD image signal by computation with the tap coefficient supplied from the control part 72.

In other words, the tap extracting part 63 sets the simulation take image signal supplied from the simulation take image creating part 62 to the first image signal as well as sets the HD image signal of high quality (high resolution) that is to be obtained by converting the first image signal to the second image signal (since the HD image signal as the second image signal is an image signal that is to be found and it does not exist at the current stage, it is virtually assumed), and sequentially sets the pixel configuring the second image signal to the attention pixel. Then, with respect to the attention pixel, the tap extracting part 63 extracts from the first image signal the prediction tap in the same tap structure as that of the prediction tap extracted by the tap extracting part 41 shown in FIG. 4, and supplies it to the predicting part 67.

With respect to the attention pixel, the tap extracting part 64 extracts from the first image signal the class tap in the same tap structure as that of the class tap extracted by the tap extracting part 42 shown in FIG. 4, and supplies it to the classification part 65.

The classification part 65 classifies the attention pixel by the same method as that of the classification part 43 shown in FIG. 4 based on the class tap from the tap extracting part 64, and supplies the class code corresponding to the resulted class to the coefficient memory 66.

The coefficient memory 66 stores therein the tap coefficient for every class under control performed by the control part 72. Then, as similar to the coefficient memory 44 shown in FIG. 4, the coefficient memory 66 outputs the class indicated by the class code supplied from the classification part 65 among the tap coefficients for every class, that is, the tap coefficient for the class of the attention pixel.

The predicting part 67 acquires (receives) the prediction tap outputted from the tap extracting part 63 and the tap coefficient outputted from the coefficient memory 66, and uses the prediction tap and the tap coefficient to perform the same prediction computation as that of the predicting part 45 shown in FIG. 4. Therefore, the predicting part 67 determines (the predicted value of) the pixel value of the attention pixel, that is, the pixel value of the pixels configuring the HD image signal (the second image signal), and supplies it to the display control part 68.

To the display control part 68, the control part 72 supplies the display format information which indicates the display format. The display control part 68 displays the HD image corresponding to the HD image signal supplied from the predicting part 67 in the display format indicated by the display format information from the control part 72 on the display 69.

The display 69 displays the HD image as light in the display format under control performed by the display control part 68.

A photodetector 70 detects light as the HD image (the display image) displayed on the display 69 (by photoelectric conversion), and outputs the display image signal conformable to the HD image signal that is the electrical signal corresponding to the light to an evaluation value computing part 71.

The evaluation value computing part 71 evaluates the display image signal from the photodetector 70 which results in the HD image displayed on the display 69.

In other words, to the evaluation value computing part 71, the display image signal from the photodetector 70 is supplied as well as the attention SHD image signal from the learning data storage part 61. The evaluation value computing part 71 compares the display image signal from the photodetector 70 with the attention SHD image signal from the learning data storage part 61 to compute the evaluation value of the evaluation of the display image signal which results in the evaluation of the image quality felt by a user who views the HD image displayed on the display 69, and supplies it to the control part 72.

The control part 72 decides the simulation signal format for the shot image signal conformable to the SD image signal outputted from the camera 1 (FIG. 1) to be created by the simulation take image creating part 62 based on the evaluation value from the evaluation value computing part 71, and supplies signal format information which indicates the signal format to the simulation take image creating part 62.

In addition, the control part 72 decides the display format that the display control part 68 displays the HD image corresponding to the HD image signal supplied from the predicting part 67 on the display 69 based on the evaluation value from the evaluation value computing part 71, and supplies display format information which indicates the display format to the display control part 68.

Furthermore, the control part 72 decides the tap coefficient for every class for use in the image conversion process by the image converting part 73 based on the evaluation value from the evaluation value computing part 71, and controls the coefficient memory 66 to store the tap coefficient in the coefficient memory 66.

Next, the relation between the SHD image signal stored as learning data in the learning data storage part 61 shown in FIG. 9 and the HD image signal (the HD image signal of the HD image to be displayed on the display 69) outputted by (the predicting part 67 of) the image converting part 73 will be described with reference to FIG. 10.

Figure 10:
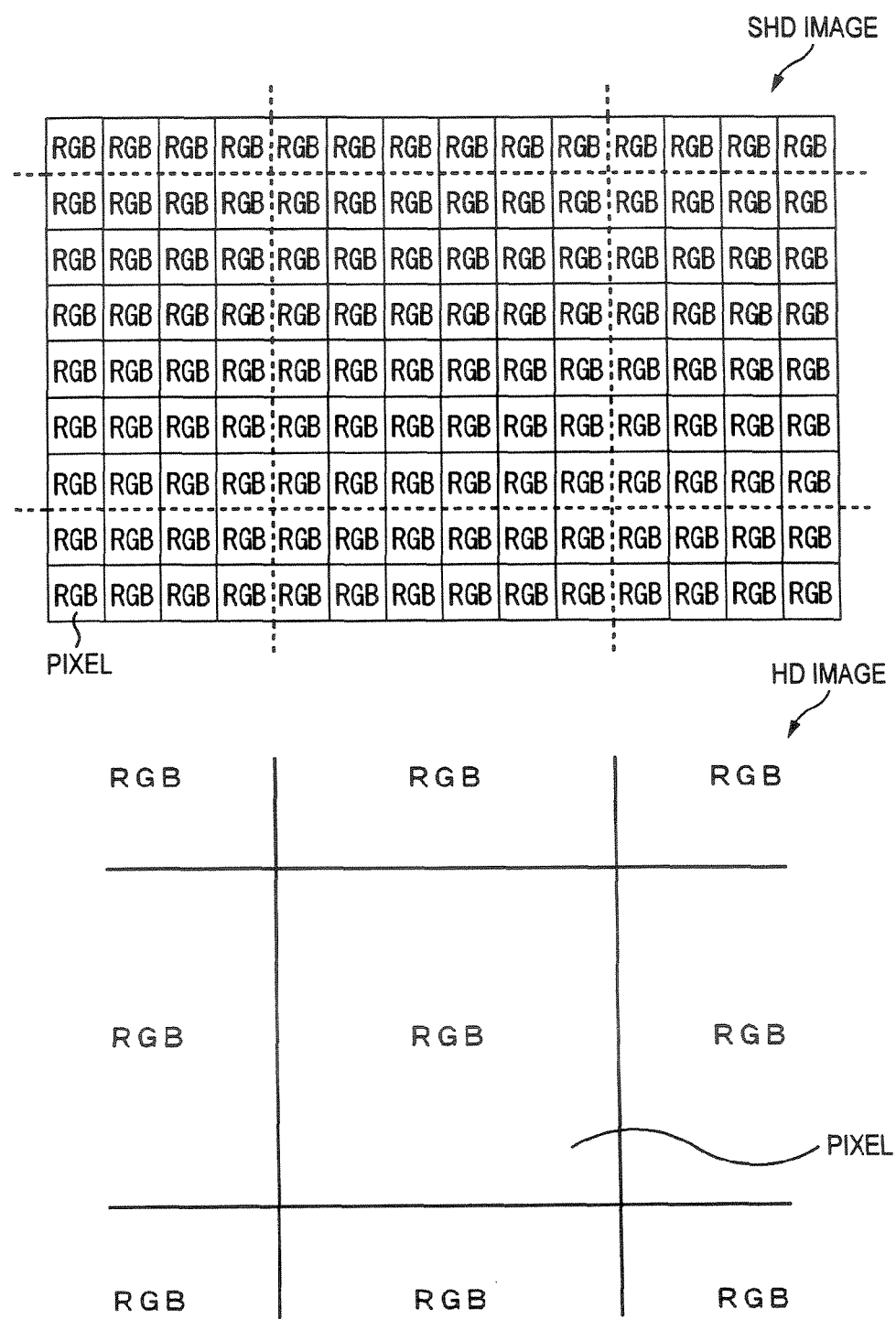
FIG. 10 shows a diagram depicting an SHD image and an HD image.

For example, as shown in the upper part and the lower part in FIG. 10, the SHD image signal and the HD image signal are common in that they are image signals that have the three color components of R, G, and B components per single pixel as the pixel value.

However, the HD image signal is the image signal of low resolution that the number of the pixels is smaller than the SHD image signal has (the SHD image signal is the image signal of high resolution that the number of the pixels is greater than the HD image signal has).

In other words, for example, the HD image signal is the image signal that a six by six matrix of pixels of the SHD image signal corresponds to a single pixel. Moreover, in FIG. 10, to make it easier to understand that a single pixel of the HD image signal is conformable to a six by six matrix of pixels of the SHD image signal, a single pixel of the HD image signal and a six by six matrix of pixels of the SHD image signal are shown in the same size in the drawing, but the pixel size of the HD image signal and the pixel size of the SHD image signal do not necessarily have the relation shown in FIG. 10. The same thing can be applied to the pixel size of the SD image signal and the pixel size of the HD image signal.

Next, a creation method in which the simulation take image creating part 62 shown in FIG. 9 creates the simulation take image signal (the SD image signal) from the SHD image signal as learning data will be described with reference to FIGS. 11 and 12.

For example, the simulation take image creating part 62 creates the HD image signal having the relation described in FIG. 10 from the SHD image signal. In other words, for example, it creates the HD image signal by determining the mean values of a six by six matrix of pixels of R, G, and B components of the SHD image signal as a single pixel of R, G, and B components of the HD image signal corresponding to the six by six matrix of pixels, or by setting any one pixel of R, G, and B components among a six by six matrix of pixels of the SHD image signal to each of a single pixel of R, G, and B components of the HD image signal corresponding to the a six by six matrix of pixels. Furthermore, it creates the simulation take image signal as the SD image signal from the HD image signal.

More specifically, now, suppose for example, the SD image signal is the image signal that a two by two matrix of pixels of the HD image signal corresponds to a single pixel and signal format information which indicates the Bayer format shown on the top in FIG. 8, for example, is supplied from the control part 72 to the simulation take image creating part 62. For example, as shown in FIG. 11, from the HD image signal, the simulation take image creating part 62 creates the simulation take image signal as the SD image signal in the signal format indicated by signal format information from the control part 72.

Figure 11:
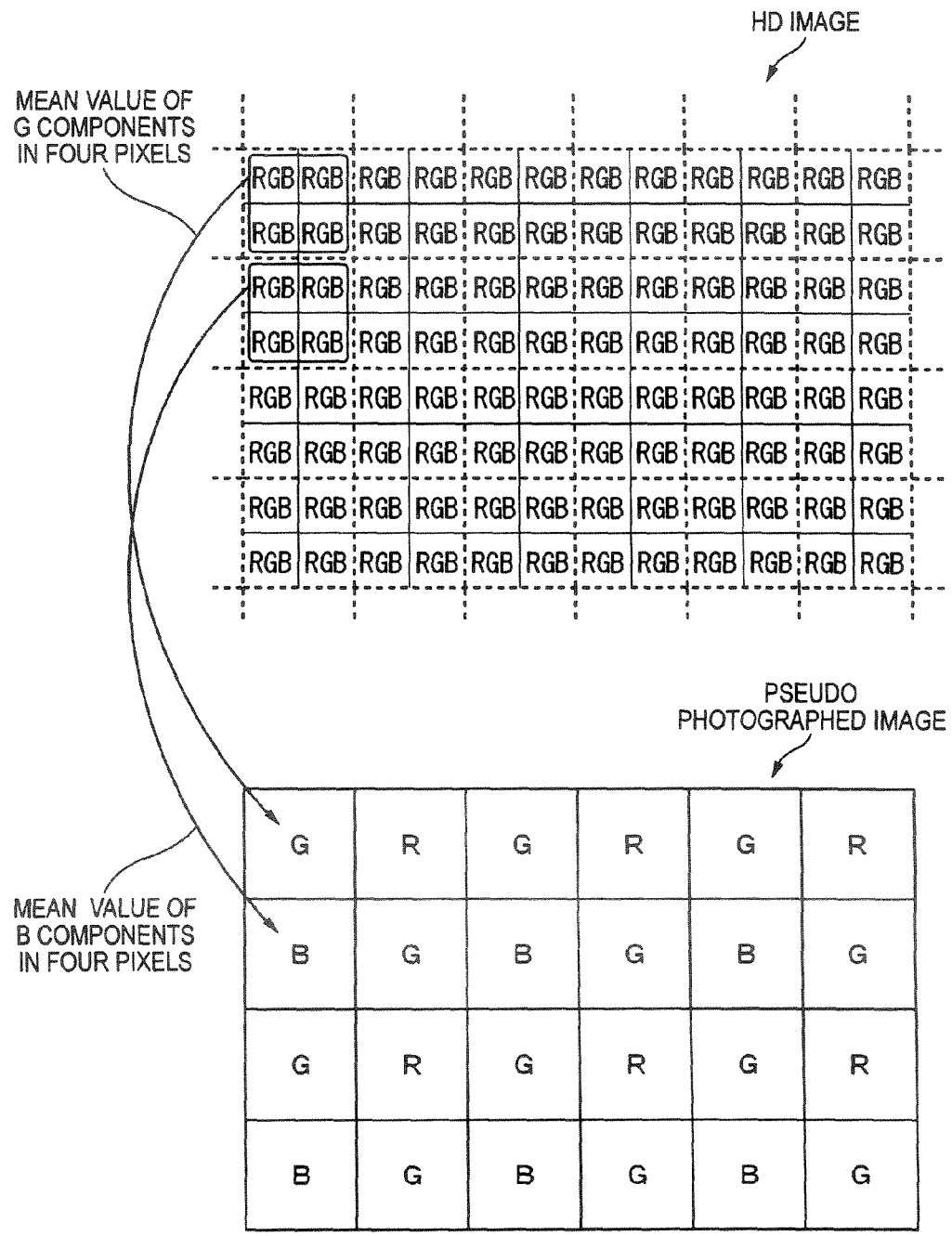
FIG. 11 shows a diagram illustrative of a creation method of creating a simulation take image.

In other words, as shown in FIG. 11, in this case, the simulation take image creating part 62 detects a two by two matrix of pixels of the HD image signal corresponding to each of the pixels of the SD image signal in the Bayer format, determines the pixel value of a single pixel of the SD image corresponding to the two by two matrix of pixels, and then creates the SD image signal in the Bayer format as the simulation take image signal.

Here, each of the pixels of the SD image signal in the Bayer format has only the G component as the pixel value among the color components of R, G, and B components. Thus, the simulation take image creating part 62 determines only the color component that a single pixel of the SD image signal corresponding to a two by two matrix of pixels has the color component as the pixel value among the two by two matrix of pixels of the HD image signal.

More specifically, for example, when among the pixels of the SD image signal in the Bayer format, the pixel having only the G component as the pixel value is the attention pixel, as shown in FIG. 11, the mean value of the G components among the pixel values of a two by two matrix of pixels of the HD image signal corresponding to the attention pixel is determined as the pixel value of the attention pixel.

In addition, for example, when among the pixels of the SD image signal in the Bayer format, the pixel having only the B component as the pixel value is the attention pixel, as shown in FIG. 11, the mean value of the B components is determined as the pixel value of the attention pixel among the pixel values of a two by two matrix of pixels of the HD image signal corresponding to the attention pixel. For the pixel having only the R component as the pixel value among the pixels of the SD image signal in the Bayer format, the pixel value is also similarly determined.

Moreover, in addition to this, for example, when the signal format signal is supplied from the control part 72 to the simulation take image creating part 62, the signal format signal indicating the signal format in which the positions of the pixels in the Bayer format are shifted downward at every other row shown in the lower part in FIG. 8, as similar to the description in FIG. 11, the simulation take image creating part 62 creates from the HD image signal the simulation take image signal as the SD image signal in the signal format indicated by signal format information from the control part 72.

Figure 12:
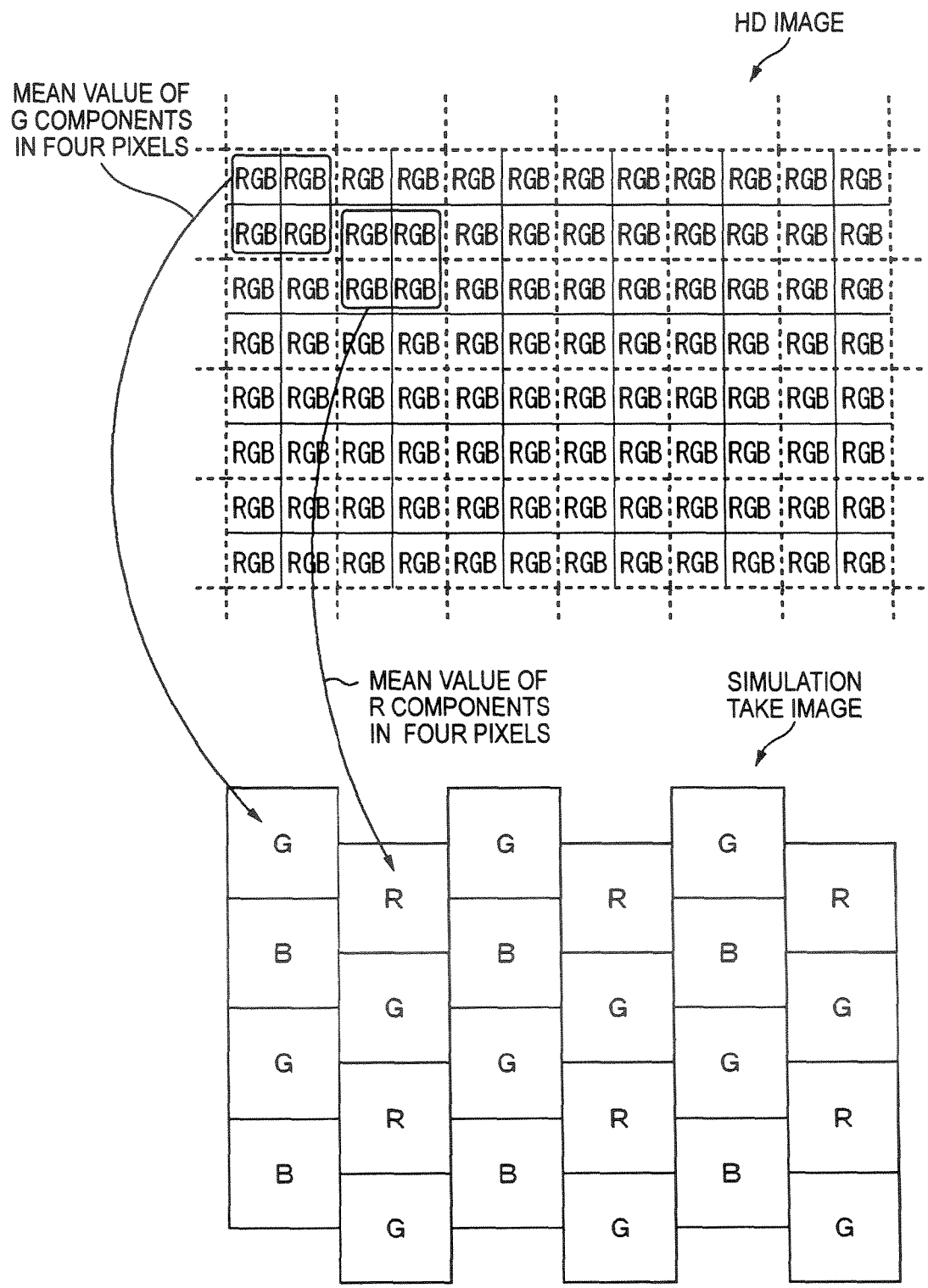
FIG. 12 shows a diagram illustrative of a creation method of creating a simulation take image.

In other words, for example, when the pixel having only the G component as the pixel value is the attention pixel among the pixels of the SD image signal in the signal format shown in the lower part of FIG. 8, as shown in FIG. 12, the simulation take image creating part 62 determines the mean value of the G components as the pixel value of the attention pixel among the pixel values of a two by two matrix of pixels of the HD image signal corresponding to the attention pixel.

In addition, for example, when the pixel having only the R component as the pixel value is the attention pixel among the pixels of the SD image signal in the signal format shown in the lower part of FIG. 8, as shown in FIG. 12, the mean value of the R components is determined as the pixel value of the attention pixel among the pixel values of a two by two matrix of pixels of the HD image signal corresponding to the attention pixel. For the pixel having only the B component as the pixel value among the pixels of the SD image signal in the signal format shown in the lower part in FIG. 8, the pixel value is also similarly determined.

Next, in the learning apparatus shown in FIG. 9, the display control part 68 displays the HD image corresponding to the HD image signal on the display 69 in the display format indicated by display format information supplied from the control part 72. Therefore, the display 69 is configured to display the HD image in various display formats.

Figure 13:
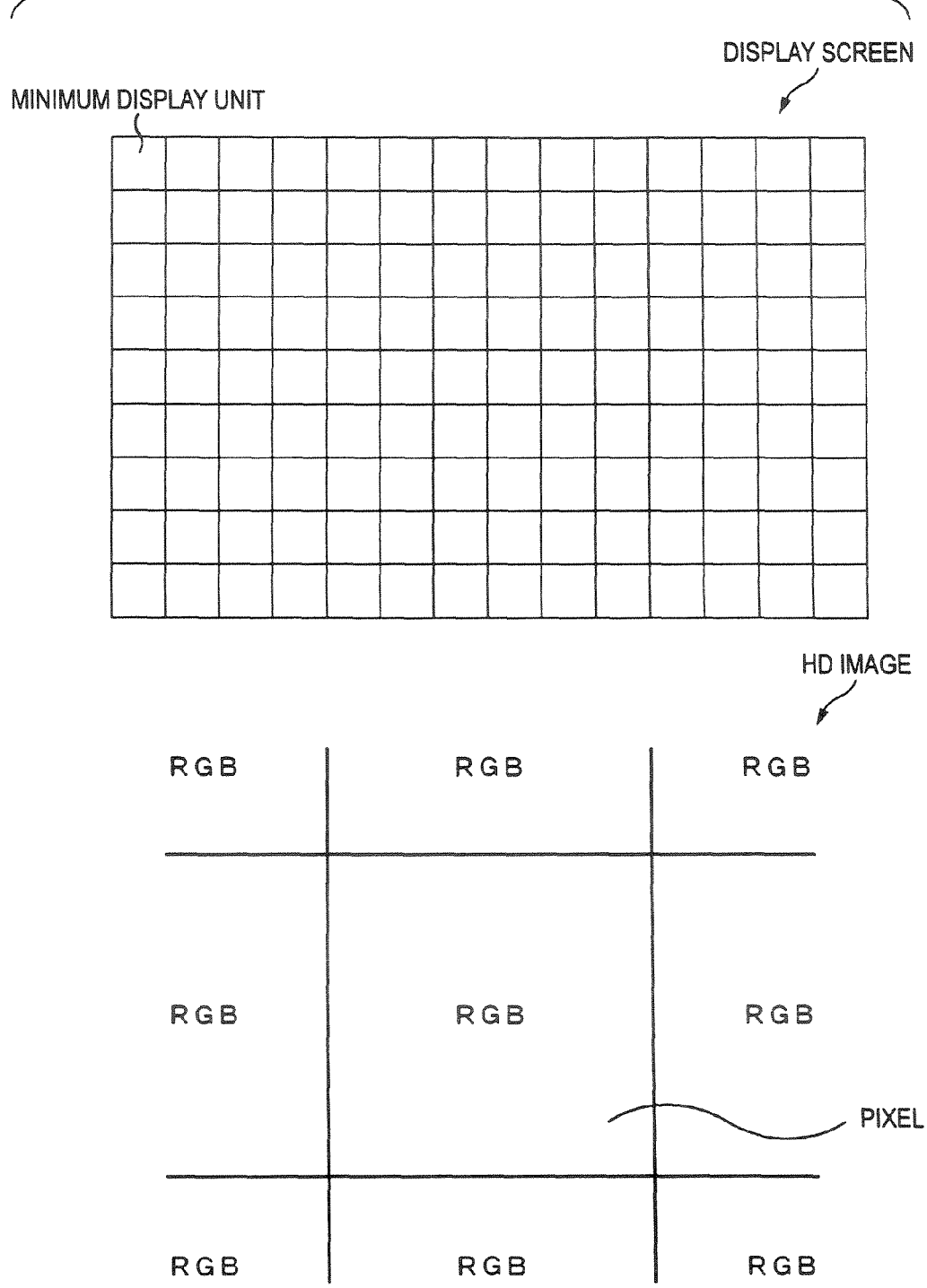
FIG. 13 shows a diagram depicting an HD image and a display screen of a display 69.

In other words, FIG. 13 shows the relation between the display screen of the display 69 and the HD image.

As shown in the upper part in FIG. 13, the display 69 has the display screen in which an area corresponding to a single pixel of the SHD image is a minimum display unit that is the smallest unit allowing the color component to be displayed. As described in FIG. 10, since a six by six matrix of pixels of the SHD image corresponds to a single pixel of the HD image, for the display screen having the area corresponding to a single pixel of the SHD image as the minimum display unit, a six by six matrix of the minimum display units corresponds to a single pixel of the HD image shown in the lower part in FIG. 13. Moreover, in the display screen, hereinafter, a six by six matrix of the minimum display units corresponding to the pixel of the HD image is properly also called a pixel.

Figure 14:
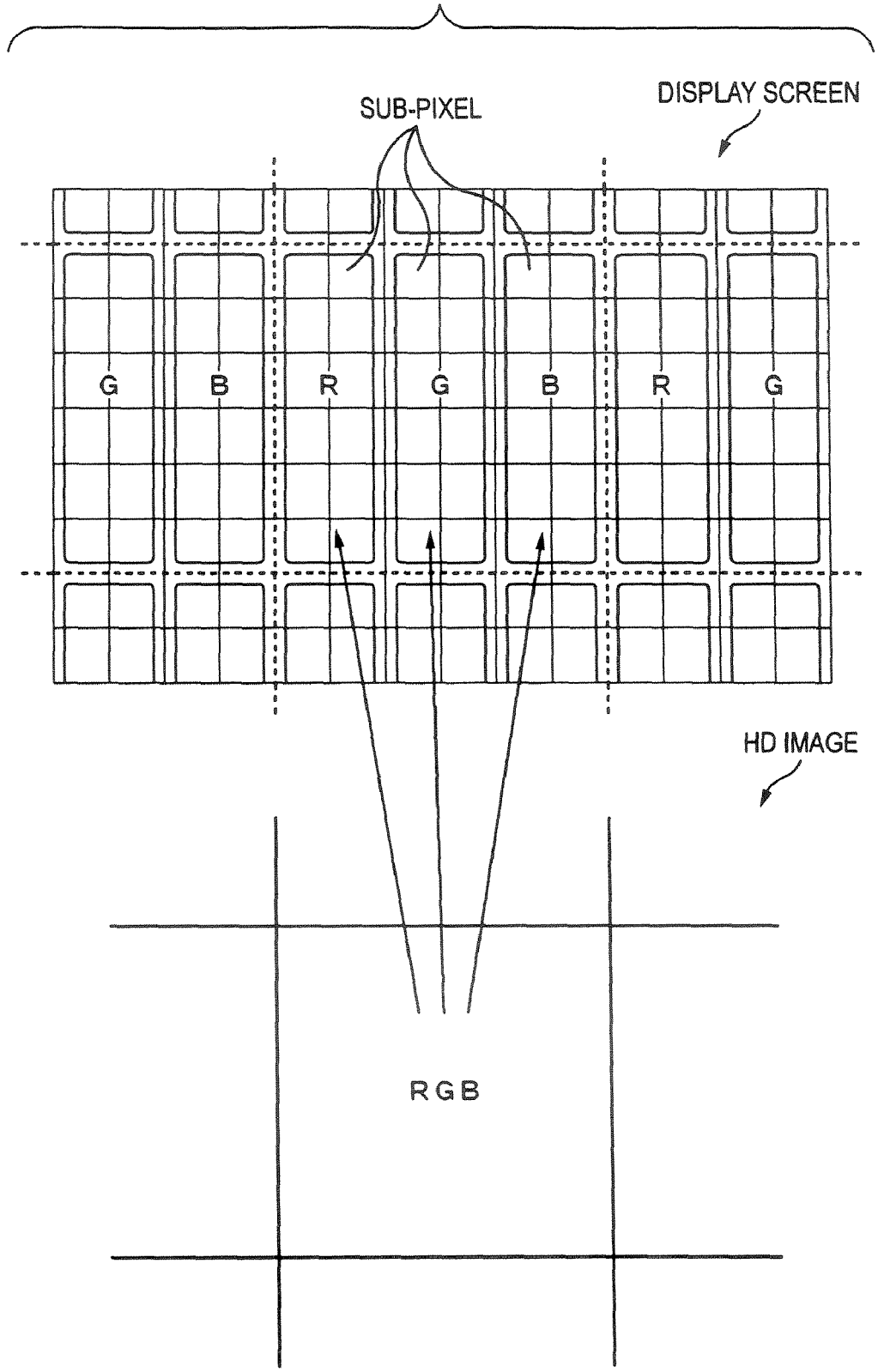
FIG. 14 shows a diagram depicting the HD image and the display screen of the display 69.
Figure 15:
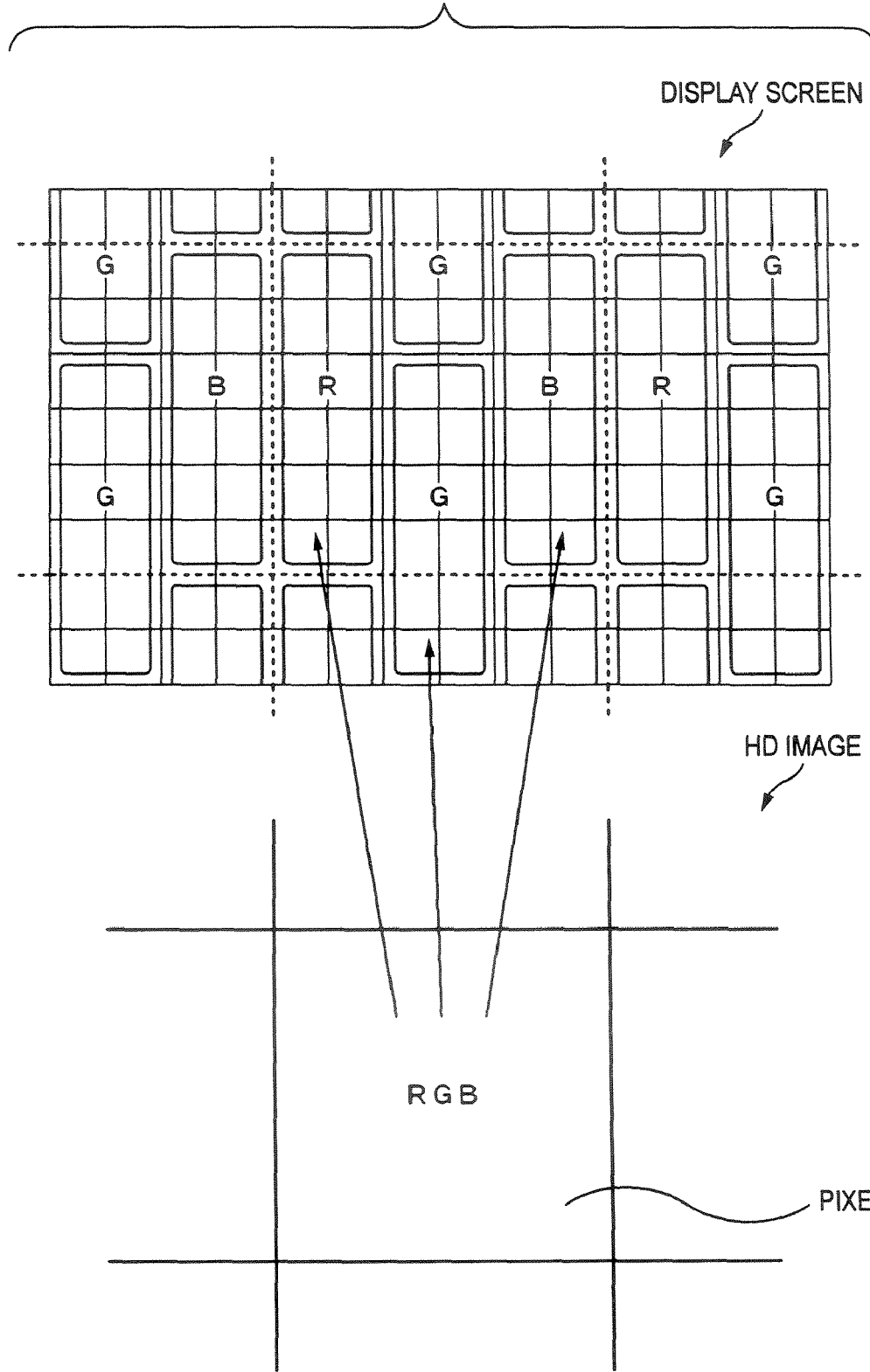
FIG. 15 shows a diagram depicting the HD image and the display screen of the display 69.

For example, as shown in FIGS. 14 and 15, the display control part 68 displays the HD image on the display screen of the display 69 in the display format indicated by display format information from the control part 72.

In other words, for example, when display format information from the control part 72 indicates the stripe array shown in the upper left in FIG. 7, as shown in FIG. 14, the display control part 68 sets a two by six matrix of the minimum display unit to a sub-pixel in which the pixels of the display screen are laterally divided into three portions. Then, as shown in FIG. 14, the display control part 68 displays the color components of R, G, and B components of the pixel of the HD image at the first left, second left and third sub-pixels of the pixels of the display screen corresponding to the pixel. Thus, the HD image is displayed in the stripe array indicated by display format information from the control part 72.

In addition, when the display format information from the control part 72 indicates the display format shown in the upper right in FIG. 7, for example, in which the sub-pixel of the G component is arranged at the position lower than the sub-pixels of R and B components among three sub-pixels laterally arranged in order of a single pixel of R, G, and B components, as shown in FIG. 15, the display control part 68 sets three sub-pixels of R, G, and B components on the display screen (a two by six matrix of the minimum display units) so that the sub-pixel of the G component is arranged at the position lower than the sub-pixels of R and B components as similar to the display format. Then, as shown in FIG. 15, the display control part 68 displays the color components of R, G, and B components of the pixel of the HD image on the corresponding sub-pixels on the display screen, whereby the HD image is displayed in the display format indicated by the display format information from the control part 72.

Next, the process performed by the evaluation value computing part 71 shown in FIG. 9 will be described with reference to FIGS. 16 to 18.

As described in FIG. 9, the evaluation value computing part 71 compares the display image signal from the photodetector 70 with the attention SHD image signal from the learning data storage part 61, and computes the evaluation value of the evaluation of the display image signal, which results in the evaluation of the image quality felt by a user who views the HD image displayed on the display 69.

Here, the photodetector 70 detects light as the HD image (the display image) displayed on the display 69 for each of R, G, and B components (by photoelectric conversion), and outputs to the evaluation value computing part 71 the display image signal that is the HD image signal having the R component, the G component, and the B component that are electrical signals each corresponding to R, G, and B lights as the pixel value of each of the pixels.

Figure 16:
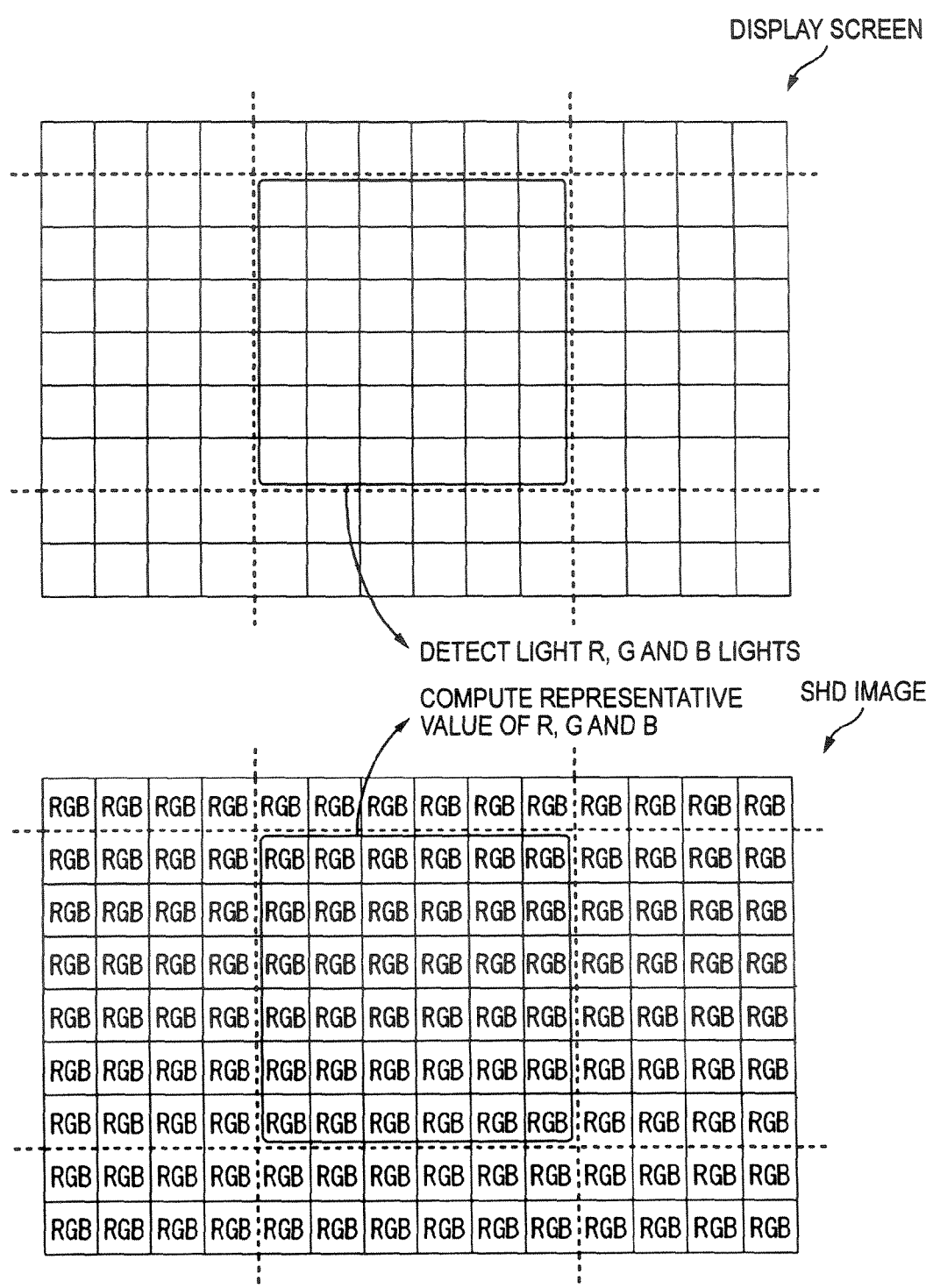
FIG. 16 shows a diagram illustrative of an evaluation method of evaluating a display image displayed on the display 69.

In other words, as shown in the upper part in FIG. 16, the photodetector 70 detects the light of each of the pixels configured of a six by six matrix of the minimum display units on the display screen of the display 69 for each of R, G, and B components, and outputs to the evaluation value computing part 71 the display image signal that is the HD image signal having the R component, the G component, and the B component that are electrical signals each corresponding to R, G, and B lights as the pixel value of each of the pixels.

On the other hand, the evaluation value computing part 71 generates an evaluation HD image signal that is the HD image signal for use in the evaluation of the display image signal from the attention SHD image signal stored in the learning data storage part 61.

More specifically, the evaluation value computing part 71 determines a representative value to be the pixel value of the pixel of the HD image signal from the pixel value of a six by six matrix of pixels of the attention SHD image signal corresponding to the pixel of the HD image signal. In other words, for example, the evaluation value computing part 71 determines each of the mean values of a six by six matrix of pixels of R, G, and B components of the attention SHD image signal corresponding to the pixel of the HD image signal, or any one of the pixels of R, G, and B components among the six by six matrix of pixels as the representative value of each of the six by six matrix of pixels of R, G, and B components. Then, as the evaluation HD image signal, the evaluation value computing part 71 generates the HD image signal having the representative values of the six by six matrix of pixels of R, G, and B components of the attention SHD image signal as the corresponding pixels of R, G, and B components.

Furthermore, the evaluation value computing part 71 determines the square error $(R_1-R_2)^2+(G_1-G_2)^2+(B_1-B_2)^2$ between the pixel value of the pixel of the evaluation HD image signal $(R_1, G_1, B_1)$ and the pixel value of the corresponding pixel of the display image signal $(R_2, G_2, B_2)$ for all the pixels of the evaluation HD image signal obtained from the HD image signal stored in the learning data storage part 61, and determines the value inversely proportional to the total sum of the square errors for all the pixels as the evaluation value.

Figure 17:
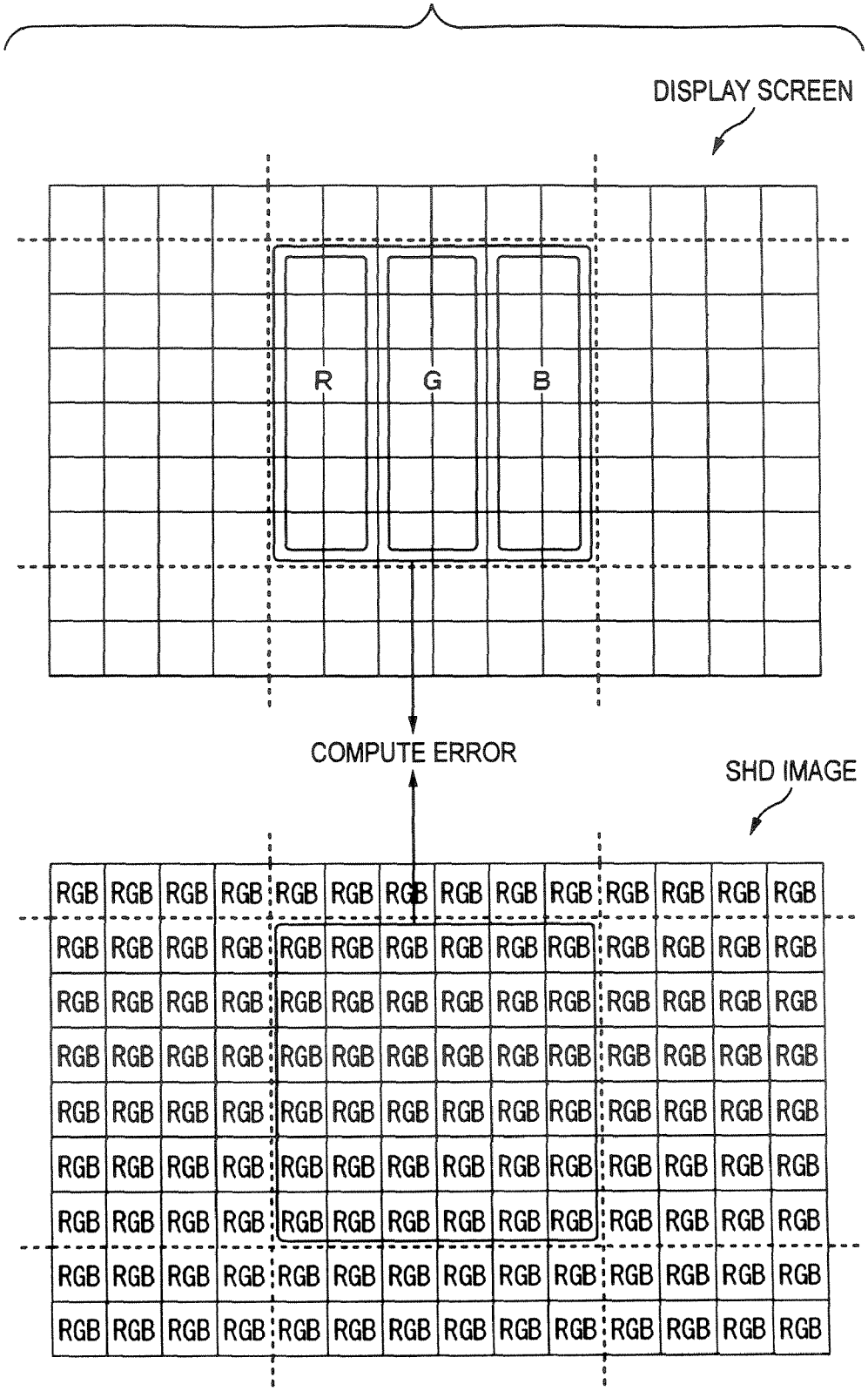
FIG. 17 shows a diagram illustrative of an evaluation method of evaluating a display image displayed on the display 69.

Therefore, for example, in the display 69, when the HD image is displayed in the stripe array that is the display format shown in FIG. 14, in the photodetector 70 (FIG. 9), as shown in FIG. 17, a six by six matrix of the minimum unit of R, and B lights as a single pixel of the display screen is detected, that is, R, G and B lights of the sub-pixels (a two by six matrix of the minimum display unit) of each of R, G, and B components contained in a single pixel of the display screen is detected, and the R, G, and B components as the electrical signals each corresponding to the R, G, and B lights are supplied to the evaluation value computing part 71. Then, in the evaluation value computing part 71, the square error between the R, G, and B components from the evaluation value computing part 71 and the R, G, and B components of the pixel of the evaluation HD image signal having the representative value of a six by six matrix of pixels of the attention SHD image signal as the pixel value is determined for all pixels of the evaluation HD image signal obtained from the SHD image signal stored in the learning data storage part 61, and the value inversely proportional to the total sum of the square errors for all the pixels is determined as the evaluation value.

Figure 18:
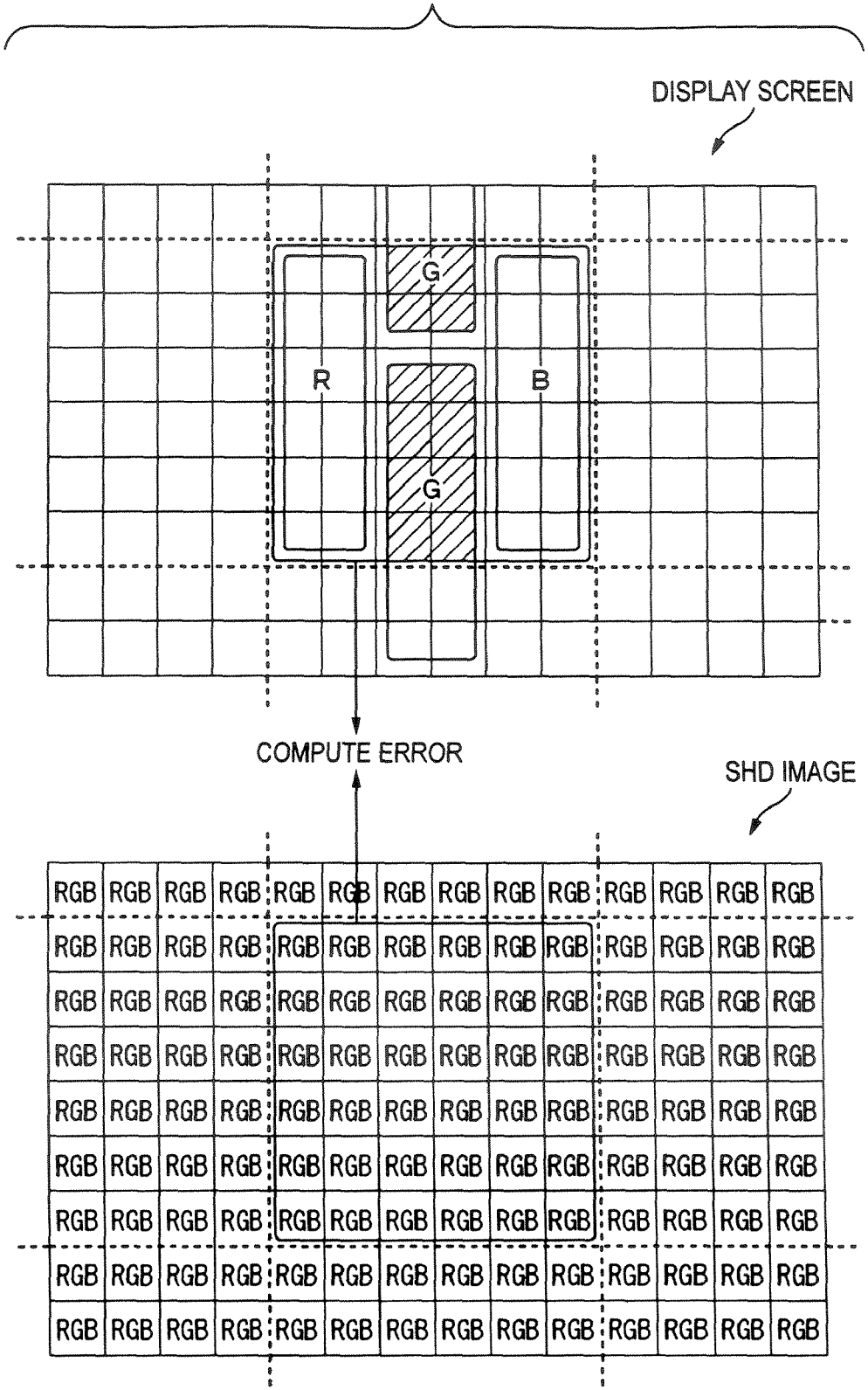
FIG. 18 shows a diagram illustrative of an evaluation method of evaluating a display image displayed on the display 69.

In addition, in the display 69, for example, when the HD image is displayed in the display format shown in FIG. 15 in which among the sub-pixels of R, G, and B components, the sub-pixel of the G component is arranged at the position lower than the sub-pixels of R and B components, in the photodetector 70 (FIG. 9), as shown in FIG. 18, a six by six matrix of the minimum display unit of R, G, and B lights as a single pixel of the display screen is detected, and the R, G, and B components as the electrical signals each corresponding to the R, G, and B lights are supplied to the evaluation value computing part 71.

In other words, in this case, for the R component, in the photodetector 70, R light of a single sub-pixel of the R component (a two by six matrix of the minimum display unit) contained in a single pixel of the display screen is detected, and the R component that is the electrical signal corresponding to the R light is supplied to the evaluation value computing part 71. As similar to the R component, for the B component, in the photodetector 70, B light of a single sub-pixel of the B component (a two by six matrix of the minimum display unit) contained in a single pixel of the display screen is detected, and the B component that is the electrical signal corresponding to the BS light is supplied to the evaluation value computing part 71.

In addition, since the G component is arranged at the position lower than the sub-pixels of R and B components, a single pixel of the display screen partially contains two sub-pixels of the G component. Therefore, for the G component, the photodetector 70 detects the light (the portions with dashed lines in FIG. 18) that the B light of each of the two sub-pixels of the B component contained in a single pixel of the display screen (a two by six matrix of the minimum display units) is partially combined, and supplies the B component as the electrical signal corresponding to the combined light to the evaluation value computing part 71.

Then, the evaluation value computing part 71 determines the square error between the R, G, and B components from the evaluation value computing part 71 and the R, G, and B components of the pixel of the evaluation HD image signal having the representative value of a six by six matrix of pixels of the attention SHD image signal as the pixel value for all the pixels of the evaluation HD image signal obtained from the SHD image signal stored in the learning data storage part 61, and determines the value inversely proportional to the total sum of the square errors for all the pixels as the evaluation value.

Next, a learning process performed by the learning apparatus shown in FIG. 9 in which the tap coefficient, the signal format, and the display format are learned will be described with reference to a flow chart shown in FIG. 19.

At Step S31, the control part 72 decides an initial signal format $A_i$ that is to be the attention signal format among a plurality of initial signal formats, and supplies signal format information which indicates the attention signal format $A_i$ to the simulation take image creating part 62, and the process goes to Step S32.

In other words, for example, in the learning apparatus shown in FIG. 9, a plurality of the signal formats including the Bayer format and the other existing signal formats is set (decided) as the initial signal formats to be first used in the learning process, and the control part 72 stores items of signal format information each indicating a plurality of the initial signal formats in its incorporated memory (not shown). Then, the control part 72 decides (sets) as the initial signal format $A_i$, one of the initial signal formats that are not set to the attention signal format among a plurality of the initial signal formats indicated by a plurality of the items of signal format information stored in the incorporated memory and supplies signal format information which indicates the attention signal format $A_i$ to the simulation take image creating part 62.

Here, for example, $A_i$ indicates the ith initial signal format among a plurality of the initial signal formats.

At Step S32, the control part 72 decides an initial display format $B_j$ that is to be the attention display format among a plurality of the initial display formats, and supplies display format information which indicates the attention display format $B_j$ to the display control part 68, and the process goes to Step S33.

In other words, for example, in the learning apparatus shown in FIG. 9, a plurality of the display formats including the stripe array, the delta array and the other existing display formats is set as the initial display formats to be first used in the learning process, and the control part 72 stores items of display format information each indicating a plurality of the initial display formats in its incorporated memory. Then, the control part 72 decides as the attention display format Bj one of the initial display formats that are not set to the attention signal format among a plurality of the initial display formats indicated by a plurality of the items of display format information stored in the incorporated memory, and supplies the display format information indicting the attention display format $B_j$ to the display control part 68.

Here, for example, $B_j$ indicates the jth initial display format among a plurality of the initial display formats.

At Step S33, in the learning apparatus (FIG. 9), for the combination of the attention signal format $A_i$ and the attention display format $B_j$, a set of temporary optimum tap coefficients $F_{i,j}$ (a set of tap coefficients for every class $(x_1, x_2 \ldots, X_N)$ for use in computation of Equation (1)) is decided.

In other words, at Step S33, the SD image signal of the attention signal format $A_i$ is set to the first image signal, the image converting part 11 shown in FIG. 4 uses the tap coefficient to perform the image conversion process to obtain the HD image corresponding to the HD image signal that is the second image signal formed of the pixels having each component of R, G, and B components as the pixel value, and the HD image is displayed in the attention display format $B_j$ on the display 69. In this case, a set of the tap coefficients that most maximizes the evaluation value of the display image signal obtained by detecting the light as the HD image displayed on the display 69 by the photodetector 70 is determined as a set of the temporary optimum tap coefficients $F_{i,j}$ for the combination of the attention signal format $A_i$ and the attention display format $B_j$.

Then, the process goes from Step S33 to Step S34. The control part 72 determines whether all of a plurality of the initial display formats indicated by a plurality of the items of display format information stored in the incorporated memory is set to the attention display format to find a set of the tap coefficients at Step S33.

At Step S34, when it is determined that all of a plurality of the initial display formats are not set to the attention display format, the process returns to Step S32. The control part 72 newly decides one of the initial display formats that are not set to the attention display format among a plurality of the initial display formats as the attention display format, and supplies display format information which indicates the attention display format to the display control part 68, and hereinafter, the similar process steps are repeated.

In addition, at Step S34, when it is determined that all of a plurality of the initial display formats is set to the attention display format, the process goes to Step S35. The control part 72 determines whether all of a plurality of the initial signal formats indicated by a plurality of the items of signal format information stored in the incorporated memory is set to the attention signal format to find a set of the tap coefficients at Step S33.

At Step S35, when it is determined that all of a plurality of the initial signal formats is not set to the attention signal format, the process returns to Step S31. The control part 72 newly decides one of the initial display formats that are not set to the attention signal format among a plurality of the initial signal formats as the attention signal format, and supplies signal format information which indicates the attention signal format to the simulation take image creating part 62, and hereinafter, the similar process steps are repeated.

In addition, at Step S35, when it is determined that all of a plurality of the initial signal formats is set to the attention signal format, that is, when a set of the optimum tap coefficients is found for the combination of each of a plurality of the initial signal formats and each of a plurality of the initial display formats at Step S33, the process goes to Step S36. The control part 72 temporarily decides the combination of the optimum signal format, the optimum display format, and a set of the optimum tap coefficients among the combinations of the initial signal format and the initial display format and a set of the optimum tap coefficients for the combination of the initial signal format and the initial display format.

In other words, when there are I ways of the signal formats for a plurality of the initial signal formats and there are J ways of the display formats for a plurality of the initial display formats, at Step S33, a set of the temporary optimum tap coefficients is found for each of I×J ways of the combinations of the initial signal format and the initial display format. Consequently, I×J ways of the combinations of the initial signal format, the initial display format, and a set of the tap coefficients are obtained. At Step S36, among I×J ways of the combinations of the initial signal format, the initial display format, and a set of the tap coefficients, the combination having the maximum evaluation value of the display image signal is temporarily decided as the combination of the optimum signal format, the optimum display format, and a set of the optimum tap coefficients.

At Step S36, after the combination of the optimum signal format, the optimum display format, and a set of the optimum tap coefficients is temporarily decided, the process goes to Step S37. An optimum signal format decision process is performed in which the optimum signal format is temporarily decided for the current optimum combination of the display format and a set of the tap coefficients, and the process goes to Step S38.

At Step S38, an optimum display format decision process is performed in which the optimum display format is temporarily decided for the current optimum combination of the signal format and a set of the tap coefficients, and the process goes to Step S39.

At Step S39, an optimum tap coefficient set decision process is performed in which a set of the optimum tap coefficients is temporarily decided for the current optimum combination of the signal format and the display format, and the process goes to Step S40.

At Step S40, the control part 72 determines whether the combination of the current optimum signal format determined at the next previous Step S37, the current optimum display format determined at the next previous Step S38, and the set of the current optimum tap coefficients determined at the next previous Step S39 is an optimized combination.

In other words, in the optimum tap coefficient set decision process at the next previous Step S39, for the current temporary optimum combination of the signal format and the display format, a set of the tap coefficients that makes the evaluation value computed by the evaluation value computing part 71 at the maximum is temporarily decided as a set of the optimum tap coefficients, as described later. At Step S40, for example, depending whether the evaluation value of the set of the optimum tap coefficients is equal to or greater than a predetermined threshold for determining optimization, it is determined whether the combination of the current temporary optimum signal format, the current temporary optimum display format, and the set of the current temporary optimum tap coefficients is an optimized combination.

At Step S40, when it is determined that the combination of the current temporary optimum signal format, the current temporary optimum display format, and the set of the current temporary optimum tap coefficients is not an optimized combination, that is, when the evaluation value for a set of the optimum tap coefficients temporarily decided at the next previous Step S39 is not equal to or greater than the threshold for determining optimization, the process returns to Step S37, and the similar process steps are repeated.

In addition, at Step S40, when it is determined that the combination of the current temporary optimum signal format, the current temporary optimum display format, and the set of the current temporary optimum tap coefficients is an optimized combination, that is, when the evaluation value for a set of the optimum tap coefficients temporarily decided at the next previous Step S39 is equal to or greater than the threshold for determining optimization, the control part 72 finally decides the combination of the current temporary optimum signal format, the current temporary optimum display format, and the set of the current temporary optimum tap coefficients as the combination of the optimum signal format, the optimum display format, and a set of the optimum tap coefficients, and end the learning process.

Figure 19:
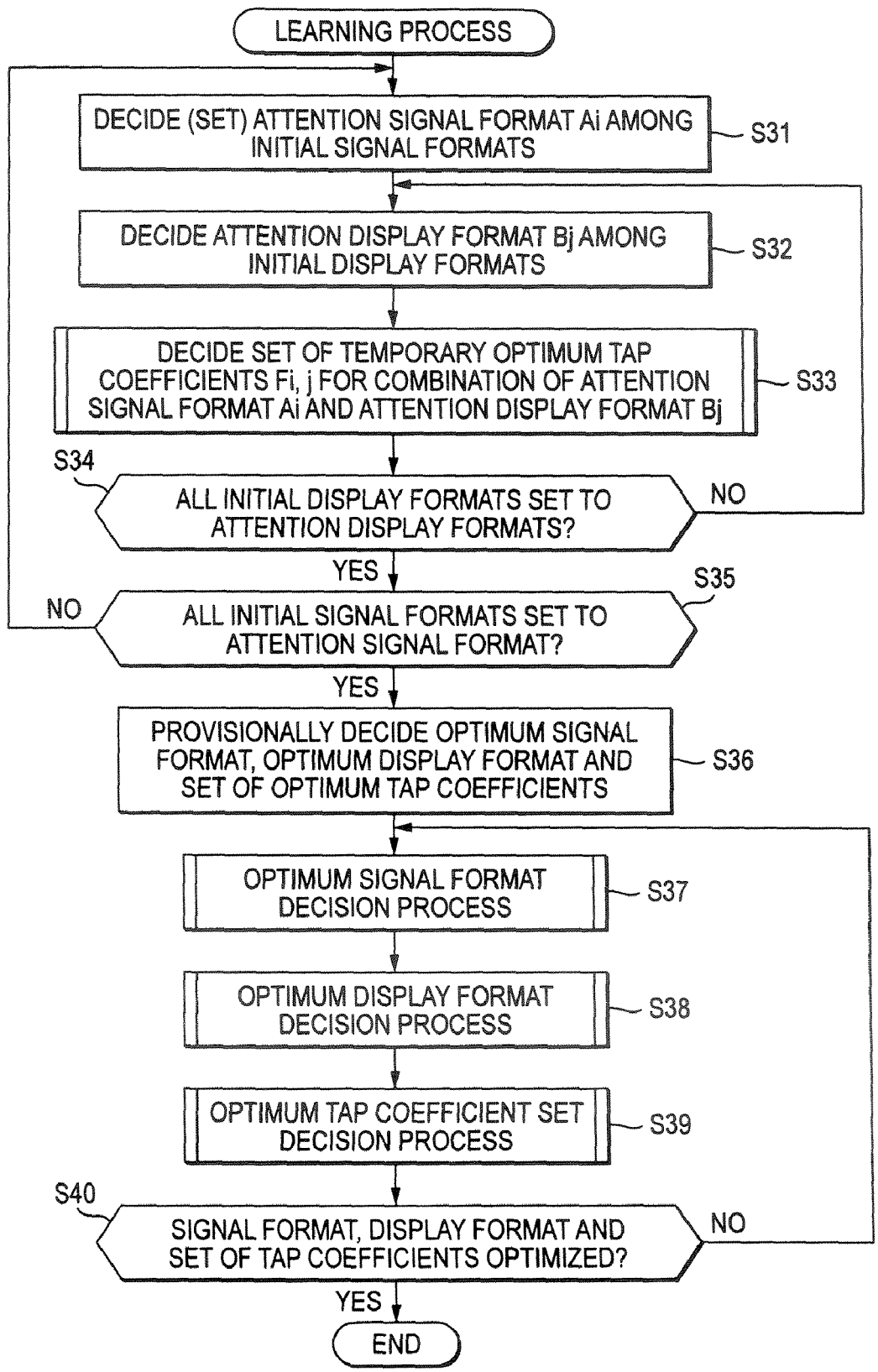
FIG. 19 shows a flow chart illustrative of the process steps performed by the learning apparatus which learns an optimum signal format, an optimum display format, and an optimum tap coefficient.

In the image processing system shown in FIG. 1, the camera 1 outputs the shot image signal (the SD image signal) in the optimum signal format finally decided by the learning process shown in FIG. 19. In addition, the display control part 12 of the display device 2 (FIG. 2) displays the HD image in the optimum display format finally decided by the learning process shown in FIG. 19 on the display 13. Furthermore, the coefficient memory 44 of the image converting part 11 of the display device 2 stores therein a set of the optimum tap coefficients finally decided by the learning process shown in FIG. 19, and the image converting part 11 uses the set of the tap coefficients to perform the image conversion process.

Consequently, the performance of the image processing system can be improved which is the combination of the camera 1 and the display device 2 shown in FIG. 1. In other words, according to the image processing system which is the combination of the camera 1 and the display device 2 shown in FIG. 1, the image that a user feels to be in high quality can be displayed on the display 13 regardless of the signal to noise ratio of the shot image signal outputted from the camera 1 or the HD image signal outputted from the image converting part 11.

Moreover, in FIG. 19, when the evaluation value for the set of the tap coefficients determined in the optimum tap coefficient set decision process is equal to or greater than the threshold for determining optimization, it is determined that the combination of the signal format, the display format, and a set of the tap coefficients is optimized. In addition to this, for example, this scheme may be performed in which when the optimum signal format decision process, the optimum display format decision process, and the optimum tap coefficient set decision process are repeated for a predetermined number of times, it is determined that the combination of the signal format, the display format, and a set of the tap coefficients is optimized.

Next, the process at Step S33 shown in FIG. 19 in which a set of the temporary optimum tap coefficients $F_{i,j}$ is decided for the combination of the attention signal format $A_i$ and the attention display format $B_j$ will be described in detail with reference to a flow chart shown in FIG. 20.

At Step S51, the control part 72 decides a set of the tap coefficients for every class for use in the image conversion process by the image converting part 73. In other words, for example, suppose the sum of classes is $\alpha$, the number of the tap coefficients for every class is $\beta$ (n in Equation (1)), and the bit number of the tap coefficients is $\gamma$. The number of a set of the tap coefficients that possibly takes is $\alpha \times \beta \times 2^{\gamma}$ ways, but the control part 72 decides as a set of the attention tap coefficients one set that is not set to a set of the attention tap coefficients in the process shown in FIG. 20 at this time among $\alpha \times \beta \times 2^{\gamma}$ ways of sets of the tap coefficients.

Then, the control part 72 supplies and stores the set of the attention tap coefficients in the coefficient memory 66, and the process goes from Step S51 to Step S52.

At Step S52, the control part 72 supplies signal format information which indicates the attention signal format $A_i$ to the simulation take image creating part 62 to allow the simulation take image creating part 62 to generate the SD image signal as the simulation take image signal in the attention signal format $A_i$.

In other words, when the signal format information indicting the attention signal format $A_i$ is supplied from the control part 72, the simulation take image creating part 62 thins out the number of the pixels of the SHD image signal stored in the learning data storage part 61, for example, to generate the SD image signal in the attention signal format $A_i$, and supplies it as the simulation take image signal conformable to the shot image signal outputted from the camera 1 (FIG. 1) to the image converting part 73.

After that, the process goes from Step S52 to Step S53. The image converting part 73 sets the simulation take image signal (the SD image signal) in the attention signal format $A_i$ supplied from the simulation take image creating part 62 to the first image signal, and performs the image conversion process in which the first image signal is converted to the HD image signal as the second image signal that a single pixel has all the R, G, and B components.

In other words, at Step S53, at first, at Step S53$_1$, the tap extracting part 63 of the image converting part 73 sets the simulation take image signal supplied from the simulation take image creating part 62 to the first image signal as well as sets the HD image signal of high quality (the high resolution) that the first image signal is converted to obtain to the second image signal (since the HD image signal as the second image signal is an image signal that is to be found and it does not exist at the current stage, it is virtually assumed), and then sequentially sets the pixels configuring the second image signal to the attention pixel. Then, with respect to the attention pixel, the tap extracting part 63 extracts from the first image signal the prediction tap in the same tap structure as that of the prediction tap extracted by the tap extracting part 41 shown in FIG. 4, and supplies it to the predicting part 67.

Furthermore, at Step S53$_1$, with respect to the attention pixel, the tap extracting part 64 extracts from the first image signal the class tap in the same tap structure as that of the class tap extracted by the tap extracting part 42 shown in FIG. 4, and supplies it to the classification part 65.

Then, the process goes Step S53$_1$ to Step S53$_2$. The classification part 65 classifies the attention pixel by the same method as the classification part 43 shown in FIG. 4 based on the class tap from the tap extracting part 64, and supplies the class code corresponding to the resulted class to the coefficient memory 66, and the process goes to Step S53$_3$.

At Step S53$_3$, the coefficient memory 66 acquires the class indicated by the class code supplied from the classification part 65 among the stored sets of the attention tap coefficients under control performed by the control part 72, that is, the tap coefficient for the class of the attention pixel, and outputs it to the predicting part 67, and the process goes to Step S53$_4$.

At Step S53$_4$, the predicting part 67 acquires the prediction tap outputted from the tap extracting part 63 and the tap coefficient outputted from the coefficient memory 66, and uses the prediction tap and the tap coefficient to perform the same prediction computation as that of the predicting part 45 shown in FIG. 4, that is, for example, a computation of Equation (1). Therefore, the predicting part 67 determines (the predicted value of) the pixel value of the attention pixel, that is, the pixel value of the pixel configuring the HD image signal (the second image signal), and supplies it to the display control part 68.

After the process steps of Step S53, the process goes to Step S54. The control part 72 supplies display format information which indicates the attention display format $B_j$ to the display control part 68. Thus, the display control part 68 displays the HD image corresponding to the HD image signal outputted from the image converting part 73 in the attention display format $B_j$ indicated by display format information from the control part 72 on the display 69, and the process goes from Step S54 to Step S55.

At Step S55, the photodetector 70 detects the light as the HD image (the display image) displayed on the display 69 (by photoelectric conversion), and outputs the display image signal conformable to the HD image signal that is the electrical signal corresponding to the light to the evaluation value computing part 71, and the process goes to Step S56.

At Step S56, the evaluation value computing part 71 evaluates the display image signal from the photodetector 70, which results in the evaluation of the HD image displayed on the display 69.

In other words, the evaluation value computing part 71 reads the SHD image signal corresponding to the display image signal from the photodetector 70 out of the learning data storage part 61, and compares the display image signal with the corresponding SHD image signal. Thus, it computes the evaluation value as the evaluation of the display image signal, which results in the evaluation of the image quality felt by a user who views the HD image displayed on the display 69, and supplies it to the control part 72.

Here, the process steps of Steps S52 to S56 are performed for all the frames of the SHD image signal stored in the learning data storage part 61. Then, the control part 72 determines the total sum of the evaluation value, for example, obtained for all the frames of the SHD image signal stored in the learning data storage part 61 per set of the attention tap coefficients, and temporarily stores the total sum as the final evaluation value of a set of the attention tap coefficients.

After that, the process goes from Step S56 to Step S57. The control part 72 determines whether the evaluation value is computed for all the values in $\alpha \times \beta \times 2^\gamma$ ways that a set of the tap coefficients possibly takes.

Figure 20:
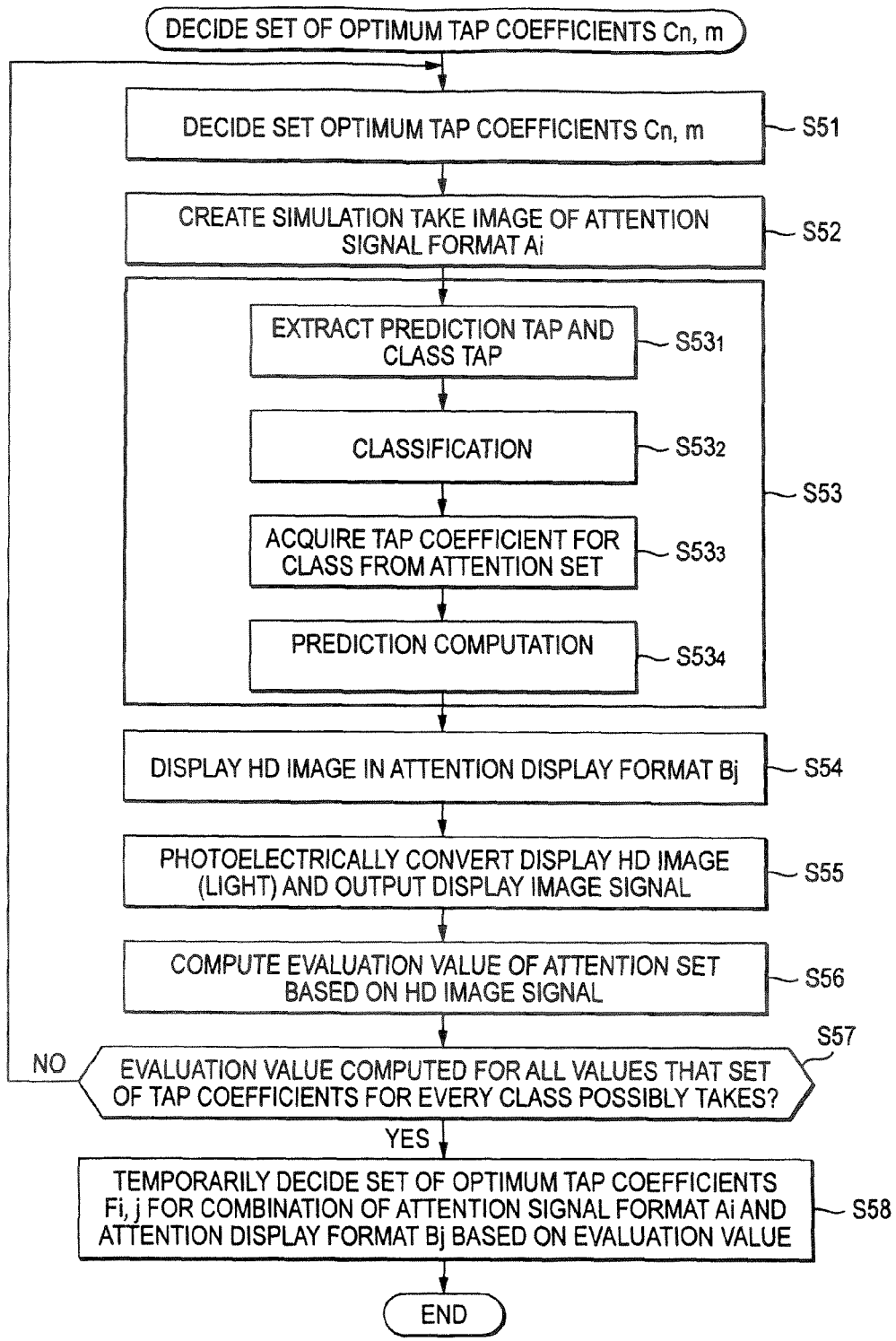
FIG. 20 shows a flow chart illustrative of the detail of the process steps of Step S33.

At Step S57, when it is determined that the evaluation value is not computed for all the values in $\alpha \times \beta \times 2^\gamma$ ways that a set of the tap coefficients possibly takes, that is, when there is a set that is not set to the attention tap coefficients in the process at this time shown in FIG. 20 among $\alpha \times \beta \times 2^\gamma$ ways of sets of the tap coefficients, the process returns to Step S51. The control part 72 newly decides one set that is not set to a set of the attention tap coefficients in the process at this time shown in FIG. 20 among $\alpha \times \beta \times 2^\gamma$ ways of sets of the tap coefficients as a set of the attention tap coefficients, and hereinafter, the similar process steps are repeated.

In addition, at Step S57, when it is determined that the evaluation value is computed for all the values in $\alpha \times \beta \times 2^\gamma$ ways that a set of the tap coefficients possibly takes, the process goes to Step S58. The control part 72 decides a set of the tap coefficient having the greatest evaluation value among $\alpha \times \beta \times 2^\gamma$ ways of sets of the tap coefficients as a set of the optimum tap coefficients $F_{i,j}$ for the combination of the attention signal format $A_i$ and the attention display format $B_j$, and the process is returned.

Here, as described in FIG. 19, when there are I ways of the signal formats for a plurality of the initial signal formats and there are J ways of the display formats for a plurality of the initial display formats, the process shown in FIG. 20 that is the process step at Step S33 is performed for I×J times. Consequently, I×J ways of the combinations of the initial signal format, the initial display format, and a set of the tap coefficients are obtained. At Step S36 shown in FIG. 19, among I×J ways of the combinations of the initial signal format, the initial display format, and a set of the tap coefficients, the combination having the greatest evaluation value obtained in the process shown in FIG. 20 is temporarily decided as the combination of the optimum signal format, the optimum display format, and a set of the optimum tap coefficients.

Moreover, as described above, the learning of the tap coefficient is called round-robin learning, in which the evaluation value is computed for all the values in $\alpha \times \beta \times 2^\gamma$ ways that a set of the tap coefficients possibly takes and the tap coefficient having the greatest evaluation value is determined.

Next, the optimum signal format decision process Step S37 shown in FIG. 19 will be described in detail with reference to a flow chart shown in FIG. 21.

At Step S71, the control part 72 decides a plurality of candidates of the optimum signal format based on the current temporary (temporarily decided) optimum signal format.

In other words, for example, now, suppose the Bayer format is the current temporary optimum signal format. For example, as shown in FIG. 8, the control part 72 decides some (a plurality of) signal formats that are obtained by slightly modifying the Bayer format as a plurality of the candidates of the optimum signal format. Moreover, in order to obtain a plurality of the candidates of the optimum signal format, for example, a modification rule how to modify the current temporary optimum signal format is decided beforehand. The control part 72 modifies the current temporary optimum signal format in accordance with the modification rule, and decides a plurality of the candidates of the optimum signal format.

After the process steps of Step S71, the process goes to Step S72. The control part 72 decides one of the formats that are not set to the attention signal format among a plurality of the candidates of the optimum signal format as the attention signal format, and supplies signal format information which indicates the attention signal format to the simulation take image creating part 62, and the process goes to Step S73.

At Step S73, the simulation take image creating part 62 thins out the number of the pixels of the SHD image signal stored in the learning data storage part 61 to generate the SD image signal in the attention signal format indicated by the signal format information from the control part 72, and supplies it as the simulation take image signal conformable to the shot image signal outputted from the camera 1 (FIG. 1) to the image converting part 73, and the process goes to Step S74.

At Step S74, the control part 72 stores a set of the current temporary optimum tap coefficients in the coefficient memory 66. Furthermore, at Step S74, as similar to Step S53 shown in FIG. 20, the image converting part 73 sets the simulation take image signal (the SD image signal) in the attention signal format supplied from the simulation take image creating part 62 to the first image signal, performs the image conversion process in which the first image signal is converted into the HD image signal as the second image signal by computation with the set of the current temporary optimum tap coefficients stored in the coefficient memory 66, and supplies the resulted HD image signal to the display control part 68.

After the process steps of Step S74, the process goes to Step S75. The control part 72 supplies display format information indicting the current temporary optimum display format to the display control part 68. Therefore, the display control part 68 displays the HD image corresponding to the HD image signal outputted from the image converting part 73 in the current temporary optimum display format indicted by the display format information from the control part 72 on the display 69, and the process goes from Step S75 to Step S76.

At Step S76, the photodetector 70 detects the light as the HD image (the display image) displayed on the display 69 (by photoelectric conversion), and outputs the display image signal conformable to the HD image signal that is the electrical signal corresponding to the light to the evaluation value computing part 71, and the process goes to Step S77.

At Step S77, the evaluation value computing part 71 evaluates the display image signal from the photodetector 70, which results in the evaluation of the HD image displayed on the display 69.

In other words, the evaluation value computing part 71 reads the SHD image signal corresponding to the display image signal from the photodetector 70 out of the learning data storage part 61, and compares the display image signal with the corresponding SHD image signal. Thus, it computes the evaluation value of the evaluation of the display image signal, which results in the evaluation of the image quality felt by a user who views the HD image displayed on the display 69, and supplies it to the control part 72.

Here, the process steps of Steps S73 to S77 are performed to all the frames of the SHD image signal stored in the learning data storage part 61. Then, for example, the control part 72 determines the total sum of the evaluation values obtained for all the frames of the SHD image signal stored in the learning data storage part 61 with respect to the attention signal format, and temporarily stores the total sum as the final evaluation value of the attention signal format.

After that, the process goes from Step S77 to Step S78. The control part 72 determines whether the evaluation value is computed for all of a plurality of the candidates of the optimum signal format.

At Step S78, when it is determined that the evaluation value is not computed for all of a plurality of the candidates of the optimum signal format, the process returns to Step S72. The control part 72 newly decides one of the formats that are not set to the attention signal format among a plurality of the candidates of the optimum signal format as the attention signal format, and hereinafter, the similar process steps are repeated.

In addition, at Step S78, when it is determined that the evaluation value is computed for all of a plurality of the candidates of the optimum signal format, the process goes to Step S79. The control part 72 newly decides a candidate having the greatest evaluation value among a plurality of the candidates of the optimum signal format as the optimum signal format for the combination of the current temporary optimum display format and a set of the current temporary optimum tap coefficients, and the process is returned.

Next, the optimum display format decision process at Step S38 shown in FIG. 19 will be described in detail with reference to a flow chart shown in FIG. 22.

At Step S91, the control part 72 decides a plurality of candidates of the optimum display format based on the current temporary (temporarily decided) optimum display format.

In other words, for example, now, suppose the stripe array is the current temporary optimum display format. For example, as shown in FIG. 7, the control part 72 decides some (a plurality of) the display formats obtained by slightly modifying the stripe array as a plurality of the candidates of the optimum display format. Moreover, in order to obtain a plurality of the candidates of the optimum display format, for example, the modification rule how to modify the current temporary optimum display format is decided beforehand. The control part 72 modifies the current temporary optimum display format in accordance with the modification rule, and decides a plurality of the candidates of the optimum display format.

After the process steps of Step S91, the process goes to Step S92. The control part 72 supplies signal format information which indicates the current temporary optimum signal format to the simulation take image creating part 62. Thus, the simulation take image creating part 62 thins out the number of the pixels of the SHD image signal stored in the learning data storage part 61 to generate the SD image signal in the signal format indicated by the signal format information from the control part 72, and supplies it as the simulation take image signal conformable to the shot image signal outputted from the camera 1 (FIG. 1) to the image converting part 73, and the process goes to Step S93.

At Step S93, as similar to Step S53 shown in FIG. 20, the image converting part 73 sets the simulation take image signal (the SD image signal) supplied from the simulation take image creating part 62 to the first image signal, performs the image conversion process in which the first image signal is converted into the HD image signal as the second image signal by computation with the set of the current temporary optimum tap coefficients stored in the coefficient memory 66, and supplies the resulted HD image signal to the display control part 68.

After the process steps of Step S93, the process goes to Step S94. The control part 72 decides one of the formats that are not set to the attention signal format among a plurality of the candidates of the optimum display format as the attention display format, and supplies display format information which indicates the attention display format to the display control part 68, and the process goes to Step S95.

At Step S95, the display control part 68 displays the HD image corresponding to the HD image signal outputted from the image converting part 73 in the attention display format indicated by display format information from the control part 72 on the display 69, and the process goes to Step S96.

At Step S96, the photodetector 70 detects the light as the HD image (the display image) displayed on the display 69 (by photoelectric conversion), and outputs the display image signal conformable to the HD image signal that is the electrical signal corresponding to the light to the evaluation value computing part 71, and the process goes to Step S97.

At Step S97, the evaluation value computing part 71 evaluates the display image signal from the photodetector 70, which results in the evaluation of the HD image displayed on the display 69.

In other words, the evaluation value computing part 71 reads the SHD image signal corresponding to the display image signal from the photodetector 70 out of the learning data storage part 61, and compares the display image signal with the corresponding SHD image signal. Thus, it computes the evaluation value of the evaluation of the display image signal, which results in the evaluation of the image quality felt by a user who views the HD image displayed on the display 69, and supplies it to the control part 72.

Here, the process steps of Steps S92 and S93, and Steps S95 to S97 are performed for all the frames of the SHD image signal stored in the learning data storage part 61. Then, for example, the control part 72 determines the total sum of the evaluation value obtained for all the frames of the SHD image signal stored in the learning data storage part 61 with respect to the attention display format, and temporarily stores the total sum as the final evaluation value of the attention display format.

After that, the process goes from Step S97 to Step S98. The control part 72 determines whether the evaluation value is computed for all of a plurality of the candidates of the optimum display format.

At Step S98, when it is determined that the evaluation value is not computed for all of a plurality of the candidates of the optimum display format, the process returns to Step S94. The control part 72 newly decides one of the formats that are not set to the attention display format among a plurality of the candidates of the optimum display format to the attention display format, and hereinafter, the similar process steps are repeated.

In addition, at Step S98, when it is determined that the evaluation value is computed for all of a plurality of the candidates of the optimum display format, the process goes to Step S99. The control part 72 newly temporarily decides a candidate having the greatest evaluation value among a plurality of the candidates of the optimum display format as the optimum display format for the combination of the current temporary optimum signal format and a set of the current temporary optimum tap coefficients, and the process is returned.

Next, the optimum tap coefficient set decision process at Step S39 shown in FIG. 19 will be described in detail with reference to a flow chart shown in FIG. 23.

At Step S111, the control part 72 decides a plurality of candidates of a set of the optimum tap coefficients based on the current temporary (temporarily decided) set of the optimum tap coefficients.

In other words, for example, the control part 72 selects a plurality of points within a predetermined area which is expressed by Z-dimensional vectors having components of each of the tap coefficients of the set of the current temporary optimum tap coefficients (in this case, Z is the product of the sum of classes and the number of the tap coefficient per class) and which is on the basis of the points of the Z-dimensional vector space, and decides (the components of) a plurality of the Z-dimensional vectors each expressing a plurality of the points as a plurality of the candidates of a set of the optimum tap coefficients. Moreover, in order to obtain a plurality of the candidates of a set of the optimum tap coefficients, the rule how to select which point in which area on the basis of the Z-dimensional vectors corresponding to the set of the current temporary optimum tap coefficients is decided beforehand. The control part 72 selects a plurality of points within a predetermined area on the basis of the Z-dimensional vectors corresponding to the set of the current temporary optimum tap coefficients in accordance with the rule, and decides a plurality of the candidates of a set of the optimum tap coefficients.

After the process steps of Step S111, the process goes to Step S112. The control part 72 supplies signal format information which indicates the current temporary optimum signal format to the simulation take image creating part 62. Thus, the simulation take image creating part 62 thins out the number of the pixels of the SHD image signal stored in the learning data storage part 61 to generate the SD image signal in the signal format indicated by signal format information from the control part 72, and supplies it as the simulation take image signal conformable to the shot image signal outputted from the camera 1 (FIG. 1) to the image converting part 73, and the process goes to Step S113.

At Step S113, the control part 72 decides one set that is not set to a set of the attention tap coefficients among a plurality of the candidates of a set of the optimum tap coefficients as a set of the attention tap coefficients, and controls the coefficient memory 66 to store the set of the attention tap coefficients therein, and the process goes to Step S114.

At Step S114, as similar to Step S53 shown in FIG. 20, the image converting part 73 sets the simulation take image signal (the SD image signal) supplied from the simulation take image creating part 62 to the first image signal, and performs the image conversion process in which the first image signal is converted into the HD image signal as the second image signal by computation with a set of the attention tap coefficients stored in the coefficient memory 66, and supplies the resulted HD image signal to the display control part 68.

After the process steps of Step S114, the process goes to Step S115. The control part 72 supplies display format information which indicates the current temporary optimum display format to the display control part 68. Therefore, the display control part 68 displays the HD image corresponding to the HD image signal outputted from the image converting part 73 in the display format indicated by the display format information from the control part 72 on the display 69, and the process goes to Step S116.

At Step S116, the photodetector 70 detects the light as the HD image (the display image) displayed on the display 69 (by photoelectric conversion), and outputs the display image signal conformable to the HD image signal that is the electrical signal corresponding to the light to the evaluation value computing part 71, and the process goes to Step S117.

At Step S117, the evaluation value computing part 71 evaluates the display image signal from the photodetector 70, which results in the evaluation of the HD image displayed on the display 69.

In other words, the evaluation value computing part 71 reads the SHD image signal corresponding to the display image signal from the photodetector 70 out of the learning data storage part 61, and compares the display image signal with the corresponding SHD image signal. Thus, it computes the evaluation value of the evaluation of the display image signal, which results in the evaluation of the image quality felt by a user who views the HD image displayed on the display 69, and supplies it to the control part 72.

Here, the process steps of Step S112, and Steps S114 to S117 are performed for all the frames of the SHD image signal stored in the learning data storage part 61. Then, for example, the control part 72 determines the total sum of the evaluation value obtained for all the frames of the SHD image signal stored in the learning data storage part 61 with respect to a set of the attention tap coefficients, and temporarily stores the total sum as the final evaluation value of a set of the attention tap coefficients.

After that, the process goes from Step S117 to Step S118. The control part 72 determines whether the evaluation value is computed for all of a plurality of the candidates of a set of the optimum tap coefficients.

At Step S118, when it is determined that the evaluation value is not computed for all of a plurality of the candidates of a set of the optimum tap coefficients, the process returns to Step S113. The control part 72 newly decides one set that is not set to a set of the attention tap coefficients among a plurality of the candidates of a set of the optimum tap coefficients as a set of the attention tap coefficients, and hereinafter, the similar process steps are repeated.

In addition, at Step S118, when it is determined that the evaluation value is computed for all of a plurality of the candidates of a set of the optimum tap coefficients, the process goes to Step S119. The control part 72 newly temporarily decides a candidate having the greatest evaluation value among a plurality of the candidates of a set of the optimum tap coefficients as a set of the optimum tap coefficients for the current temporary optimum combination of the signal format and the display format, and the process is returned.

Figure 21:
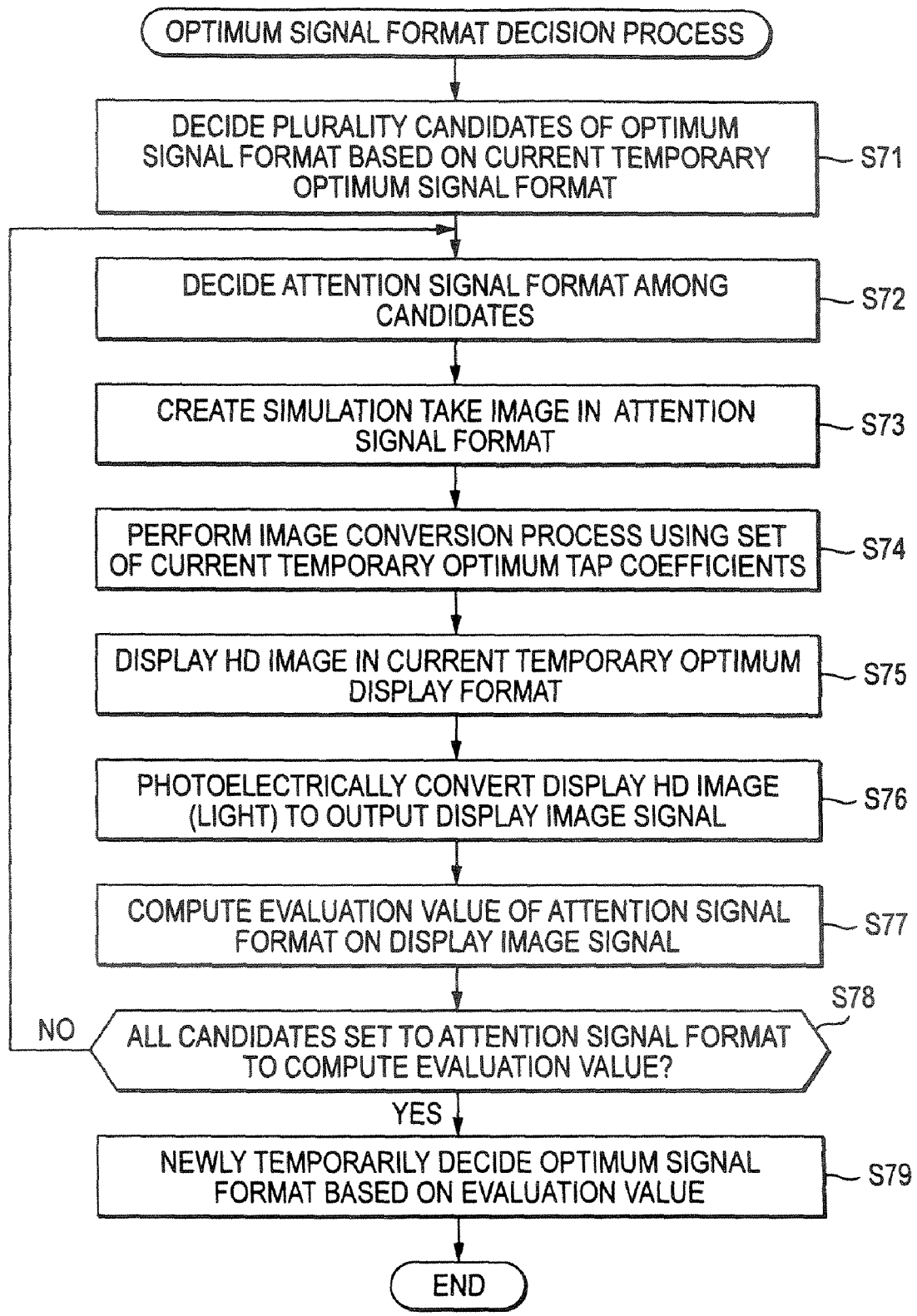
FIG. 21 shows a flow chart illustrative of the detail of the process steps of Step S37.

As described above, in the learning apparatus shown in FIG. 9, at Step S37 shown in FIG. 19, the control part 72 decides a plurality of the signal formats as a plurality of the candidates of the optimum signal format, the simulation take image creating part 62 generates the simulation take image signal for each of a plurality of the signal formats, the image converting part 73 converts the simulation take image signal into the HD image signal by computation with the tap coefficient (the current set of the temporary optimum tap coefficients) decided by the control part 72, the display control part 68 displays the HD image corresponding to the HD image signal in a certain display format (the current temporary optimum display format) decided by the control part 72 on the display 69, the photodetector 70 detects the light as the display image to output the display image signal that is the electrical signal corresponding to the light, and the evaluation value computing part 71 evaluates the display image signal, whereby the optimum signal format decision process is performed in which the signal format having the greatest evaluation of the display image signal is temporarily decided among a plurality of the signal formats (FIG. 21).

Figure 22:
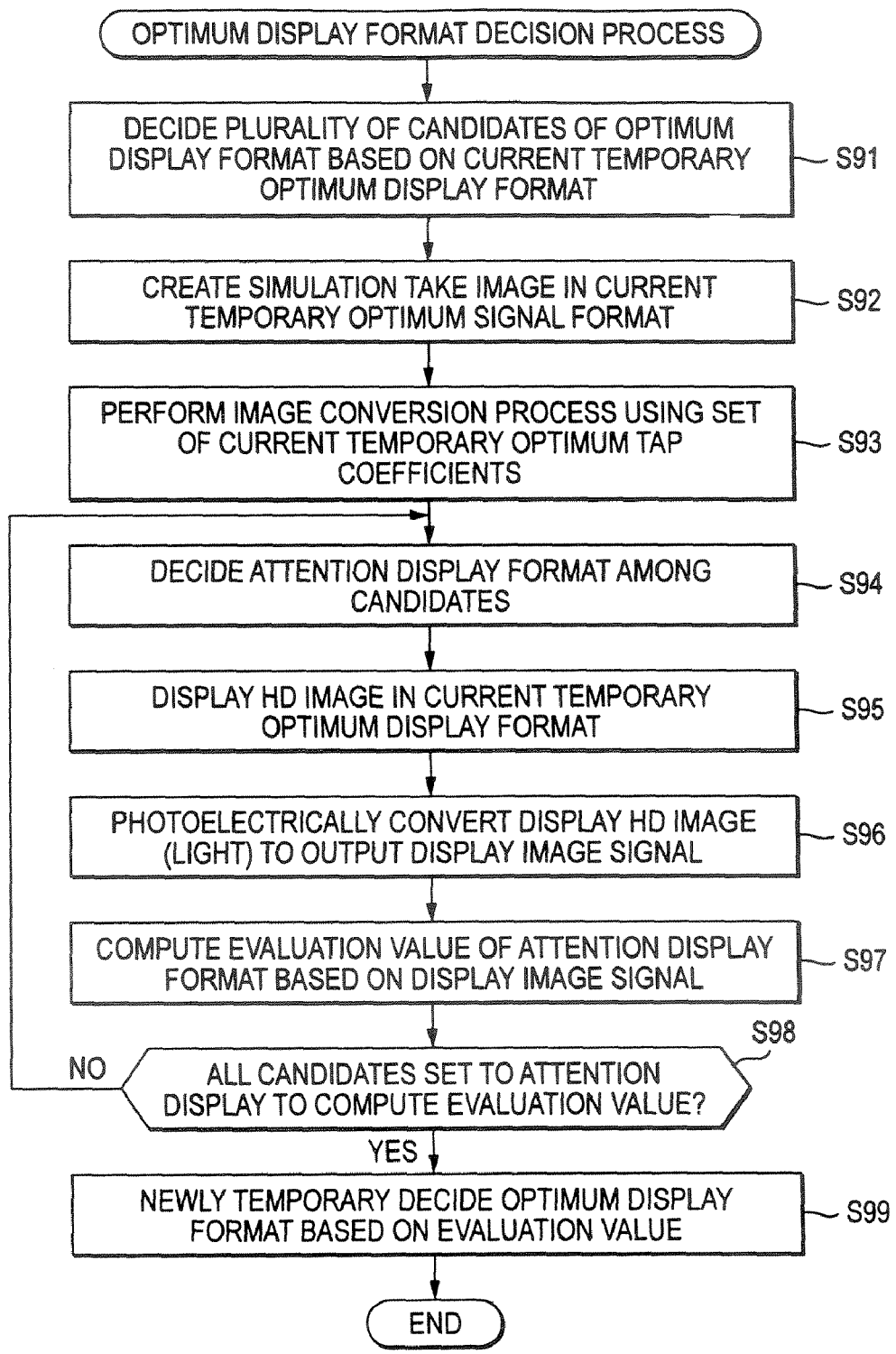
FIG. 22 shows a flow chart illustrative of the detail of the process steps of Step S38.

Furthermore, in the learning apparatus shown in FIG. 9, at Step S38 shown in FIG. 19, the control part 72 decides a plurality of the display formats as a plurality of the candidates of the optimum display format, the simulation take image creating part 62 generates the simulation take image signal of the signal format (the current temporary optimum signal format) decided by the control part 72, the image converting part 73 converts the simulation take image signal into the HD image signal by computation with the tap coefficient (the current set of the temporary optimum tap coefficients) decided by the control part 72, the display control part 68 displays the HD image corresponding to the HD image signal for each of a plurality of the display formats on the display 69, the photodetector 70 detects the light as the display image to output the display image signal that is the electrical signal corresponding to the light, and the evaluation value computing part 71 evaluates the display image signal, whereby the optimum display format decision process is performed in which the display format having the greatest evaluation of the display image signal is temporarily decided among a plurality of the display formats (FIG. 22).

Figure 23:
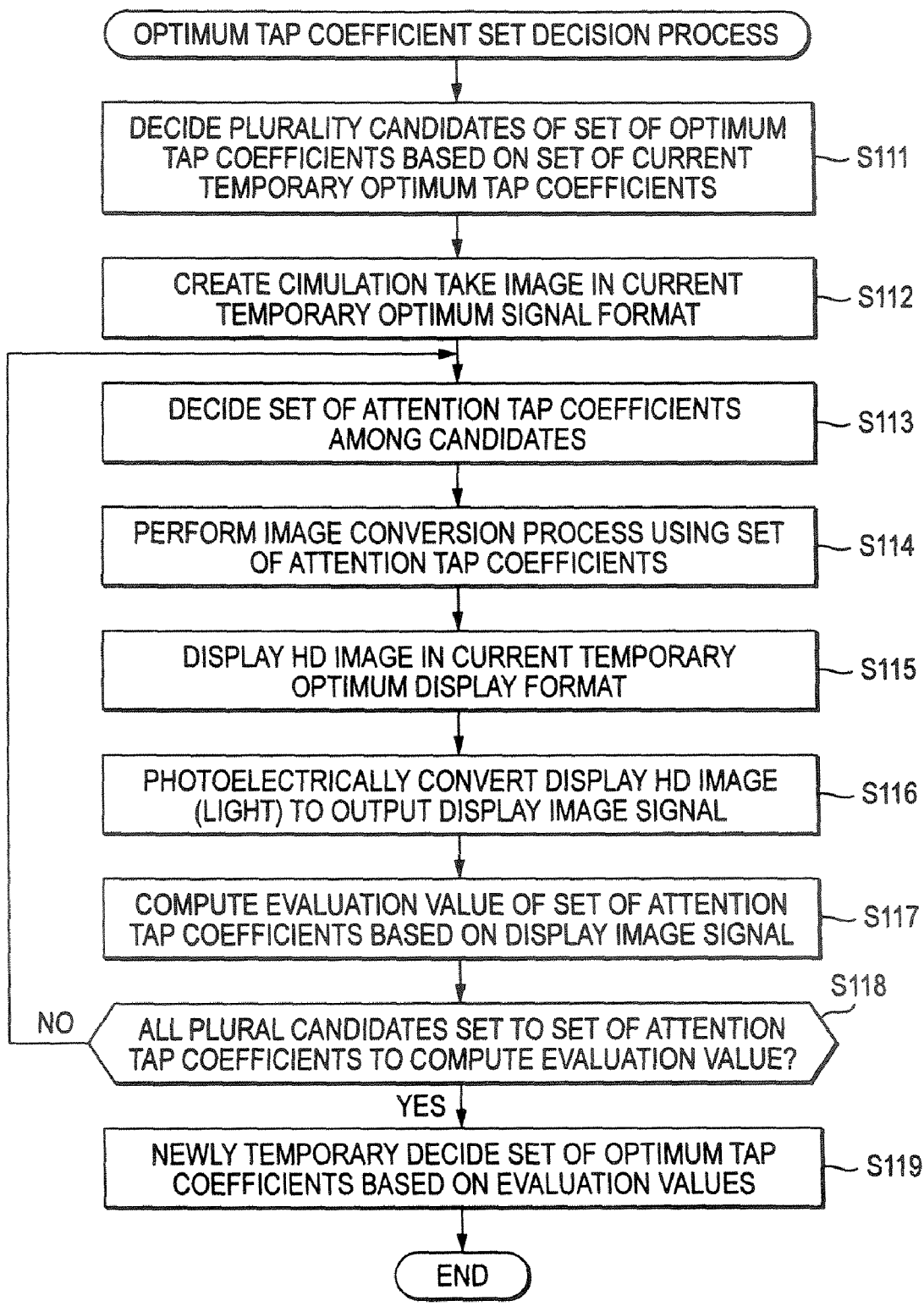
FIG. 23 shows a flow chart illustrative of the detail of the process steps of Step S39.

In addition, in the learning apparatus shown in FIG. 9, at Step S39 shown in FIG. 19, the control part 72 decides a plurality of (sets of) the tap coefficients as a plurality of the candidates of a set of the optimum tap coefficients, the simulation take image creating part 62 generates the simulation take image signal in the signal format (the current temporary optimum signal format) decided by the control part 72, the image converting part 73 converts the simulation take image signal into the HD image signal for each of a plurality of the tap coefficients, the display control part 68 displays the HD image corresponding to the HD image signal in the display format decided by (the current temporary optimum display format) decided by the control part 72 on the display 69, the photodetector 70 detects the light as the display image to output the display image signal that is the electrical signal corresponding to the light, and the evaluation value computing part 71 evaluates the display image signal, whereby the optimum tap coefficient set decision process is performed in which the tap coefficient having the greatest evaluation of the display image signal is temporarily decided among a plurality of the tap coefficients (FIG. 23).

Then, as described in FIG. 19, in the learning apparatus shown in FIG. 9, the optimum signal format decision process, the optimum display format decision process, and the optimum tap coefficient set decision process are repeated until the evaluation value (here, the evaluation value obtained at the next previous optimum tap coefficient set decision process) is equal to or greater than the threshold for determining optimization. Thus, the following is determined: (a set of) the tap coefficients for use in the image conversion process in which the display image that is the HD image displayed on the display 69 is made to have higher quality; the signal format for the shot image signal that is the target for the image conversion process using the tap coefficient; and the display format which displays the HD image corresponding to the HD image signal obtained by the image conversion process in which the shot image signal in the signal format is the target.

Therefore, according to the learning apparatus shown in FIG. 9, the tap coefficient, the signal format, and the display format by which a user feels the display image displayed on the display 69 is higher quality can be determined, that is, the optimum (suited) tap coefficient, the optimum signal format, and the optimum display format can be determined which further improve the performance of the image processing system configured of the camera 1 and the display device 2 shown in FIG. 1.

Then, in the camera 1 shown in FIG. 1, the shot image signal in the optimum signal format obtained in the learning apparatus shown in FIG. 9 is outputted as well as in the display device 2 shown in FIG. 1, and the optimum tap coefficient obtained in the learning apparatus shown in FIG. 9 is used to perform the image conversion process. Furthermore, the HD image obtained in the image conversion process is displayed in the optimum display format obtained in the learning apparatus shown in FIG. 9. Therefore, when the image processing system is configured of the combination of the camera 1 and the display device 2, the maximum performance of the overall image processing system can be exerted.

Moreover, in the optimum signal format decision process shown in FIG. 21, in the case in which a plurality of the candidates of the optimum signal format is decided on the basis of the current temporary optimum signal format, for the scheme to modify the current temporary optimum signal format, a scheme can be adapted in which when the number of times for repetition is small at Steps S37 to S39 shown in FIG. 19, the signal format is "greatly" modified, and the signal format is gradually modified into a smaller deformation as the number of times for repetition is increased. It is similar to the display format and a set of the tap coefficients.

In addition, when the evaluation value determined for the candidates of the optimum signal format is a value not so great and becomes hardly increased, the current temporary optimum signal format is greatly modified to decide a plurality of the candidates of the optimum signal format. In this case, a so-called local minimum problem can be solved. It is similar to the display format and a set of the tap coefficients.

Figure 24:
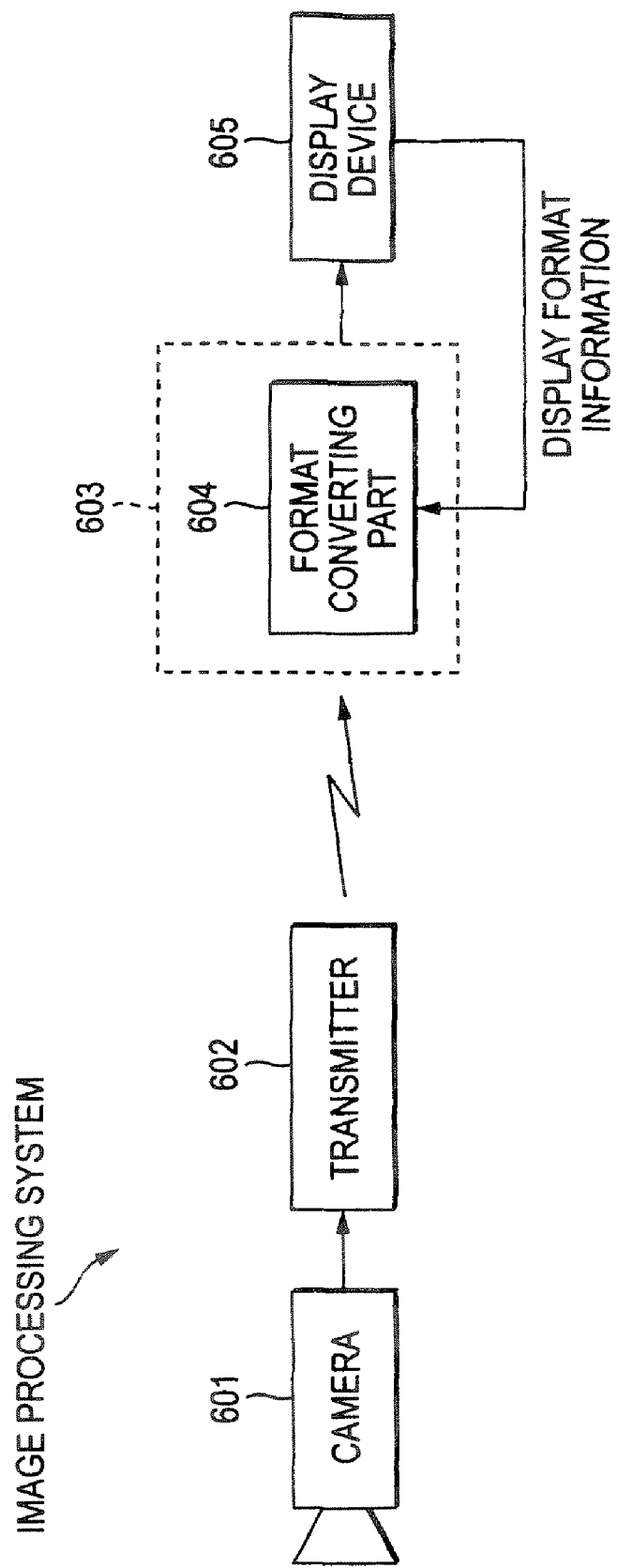
FIG. 24 shows a block diagram depicting a second exemplary configuration of an image processing system which performs image processing.

Next, FIG. 24 shows a second exemplary configuration of an image processing system for image processing.

The image processing system shown in FIG. 24 is configured of a camera 601, a transmitter 602, a receiver 603, and a display device 605.

The camera 601 shoots an object (subject), and outputs a shot image signal in a predetermined signal format which is the SD image signal obtained by the shooting. The transmitter 602 sends the shot image signal in a predetermined signal format outputted from the camera 601 to the receiver 603.

The receiver 603 receives the shot image signal in a determined signal format sent from the transmitter 602. In addition, the receiver 603 has a format converting part 604. To the format converting part 604, the shot image signal in a predetermined signal format received by the receiver 603 is supplied as well as display format information which indicates the display format which displays an image on the display device 605 from the display device 605.

The format converting part 604 converts the shot image signal in a predetermined signal format (a first signal format) into the shot image signal (the SD image signal) in another signal format (a second signal format) in accordance with a predetermined signal format for the shot image signal received at the receiver 603 and the display format indicated by the display format information from the display device 605, and supplies it to the display device 605.

The display device 605 converts a shot image signal in another signal format supplied from the format converting part 604 of the receiver 603 into the HD image signal of a higher quality than that of the image corresponding to the shot image signal, and displays the HD image corresponding to the HD image signal.

Next, FIG. 25 shows exemplary configurations of the format converting part 604 and the display device 605 shown in FIG. 24.

The format converting part 604 is configured of a signal acquiring part 611, a signal converting part 612, and a display format acquiring part 613.

The signal acquiring part 611 receives and acquires a shot image signal in a predetermined signal format outputted from the camera 601 (FIG. 24) through the transmitter 602, and supplies it to the signal converting part 612. In addition, the signal acquiring part 611 detects (identifies) the signal format of the shot image signal, and supplies signal format information which indicates the signal format to the signal converting part 612.

The signal converting part 612 stores format correspondence information indicating the correspondence between the signal format and the display format, the signal format for the SD image signal that is the target for the image conversion process in an image converting part 621 of the display device 605, described later, and the display format which displays the HD image corresponding to the HD image signal obtained in the image conversion process. Here, the format correspondence information is determined by learning performed beforehand, which indicates the correspondence between the signal format in the SD image and the display format that a user feels it in the highest quality when the HD image is displayed that corresponds to the HD image signal obtained in the image conversion process in which the SD image signal in the signal format is the target.

The signal converting part 612 identifies the signal format associated with the display format for the display device 605 indicated by display format information supplied from the display format acquiring part 613 in format correspondence information (hereinafter, properly called a associated signal format), converts the shot image signal in the predetermined signal format from the signal acquiring part 611 into the associated shot image signal in the signal format as another signal format, and supplies it to the display device 605.

The display format acquiring part 613 acquires (receives) display format information that indicates the display format which displays the HD image on the display 623 by a display control part 622 of the display device 605 from the display control part 622, and supplies it to the signal converting part 612.

Moreover, the receiver 603 having the format converting part 604 incorporated therein is connected to the display device 605 by a cable or radio. For example, the display format acquiring part 613 acquires display format information from the display device 605 every time when the connection between the receiver 603 and the display device 605 is established, and supplies it to the signal converting part 612.

The display device 605 is configured of the image converting part 621, the display control part 622, and a display 623.

To the image converting part 621, the shot image signal in the associated signal format (the SD image signal) as another signal format is supplied from the format converting part 612. The image converting part 621 stores a set of the tap coefficients obtained by learning performed beforehand. It converts the SD image signal that is the shot image signal in the associated signal format into the HD image signal by computation with the tap coefficient, and supplies it to the display control part 622.

For example, the display control part 622 performs display control to display the HD image corresponding to the HD image signal supplied from the image converting part 621 in a predetermined display format including the display format decided by learning that uses the SHD image of the HD image of higher quality and the existing display formats on the display 623. Moreover, the display control part 622 has a function that outputs display format information that indicates the display format which displays the HD image to outside.

For example, the display 623 is a display mechanism configured of a CRT (Cathode Ray Tube) or an LCD (Liquid Crystal Display) panel, for example, which displays images under control by the display control part 222.

As described above, the signal converting part 612 which configures the format converting part 604 converts an SD image signal in a predetermined signal format (the shot image signal) from the signal acquiring part 611 into the SD image signal in the associated signal format as another signal format. Although this conversion can be performed by thinning or interpolating the pixel (including the sub-pixel), it can also be performed by the image conversion process in which the first image signal is converted into the second image signal.

Then, FIG. 26 shows an exemplary configuration of the signal converting part 612 which sets an SD image signal in a predetermined signal format to the first image signal as well as sets the SD image signal in the associated signal format as another signal format to the second image signal to convert a predetermined SD image signal in the signal format into the SD image signal in the associated signal format.

In FIG. 26, the signal converting part 612 is configured of tap extracting parts 631 and 632, a classification part 633, a coefficient memory 634, a predicting part 635, and a coefficient selecting part 636.

To the signal converting part 612, an SD image signal in a predetermined signal format from the signal acquiring part 611 is supplied as the first image signal. Then, the SD image signal as the first image signal is supplied to the tap extracting parts 631 and 632.

The tap extracting part 631 sequentially sets the pixels configuring the SD image signal in the associated signal format as the second image signal that is to be obtained by converting the first image signal (since the SD image signal as the second image signal is an image signal that is to be found and it does not exist at the current stage, it is virtually assumed) to the attention pixel, and extracts from the first image signal the prediction tap that is the pixel value of a plurality of the pixels for use in predicting the pixel value of the attention pixel.

More specifically, the tap extracting part 631 extracts as a prediction tap the pixel value of a plurality of the pixels having the spatially or temporally close positional relation (for example, a pixel closest to the position on the image of the first image signal corresponding to the attention pixel, a pixel spatially adjacent to the pixel, etc.) with respect to the position of the image of the first image signal corresponding to the attention pixel (for example, the position on the image of the first image signal at which a subject portion is seen that is the same as the one seen at the position of the attention pixel).

The tap extracting part 632 extracts from the first image signal a class tap which is the pixel value of a plurality of pixels for use to classify the attention pixel into any one of some (a plurality of) classes.

The prediction tap obtained at the tap extracting part 631 is supplied to the predicting part 635, and the class tap obtained at the tap extracting part 632 is supplied to the classification part 633.

The classification part 633 classifies the attention pixel based on the class tap from the tap extracting part 632, and supplies the class of the attention pixel to the coefficient memory 634.

Here, for a scheme of classification performed by the classification part 633, for example, a scheme described in the classification part 43 shown in FIG. 4 can be adapted.

The coefficient memory 634 sets two given signal formats among a plurality of (types of) the signal formats to the first signal format and the second signal format, and stores a set of the tap coefficients for use in the image conversion process in which the first SD image signal in the first signal format is converted into the SD image signal in the second signal format (hereinafter, properly called a set of first/second conversion tap coefficients) for each of a plurality of the combinations of the first signal format and the second the signal format.

A plurality of (types of) sets of the first/second conversion tap coefficients is the tap coefficient for every class that is determined by learning beforehand, described later. Under control by the coefficient selecting part 636, the coefficient memory 634 sets the signal format indicated by signal format information supplied from the signal acquiring part 611 (FIG. 25) to the first signal format as well as selects a set of the first/second conversion tap coefficients having the associated signal format as the second signal format as a set of valid tap coefficients among a plurality of sets of the first/second conversion tap coefficients, and reads and acquires the tap coefficient for the class supplied from the classification part 633 among a set of the valid tap coefficients, and outputs it to the predicting part 635.

The predicting part 635 acquires the prediction tap outputted from the tap extracting part 631 and the tap coefficient outputted from the coefficient memory 634, and uses the prediction tap and the tap coefficient for computing Equation (1) as a predetermined prediction computation to determine the predicted value of the true value of the attention pixel. Therefore, the predicting part 635 outputs it for finding (the predicted value of) the pixel value of the attention pixel, that is, here, the pixel value of the pixels configuring the SD image signal in the associated signal format as the second image signal.

To the coefficient selecting part 636, the signal format information which indicates the signal format for the SD image signal outputted from the camera 601 (hereinafter, properly called camera signal format information) is supplied from the signal acquiring part 611 (FIG. 25) as well as display format information which indicates the display format for the display device 605 from the display format acquiring part 613 (FIG. 25). The coefficient selecting part 636 stores format correspondence information, and identifies the associated signal format associated with the display format for the display device 605 which is indicated by display format information from the display format acquiring part 613 in format correspondence information. Then, the coefficient selecting part 636 controls the coefficient memory 634 so that the signal format indicated by the camera signal format information supplied from the signal acquiring part 611 (FIG. 25) is set to the first signal format among a plurality of sets of the first/second conversion tap coefficients stored in the coefficient memory 634, as well as a set of the first/second conversion tap coefficients having the associated signal format as the second signal format is selected as a set of the valid tap coefficients.

Next, the image conversion process performed by the signal converting part 612 shown in FIG. 26 will be described with reference to a flow chart shown in FIG. 27.

At Step S601, in the signal converting part 612, the coefficient selecting part 636 identifies the associated signal format associated with the display format for the display device 605 indicated by the display format information supplied from the display format information acquiring part 613 (FIG. 25) in stored format correspondence information, and controls the coefficient memory 634 so that the signal format indicated by the camera signal format information from the signal acquiring part 611 is set to the first signal format as well as a set of the first/second conversion tap coefficients having the associated signal format as the second signal format is selected as a set of the valid tap coefficients. Therefore, under control by the coefficient selecting part 636, among a plurality of the set of the first/second conversion tap coefficients, the coefficient memory 634 sets the signal format indicated by the camera signal format information to the first signal format as well as selects a set of the first/second conversion tap coefficients having the associated signal format as the second signal format to be a set of the valid tap coefficients, and the process goes to Step S602.

At Step S602, the tap extracting part 631 sets the SD image signal supplied from the signal acquiring part 611 (FIG. 25) to the first image signal as well as sets the SD image signal in the associated signal format that the first image signal is converted into the SD image signal in the associated signal format to the second image signal, and sequentially sets each of the pixels configuring the SD image signal in the associated signal format as the second image signal to the attention pixel. Then, the tap extracting parts 631 and 632 each extract the pixel value of the pixel to be the prediction tap and the class tap of the attention pixel from the SD image signal as the first image signal. The prediction tap is supplied from the tap extracting part 631 to the predicting part 635, and the class tap is supplied from the tap extracting part 632 to the classification part 633.

The classification part 633 receives the class tap of the attention pixel from the tap extracting part 632, and classifies the attention pixel based on the class tap at Step S603. Furthermore, the classification part 633 outputs the class of the attention pixel resulted from the classification to the coefficient memory 634, and the process goes to Step S604.

At Step S604, the coefficient memory 634 reads and outputs the tap coefficient for the class supplied from the classification part 633 among a set of the valid tap coefficients, and the process goes to Step S605. The tap coefficient outputted from the coefficient memory 634 is acquired at the predicting part 635.

At Step S605, the predicting part 635 uses the prediction tap outputted from the tap extracting part 631 and the tap coefficient acquired from the coefficient memory 634 to compute Equation (1) as a predetermined prediction computation, whereby the pixel value of the attention pixel, that is, the pixel value of the pixel of the second image signal is determined. As described above, the predicting part 635 outputs the SD image signal in the associated signal format that is the second image signal to (the image converting part 621 of) the display device 605 (FIG. 25) at every time when the pixel value of the pixel of the second image signal is determined for a single frame, for example.

Next, the process performed by the format converting part 604 shown in FIG. 25 will be described with reference to a flow chart shown in FIG. 28.

At Step S611, in the format converting part 604, the display format acquiring part 613 acquires (receives) display format information from the display control part 622 of the display device 605, and supplies it to the signal converting part 612, and the process goes to Step S612.

At Step S612, the signal acquiring part 611 acquires (receives) a predetermined SD image signal in the signal format sent from the transmitter 602 (FIG. 24), and detects the signal format for the SD image signal. Furthermore, the signal acquiring part 611 supplies camera signal format information which indicates the detected signal format and the SD image signal in the signal format to the signal converting part 612, and the process goes from Step S612 to Step S613.

Figure 27:
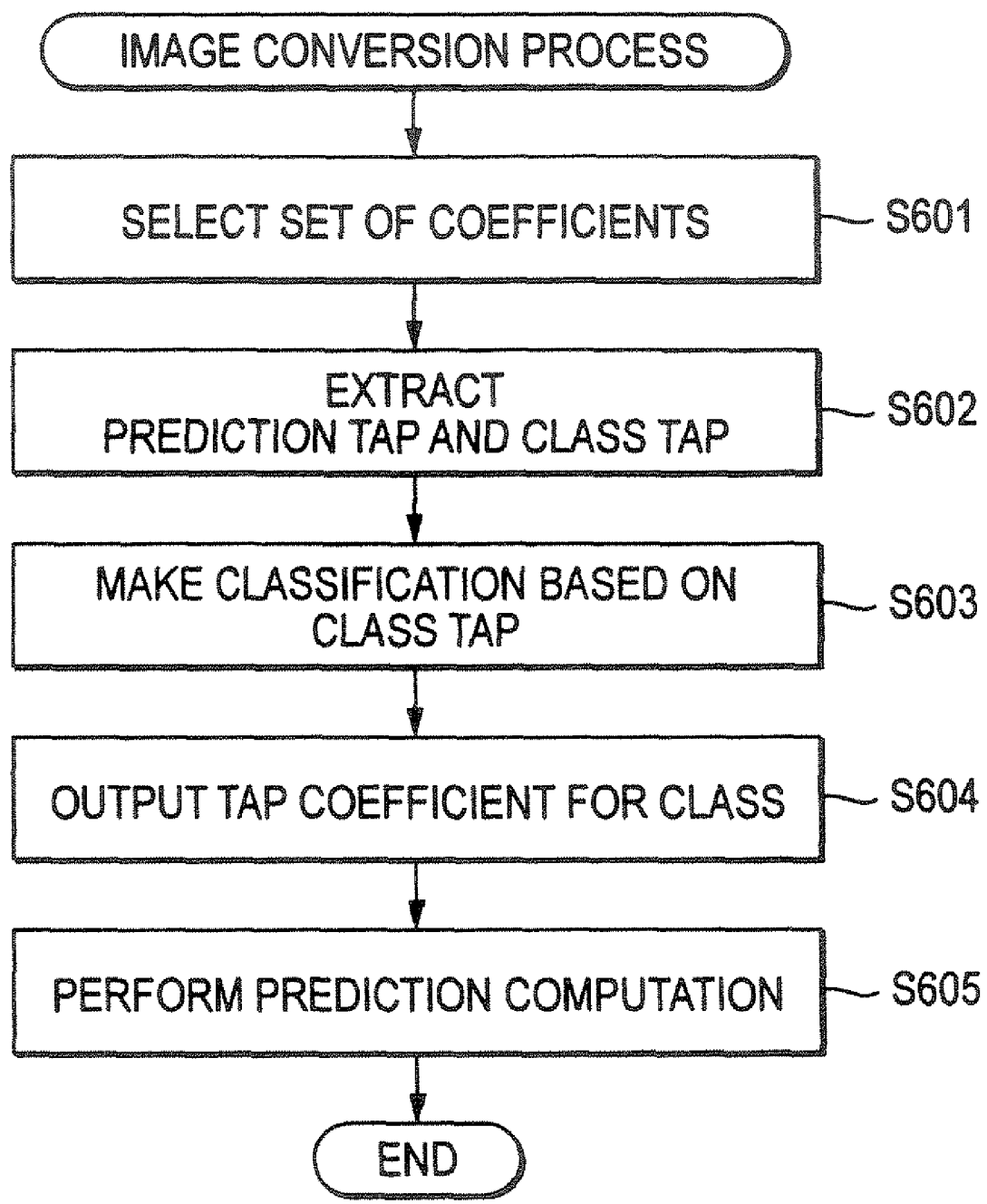
FIG. 27 shows a flow chart illustrative of the process steps performed by the signal converting part 612.

At Step S613, as described in FIG. 27, for example, the signal converting part 612 sets the signal format indicated by the camera signal format information from the signal acquiring part 611 to the first signal format based on format correspondence information as well as sets the associated signal format associated with the display format indicated by the display format information from the display format acquiring part 613 to the second signal format. It uses a set of the first/second conversion tap coefficients to convert the SD image signal in a predetermined signal format (the camera the signal format) from the signal acquiring part 611 into the SD image signal in the associated signal format, and supplies it to the display device 605.

Figure 29:
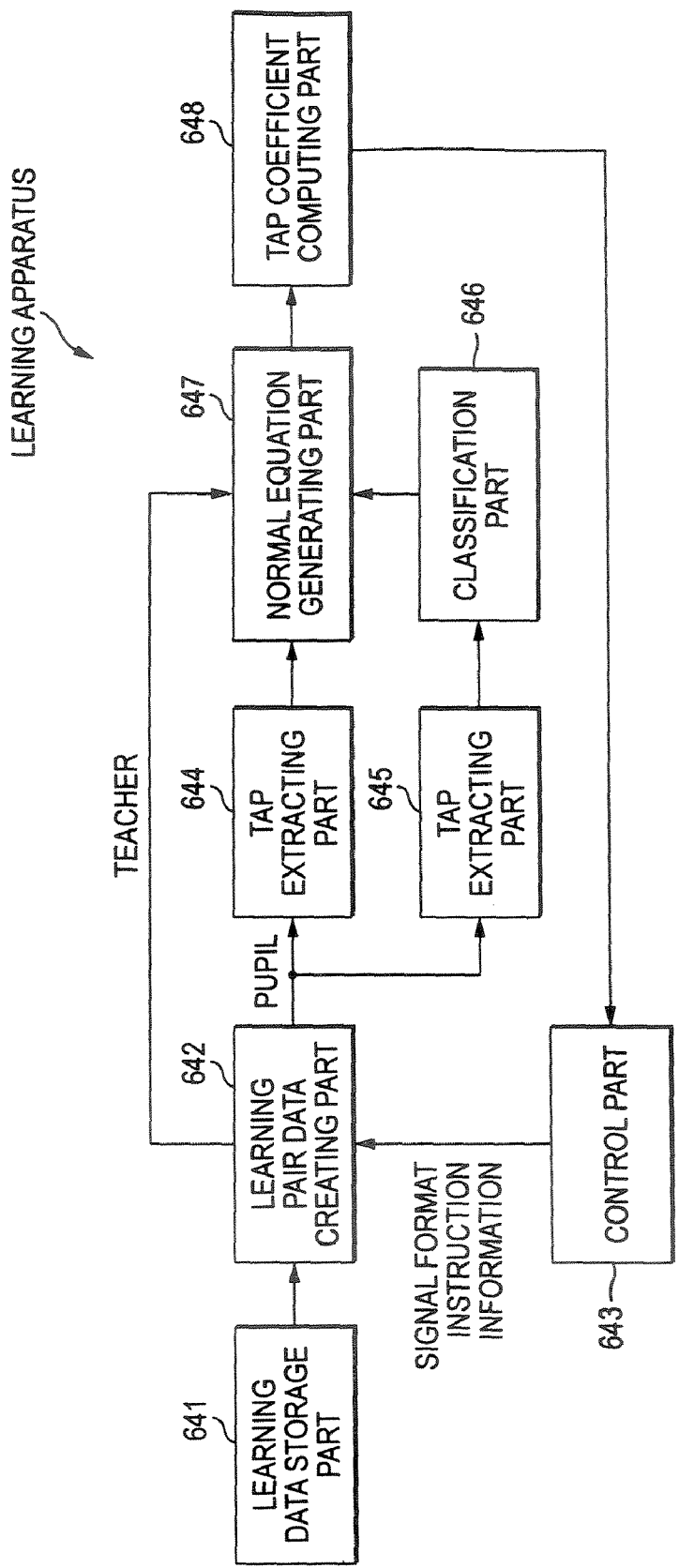
FIG. 29 shows a block diagram depicting an exemplary configuration of the learning apparatus which learns the tap coefficient used by the signal converting part 612.

Next, FIG. 29 shows an exemplary configuration of a learning apparatus which performs a learning process in which a set of the tap coefficients is determined for each of a plurality of the signal formats stored in the coefficient memory 634 shown in FIG. 26.

The learning apparatus shown in FIG. 29 is configured of a learning data storage part 641, a learning pair data creating part 642, a control part 643, tap extracting parts 644 and 645, a classification part 646, a normal equation generating part 647, and a tap coefficient computing part 648. The learning method using the normal equation, that is, learning is performed in accordance with the learning method in which the normal equation in Equation (8) is formed and solved for every class, whereby the tap coefficient for every class is determined.

For example, the learning data storage part 641 stores the SHD image signal (the SHD image), the HD image signal, or the SD image signal as learning data for use in the learning of the tap coefficient for each of a plurality of the signal formats.

Under control performed by the control part 643, from learning data stored in the learning data storage part 641, the learning pair data creating part 642 generates the first SD image signal in the signal format as a pupil signal and the SD image signal in the second signal format as a teacher signal that the signal format for the SD image signal is the second signal format, sets a set of the SD image signals as the pupil signal and the teacher signal to learning pair data, and supplies it to the tap extracting parts 644 and 645 and the normal equation generating part 647.

Here, the teacher signal means an ideal output signal for a certain input signal. In addition, the pupil signal means an input signal that is given to obtain a teacher signal.

The control part 643 supplies signal format instruction information which indicates the signal format for the SD image signal as the pupil signal (the first signal format) and the signal format for the SD image signal as (the teacher signal the second signal format) to the learning pair data creating part 642, whereby it controls (instructs) the learning pair data creating part 642 to handle the signal formats for the SD image signals as the teacher signal and the pupil signal.

In addition, to the control part 643, the tap coefficient computing part 648 supplies a set of the first/second conversion tap coefficients determined by using a set of the SD image signals of the first signal format and the second signal format indicated by signal format information supplied to the learning pair data creating part 642 as learning pair data. The control part 643 associates a set of the first/second conversion tap coefficients from the tap coefficient computing part 648 with the signal format information supplied to the learning pair data creating part 642, and stores it.

The tap extracting part 644 sequentially sets to the attention pixel the pixel of the SD image signal in the second signal format as the teacher signal in learning pair data supplied from the learning pair data creating part 642, extracts the pixel value of the pixel that is to be the prediction tap from the first SD image signal in the signal format as the pupil signal in learning pair data with respect to the attention pixel, and supplies the prediction tap in the same tap structure as that obtained by the tap extracting part 631 configuring the signal converting part 612 shown in FIG. 26 to the normal equation generating part 647.

The tap extracting part 645 extracts the pixel value of the pixel that is to be the class tap from the first SD image signal in the signal format supplied from the learning pair data creating part 642 with respect to the attention pixel, and supplies the class tap in the same tap structure as that obtained by the tap extracting part 632 configuring the signal converting part 612 shown in FIG. 26 to the classification part 646.

The classification part 646 classifies the attention pixel as similar to the classification part 633 configuring the signal converting part 612 shown in FIG. 26 based on the class tap supplied from the tap extracting part 645, and supplies the resulted class of the attention pixel to the normal equation generating part 647.

The normal equation generating part 647 performs additions for every class supplied from the classification part 646 in which the targets are (the pixel value of) the attention pixel $y_k$ in the SD image signal in the second signal format as the teacher signal in learning pair data supplied from the learning pair data creating part 642 and (the pixel value of) the pixels $x_{n,k}$ configuring the prediction tap of the attention pixel supplied from the tap extracting part 631.

In other words, for every class supplied from the classification part 646, the normal equation generating part 647 uses the pixel $x_{n,k}$ of the SD image signal in the first signal format configuring the prediction tap of the attention pixel supplied from the tap extracting part 644 (hereinafter, properly also called a first pixel), and performs multiplications $(x_{n,k}x_{n',k})$ of the first pixels on the left-hand side matrix in Equation (8) and computations conformable to the summation ($\Sigma$).

Furthermore, for every class supplied from the classification part 646, the normal equation generating part 647 uses the first pixel $x_{n,k}$ and the pixel (the attention pixel) $y_k$ of the SD image signal in the second signal format, and performs multiplications $(x_{n,k}x_{n,k})$ of the first pixel $x_{n,k}$ and the attention pixel $y_k$ in the right-hand side vectors in Equation (8) and computations conformable to the summation ($\Sigma$).

In other words, the normal equation generating part 647 stores the components of the left-hand side matrix ($\Sigma x_{n,k}x_{n,k}$) and the right-hand side vector components of ($\Sigma x_{n,k}y_k$) in Equation (8) determined for the pixel of the SD image signal in the second signal format that is set to the attention pixel last time (hereinafter, properly also called a second pixel) in its incorporated memory (not shown).

Then, the normal equation generating part 647 performs additions in which the corresponding component $x_{n,k+1}x_{n',k+1}$ that is computed by using a first pixel $x_{n,k+1}$ configuring the prediction tap of the second pixel newly set as the attention pixel is added to the component ($\Sigma x_{n,k}x_{n,k}$) stored in the memory the matrix (the addition expressed by the summation of the left-hand side matrix in Equation (8) is performed) as well as performs additions in which the corresponding component $x_{n,k+1}y_{k+1}$ that is computed by using a second pixel $y_{k+1}$ and a first pixel $x_{n,k+1}$ for the second pixel newly set to the attention pixel is added to the vector component ($\Sigma x_{n,k}y_k$) stored in the memory the matrix (the addition expressed by the summation in the right-hand side vector in Equation (8)).

The normal equation generating part 647 sets to the attention pixel all of the pixels of the SD image signal in the second signal format as the teacher signal in learning pair data supplied from the learning pair data creating part 642, and performs the additions. Thus, it forms the normal equation expressed in Equation (8) for every class, and supplies the normal equation to the tap coefficient computing part 648.

The tap coefficient computing part 648 solves the normal equation for every class supplied from the normal equation generating part 647 to determine a set of the optimum tap coefficients $w_n$ (the tap coefficient that minimizes the total sum E of the square errors in Equation (4)) for every class, and supplies it as a set of the first/second conversion tap coefficients to the control part 643.

Next, the learning process performed by the learning apparatus shown in FIG. 29 in which a set of the first/second conversion tap coefficients is determined will be described with reference to a flow chart shown in FIG. 30.

At Step S621, in the learning apparatus shown in FIG. 29, among a predetermined plurality of the signal formats, the control part 643 decides one signal format in a single combination among the combinations of one signal format and the other signal format that are not set to the combination of a first attention signal format and a second attention signal format as the first attention signal format as well as decides the other signal format as the second attention signal format, and supplies signal format instruction information which indicates the first attention signal format and the second attention signal format to the learning pair data creating part 642, and the process goes to Step S622.

At Step S622, in accordance with signal format instruction information from the control part 643, the learning pair data creating part 642 generates the SD image signal in the first attention signal format as the pupil signal indicated by signal format instruction information and the SD image signal in the second attention signal format as the teacher signal indicated by signal format information from learning data stored in the learning data storage part 641, and supplies a set of the SD image signal as the pupil signal and the SD image signal as the teacher signal as learning pair data to the tap extracting part 644 and 645 and to the normal equation generating part 647, and the process goes to Step S623.

At Step S623, the tap extracting part 644 sequentially sets the pixels of the SD image signal in the second attention signal format as the teacher signal among learning pair data supplied from the learning pair data creating part 642 to the attention pixel, extracts the pixel value of the pixel to be the prediction tap from the SD image signal in the first attention signal format as the pupil signal in learning pair data with respect to the attention pixel, and supplies it to the normal equation generating part 647.

In addition, the tap extracting part 645 extracts the pixel value of the pixel to be the class tap from the SD image signal in the first attention signal format as the pupil signal in learning pair data with respect to the attention pixel, and supplies it to the classification part 646.

At Step S624, the classification part 646 classifies the attention pixel based on the class tap from the tap extracting part 645, and supplies the resulted class of the attention pixel to the normal equation generating part 647, and the process goes to Step S625.

At Step S625, the normal equation generating part 647 performs the additions of Equation (8) formed for the class supplied from the classification part 646 as described above as the targets are (the pixel value of) the attention pixel in learning pair data from the learning pair data creating part 642 and (the pixel value of) the pixels of the SD image signal in the first attention signal format configuring the prediction tap obtained for the attention pixel supplied from the tap extracting part 644.

Then, the normal equation generating part 647 sets all of the pixels of the SD image signal in the second attention signal format as the teacher signal in learning pair data supplied from the learning pair data creating part 642 to the attention pixel, and performs the additions at Step S625. It supplies the normal equation for every class obtained by the additions (the left-hand side matrix and the right-hand side vector in Equation (8) for every class) to the tap coefficient computing part 648, and the process goes from Step S625 to Step S626.

At Step S626, the tap coefficient computing part 648 solves the normal equation for every class supplied from the normal equation generating part 647 (the normal equation for every class configured of the left-hand side matrix and the right-hand side vector in Equation (8) for every class), and determines a set of the tap coefficients for every class. It sets the set of the tap coefficients to a set of the first/second conversion tap coefficients that the first attention signal format is the first signal format as well as set the second attention signal format to the second signal format to the control part 643.

The control part 643 associates a set of the first/second conversion tap coefficients from the tap coefficient computing part 648 with the first attention signal format and the second attention signal format, and stores it, and the process goes from Step S626 to Step S627.

At Step S627, the control part 643 determines whether there is the combination of one signal format and the other signal format that is not the combination of the first attention signal format and the second attention signal format among a predetermined plurality of the signal formats.

At Step S627, when it is determined that there is the combination of one signal format and the other signal format that is not the combination of the first attention signal format and the second attention signal format among a predetermined plurality of the signal formats, the process returns to Step S621. The control part 643 newly decides one signal format in a single combination as the first attention signal format as well as the other signal format as the second attention signal format among the combinations of one signal format and the other signal format that is not the combination of the first attention signal format and the second attention signal format among a predetermined plurality of the signal formats, and hereinafter, the similar process steps are repeated.

In addition, at Step S627, when it is determined that there is no combination of one signal format and the other signal format that is not the combination of the first attention signal format and the second attention signal format among a predetermined plurality of the signal formats, that is, when a set of the first/second conversion tap coefficients is determined for all of the possibly obtained combinations of the first attention signal format and the second attention signal format in a predetermined plurality of the signal formats and when the control part 643 stores the sets of the first/second conversion tap coefficients associated with various combinations of the first attention signal format and the second attention signal format, the learning process is ended.

The coefficient memory 634 configuring the signal converting part 612 shown in FIG. 26 stores therein the sets of the first/second conversion tap coefficients associated with various combinations of the first signal format and the second signal format that are stored in the control part 643 in the learning process described above.

Then, in the format converting part 604 having the signal converting part 612 (FIG. 25), the signal acquiring part 611 acquires the SD image signal outputted from the camera 601, and the display format acquiring part 613 acquires the display format for the display device 605. Furthermore, in the format converting part 604, the signal converting part 612 converts the SD image signal from the camera 601 into the image signal in the signal format associated with the display format for the display device 605 in format correspondence information (the associated signal format) based on the signal format for the SD image signal outputted from the camera 601 and the display format for the display device 605.

As described later, the signal format associated with the display format in format correspondence information is the signal format that a user feels it in the highest quality when the HD image corresponding to the HD image signal obtained by performing the image conversion process for the SD image signal in the signal format is displayed in the display format with which the signal format is associated. Therefore, the SD image signal in the signal format like this is converted into the HD image signal in the image conversion process by the image converting part 621, and the display control part 622 displays the HD image corresponding to the HD image signal in the display format for the display device 605 on the display 623, whereby the HD image suited for a user (the image that the user feels it in high quality) can be displayed.

Figure 31:
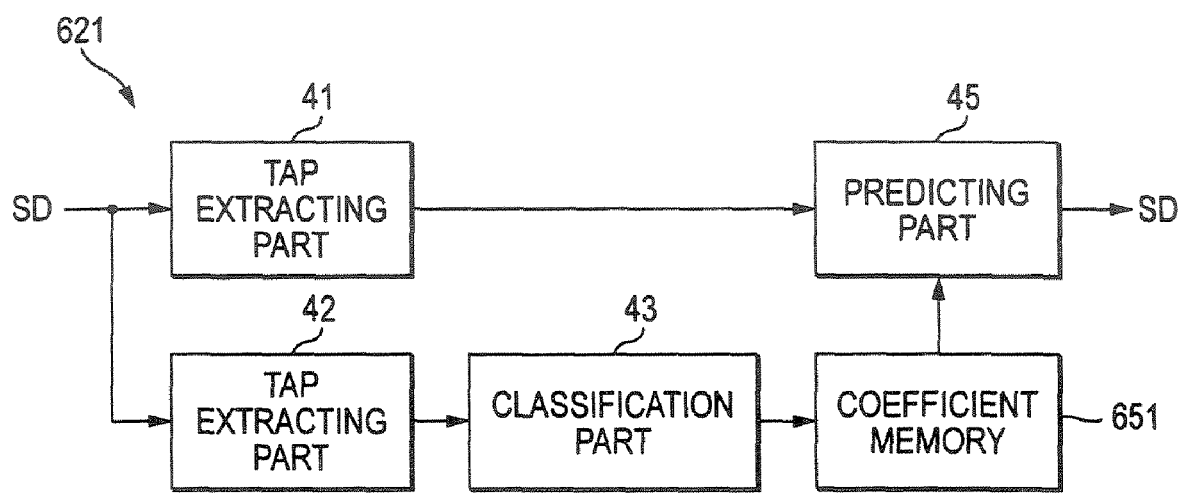
FIG. 31 shows a block diagram depicting an exemplary configuration of an image converting part 621.

Next, FIG. 31 shows an exemplary configuration of the image converting part 621 shown in FIG. 25.

Moreover, In the drawing, the portions corresponding to the image converting part 11 shown in FIG. 4 are designated the same numerals and signs, properly omitting the descriptions below. In other words, as similar to the image converting part 11 shown in FIG. 4, the image converting part 621 is configured to perform the image conversion process in which the first image signal is converted into the second image signal, and is common with the image converting part 11 shown in FIG. 4 in that it has the tap extracting parts 41 and 42, the classification part 43, and the predicting part 45. However, the image converting part 621 is different from the image converting part 11 shown in FIG. 4 in that it is provided with a coefficient memory 651 instead of the coefficient memory 44.

The coefficient memory 651 stores the sets of the tap coefficients for every class determined beforehand by the learning performed by the learning apparatus shown in FIG. 34, described later. It reads and acquires the tap coefficient for the class of the attention pixel supplied from the classification part 43 among the sets of the tap coefficients, and outputs it to the predicting part 45.

Here, as described above, in the display device 605, the image converting part 621 converts the SD image signal in the associated signal format supplied from (the signal converting part 612 of) the format converting part 604 into the HD image signal, and the display control part 622 displays the HD image corresponding to the HD image signal in a predetermined display format for the display device 605 (hereinafter, properly called a preset display format) on the display 623. The sets of the tap coefficients stored in the coefficient memory 651 are to perform the image conversion process in which the SD image signal in the associated signal format is converted into the HD image signal that a user feels the HD image displayed in the preset display format on the display 623 in high quality.

Figure 32:
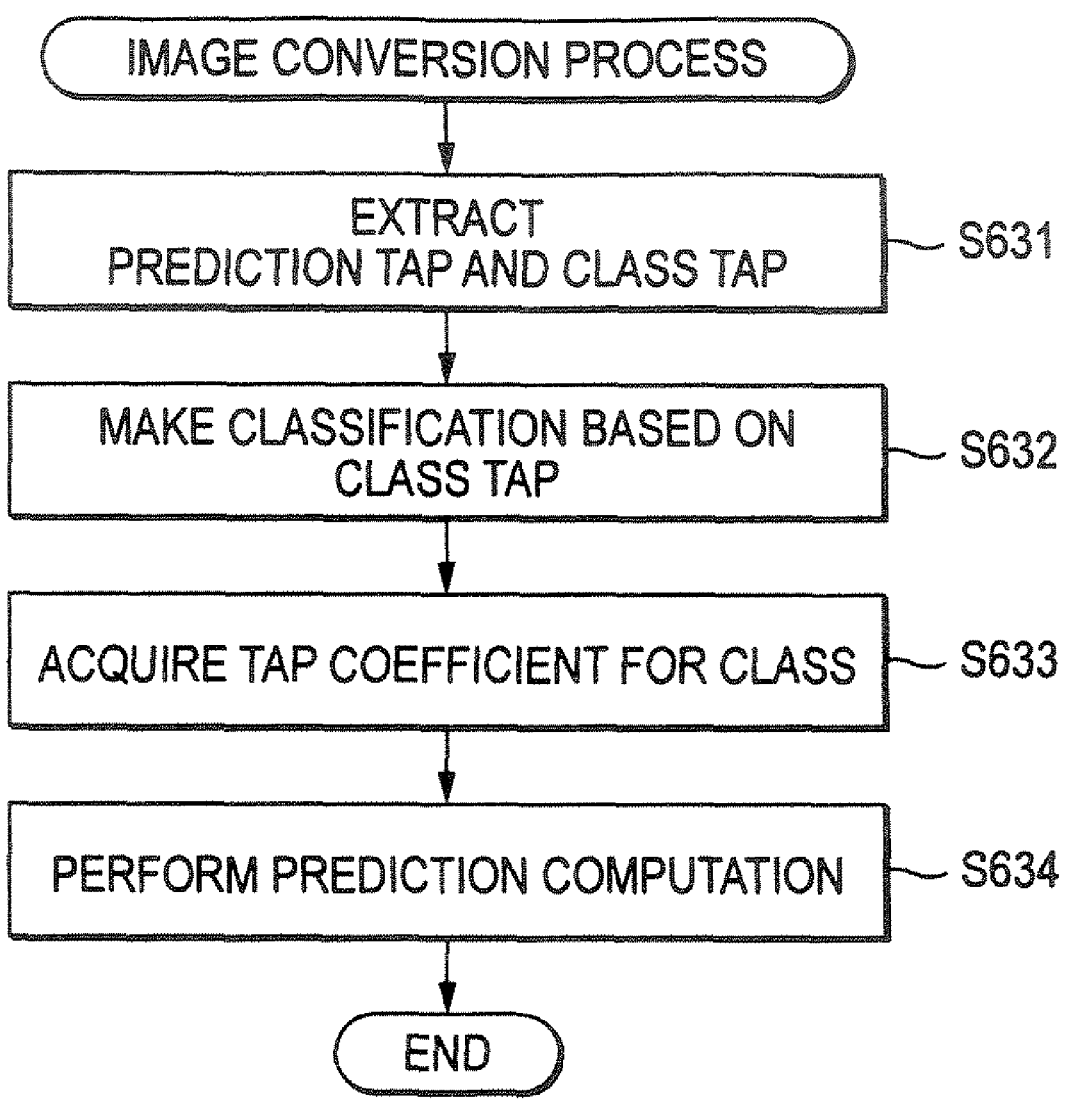
FIG. 32 shows a flow chart illustrative of the process steps performed by the image converting part 621.

Next, the image conversion process performed by the image converting part 621 shown in FIG. 31 will be described with reference to a flow chart shown in FIG. 32.

To the image converting part 621, the SD image signal in the associated signal format is supplied from (the signal converting part 612 of) the format converting part 604 (FIG. 25), and the SD image signal in the associated signal format is supplied to the tap extracting parts 41 and 42.

At Step S631, the tap extracting part 41 sets the SD image signal in the associated signal format to the first image signal as well as sets the HD image signal that is made of a high quality SD image signal to the second image signal, and sequentially sets each of the pixels configuring the HD image signal as the second image signal to the attention pixel. Then, the tap extracting parts 41 and 42 each extract the pixel values of the prediction tap for the attention pixel and the pixel that is to be the class tap from the SD image signal in the associated signal format as the first image signal. The prediction tap is supplied from the tap extracting part 41 to the predicting part 45, and the class tap is supplied from the tap extracting part 42 to the classification part 43.

The classification part 43 receives the class tap of the attention pixel from the tap extracting part 42, and classifies the attention pixel based on the class tap at Step S632. Furthermore, the classification part 43 outputs the class of the attention pixel resulted from the classification to the coefficient memory 651, and the process goes to Step S633.

At Step S633, the coefficient memory 651 reads and outputs the tap coefficient for the class of the attention pixel supplied from the classification part 43, and the process goes to Step S634. The tap coefficient outputted from the coefficient memory 651 is acquired at the predicting part 45.

At Step S634, the predicting part 45 uses the prediction tap outputted from the tap extracting part 41 and the tap coefficient acquired from the coefficient memory 651 to compute Equation (1) as a predetermined prediction computation, whereby it determines the pixel value of the attention pixel, that is, the pixel value of the pixel of the second image signal. As described above, the predicting part 45 outputs the HD image signal that is the second image signal to the display control part 622 (FIG. 25) every time when the pixel value of the pixel of the HD image signal as the second image signal is determined for a single frame, for example.

Figure 33:
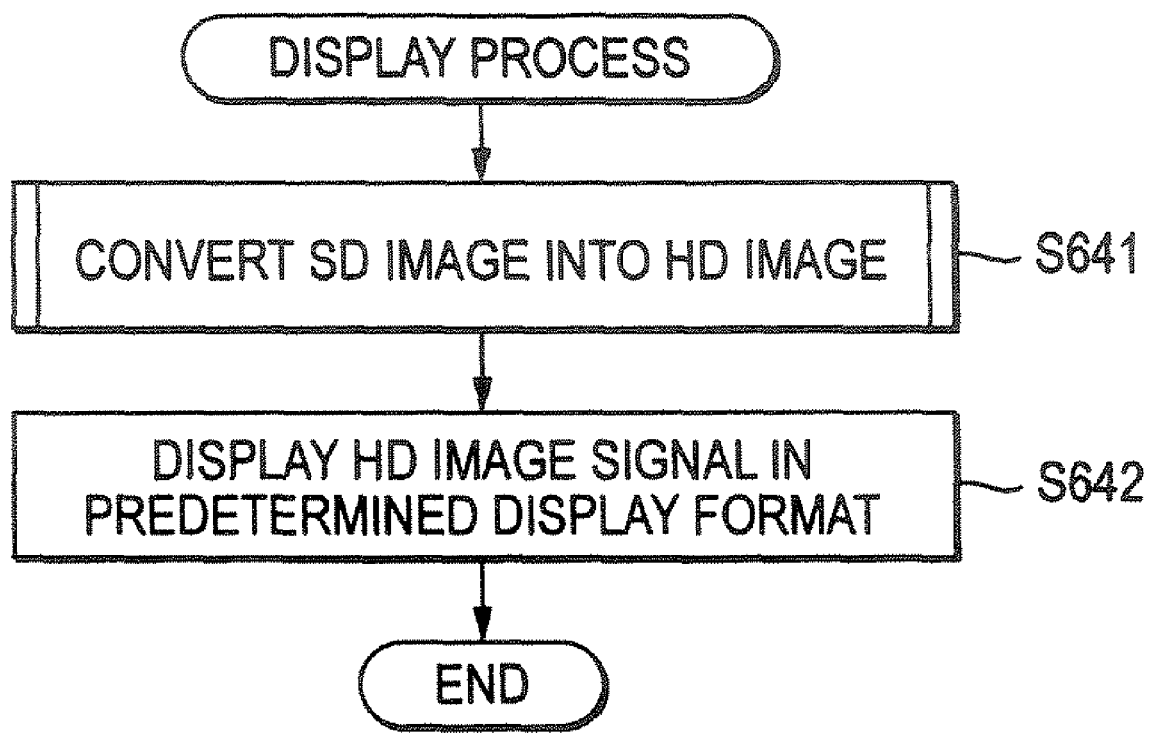
FIG. 33 shows a flow chart illustrative of the process steps performed by the display device 605.

Next, the process performed by the display device 605 shown in FIG. 25 will be described with reference to a flow chart shown in FIG. 33.

In the display device 605, the SD image signal in the associated signal format from the format converting part 604 is supplied to the image converting part 621. At Step S641, as described in FIG. 32, the image converting part 621 performs the image conversion process in which the SD image signal in the associated signal format is converted into the HD image signal, and the resulted HD image signal is supplied to the display control part 622.

At Step S642, the display control part 622 displays the HD image signal from the image converting part 621 in the preset display format on the display 623.

Figure 34:
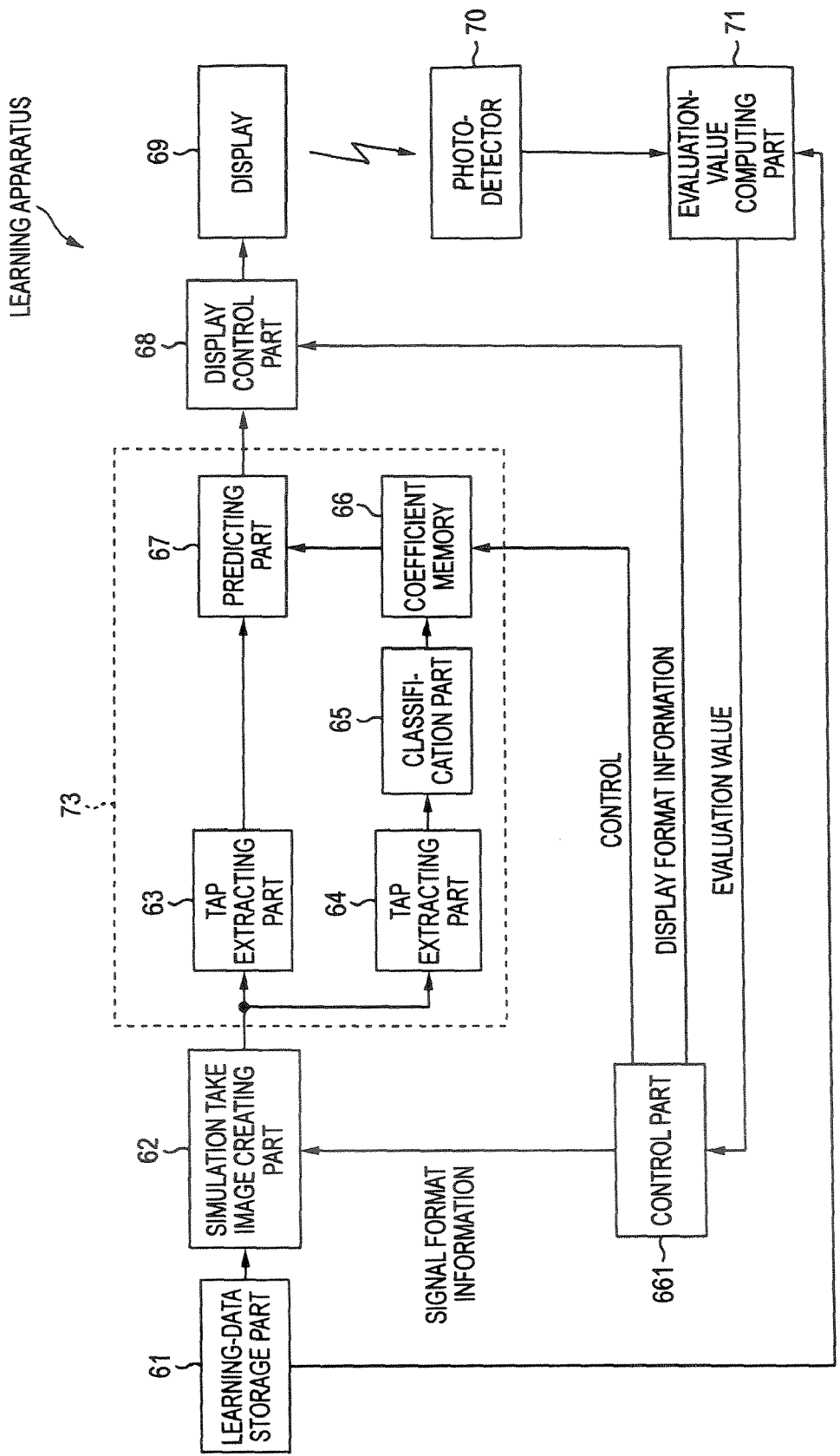
FIG. 34 shows a block diagram depicting an exemplary configuration of the learning apparatus which learns an optimum signal format and an optimum tap coefficient with respect to each of the display formats.

Next, FIG. 34 shows an exemplary configuration of a learning apparatus which performs learning to determine a set of the tap coefficients to be stored in the coefficient memory 651 of the image converting part 621 (FIG. 31).

Moreover, in the drawing, the portions corresponding to those shown in FIG. 9 are assigned the same numerals and signs, properly omitting the descriptions below. In other words, the learning apparatus shown in FIG. 34 is similarly configured as the learning apparatus shown in FIG. 9 except that a control part 661 is provided instead of the control part 72.

In the control part 611, for example, a plurality of the existing signal formats is set as a plurality of the initial signal formats. The control part 661 decides the signal format for the SD image signal as the simulation take image signal to be created by the simulation take image creating part 62 among a plurality of the initial signal formats based on the evaluation value from the evaluation value computing part 71, and supplies signal format information which indicates the signal format to the simulation take image creating part 62.

In addition, a part or all of the display formats for display devices connectable to the format converting part 604 (held by the receiver 603 (FIG. 24)) including the display device 605 are set in the control part 661 as a plurality of the initial display formats. The control part 661 sequentially sets a plurality of the initial display formats to the attention display format, and supplies display format information which indicates the attention display format to the display control part 68.

Furthermore, the control part 661 decides a set of the tap coefficients for every class for use in the image conversion process by the image converting part 73 based on the evaluation value from the evaluation value computing part 71, and controls the coefficient memory 66 to store the tap coefficient in the coefficient memory 66.

Next, a learning process performed by the learning apparatus shown in FIG. 34 in which (a set of) the tap coefficients is learned will be described with reference to a flow chart shown in FIG. 35.

At Step S661, for example, as similar to Step S31 shown in FIG. 19, the control part 661 decides an initial signal format $A_i$ that is to be the attention signal format among a plurality of the initial signal formats, and supplies signal format information indicating the attention signal format $A_i$ to the simulation take image creating part 62, and the process goes to Step S662.

At Step S662, for example, as similar to Step S32 shown in FIG. 19, the control part 661 decides an initial display format $B_j$ that is to be the attention display format among a plurality of the initial display formats, and supplies display format information indicating the attention display format $B_j$ to the display control part 68, and the process goes to Step S663.

At Step S663, in the learning apparatus (FIG. 34), for the combination of the attention signal format $A_i$ and the attention display format $B_j$, a set of temporary optimum tap coefficients (a set of tap coefficients for every class $(x_1, x_2, \ldots, x_N)$ for use in computation of Equation (1)) $F_{i,j}$ is decided.

In other words, at Step S663, as similar to the description in the flow chart shown in FIG. 20, the SD image signal of the attention signal format $A_i$ is set to the first image signal. The image converting part 73 uses the tap coefficient to perform the image conversion process to obtain the HD image corresponding to the HD image signal that is the second image signal formed of the pixels having each component of R, G, and B components as the pixel value, and the HD image is displayed in the attention display format $B_j$ on the display 69. In this case, a set of the tap coefficients that most maximizes the evaluation value of the display image signal obtained by detecting the light as the HD image displayed on the display 69 by the photodetector 70 is determined as a set of the temporary optimum tap coefficients $F_{i,j}$ for the combination of the attention signal format $A_i$ and the attention display format $B_j$.

Then, the process goes from Step S663 to Step S664. The control part 661 determines whether all of a plurality of the initial display formats is set to the attention display format to find a set of the tap coefficients at Step S663.

At Step S664, when it is determined that all of a plurality of the initial display formats is not set to the attention display format, the process returns to Step S32. The control part 72 newly decides one of the initial display formats that are not set to the attention display format among a plurality of the initial display formats as the attention display format with respect to the attention signal format $A_i$, and supplies display format information indicating the attention display format to the display control part 68, and hereinafter, the similar process steps are repeated.

In addition, at Step S664, when it is determined that all of a plurality of the initial display formats is set to the attention display format, the process goes to Step S665. The control part 661 determines whether all of a plurality of the initial signal formats is set to the attention signal format to find a set of the tap coefficients at Step S633.

At Step S665, when it is determined that all of a plurality of the initial signal formats is not set to the attention signal format, the process returns to Step S661. The control part 661 newly decides one of the initial display formats that are not set to the attention signal format among a plurality of the initial signal formats as the attention signal format, and supplies signal format information indicating the attention signal format to the simulation take image creating part 62, and hereinafter, the similar process steps are repeated.

In addition, at Step S665, when it is determined that all of a plurality of the initial signal formats is set to the attention signal format, that is, when a set of the optimum tap coefficients is found for the combination of each of a plurality of the initial signal formats and each of a plurality of the initial display formats at Step S633, the process goes to Step S666. The control part 611 temporarily decides the temporary optimum initial signal format and a set of the temporary optimum tap coefficients for each of the initial display formats among the combinations of the initial signal format and the initial display format and a set of the optimum tap coefficients for the combination of the initial signal format and the initial display format (that is, the combination of the initial signal format, the initial display format, and a set of the tap coefficients).

In other words, when there are I ways of the signal formats for a plurality of the initial signal formats and there are J ways of the display formats for a plurality of the initial display formats, at Step S663, a set of the temporary optimum tap coefficients is found for each of I×J ways of the combinations of the initial signal format and the initial display format. Consequently, I×J ways of the combinations of the initial signal format, the initial display format, and a set of the tap coefficients are obtained. At Step S666, among I×J ways of the combinations of the initial signal format, the initial display format, and a set of the tap coefficients, the combination of the initial signal format having the greatest evaluation value of the display image signal (the evaluation value obtained at Step S663) and a set of the tap coefficients is decided as the temporary optimum initial signal format and a set of the temporary optimum tap coefficients for each of J ways of the initial display formats.

At Step S666, after the temporary optimum signal format and a set of the temporary optimum tap coefficients are decided for each of the initial display formats, the process goes to Step S667. The control part 661 again decides one of the initial display formats that are not set to the attention display format as the attention display format among a plurality of the initial display formats, and the process goes to Step S668.

At Step S668, the optimum signal format decision process in which the optimum signal format is temporarily decided is performed for the combination of the attention display format and the set of the current temporary optimum tap coefficients for the attention display format, and the process goes to Step S669.

At Step S669, the optimum tap coefficient set decision process in which a set of the optimum tap coefficients is temporarily decided is performed for the combination of the attention display format and the set of the current temporary optimum tap coefficients for the attention display format, and the process goes to Step S670.

At Step S670, the control part 661 determines whether the current temporary optimum signal format determined at the next previous Step S668 and the set of the current temporary optimum tap coefficients determined at the next previous Step S669 are optimized for the attention display format.

In other words, in the optimum tap coefficient set decision process at the next previous Step S669, a set of the tap coefficients that maximizes the evaluation value computed by the evaluation value computing part 71, as described later, is temporarily decided as a set of the optimum tap coefficients for the combination of the attention display format and the current temporary optimum signal format for the attention display format. For example, at Step S670, depending whether the evaluation value of the set of the optimum tap coefficients is equal to or greater than a predetermined threshold for determining optimization, it is determined whether the current temporary optimum signal format and a set of the current temporary optimum tap coefficients are optimized for the attention display format.

At Step S670, when it is determined that the current temporary optimum signal format and a set of the current temporary optimum tap coefficients are not optimized for the attention display format, that is, when the evaluation value for a set of the optimum tap coefficients determined at the next previous Step S669 is not equal to or greater than a predetermined threshold for determining optimization, the process returns to Step S668, and the similar process steps are repeated.

In addition, at Step S670, when it is determined that the current temporary optimum signal format and a set of the current temporary optimum tap coefficients are optimized for the attention display format, that is, when the evaluation value for a set of the optimum tap coefficients determined at the next previous Step S669 is equal to or greater than a predetermined threshold for determining optimization and when the optimum signal format and a set of the optimum tap coefficients are determined for the attention display format, the control part 661 crates format correspondence information which associates (display format information which indicates) the attention display format with (signal format information which indicates) the optimum signal format determined for the attention display format, and stores it as well as associates the attention display format with a set of the optimum tap coefficients determined for the attention display format and stores them, and the process goes to Step S671.

At Step S671, the control part 661 sets all of a plurality of the initial display formats to the attention display format, and determines whether the optimized signal format and a set of the optimized tap coefficients are determined for each of a plurality of the initial display formats.

At Step S671, when it is determined that all of a plurality of the initial display formats are not set to the attention display format, the process returns to Step S667. The control part 661 newly decides one of the initial display formats that are not set to the attention display format among a plurality of the initial display formats to the attention display format, and hereinafter, the similar process steps are repeated.

In addition, at Step S671, when it is determined that all of a plurality of the initial display formats are set to the attention display format, that is, when the optimum signal format and a set of the optimum tap coefficients are determined for each of a plurality of the initial display formats, the learning process is ended.

Figure 35:
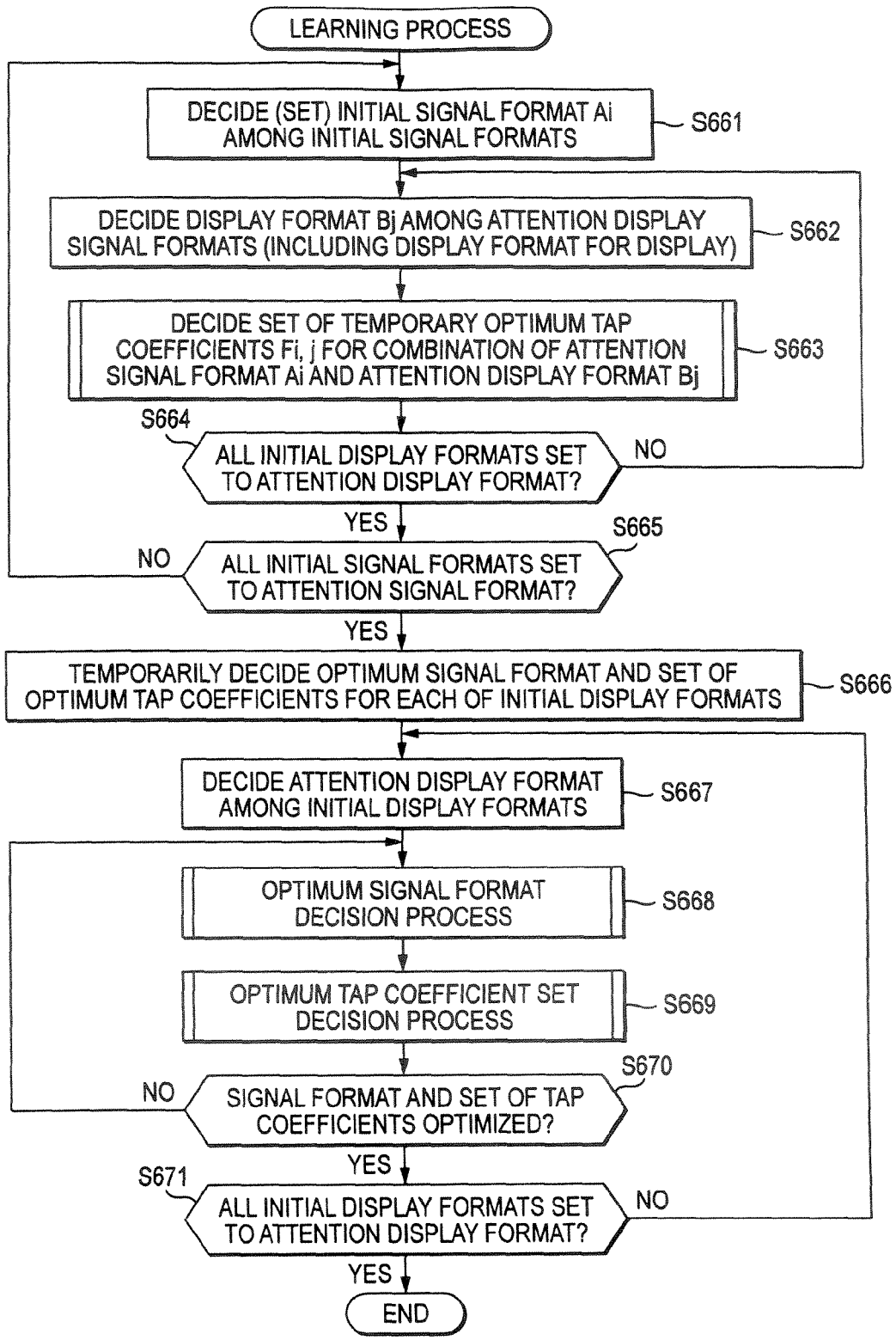
FIG. 35 shows a flow chart illustrative of the process steps performed by the learning apparatus which learns an optimum signal format and an optimum tap coefficient with respect to each of the display formats.

The coefficient memory 651 configuring the image converting part 621 shown in FIG. 31 stores a set of the tap coefficients for the display format for the display device 605 (FIG. 25) having the image converting part 621 incorporated therein among the sets of the optimum tap coefficients for each of a plurality of the initial display formats determined in the learning process shown in FIG. 35.

In addition, the coefficient selecting part 636 configuring the signal converting part 612 shown in FIG. 26 stores correspondence information which associates each of a plurality of the initial display formats with the optimum signal format for the initial display format determined for each of the initial display formats in the learning process shown in FIG. 35. As described above, the coefficient selecting part 636 identifies the signal format (the associated signal format) associated with the display format for the display device 605 indicated by display format in formation from the display format acquiring part 613 (FIG. 25) in format correspondence information, and controls the coefficient memory 634 so that the signal format indicated by camera signal format information supplied from the signal acquiring part 611 is set to the first signal format as well as a set of the first/second conversion tap coefficients having the associated signal format as the second signal format is selected as a set of the valid tap coefficients.

Then, the format converting part 604 shown in FIG. 25 having the signal converting part 612 incorporated therein sets to the associated signal format the signal format for the SD image signal that is the target for the image conversion process to obtain the HD image signal that a user feels it in the highest quality when it is displayed in the display format for the display device 605, and the SD image signal from the camera 601 is converted into the SD image signal in the associated signal format. Furthermore, in the display device 605 (FIG. 25), the image converting part 621 performs the image conversion process for the SD image signal in the associated signal format, and the display control part 622 displays the HD image obtained in the image conversion process in the display format for the display device 605.

Therefore, regardless of the signal to noise ratio of the SD image signal in the associated signal format, for the overall system of the combination of the format converting part 604 and the display device 605, the image that the user feels to be in high quality can be displayed on the display 623.

Figure 30:
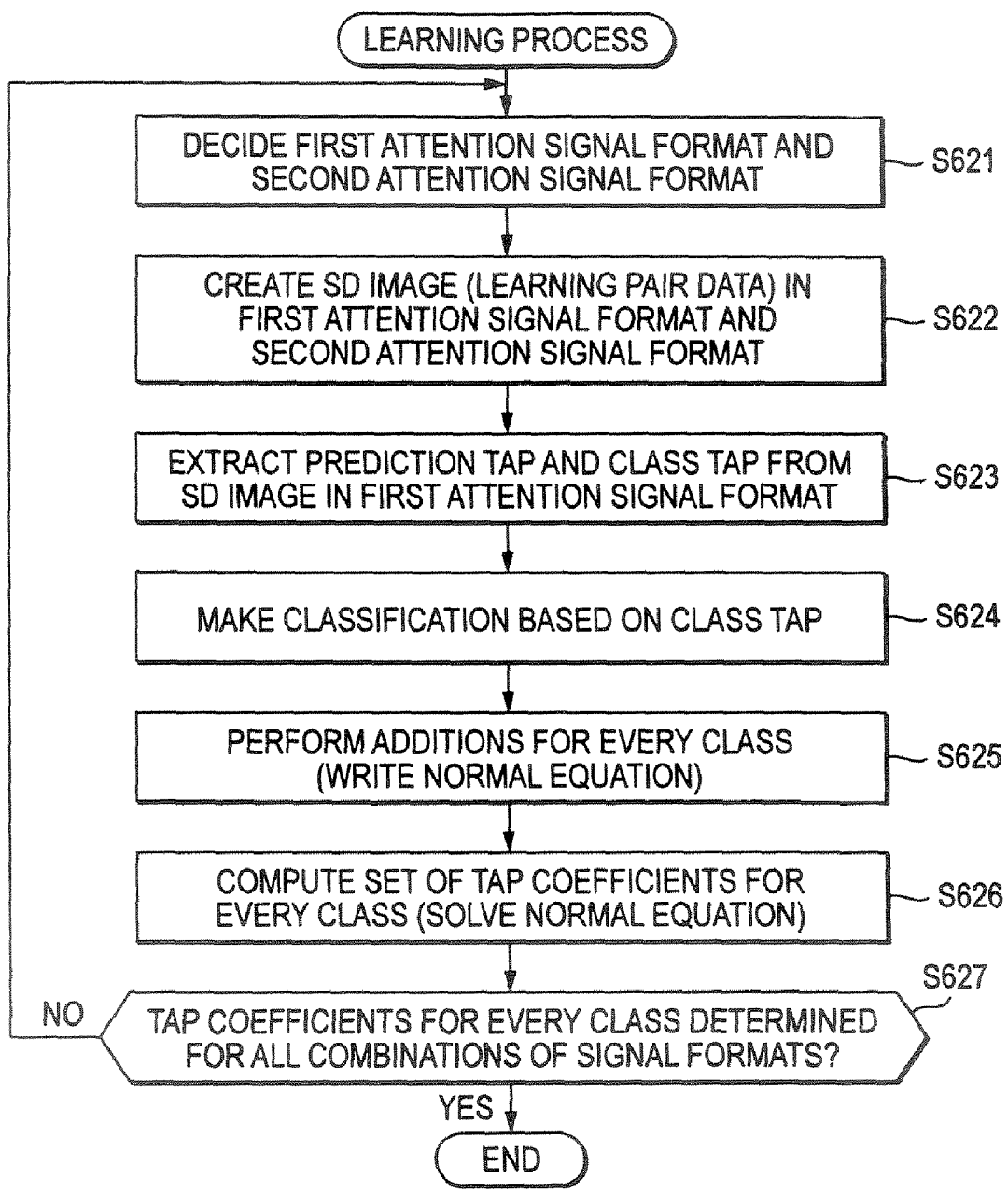
FIG. 30 shows a flow chart illustrative of the process steps performed by the learning apparatus which learns the tap coefficient used by the signal converting part 612.

Moreover, as described above, in the learning apparatus shown in FIG. 29 which learns a set of the first/second conversion tap coefficients to be stored in the coefficient memory 634 configuring the signal converting part 612 shown in FIG. 26, a set of the first/second conversion tap coefficients is determined for various combinations of the first signal format and the second signal format by the learning process shown in FIG. 30. It is necessary for various second signal formats to include a plurality of the signal formats associated with each of a plurality of the initial display formats in format correspondence information determined in the learning process shown in FIG. 35.

In addition, in the learning process shown in FIG. 35, it is determined that the combination of the signal format and a set of the tap coefficients is optimized for the attention display format when the evaluation value of a set of the tap coefficients determined in the optimum tap coefficient set decision process is equal to or greater than the threshold for determining optimization. However, in addition to this, for example, it may be determined that the combination of the signal format and a set of the tap coefficients are optimized when the optimum signal format decision process and the optimum tap coefficient set decision process are repeated for a predetermined number of times.

Next, the optimum signal format decision process at Step S668 shown in FIG. 35 will be described in detail with reference to a flow chart shown in FIG. 36.

At Step S681, for example, as similar to Step S71 shown in FIG. 21, the control part 661 (FIG. 34) decides a plurality of candidates of the optimum signal format based on the current temporary (temporarily decided) optimum format, and the process goes to Step S682.

At Step S682, the control part 661 decides one of the formats that are not set to the attention signal format among a plurality of the candidates of the optimum signal format as the attention signal format, and supplies the signal format information indicating the attention signal format to the simulation take image creating part 62, and the process goes to Step S683.

At Step S683, the simulation take image creating part 62 thins out the number of the pixels of the SHD image signal stored in the learning data storage part 61 to generate the SD image signal in the attention signal format indicated by the signal format information from the control part 661, and supplies it to the image converting part 73, and the process goes to Step S684.

At Step S684, the control part 661 stores the set of the current temporary optimum tap coefficients for the attention display format in the coefficient memory 66. Furthermore, at Step S684, as similar to Step S53 shown in FIG. 20, the image converting part 73 sets the SD image signal in the attention signal format supplied from the simulation take image creating part 62 to the first image signal, performs the image conversion process in which the first image signal is converted into the HD image signal as the second image signal by computation with the current set of the temporary optimum tap coefficients stored in the coefficient memory 66, and supplies the resulted HD image signal to the display control part 68.

After the process steps of Step S684, the process goes to Step S685. The control part 661 supplies display format information which indicates the attention display format to the display control part 68. Therefore, the display control part 68 displays the HD image corresponding to the HD image signal outputted from the image converting part 73 in the attention display format indicated by the display format information from the control part 661 on the display 69, and the process goes from Step S685 to Step S686.

At Step S686, the photodetector 70 detects the light as the HD image (the display image) displayed on the display 69 (by photoelectric conversion), and outputs the display image signal conformable to the HD image signal that is the electrical signal corresponding to the light to the evaluation value computing part 71, and the process goes to Step S687.

At Step S687, the evaluation value computing part 71 evaluates the display image signal from the photodetector 70, which results in the evaluation of the HD image displayed on the display 69.

In other words, the evaluation value computing part 71 reads the SHD image signal corresponding to the display image signal from the photodetector 70 out of the learning data storage part 61, and compares the display image signal with the corresponding SHD image signal. Thus, it computes the evaluation value of the evaluation of the display image signal, which results in the evaluation of the image quality felt by a user who views the HD image displayed on the display 69, and supplies it to the control part 611.

Here, the process steps of Steps S683 to S687 are performed to all the frames of the SHD image signal stored in the learning data storage part 61. Then, for example, the control part 611 determines the total sum of the evaluation values obtained for all the frames of the SHD image signal stored in the learning data storage part 61 with respect to the attention signal format, and temporarily stores the total sum as the final evaluation value of the attention signal format.

After that, the process goes from Step S687 to Step S688. The control part 661 determines whether the evaluation value is computed for all of a plurality of the candidates of the optimum signal format.

At Step S688, when it is determined that the evaluation value is not computed for all of a plurality of the candidates of the optimum signal format, the process returns to Step S682. The control part 611 newly decides one of the formats that are not set to the attention signal format among a plurality of the candidates of the optimum signal format as the attention signal format, and hereinafter, repeats the similar process steps.

In addition, at Step S688, when it is determined that the evaluation value is computed for all of a plurality of the candidates of the optimum signal format, the process goes to Step S689. The control part 661 newly temporarily decides a candidate having the greatest evaluation value among a plurality of the candidates of the optimum signal format as the optimum signal format for (the combination of the set of the current temporary optimum tap coefficients for the attention display format and) the attention display format, and the process is returned.

Figure 37:
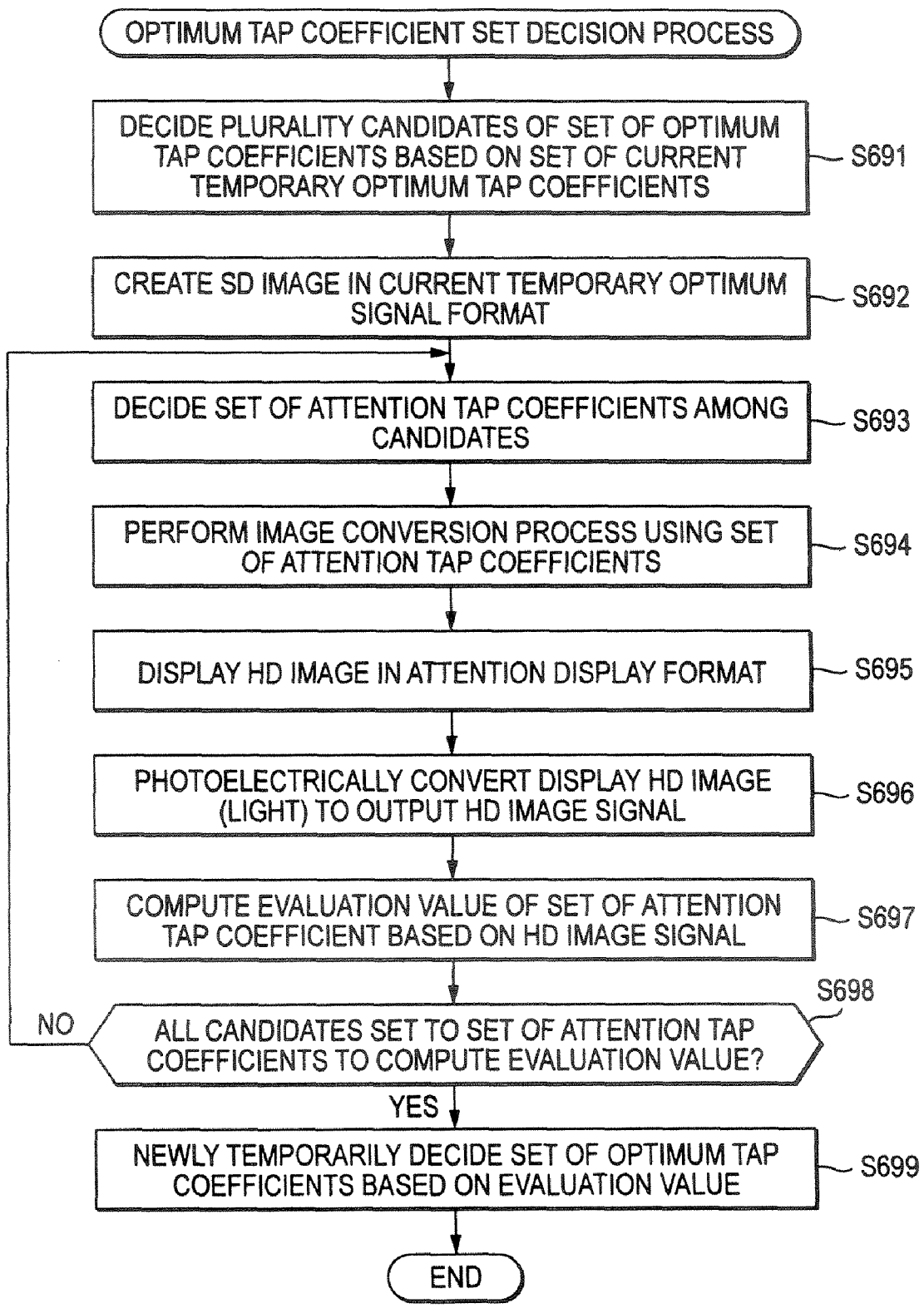
FIG. 37 shows a flow chart illustrative of the detail of the process steps of Step S669.

Next, the optimum tap coefficient set decision process at Step S669 shown in FIG. 35 will be described in detail with reference to a flow chart shown in FIG. 37.

At Step S691, for example, as similar to Step S111 shown in FIG. 23, the control part 661 decides a plurality of candidates of a set of the optimum tap coefficients based on the set of the current temporary (temporarily decided) optimum tap coefficients.

After the process steps of Step S691, the process goes to Step S692. The control part 661 supplies signal format information which indicates the current temporary optimum signal format for the attention display format to the simulation take image creating part 62. Therefore, the simulation take image creating part 62 thins out the number of the pixels of the SHD image signal stored in the learning data storage part 61 to generate the SD image signal in the signal format indicated by signal format information from the control part 611, and supplies it to the image converting part 73, and the process goes to Step S693.

At Step S693, the control part 661 decides one set that is not set to a set of the attention tap coefficients among a plurality of the candidates of a set of the optimum tap coefficients as a set of the attention tap coefficients, and controls the coefficient memory 66 to store the set of the attention tap coefficients, and the process goes to Step S694.

At Step S694, as similar to Step S53 shown in FIG. 20, the image converting part 73 sets the SD image signal supplied from the simulation take image creating part 62 to the first image signal, and performs the image conversion process in which the first image signal is converted into the HD image signal as the second image signal by computation with a set of the attention tap coefficients stored in the coefficient memory 66, and supplies the resulted HD image signal to the display control part 68.

After the process steps of Step S694, the process goes to Step S695. The control part 661 supplies display format information which indicates the attention display format to the display control part 68. Thus, the display control part 68 displays the HD image corresponding to the HD image signal outputted from the image converting part 73 in the attention display format indicated by the display format in formation from the control part 661 on the display 69, and the process goes to Step S696.

At Step S696, the photodetector 70 detects the light as the HD image (the display image) displayed on the display 69 (by photoelectric conversion), and outputs the display image signal conformable to the HD image signal that is the electrical signal corresponding to the light to the evaluation value computing part 71, and the process goes to Step S697.

AT Step S697, the evaluation value computing part 71 evaluates the display image signal from the photodetector 70, which results in the evaluation of the HD image displayed on the display 69.

In other words, the evaluation value computing part 71 reads the SHD image signal corresponding to the display image signal from the photodetector 70 out of the learning data storage part 61, and compares the display image signal with the corresponding SHD image signal. Thus, it computes the evaluation value of the evaluation of the display image signal, which results in the evaluation of the image quality felt by a user who views the HD image displayed on the display 69, and supplies it to the control part 661.

Here, the process steps of Step S692, and Steps S694 to S697 are performed for all the frames of the SHD image signal stored in the learning data storage part 61. Then, for example, the control part 661 determines the total sum of the evaluation value obtained for all the frames of the SHD image signal stored in the learning data storage part 61 with respect to a set of the attention tap coefficients, and temporarily stores the total sum as the final evaluation value of a set of the attention tap coefficients.

After that, the process goes from Step S697 to Step S698. The control part 661 determines whether the evaluation value is computed for all of a plurality of the candidates of a set of the optimum tap coefficients.

At Step S698, when it is determined that the evaluation value is not computed all of a plurality of the candidates of a set of the optimum tap coefficients, the process returns to Step S693. The control part 661 newly decides one set that is not set to a set of the attention tap coefficients among a plurality of the candidates of a set of the optimum tap coefficients as a set of the attention tap coefficients.

In addition, at Step S698, when it is determined that the evaluation value is computed for all of a plurality of the candidates of a set of the optimum tap coefficients, the process goes to Step S699. The control part 661 newly temporarily decides a candidate having the greatest evaluation value among a plurality of the candidates of a set of the optimum tap coefficients as a set of the optimum tap coefficients for (the combination of the current temporary optimum signal format for the attention display format and) the attention display format, and the process is returned.

As described above, as described in FIG. 35, in the learning apparatus shown in FIG. 34, the optimum signal format decision process and the optimum tap coefficient set decision process are repeated until the evaluation value (here, the evaluation value obtained at the next previous optimum tap coefficient set decision process) is equal to or greater than the threshold for determining optimization for each of various display formats (a plurality of the initial display formats), whereby (a set of) the tap coefficients is determined that is used in the image conversion process to make the display image of the HD image to be displayed to be higher quality, and the signal format for the SD image signal is determined that is the target for the image conversion process performed by using the tap coefficient.

Therefore, according to the learning apparatus shown in FIG. 34, the tap coefficient and the signal format can be determined so that a user feels the display image displayed in various display formats in higher image quality.

Figure 36:
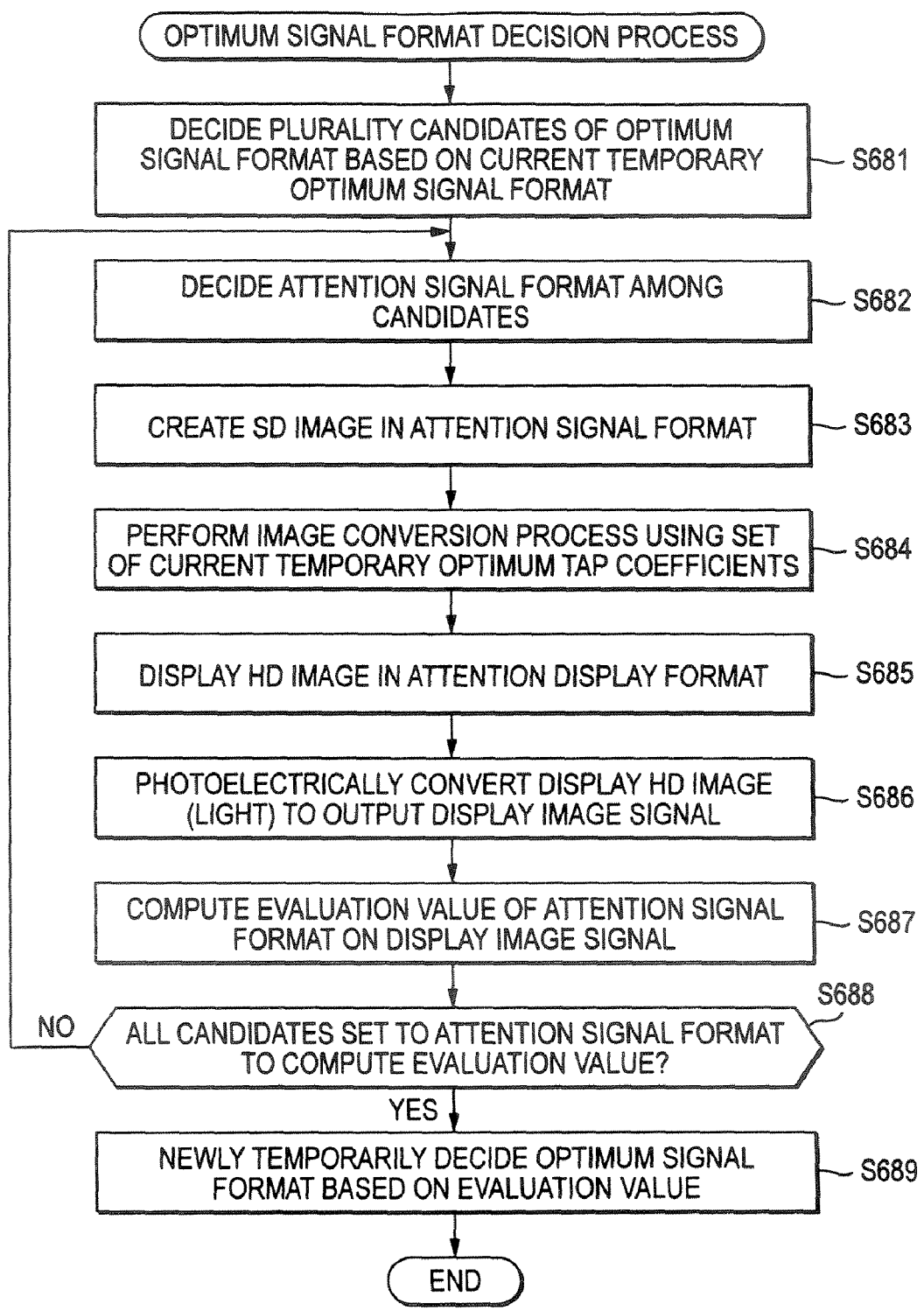
FIG. 36 shows a flow chart illustrative of the detail of the process steps of Step S668.

In addition, in the optimum signal format decision process shown in FIG. 36, in the case in which a plurality of the candidates of the optimum signal format is decided on the basis of the current temporary optimum signal format, for the scheme how to modify the current temporary optimum signal format, such a scheme can be adapted in which when the number of times for repetition is small at Steps S668 and S669 shown in FIG. 35, the signal format is "greatly" modified, and the signal format is gradually modified into a smaller deformation as the number of times for repetition is increased. It is similar to a set of the tap coefficients.

In addition, when the evaluation value determined for the candidates of the optimum signal format is the number not so great and becomes hardly increased, the current temporary optimum signal format is greatly modified to decide a plurality of the candidates of the optimum signal format. In this case, a so-called local minimum problem can be solved. It is similar to a set of the tap coefficients.

Figure 38:
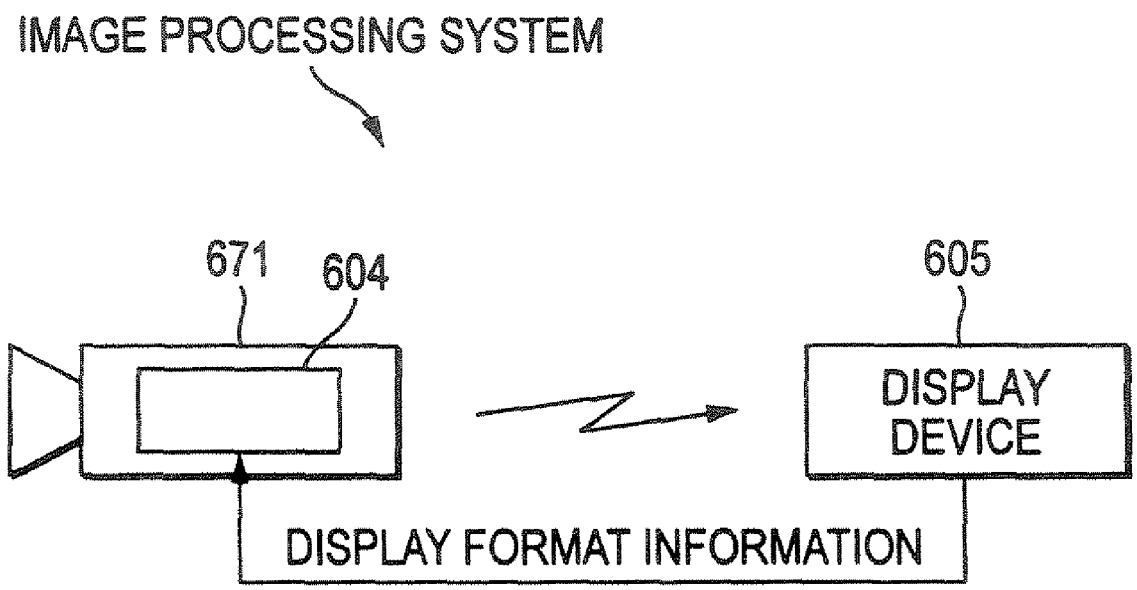
FIG. 38 shows a block diagram depicting a third exemplary configuration of an image processing system which performs image processing.

Next, FIG. 38 shows a third exemplary configuration of an image processing system for image processing.

Moreover, in the drawing, the portions corresponding to those of the image processing system shown in FIG. 24 are assigned the same numerals and signs, properly omitting the descriptions below.

The image processing system shown in FIG. 38 is configured of a camera 671 and a display device 605.

The camera 671 has a format converting part 604 incorporated therein, and display format information which indicates the display format is supplied from the display device 605 to the format converting part 604.

The camera 671 shoots an object (subject), and acquires an SD image signal that is a shot image signal in a predetermined signal format. Furthermore, in the camera 671, the incorporated format converting part 604 converts a predetermined SD image signal in the signal format into the SD image signal in the associated signal format corresponding to the display format indicated by display format information from the display device 605, and outputs it.

The SD image signal in the associated signal format outputted from the camera 671 is supplied to the display device 605. In the display device 605, the image conversion process is performed for the SD image signal in the associated signal format outputted from the camera 671, and the resulted HD image corresponding to the HD image signal is displayed in the display format for the display device 605.

Therefore, in the image processing system shown in FIG. 38, regardless of the signal to noise ratio of the SD image signal in the associated signal format outputted from the camera 671, in the overall image processing system configured of the camera 671 and the display device 605, the image that a user feels to be in high quality can be displayed on the display device 605.

Next, FIG. 39 shows a fourth exemplary configuration of an image processing system for image processing.

In FIG. 39, the image processing system is configured of a camera (video camera) 701 and a display device 702.

The camera 701 shoots an object (subject), and outputs an SD image signal as the shot image signal that is the image signal obtained by the shooting, for example. The display device 702 receives the shot image signal outputted from the camera 701, performs image processing for the shot image signal, and displays an image corresponding to the image signal obtained by the image process (hereinafter, properly called an image post-processed image signal).

Moreover, for example, the camera 701 is a single plate camera, which is configured to output a shot image signal in a certain signal format.

FIG. 40 shows an exemplary configuration of the display device 702 shown in FIG. 39.

The display device 702 is configured of an image processing part 711, a display control part 714, a display 715, a signal format acquiring part 716, a display format acquiring part 717, a manipulation part 718, and a control part 719.

To the image processing part 711, the shot image signal outputted from the camera 701 (here, for example, the SD image signal) is supplied. For example, the image processing part 711 is configured of a pre-processing part 712 and an image converting part 713, which performs image processing for the shot image signal from the camera 701 under control performed by the control part 719, and supplies the resulted image post-processed image signal to the display control part 714.

In other words, in the image processing part 711, the camera 701 supplies the SD image signal to the pre-processing part 712. The pre-processing part 712 pre-processes the shot image signal from the camera 701 in order to obtain a signal suited for the image conversion process in the image converting part 713 in the later stage under control performed by the control part 719, and supplies the image signal resulted from pre-processing (hereinafter, properly also called a pre-processed shot image signal) to the image converting part 713.

The image converting part 713 sets the pre-processed shot image signal from the pre-processing part 712 to the first image signal as well as sets the image signal that is to be obtained by the image conversion process to the second image signal, converts the pre-processed shot image signal as the first image signal into the second image signal by computation with the tap coefficient obtained by learning performed beforehand under control performed by the control part 719, and supplies it as the image post-processed image signal to the display control part 714.

The display control part 714 performs display control in which the image corresponding to the image post-processed image signal supplied from the image converting part 713 is displayed in a certain display format on the display 715.

The display 715 is a display mechanism configured of a CRT or an LCD panel, for example, which displays images under control by the display control part 714.

To the signal format acquiring part 716, the shot image signal outputted from the camera 701 is supplied. The signal format acquiring part 716 acquires data by detecting the signal format of the shot image signal from the camera 701, for example, and supplies signal format information which indicates the signal format to the control part 719.

The display format acquiring part 717 acquires the display format information that indicates the display format which displays an image on the display 715 by the display control part 714 from the display control part 714, and supplies it to the control part 719.

The manipulation part 718 is manipulated by a user, and supplies an instruction signal which indicates an instruction corresponding to the user's manipulation to the control part 719. Here, for example, the instruction signal includes signals to instruct (the descriptions of) image processing for the shot image signal from the camera 701 such as noise removal, image up-scaling, and conversion of the SD image into the HD image.

The control part 719 decides image processing performed for the shot image signal in accordance with the instruction signal supplied from the manipulation part 718, and controls the pre-processing part 712 and the image converting part 713 of the image processing part 711 depending on image processing and signal format information from the signal format acquiring part 716 and display format information from the display format acquiring part 717.

Next, FIG. 41 shows an exemplary configuration of the pre-processing part 712 shown in FIG. 40.

For example, the pre-processing part 712 is configured of a pre-processing tap extracting part 731, a pre-processing computing part 732, and a coefficient memory 733.

The pre-processing tap extracting part 731 sequentially sets the pixels configuring the pre-processed shot image signal that is to be obtained by pre-processing the shot image signal from the camera 701 (FIG. 40) to the attention pixel, and extracts a pre-processing tap that is the pixel value of a plurality of the pixels for use to determine the pixel value of the attention pixel from the shot image signal supplied from the camera 701. Then, the pre-processing tap extracting part 731 supplies the pre-processing tap obtained for the attention pixel to the pre-processing computing part 732.

Moreover, under control performed by the control part 719 (FIG. 40), the pre-processing tap extracting part 731 obtains the pre-processing tap in the tap structure in accordance with the control.

The pre-processing computing part 732 uses the pixel value that is the pre-processing tap supplied from the pre-processing tap extracting part 731 as an argument to perform computation of the function for a predetermined pre-process defined by (a set of) the pre-processing coefficient which is stored in the coefficient memory 733 and decided by learning that is performed by using the SHD image of higher quality than the HD image, and outputs the computed result of the pre-processing function as the pixel value of the attention pixel of the pre-processed shot image signal.

The coefficient memory 733 stores a plurality of sets of the pre-processing coefficients which are determined beforehand by learning that is performed by using the SHD image of higher quality than the HD image and which define the pre-processing function. Then, the coefficient memory 733 selects a set of the pre-processing coefficients under control performed by the control part 719 (FIG. 40) as a valid set of the pre-processing coefficients among a plurality of the sets of the pre-processing coefficients, and supplies it to the pre-processing computing part 732.

Here, the pre-processing computing part 732 performs computation of the pre-processing function defined by a valid set of the pre-processing coefficients from the coefficient memory 733.

Moreover, for the pre-processing function f( ), suppose a first-order linear equation is adapted. The pre-processing function $f(x_1, x_2, \ldots, x_M)$ is expressed by Equation $f(x_1, x_2, \ldots, x_M) = p_1 x_1 + p_2 x_2 + \ldots + p_M x_M$. However, $x_1, x_2, \ldots, x_M$ express the pixel value of a plurality of pixels (M pixels) as the pre-processing tap for the attention pixel, and $p_1 + p_2 + \ldots, + p_M$ express a set of the coefficients that defines the pre-processing function f( ) stored in the coefficient memory 733.

Next, FIG. 42 shows an exemplary configuration of the image converting part 713 shown in FIG. 40.

Moreover, in the drawing, the portions corresponding to those of the image converting part 11 shown in FIG. 4 are designated the same numerals and signs, properly omitting the descriptions below. In other words, the image converting part 713 shown in FIG. 42 is common with the image converting part 11 shown in FIG. 4 in that the tap extracting parts 41 and 42, the classification part 43, and the predicting part 45 are provided, but it is different from the image converting part 11 shown in FIG. 4 in that a coefficient memory 741 is provided instead of the coefficient memory 44.

The coefficient memory 741 stores a plurality of sets of the tap coefficients for use in the image conversion process. Here, a plurality of the sets of the tap coefficients stored in the coefficient memory 741 is determined beforehand by learning that is performed by using the SHD image of higher quality than the HD image.

In the image converting part 713, a set of the tap coefficients under control performed by the control part 719 (FIG. 40) is set to a set of the valid tap coefficients among a plurality of the sets of the tap coefficients, and a set of the valid tap coefficients (a set of the valid tap coefficients) is used for the image conversion process.

In other words, the image converting part 713 sets the pre-processed shot image signal from the pre-processing part 712 (FIG. 40) to the first image signal as well as sets the image post-processed image signal to the second image signal. The tap extracting part 41 sequentially sets the pixel of the image processed image signal as the second image signal to the attention pixel, extracts the pixel value of the pixel that is to be the prediction tap from the pre-processed shot image signal as the first image signal with respect to the attention pixel, and supplies it to the predicting part 45. Furthermore, the tap extracting part 42 extracts the pixel value of the pixel that is to be the class tap from the pre-processed shot image signal as the first image with respect to the attention pixel, and supplies it to the classification part 43.

The classification part 43 performs classification to determine a class for the attention pixel based on the class tap from the tap extracting part 42, and supplies (the class code indicating) the class of the resulted attention pixel to the coefficient memory 741. The coefficient memory 741 reads (a set of) the tap coefficients for the class from the classification part 43 out of a set of the valid tap coefficients, and outputs it to the predicting part 45.

The predicting part 45 uses the prediction tap from the tap extracting part 41 and the tap coefficient from the coefficient memory 741 to perform a computation of the Equation (1), for example, and determines (predicts) the pixel value of the attention pixel of the image post-processed image signal as the second image signal.

Next, the operation of the display device 702 shown in FIG. 40 will be described with reference to a flow chart shown in FIG. 43.

To the display device 702, the shot image signal is supplied from the camera 701. The display device 702 receives the shot image signal from the camera 701, and supplies it to the pre-processing part 712 and the signal format acquiring part 716 of the image processing part 711.

Then, at Step S701, the control part 719 decides an image process for the shot image signal from the camera 701 in response to the instruction signal supplied from the manipulation part 718. In other words, suppose a decision process is the image process decided as the image process applied to the shot image signal by the control part 719. For example, when a user manipulates the manipulation part 718 to supply an instruction signal from the manipulation part 718 to the control part 719, the control part 719 decides the image process instructed by the instruction signal as the decision process. In addition, when the manipulation part 718 does not supply the instruction signal to the control part 719, the control part 719 decides as the decision process the image process instructed by the instruction signal supplied from the manipulation part 718 last time, or a predetermined default image process.

On the other hand, at Step S702, the signal format acquiring part 716 acquires the signal format for the shot image signal from the camera 701, and supplies signal format information which indicates the signal format to the control part 719. In addition, at Step S703, the display format acquiring part 717 acquires display format information which indicates the display format for the display device 702 (the display format which displays an image on the display 715 by the display control part 714) from the display control part 714, and supplies it to the control part 719.

Then, the control part 719 controls the image processing part 711 in accordance with the decision process decided at Step S701, the signal format information supplied from the signal format acquiring part 716 at Step S702, and the display format information supplied from the display format acquiring part 717 at Step S703. The image processing part 711 performs the image process as the decision process by performing different processes in accordance with the decision process, signal format information and the display format information under control by the control part 719.

In other words, at Step S704, the pre-processing part 712 pre-processes the shot image signal from the camera 701 under control performed by the control part 719 at Step S704$_1$, and supplies the pre-processed shot image signal resulted from the pre-process to the image converting part 713.

At Step S704$_2$, the image converting part 713 sets the pre-processed shot image signal from the pre-processing part 712 to the first image signal as well as sets the image post-processed image signal to the second image signal, and performs the image conversion process under control performed by the control part 719.

Here, as described above, in accordance with the decision process, the signal format information, and display format information, the control part 719 controls the image processing part 711. The pre-processing part 712 and the image converting part 713 configuring the image processing part 711 each perform different processes under control performed by the control part 719, that is, in accordance with the decision process, the signal format information, and the display format information, whereby the decision process is performed for the overall image processing part 711.

The image post-processed image signal obtained by performing the image conversion process at the image converting part 713 is supplied to the display control part 714.

At Step S705, the display control part 714 displays the image corresponding to the image post-processed image signal supplied from the image converting part 713 in a predetermined display format on the display 715.

Next, for example, the SHD image of higher quality than the HD image is used for learning to decide three parameters: the tap structure of the pre-processing tap extracted by the pre-processing tap extracting part 731 in the pre-processing part 712 (FIG. 41) of the display device 702 (FIG. 40), a set of the pre-processing coefficients stored in the coefficient memory 733, and a set of the tap coefficients stored in the coefficient memory 741 of the image converting part 713 (FIG. 42).

Figure 44:
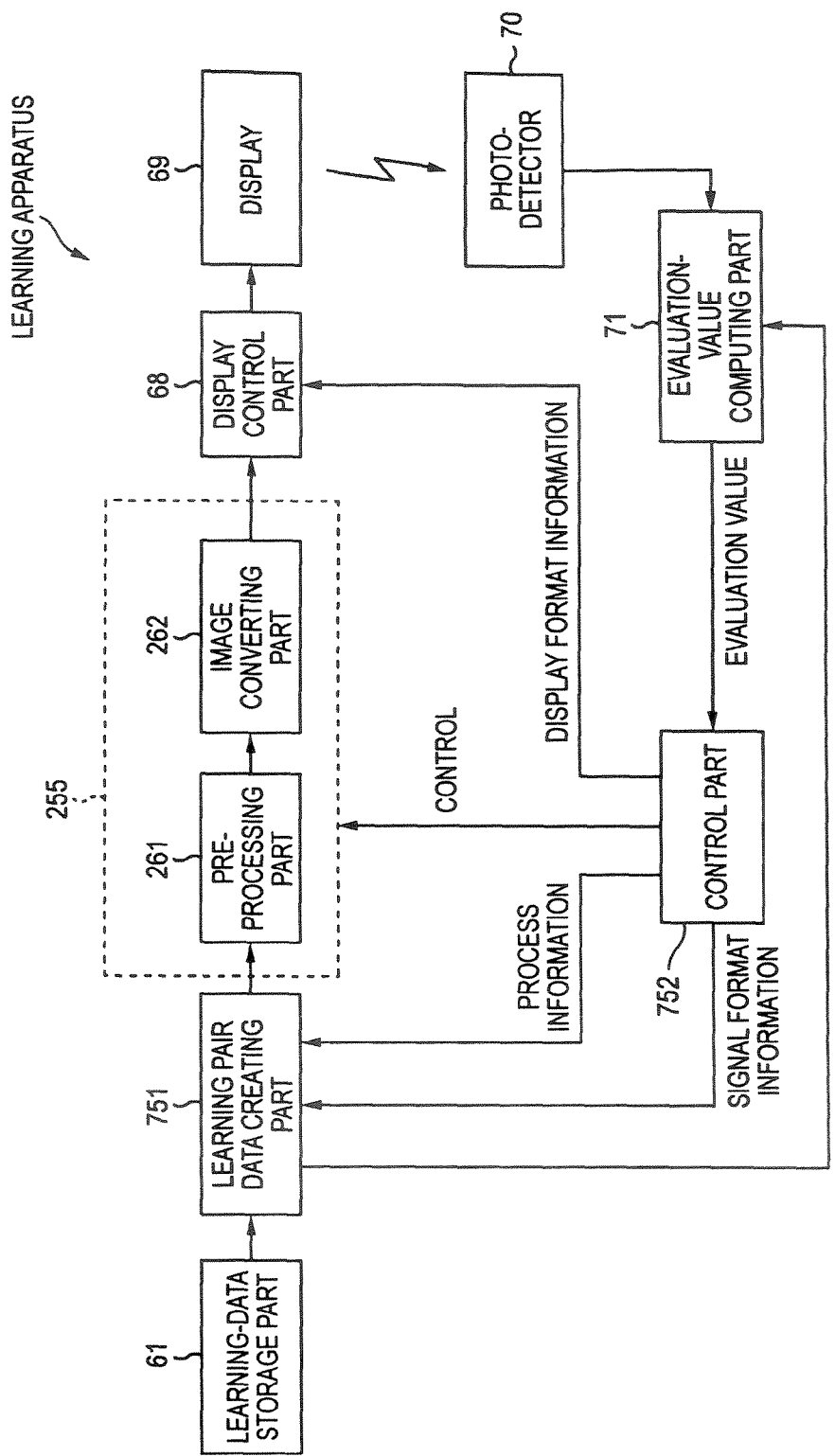
FIG. 44 shows a block diagram depicting an exemplary configuration of the learning apparatus which learns an optimum image processing, an optimum tap structure, an optimum pre-processing coefficient, and an optimum tap coefficient with respect to the combination of the signal format and the display format.

FIG. 44 shows an exemplary configuration of a learning apparatus for learning to determine the tap structure of the pre-processing tap, a set of the pre-processing coefficients, and a set of the tap coefficients.

Moreover, in the drawing, the portions corresponding to those in FIG. 9 are assigned the same numerals and signs, properly omitting the descriptions. In other words, the learning apparatus shown in FIG. 44 is similarly configured as the learning apparatus shown in FIG. 9 except that a learning pair data creating part 751 and a control part 752 are provided instead of the simulation take image creating part 62 and the control part 72, and a learning part 255 is provided instead of the image converting part 73.

The learning part 255 is configured of a pre-processing part 261 and an image converting part 262.

The pre-processing part 261 is configured as similar to the pre-processing part 712 shown in FIG. 40 (FIG. 41), which pre-processes the simulation take image signal as the pupil signal in learning pair data supplied from the learning pair data creating part 751, described later, under control performed by the control part 752, and supplies the resulted pre-processed shot image signal to the image converting part 262.

The image converting part 262 is configured as similar to the image converting part 713 shown in FIG. 40 (FIG. 42), which sets the pre-processed shot image signal supplied from the pre-processing part 261 to the first image signal as well as sets the image post-processed image signal obtained by image processing the pre-processed shot image signal to the second image signal under control performed by the control part 752, and performs the image conversion process in which the pre-processed shot image signal is converted into the image post-processed image signal. Furthermore, the image converting part 262 supplies the image post-processed image signal obtained in the image conversion process to the display control part 68.

To the learning pair data creating part 751, signal format information which indicates the signal format is supplied from the control part 752, and process information which indicates the image process instructable by the instruction signal outputted from the manipulation part 718 shown in FIG. 40 is supplied.

The learning pair data creating part 751 generates the image signal in the signal format indicated by signal format information from the control part 752 as a pupil signal from learning data stored in the learning data storage part 61. Furthermore, from learning data stored in the learning data storage part 61, the learning pair data creating part 751 generates as a teacher signal a so-called ideal image signal that is obtained by applying the image process indicated by process information from the control part 752 to the pupil signal (the ideal image signal as the image post-processed image signal).

Then, the learning pair data creating part 751 supplies a set of the image signal as the pupil signal and the image signal as the teacher signal corresponding to the pupil signal (the teacher signal obtained by applying the image process indicated by process information to the pupil signal) as learning pair data to the evaluation value computing part 71 and the learning part 255.

To the control part 752, the evaluation value is supplied from the evaluation value computing part 71. The control part 752 controls the pre-processing part 261 and the image converting part 262 configuring the learning part 255 based on the evaluation value from the evaluation value computing part 71. More specifically, the control part 752 controls (sets) the tap structure of the pre-processing tap and a set of the pre-processing coefficients for use in the pre-process at the pre-processing part 261, and controls a set of the tap coefficients for use in the image conversion process at the image converting part 262.

In addition, the control part 752 decides the display format which displays the image corresponding to the image post-processed image signal supplied from the image converting part 262 of the learning part 255 on the display 69 by the display control part 68, and supplies display format information which indicates the display format to the display control part 68. Furthermore, the control part 752 supplies the signal format information and the process information to the learning pair data creating part 751.

Figure 45:
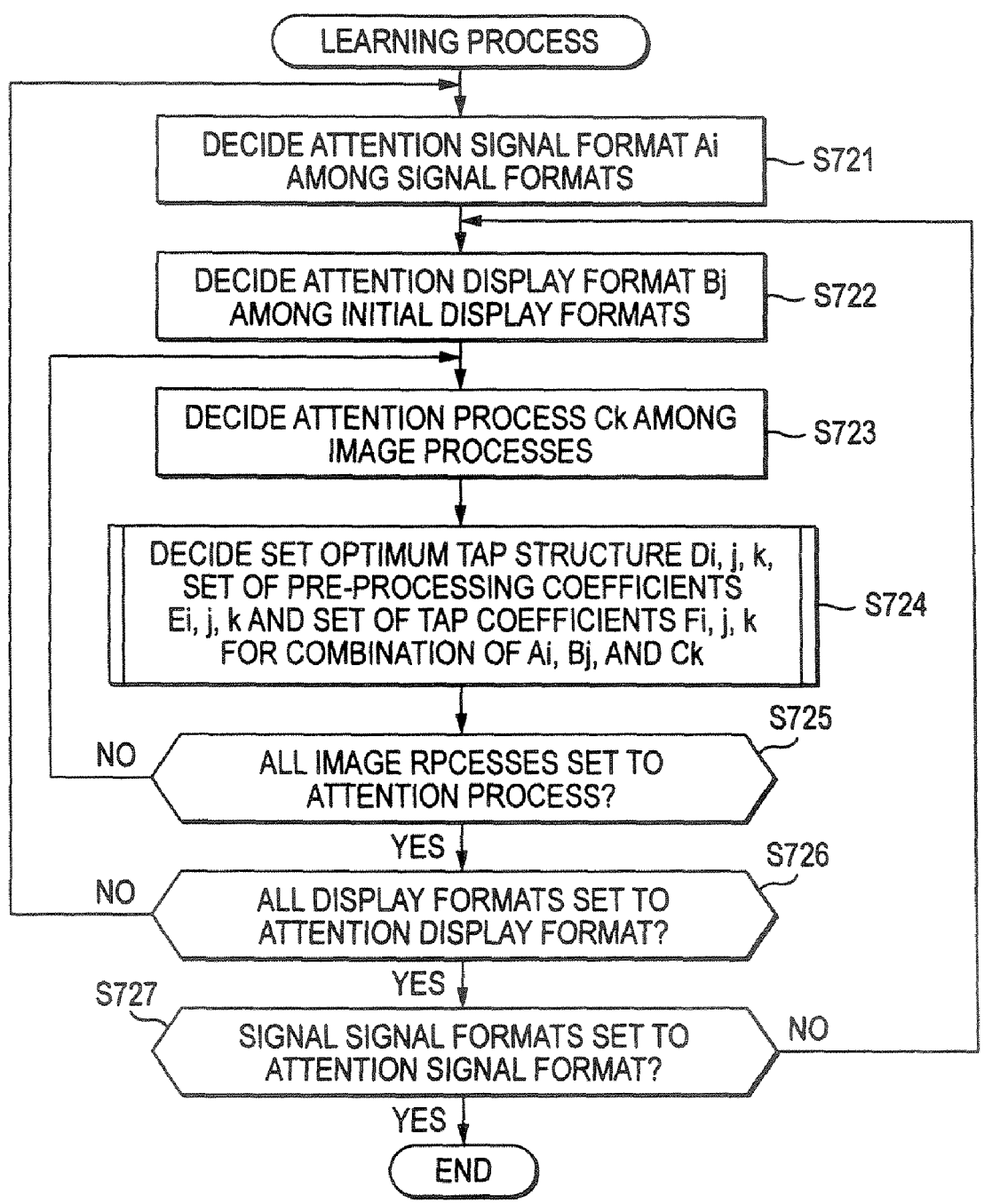
FIG. 45 shows a flow chart illustrative of the process steps performed by the learning apparatus which learns an optimum image processing, an optimum tap structure, an optimum pre-processing coefficient, and an optimum tap coefficient with respect to the combination of the signal format and the display format.

Next, a learning process performed by the learning apparatus shown in FIG. 44 to learn the tap structure of the pre-processing tap, a set of the pre-processing coefficients, and a set of the tap coefficients will be described with reference to a flow chart shown in FIG. 45.

At first, at Step S721, the control part 752 decides one of the signal formats that are not set to the attention signal format to the attention signal format $A_i$ among a plurality of the signal formats, and supplies signal format information which indicates the attention signal format $A_i$ to the learning pair data creating part 751, and the process goes to Step S722.

Here, in the learning apparatus shown in FIG. 44, a plurality of the signal formats for use in the learning process is set beforehand. The control part 752 decides the attention signal format $A_i$ from a plurality of the preset signal formats. Moreover, for example, a plurality of the preset signal formats may be the existing signal formats, or may be a new signal format that is obtained by modifying the existing signal format.

At Step S722, the control part 752 decides one of the display formats that are not set to the attention display format as the attention display format $B_j$ among a plurality of the display formats, and supplies display format information which indicates the attention display format $B_j$ to the display control part 68, and the process goes to Step S723.

Here, the learning apparatus shown in FIG. 44, a plurality of the display formats for use in the learning process is set beforehand. The control part 752 decides the attention display format $B_j$ among a plurality of the preset display formats. Moreover, for example, a plurality of the preset display formats may be the existing display formats, or may be a new display format that is obtained by modifying the existing display format.

At Step S723, the control part 752 decides one of the image processes that are not set to the attention process as an attention process $C_k$ among (the descriptions of) a plurality of the image process, and supplies process information which indicates the attention process $C_k$ to the learning pair data creating part 751, and the process goes to Step S724.

Here, in the learning apparatus shown in FIG. 44, (the descriptions of) a plurality of the image processes for use in the learning apparatus is set beforehand. The control part 752 decides the attention process $C_k$ from a plurality of the preset image processes. Moreover, a plurality of the preset image processes at least includes the image process instructable by the instruction signal outputted from the manipulation part 718 shown in FIG. 40.

At Step S724, in the learning apparatus (FIG. 44), for the combination of the attention signal format $A_i$, the attention display format $B_j$, and the attention process, the optimum tap structure $D_{i,j,k}$ of the pre-processing tap, a set of the optimum pre-processing coefficients $E_{i,j,k}$, and a set of the optimum tap coefficients $F_{i,j,k}$ (a set of the tap coefficients $(x_1, x_2, \ldots, x_N)$ for use in computation of Equation (1)) are decided.

In other words, at Step S724, for the combination of the attention signal format $A_i$, the attention display format $B_j$, and the attention process $C_k$, the tap structure $D_{i,j,k}$, a set of the pre-processing coefficients $E_{i,j,k}$, and a set of the tap coefficients $F_{i,j,k}$ are decided which are used in the pre-process and the image conversion process that are the image process as the attention process $C_k$ so that a user feels the image in highest quality in the case in which the image corresponding to the image signal obtained by applying the attention process $C_k$ to the image signal in the attention signal format $A_i$ is displayed in the attention display format $B_j$.

Then, the process goes from Step S724 to Step S725. The control part 752 determines whether all of a plurality of the preset image processes is set to the combination of the attention signal format $A_i$ and the attention display format $B_j$ as the attention process to find (decide) the tap structure $D_{i,j,k}$, a set of the pre-processing coefficients $E_{i,j,k}$, and a set of the tap coefficients $F_{i,j,k}$ at Step S724.

At Step S725, when it is determined that all of a plurality of the image processes is not set to the attention process, the process returns to Step S723. The control part 752 newly decides one of the image processes that are not set to the attention process among a plurality of the image processes as the attention process, and supplies process information which indicates the attention process to the learning pair data creating part 751, and hereinafter, the similar process steps are repeated.

In addition, at Step S725, when it is determined that all of a plurality of the image processes is set to the attention process, the process goes to Step S726. The control part 752 determines whether all of a plurality of the preset display formats is set to the attention display format for the attention signal format $A_i$ to find the tap structure $D_{i,j,k}$, a set of the pre-processing coefficients $E_{i,j,k}$, and a set of the tap coefficients $F_{i,j,k}$ at Step S724.

At Step S726, when it is determined that all of a plurality of the preset display formats is not set to the attention display format, the process returns to Step S722. The control part 752 newly decides one of the display formats that are not set to the attention display format among a plurality of the display formats as the attention display format, and supplies display format information which indicates the attention display format to the display control part 68, and hereinafter, the similar process steps are repeated.

In addition, at Step S726, when it is determined that all of a plurality of the preset display formats is set to the attention display format, the process goes to Step S727. The control part 752 determines whether all of a plurality of the preset signal formats is set to the attention signal format to find (decide) the tap structure $D_{i,j,k}$, a set of the pre-processing coefficients $E_{i,j,k}$, and a set of the tap coefficients $F_{i,j,k}$ at Step S724.

At Step S727, when it is determined that all of a plurality of the preset signal formats is not set to the attention signal format, the process returns to Step S722. The control part 752 newly decides one of the signal formats that are not set to the attention signal format among a plurality of the signal formats as the attention signal format, and supplies signal format information which indicates the attention signal format to the learning pair data creating part 751, and hereinafter, the similar process steps are repeated.

In addition, at Step S727, when it is determined that all of a plurality of the preset signal formats is set to the attention signal format, that is, when the optimum tap structure $D_{i,j,k}$, a set of the optimum pre-processing coefficients $E_{i,j,k}$, and a set of the optimum tap coefficients $F_{i,j,k}$ are found for all of the combinations of a plurality of the signal formats, a plurality of the display formats, and a plurality of the image processes, the learning process is ended.

As described above, in the learning process shown in FIG. 45, the control part 719 shown in FIG. 40 stores control information which indicates the optimum tap structure $D_{i,j,k}$, a set of the optimum pre-processing coefficients $E_{i,j,k}$, and a set of the optimum tap coefficients $F_{i,j,k}$ determined for all of the combinations of a plurality of the signal formats, a plurality of the display formats, and a plurality of the image processes.

Furthermore, the coefficient memory 733 of the pre-processing part 712 (FIG. 41) stores a plurality of the sets of the pre-processing coefficients $E_{i,j,k}$ determined for all of the combinations of a plurality of the signal formats, a plurality of the display formats, and a plurality of the image processes. The coefficient memory 741 of the image converting part 713 (FIG. 42) stores a plurality of the sets of the tap coefficients determined for all of the combinations of a plurality of the signal formats, a plurality of the display formats, and a plurality of the image processes.

Then, in the display device 702 shown in FIG. 40, the control part 719 references to control information to identify the optimum tap structure, a set of the optimum pre-processing coefficients, and a set of the optimum tap coefficients for the combination of the signal format indicated by signal format information from the signal format acquiring part 716, the display format from the display format acquiring part 717, and the image process instructed by the instruction signal from the manipulation part 718.

Furthermore, the control part 719 controls the pre-processing part 712 to set the tap structure of the pre-processing tap obtained at the pre-processing tap extracting part 731 to the optimum tap structure identified with reference to control information as well as to turn a set of the optimum pre-processing coefficients valid that is referenced to control information to identify it among a plurality of the sets of the pre-processing coefficients stored in the coefficient memory 733.

In addition, the control part 719 controls the image converting part 713 to turn a set of the optimum tap coefficients valid that is referenced to control information to identify it among a plurality of the sets of the tap coefficients stored in the coefficient memory 741.

Therefore, in the pre-processing part 712, depending on the combination of the signal format indicated by signal format information from the signal format acquiring part 716, the display format from the display format acquiring part 717, and the image process instructed by the instruction signal from the manipulation part 718, different pre-processes (pre-processes using the pre-processing tap in a different tap structure and a different set of the pre-processing coefficients) are performed.

In addition, also in the image converting part 713, depending on the combination of the signal format indicated by signal format information from the signal format acquiring part 716, the display format from the display format acquiring part 717, and the image process instructed by the instruction signal from the manipulation part 718, different image conversion processes (image conversion processes using different sets of the tap coefficients) are performed.

Then, in the image processing system shown in FIG. 39, the image that a user feels to be in high quality can be displayed on the display device 702 as the overall image processing system configured of the camera 701 and the display device 702, regardless of the shot image signal outputted from the camera 701, the image signal obtained in the pre-process at the pre-processing part 712 (FIG. 40), and the signal to noise ratio of the image signal obtained at the image converting part 713.

Next, the detail of the process steps at Step S724 shown in FIG. 45 will be described with reference to a flow chart shown in FIG. 46.

At Step S741, the control part 752 decides an initial tap structure $D_m$ that is to be the attention tap structure among a plurality of the initial tap structures, and supplies tap structure information which indicates the attention tap structure $D_m$ to the pre-processing part 261 of the learning part 255, and the process goes to Step S742.

In other words, in the learning apparatus shown in FIG. 44, a plurality of the tap structures of the pre-processing tap is set (decided) as the initial tap structure for use at the beginning of the learning process. The control part 752 stores tap structure information which indicates each of a plurality of the initial tap structures in its incorporated memory (not shown). Then, the control part 752 decides (sets) one of the initial tap structures that are not set to the attention tap structure as the attention tap structure $D_m$ among a plurality of the initial tap structures indicated by a plurality of the items of tap structure information stored in the incorporated memory, and supplies tap structure information which indicates the attention tap structure $D_m$ to the pre-processing part 261.

More specifically, in the learning apparatus shown in FIG. 44, a plurality of the tap structures of the pre-processing tap is set (decided) as the initial tap structure to be used at the beginning of the learning process such as a three by three matrix of the pixels having the pixel closest to the position of the attention pixel at the center, and nine pixels laterally arranged and five pixels vertically arranged with the pixel closest to the position of the attention pixel at the center. The control part 752 stores tap structure information which indicates each of a plurality of the initial tap structures in its incorporated memory (not shown). Then, the control part 752 decides (sets) one of the initial tap structures that are not set to the attention tap structure as the attention tap structure $D_m$ among a plurality of the initial tap structures indicated by a plurality of the items of tap structures information stored in the incorporated memory, and supplies tap structure information which indicates the attention tap structure Dm to the pre-processing part 261.

Here, For example, $D_m$ expresses the mth initial tap structure among a plurality of the initial tap structures.

At Step S742, the control part 752 decides a set of the attention pre-processing coefficients $E_n$ that is a set of the pre-processing coefficients for use in the pre-process by the pre-processing part 261. In other words, for example, suppose the number of (the pixel value of) the pixels configuring the pre-processing tap in the attention tap structure $D_m$ is X, and the bit number of the pre-processing coefficient is Y. The number that a set of the pre-processing coefficients possibly takes exists in $X \times 2^Y$ ways for the pre-processing tap in the attention tap structure $D_m$. The control part 752 decides one of the sets that are not set to a set of the attention pre-processing coefficients $E_n$ as a set of the attention pre-processing coefficients $E_n$ among $X \times 2^Y$ ways of sets of the pre-processing coefficients.

Then, the control part 752 supplies a set of the attention pre-processing coefficients $E_n$ to the pre-processing part 261, and the process goes from Step S742 to Step S743.

At Step S743, in the learning apparatus (FIG. 44), for the combination of the attention tap structure $D_m$ and a set of the attention pre-processing coefficients $E_n$, a set of temporary optimum tap coefficients $F_{m,n}$ (a set of tap coefficients for every class $(x_1, x_2, \ldots, x_N)$ for use in computation of Equation (1)) is decided.

In other words, at Step S743, the pre-processing tap in the attention tap structure $D_m$ and a set of the attention pre-processing coefficients $E_n$ are used, the pre-processed shot image signal obtained by pre-processing the SD image signal is set to the first image signal, a set of the tap coefficients is used to perform the image conversion process to obtain the second image signal, the second image signal is the image corresponding to the ideal image signal (the image post-processed image signal) that is obtained by performing the image process as the attention process $C_k$ to the first image signal, and the image is displayed in the attention display format $B_j$ on the display 69. In this case, a set of the tap coefficients that most maximizes the evaluation value of the display image signal obtained by detecting the light as the HD image displayed on the display 69 by the photodetector 70 is determined as a set of the temporary optimum tap coefficients $F_{m,n}$ for the combination of the attention tap structure $D_m$ and a set of the attention pre-processing coefficients $E_n$.

Then, the process goes from Step S743 to Step S744. The control part 752 determines whether all of $X \times 2^Y$ ways of the sets of the pre-processing coefficients possibly taken for the pre-processing tap in the attention tap structure $D_m$ are set to a set of the attention pre-processing coefficients.

At Step S744, when it is determined that all of $X \times 2^Y$ ways of the sets of the pre-processing coefficients possibly taken for the pre-processing tap in the attention tap structure $D_m$ are not set to a set of the attention pre-processing coefficients, the process returns to Step S742. The control part 752 newly decides one of the sets that are not set to a set of the attention pre-processing coefficients to a set of the attention pre-processing coefficients among all of $X \times 2^Y$ ways of the sets of the pre-processing coefficients possibly taken for the pre-processing tap in the attention tap structure $D_m$, and the similar process steps are repeated.

In addition, at Step S744, when it is determined that all of $X \times 2^Y$ ways of the sets of the pre-processing coefficients possibly taken for the pre-processing tap in the attention tap structure $D_m$ are set to a set of the attention pre-processing coefficients, the process returns to Step S745. The control part 752 determines whether all of a plurality of the initial tap structures indicated by a plurality of the items of tap structures information stored in the incorporated memory is set to the attention tap structure.

At Step S745, when it is determined that all of a plurality of the initial tap structures is not set to the attention tap structure, the process returns to Step S741. The control part 752 decides one of the initial tap structures that are not set to the attention tap structure to the attention tap structure among a plurality of the initial tap structures, and the similar process steps are repeated.

In addition, at Step S745, when it is determined that all of a plurality of the initial tap structures is set to the attention tap structure, that is, when a set of the optimum tap coefficients is determined for all of the combinations of a plurality of the initial tap structures and a set of the pre-processing coefficients possibly taken at Step S743, the process goes to Step S746. The control part 752 temporarily decides the combination of the optimum tap structure, a set of the optimum pre-processing coefficients, and a set of the optimum tap coefficients among the combinations of the tap structure, a set of the pre-processing coefficients, and a set of the tap coefficients determined at Step S743.

In other words, when there are M ways of the tap structure as the initial tap structure and there are N ways of the number that a set of the pre-processing coefficients possibly takes, there are M×N ways of combinations as the combination of the (initial) tap structure and a set of the pre-processing coefficients. At Step S743, a set of the temporary optimum tap coefficients is determined for M×N ways of the combinations. Therefore, at Step S743, M×N×J ways of the combinations of the tap structure, a set of the pre-processing coefficients, and a set of the tap coefficients are obtained. At Step S746, among M×N ways of the combinations (the combination of the tap structure, a set of the pre-processing coefficients, and a set of the tap coefficients), the combination having the maximum evaluation value of the display image signal is temporarily decided as the combination of the optimum tap structure, a set of the optimum pre-processing coefficients, and a set of the optimum tap coefficients.

At Step S746, after the combination of the optimum tap structure, a set of the optimum pre-processing coefficients, and a set of the optimum tap coefficient is temporarily decided, the process goes to Step S747. For the combination of a set of the current optimum pre-processing coefficient and a set of the current optimum tap coefficients, the optimum tap structure decision process is performed in which the optimum tap structure is temporarily decided, and the process goes to Step S748.

At Step S748, the optimum pre-processing coefficient set decision process is performed in which a set of the optimum pre-processing coefficients is temporarily decided for the combination of the current optimum tap structure and a set of the current optimum tap coefficients, and the process goes to Step S749.

At Step S749, the optimum tap coefficient set decision process is performed in which a set of the optimum tap coefficients is temporarily decided for the combination of the current optimum tap structure and a set of the current optimum pre-processing coefficients, Step and the process goes to S750.

At Step S750, the control part 752 determines whether the combination of the current temporary optimum tap structure determined at the next previous Step S747, a set of the current temporary optimum pre-processing coefficients determined at the next previous Step S748, and the set of the current temporary optimum tap coefficients determined at the next previous Step S749 is an optimized combination.

In other words, at the optimum tap coefficient set decision process determined at the next previous Step S749, for the combination of the current temporary optimum tap structure and a set of the current temporary optimum pre-processing coefficients, a set of the tap coefficients that maximizes the evaluation value computed by the evaluation value computing part 71 is temporarily decided as a set of the optimum tap coefficients. At Step S750, for example, depending whether the evaluation value for a set of the optimum tap coefficients is equal to or greater than a predetermined threshold for determining optimization, it is determined whether the combination of the current temporary optimum tap structure, a set of the current temporary optimum pre-processing coefficients, and a set of the current temporary optimum tap coefficients is an optimized combination.

At Step S750, when it is determined that the combination of the current temporary optimum tap structure, a set of the current temporary optimum pre-processing coefficients, and a set of the current temporary optimum tap coefficients is not an optimized combination, that is, when the evaluation value for a set of the optimum tap coefficients determined at the next previous Step S749 is not equal to or greater than the threshold for determining optimization, the process returns to Step S747, and the similar process steps are repeated.

In addition, at Step S750, when it is determined that the combination of the current temporary optimum tap structure, a set of the current temporary optimum pre-processing coefficients, and a set of the current temporary optimum tap coefficients is an optimized combination, that is, when the evaluation value for a set of the optimum tap coefficients determined at the next previous Step S749 is equal to or greater than the threshold for determining optimization and when the combination of the tap structure, a set of the pre-processing coefficients, and a set of the tap coefficients is an optimized combination, the process goes to Step S751. The control part 752 decides the tap structure, a set of the pre-processing coefficients, and a set of the tap coefficients as the optimum tap structure $D_{i,j,k}$, a set of the optimum pre-processing coefficients $E_{i,j,k}$, and a set of the optimum tap coefficients $F_{i,j,k}$ for the combination of the attention signal format $A_i$, the attention display format $B_j$, and the attention process $C_k$, and stores them in the incorporated memory, and the process is returned.

Figure 46:
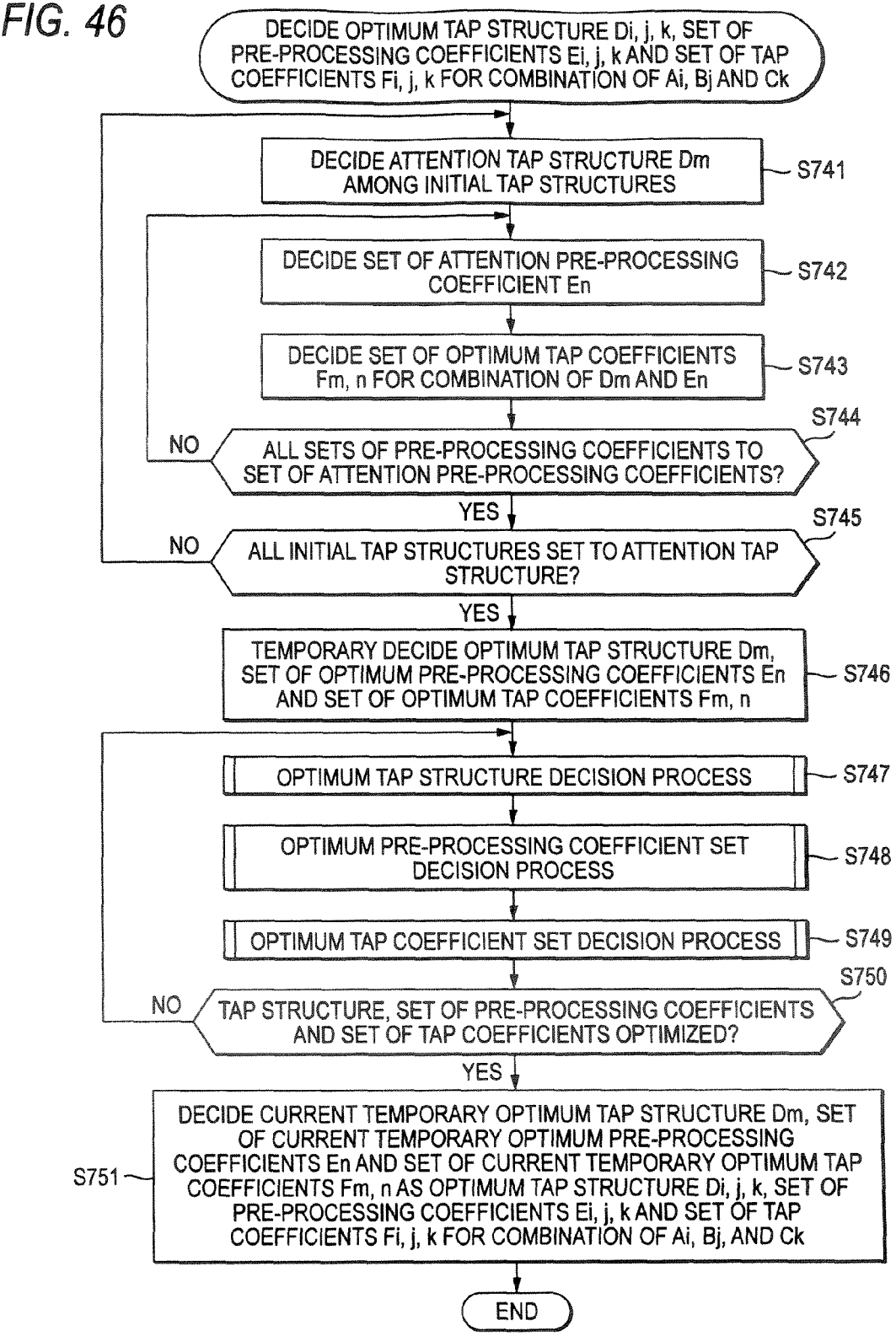
FIG. 46 shows a flow chart illustrative of the detail of the process steps of Step S724.

Moreover, at Step S750 shown in FIG. 46, it is determined that the combination of the tap structure, a set of the pre-processing coefficients, and a set of the tap coefficients is optimized, when the evaluation value for a set of the tap coefficients obtained in the optimum tap coefficient set decision process at Step S749 is equal to or greater than the threshold for determining optimization. In addition to this, for example, it may be determined that the combination of the tap structure, a set of the pre-processing coefficients, and a set of the tap coefficients is optimized, when the optimization process at Step S749 is repeated for a predetermined number of times.

In addition, at Step S750, it may be determined that the combination of the tap structure, a set of the pre-processing coefficients, and a set of the tap coefficients is optimized when the evaluation value for the tap structure obtained in the optimum tap structure decision process at Step S747, or the evaluation value for a set of the pre-processing coefficients obtained in the optimum pre-processing coefficient set decision process at Step S748 is equal to or greater than the threshold for determining optimization, in addition to the evaluation value for a set of the tap coefficients obtained in the optimum tap coefficient set decision process at Step S749.

Next, the process at Step S743 shown in FIG. 46 in which a set of the optimum tap coefficients $F_{m,n}$ is decided for the combination of the attention tap structure $D_m$ and a set of the attention pre-processing coefficients $E_n$ will be described in detail with reference to a flow chart shown in FIG. 47.

At Step S761, the learning pair data creating part 751 generates the image signal (the simulation take image signal) in the attention signal format $A_i$ indicated by signal format information from the control part 752 as the pupil signal from learning data stored in the learning data storage part 61, and the process goes to Step S762. At Step S762, the learning pair data creating part 751 generates as the teacher signal the image signal obtained by applying the image process as the attention process $C_k$ indicated by process information from the control part 752 to the pupil signal (the ideal image signal as the image post-processed image signal) from learning data stored in the learning data storage part 61.

In other words, for example, when the image process as the attention process $C_k$ is a noise removal process, the learning pair data creating part 751 generates as the teacher signal the image signal that improves the signal to noise ratio of the image signal as the pupil signal (the image signal that noise is added to the image signal as the teacher signal is generated as the pupil signal).

Then, the learning pair data creating part 751 supplies a set of the image signal as the pupil signal and the image signal as the teacher signal corresponding to the pupil signal (the teacher signal obtained by applying the image process as the attention process indicated by process information to the pupil signal) as learning pair data to the evaluation value computing part 71 and the learning part 255, and the process goes from Step S762 to Step S763.

At Step S763, the control part 752 controls the pre-processing part 261 to perform the pre-process based on the attention tap structure $D_m$ and a set of the attention pre-processing coefficients $E_n$. Therefore, under control performed by the control part 752, the pre-processing part 261 pre-processes the simulation take image signal as the pupil signal in learning pair data of the attention signal format $A_i$ supplied from the learning pair data creating part 751 to the learning part 255, and supplies the resulted pre-processed shot image signal to the image converting part 262.

In other words, the pre-processing part 261 sequentially sets to the attention pixel the pixels configuring the pre-processed shot image signal corresponding to the simulation take image signal in the attention signal format $A_i$ supplied from the learning pair data creating part 751, and extracts the pixel value of a plurality of the pixels to be the pre-processing tap in the attention tap structure $D_m$ for the attention pixel from the simulation take image signal in the attention signal format $A_i$ supplied from the learning pair data creating part 751. Furthermore, the pre-processing part 261 uses the pixel value that is the pre-processing tap as an argument to compute the pre-processing function defined by a set of the attention pre-processing coefficients $E_n$, and supplies the computed result of the pre-processing function as the pixel value of the attention pixel of the pre-processed shot image signal to the image converting part 262.

Then, at Step S764, the control part 752 decides a set of the tap coefficient for every class for use in the image conversion process by the image converting part 262 of the learning part 255. In other words, for example, suppose the sum of classes is $\alpha$, the number of the tap coefficients for every class is $\beta$, and the bit number of the tap coefficients is □, the number that a set of the tap coefficients possibly takes exists $\alpha \times \beta \times 2^\gamma$ ways. The control part 752 decides one set that is not set to a set of the attention tap coefficients in the process shown in FIG. 47 this time to a set of the attention tap coefficients among $\alpha \times \beta \times 2^\gamma$ ways of sets of the tap coefficients.

Furthermore, the control part 752 supplies a set of the attention tap coefficients to the image converting part 262, and the process goes from Step S764 to S765.

At Step S765, the image converting part 262 sets the pre-processed shot image signal supplied from the pre-processing part 261 to the first image signal as well as sets the image post-processed image signal obtained by applying the image process as the attention process $C_k$ to the pre-processed shot image signal to the second image signal. It uses a set of the attention tap coefficients supplied from the control part 752 at the next previous Step S764 to perform the image conversion process in which the pre-processed shot image signal is converted into the image post-processed image signal. Then, the image converting part 262 supplies the image post-processed image signal obtained in the image conversion process to the display control part 68.

After the process steps of Step S765, the process goes to Step S766. The display control part 68 displays the image corresponding to the image post-processed image signal outputted from the image converting part 262 in the attention display format $B_j$ indicated by the display format information supplied from the control part 752 on the display 69, and the process goes from Step S766 to Step S767.

At Step S767, the photodetector 70 detects the light as the image (the display image) displayed on the display 69 (by photoelectric conversion), and outputs the display image signal that is the electrical signal corresponding to the light to the evaluation value computing part 71, and the process goes to Step S768.

At Step S768, the evaluation value computing part 71 evaluates the display image signal from the photodetector 70, which results in the evaluation of the image displayed on the display 69.

In other words, the evaluation value computing part 71 obtains the teacher signal corresponding to the display image signal from the photodetector 70 out of learning pair data supplied from the learning data storage part 61, and compares the display image signal with the corresponding teacher signal. Thus, it computes the evaluation value as the evaluation of the display image signal, which results in the evaluation of the image quality felt by a user who views the image displayed on the display 69, and supplies it to the control part 752.

Here, the process steps of Steps S765 to S768 are performed for all of the items of learning pair data created at Steps S761 and S762. Then, for example, the control part 752 determines the total sum of the evaluation value obtained for all of the items of learning pair data with respect to a set of the attention tap coefficients, and temporarily stores the total sum as the final evaluation value of a set of the attention tap coefficients.

After that, the process goes from Step S768 to Step S769. The control part 752 determines whether the evaluation value is computed for all of $\alpha \times \beta \times 2^\gamma$ ways of the values that a set of the tap coefficients possibly takes.

Figure 47:
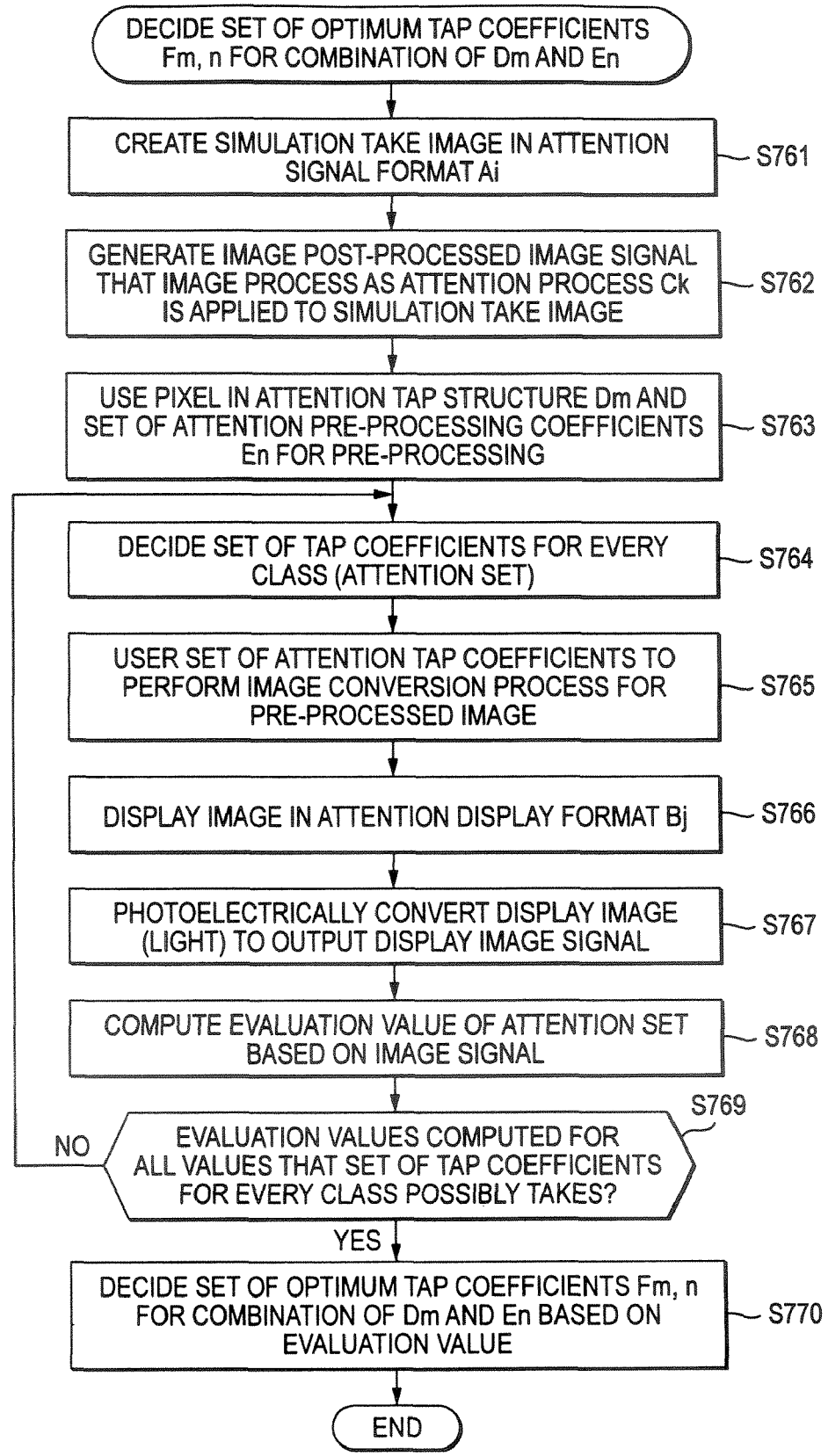
FIG. 47 shows a flow chart illustrative of the detail of the process steps of Step S743.

At Step S769, when it is determined that the evaluation value is not computed for all of $\alpha \times \beta \times 2^\gamma$ ways of the values that a set of the tap coefficients possibly takes, that is, when there is a set that is not set to a set of the attention tap coefficient among $\alpha \times \beta \times 2^\gamma$ ways of sets of the tap coefficients in the process shown in FIG. 47 this time, the process returns to Step S764. The control part 752 newly decides a set that is not set to a set of the attention tap coefficient in the process shown in FIG. 47 this time as a set of the attention tap coefficients among $\alpha \times \beta \times 2^\gamma$ ways of sets of the tap coefficients, and hereinafter, the similar process steps are repeated.

In addition, at Step S769, when it is determined that the evaluation value is computed for all of $\alpha \times \beta \times 2^\gamma$ ways of the values that a set of the tap coefficients possibly takes, the process goes to Step S770. The control part 752 decides (temporarily decides) a set of the tap coefficients having the greatest evaluation value among $\alpha \times \beta \times 2^\gamma$ ways of sets of the tap coefficients as a set of the optimum tap coefficients $F_{m,n}$ for the attention tap structure $D_m$ and a set of the attention pre-processing coefficients $E_n$, and the process is returned.

Moreover, at Step S746 shown in FIG. 46, the combination of the tap structure, a set of the pre-processing coefficients, and a set of the tap coefficients having the greatest evaluation value of a set of the tap coefficients decided as a set of the optimum tap coefficients at Step S770 shown in FIG. 47 is temporarily decided as the combination of the optimum tap structure, a set of the optimum pre-processing coefficients, and a set of the optimum tap coefficients.

Figure 48:
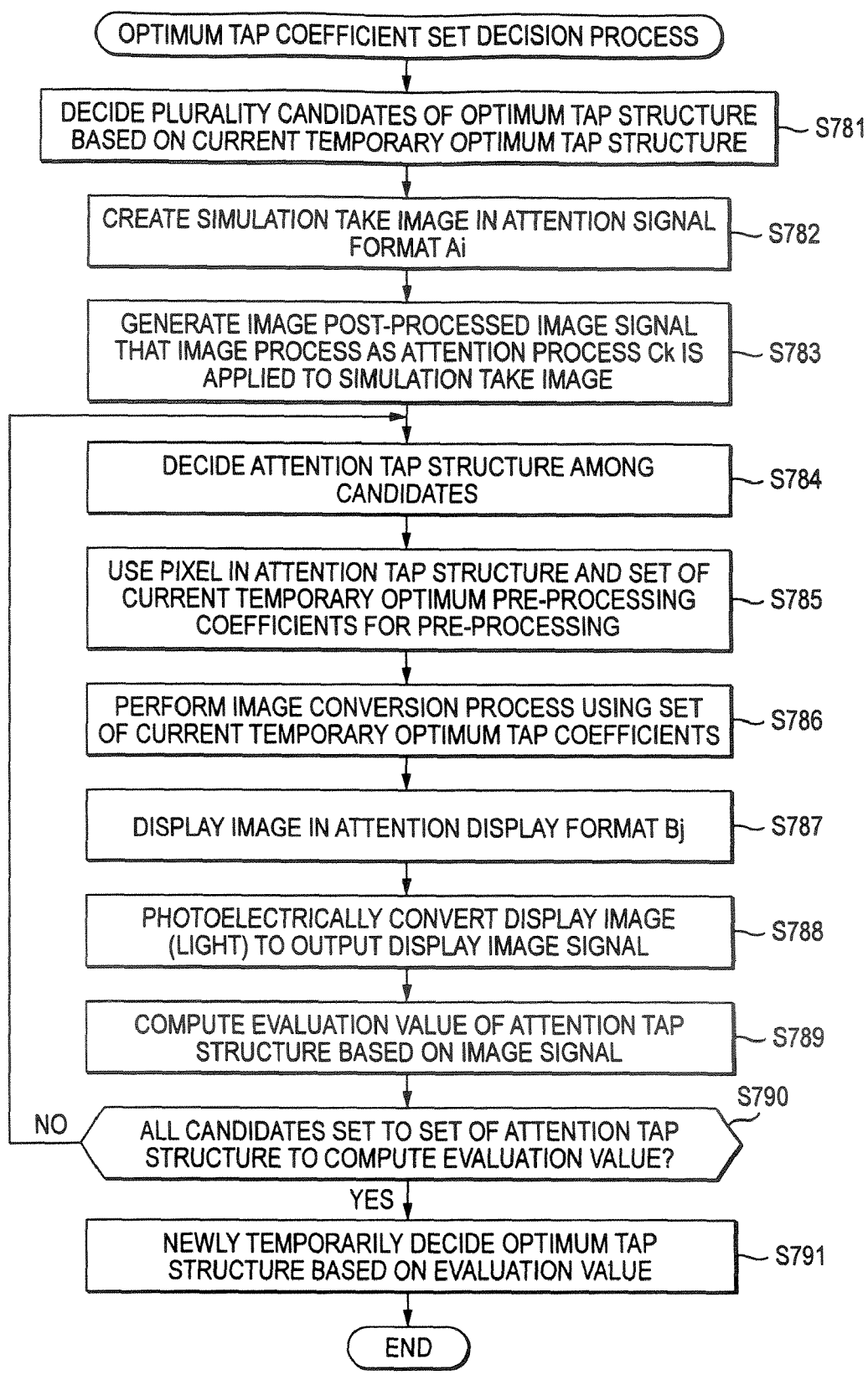
FIG. 48 shows a flow chart illustrative of the detail of the process steps of Step S746.

Next, the optimum tap structure decision process at Step S747 shown in FIG. 46 will be described in detail with reference to a flow chart shown in FIG. 48.

At Step S781, the control part 752 modifies the tap structure in accordance with a predetermined modification rule based on the current temporary optimum tap structure, and decides a plurality of candidates of the optimum tap structure.

In other words, for example, now, suppose a three by three matrix of the adjacent pixels having the pixel closest to the position of the attention pixel at the center is the current temporary optimum tap structure. For example, the control part 752 decides the tap structure that modifies the current temporary optimum tap structure as a plurality of the candidates of the optimum tap structure, including a three by three matrix of pixels arranged every other pixel having the pixel closest to the position of the attention pixel at the center, and the pixels arranged every two pixels.

Moreover, in order to obtain a plurality of the candidates of the optimum tap structure, for example, the modification rule how to modify the current temporary optimum tap structure is decided beforehand. The control part 752 modifies the current temporary optimum tap structure in accordance with the modification rule, and decides a plurality of the candidates of the optimum tap structure.

In addition, a plurality of the candidates of the optimum tap structure also includes the current temporary optimum tap structure.

After the process steps of Step S781, the process goes to Step S782. From learning data stored in the learning data storage part 61, the learning pair data creating part 751 generates as the pupil signal the image signal in the attention signal format $A_i$ indicated by signal format information supplied from the control part 752 (the simulation take image signal), and the process goes to Step S783. At Step S783, from learning data stored in the learning data storage part 61, the learning pair data creating part 751 generates as the teacher signal the ideal image signal as the image post-processed image signal that is obtained by applying the image process as the attention process $C_k$ indicated by process information from the control part 752 to the pupil signal. Then, the learning pair data creating part 751 supplies a set of the image signal as the pupil signal and the image signal as the teacher signal corresponding to the pupil signal (the teacher signal obtained by applying the image process as the attention process $C_k$ indicated by process information to the pupil signal) as learning pair data to the evaluation value computing part 71 and to the learning part 255, and the process goes from Step S783 to Step S784.

At Step S784, the control part 752 decides one of the optimum tap structures that are not set to the attention tap structure as the attention tap structure among a plurality of the candidates of the optimum tap structure, and the process goes to Step S785.

At Step S785, the control part 752 controls the pre-processing part 261 to perform the pre-process based on the attention tap structure and a set of the current temporary optimum pre-processing coefficients. Therefore, under control performed by the control part 752, the pre-processing part 261 pre-processes the simulation take image signal supplied from the learning pair data creating part 751 to the learning part 255, and supplies the resulted pre-processed shot image signal to the image converting part 262.

In other words, the pre-processing part 261 sequentially sets the pixels configuring the pre-processed shot image signal corresponding to the simulation take image signal supplied from the learning pair data creating part 751 to the attention pixel, and extracts the pixel value of a plurality of the pixels to be the pre-processing tap in the attention tap structure from the simulation take image signal supplied from the learning pair data creating part 751 with respect to the attention pixel. Furthermore, the pre-processing part 261 uses the pixel value that is the pre-processing tap as an argument to perform a computation of the pre-processing function defined by a set of the current temporary optimum pre-processing coefficients, and supplies the computed result of the pre-processing function as the pixel value of the attention pixel of the pre-processed shot image signal to the image converting part 262.

At Step S786, to the image converting part 262, the set of the current temporary optimum tap coefficients is supplied from the control part 752. Furthermore, the image converting part 262 sets the pre-processed shot image signal supplied from the pre-processing part 261 to the first image signal as well as sets the image post-processed image signal obtained by applying the image process as the attention process $C_k$ to the pre-processed shot image signal to the second image signal, and uses the set of the current temporary optimum tap coefficients from the control part 752 to perform the image conversion process in which the pre-processed shot image signal is converted into the image post-processed image signal. Then, the image converting part 262 supplies the image post-processed image signal obtained in the image conversion process to the display control part 68.

After the process steps of Step S786, the process goes to Step S787. The display control part 68 displays the image corresponding to the image post-processed image signal outputted from the image converting part 262 in the attention display format $B_j$ indicated by the display format information from the control part 752 on the display 69, and the process goes to Step S788.

At Step S788, the photodetector 70 detects the light as the image (the display image) displayed on the display 69 (by photoelectric conversion), and outputs the display image signal that is the electrical signal corresponding to the light to the evaluation value computing part 71, and the process goes to Step S789.

At Step S789, the evaluation value computing part 71 evaluates the display image signal from the photodetector 70, which results in the evaluation of the image displayed on the display 69.

In other words, from learning pair data supplied from the learning pair data creating part 751, the evaluation value computing part 71 obtains the teacher signal corresponding to the display image signal supplied from the photodetector 70, and compares the display image signal with the corresponding teacher signal. Thus, it computes the evaluation value as the evaluation of the display image signal, which results in the evaluation of the image quality felt by a user who views the image displayed on the display 69, and supplies it to the control part 752.

Here, the process steps of Steps S785 to S789 are performed for all of the items of learning pair data created at Steps S782 and S783. Then, for example, the control part 752 determines the total sum of the evaluation value obtained for all of the items of learning pair data with respect to the attention tap structure, and temporarily stores the total sum as the final evaluation value of the attention tap structure.

After that, the process goes from Step S789 to Step S790. The control part 752 determines whether the evaluation value is computed for all of a plurality of the candidates of the optimum tap structure decided at Step S781.

At Step S790, when it is determined that the evaluation value is not computed for all of a plurality of the candidates of the optimum tap structure, the process returns to Step S784. The control part 752 newly decides one of the candidates that are not set to the attention tap structure as the attention tap structure among a plurality of the candidates of the optimum tap structure, and hereinafter, the similar process steps are repeated.

In addition, at Step S790, when it is determined that the evaluation value is computed for all of a plurality of the candidates of the optimum tap structure, the process goes to Step S791. The control part 752 newly temporarily decides a candidate having the greatest evaluation value among a plurality of the candidates of the optimum tap structure as the optimum tap structure for the combination of a set of the current temporary optimum pre-processing coefficients and a set of the current temporary optimum tap coefficients, and the process is returned.

Figure 49:
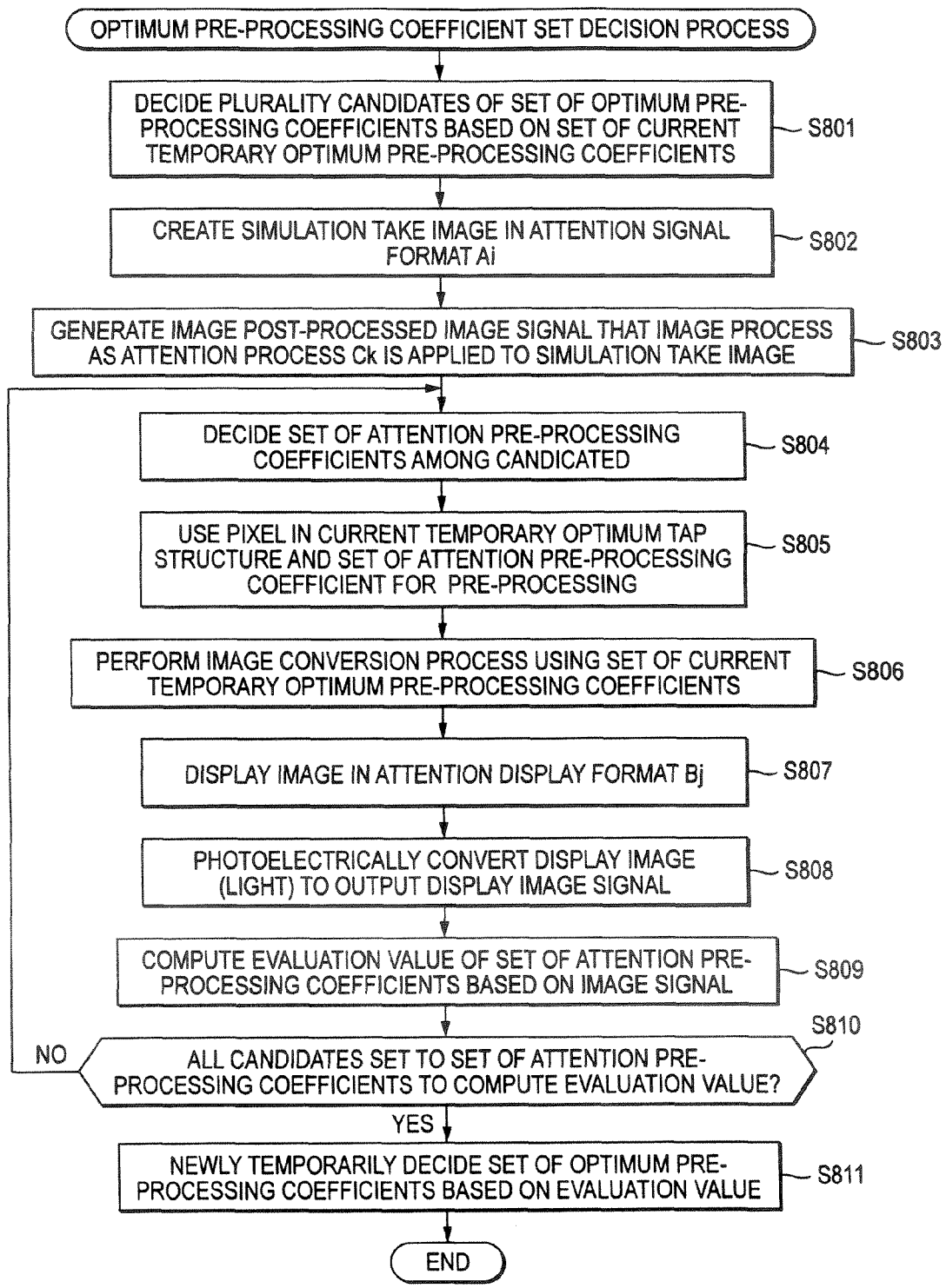
FIG. 49 shows a flow chart illustrative of the detail of the process steps of Step S747.

Next, the optimum pre-processing coefficient set decision process at Step S748 shown in FIG. 46 will be described in detail with reference to a flow chart shown in FIG. 49.

At Step S801, the control part 752 decides a set of the current temporary optimum pre-processing coefficients as a plurality of candidates of a set of the optimum pre-processing coefficients based on a predetermined rule.

In other words, for example, the control part 752 selects a plurality of points within a predetermined area which is expressed by $\Phi$-dimensional vectors having components of each of the pre-processing coefficients of the set of the current temporary optimum pre-processing coefficients (in this case, the sum of classes and the number of the pre-processing coefficient per class is $\Phi$) and which is on the basis of the points of the $\Phi$-dimensional vector space, and decides (the components of) a plurality of the Φ-dimensional vectors each expressing a plurality of the points as a plurality of the candidates of a set of the optimum pre-processing coefficients. Moreover, in order to obtain a plurality of the candidates of a set of the optimum pre-processing coefficients, the rule how to select which point in which area on the basis of the Φ-dimensional vectors corresponding to the set of the current temporary optimum pre-processing coefficients is decided beforehand. The control part 752 selects a plurality of points within a predetermined area on the basis of the Φ-dimensional vectors corresponding to the set of the current temporary optimum pre-processing coefficients in accordance with the rule, and decides a plurality of the candidates of a set of the optimum pre-processing coefficients.

After the process steps of Step S801, the process goes to Step S802. From learning data stored in the learning data storage part 61 as the pupil signal, the learning pair data creating part 751 generates the image signal in the attention signal format $A_i$ indicated by signal format information from the control part 752 (the simulation take image signal), and the process goes to Step S803. At Step S803, from learning data stored in the learning data storage part 61, the learning pair data creating part 751 generates the ideal image signal as the image post-processed image signal that is obtained by applying the image process as the attention process $C_k$ indicated by process information from the control part 752 to the pupil signal as the teacher signal. Then, the learning pair data creating part 751 supplies a set of the image signal as the pupil signal and the image signal as the teacher signal corresponding to the pupil signal (the teacher signal obtained by applying the image process as the attention process $C_k$ indicated by process information to the pupil signal) as learning pair data to the evaluation value computing part 71 and to the learning part 255, and the process goes from Step S803 to Step S804.

At Step S804, the control part 752 decides one of the sets that are not set to a set of the attention pre-processing coefficients as a set of the attention pre-processing coefficients among a plurality of the candidates of a set of the optimum pre-processing coefficients, and the process goes to Step S805.

At Step S805, the control part 752 controls the pre-processing part 261 so as to perform the pre-process based on the current temporary optimum tap structure and a set of the attention pre-processing coefficients. Therefore, under control performed by the control part 752, the pre-processing part 261 pre-processes the simulation take image signal as the pupil signal in learning pair data supplied from the learning pair data creating part 751 to the learning part 255, and supplies the resulted pre-processed shot image signal to the image converting part 262.

In other words, the pre-processing part 261 sequentially sets the pixels configuring the pre-processed shot image signal corresponding to the simulation take image signal supplied from the learning pair data creating part 751 to the attention pixel, and extracts the pixel value of a plurality of the pixels to be the pre-processing tap in the current temporary tap structure from the simulation take image signal as the pupil signal supplied from the learning pair data creating part 751 with respect to the attention pixel. Furthermore, the pre-processing part 261 uses the pixel value that is the pre-processing tap as an argument to perform a computation of the pre-processing function defined by a set of the attention pre-processing coefficients, and supplies the computed result of the pre-processing function as the pixel value of the attention pixel of the pre-processed shot image signal to the image converting part 262.

At Step S806, to the image converting part 262, the set of the current temporary optimum tap coefficients is supplied from the control part 752. Furthermore, the image converting part 262 sets the pre-processed shot image signal supplied from the pre-processing part 261 to the first image signal as well as sets the image post-processed image signal obtained by applying the image process as the attention process $C_k$ to the pre-processed shot image signal to the second image signal, and uses the set of the current temporary optimum tap coefficients from the control part 752 to perform the image conversion process in which the pre-processed shot image signal is converted into the image post-processed image signal. Then, the image converting part 262 supplies the image post-processed image signal obtained in the image conversion process to the display control part 68.

After the process steps of Step S806, the process goes to Step S807. The display control part 68 displays the image corresponding to the image post-processed image signal outputted from the image converting part 262 in the attention optimum display format $B_j$ indicated by the display format information from the control part 752 on the display 69, and the process goes to Step S808.

At Step S808, the photodetector 70 detects the light as the image (the display image) displayed on the display 69 (by photoelectric conversion), and outputs the display image signal that is the electrical signal corresponding to the light to the evaluation value computing part 71, and the process goes to Step S809.

At Step S809, the evaluation value computing part 71 evaluates the display image signal from the photodetector 70, which results in the evaluation of the image displayed on the display 69.

In other words, from learning pair data supplied from the learning pair data creating part 751, the evaluation value computing part 71 obtains the teacher signal corresponding to the display image signal from the photodetector 70, and compares the display image signal with the corresponding teacher signal. Thus, it computes the evaluation value as the evaluation of the display image signal, which results in the evaluation of the image quality felt by a user who views the image displayed on the display 69, and supplies it to the control part 752.

Here, the process steps of Steps S805 to S809 are performed for all of the items of learning pair data created at Steps S802 and S803. Then, the control part 752 determines the total sum of the evaluation value obtained for all of the items of learning pair data with respect to a set of the attention pre-processing coefficients, and temporarily stores the total sum as the final evaluation value of a set of the attention pre-processing coefficients.

After that, the process goes to Step S809 to Step S810. The control part 752 determines whether the evaluation value is computed for all of a plurality of the candidates of a set of the optimum pre-processing coefficients decided at Step S801.

At Step S810, when it is determined that the evaluation value is not computed for all of a plurality of the candidates of a set of the optimum pre-processing coefficients, the process returns to Step S804. The control part 752 newly decides one of the sets that are not set to a set of the attention pre-processing coefficients as a set of the attention pre-processing coefficients among a plurality of the candidates of a set of the optimum pre-processing coefficients, and hereinafter, the similar process steps are repeated.

In addition, at Step S810, when it is determined that the evaluation value is computed for all of a plurality of the candidates of a set of the optimum pre-processing coefficients, the process goes to Step S811. The control part 752 newly temporarily decides a candidate having the greatest evaluation value among a plurality of the candidates of a set of the optimum pre-processing coefficients as a set of the optimum pre-processing coefficients for the combination of the current temporary optimum tap structure and a set of the current temporary optimum tap coefficients, and the process is returned.

Figure 50:
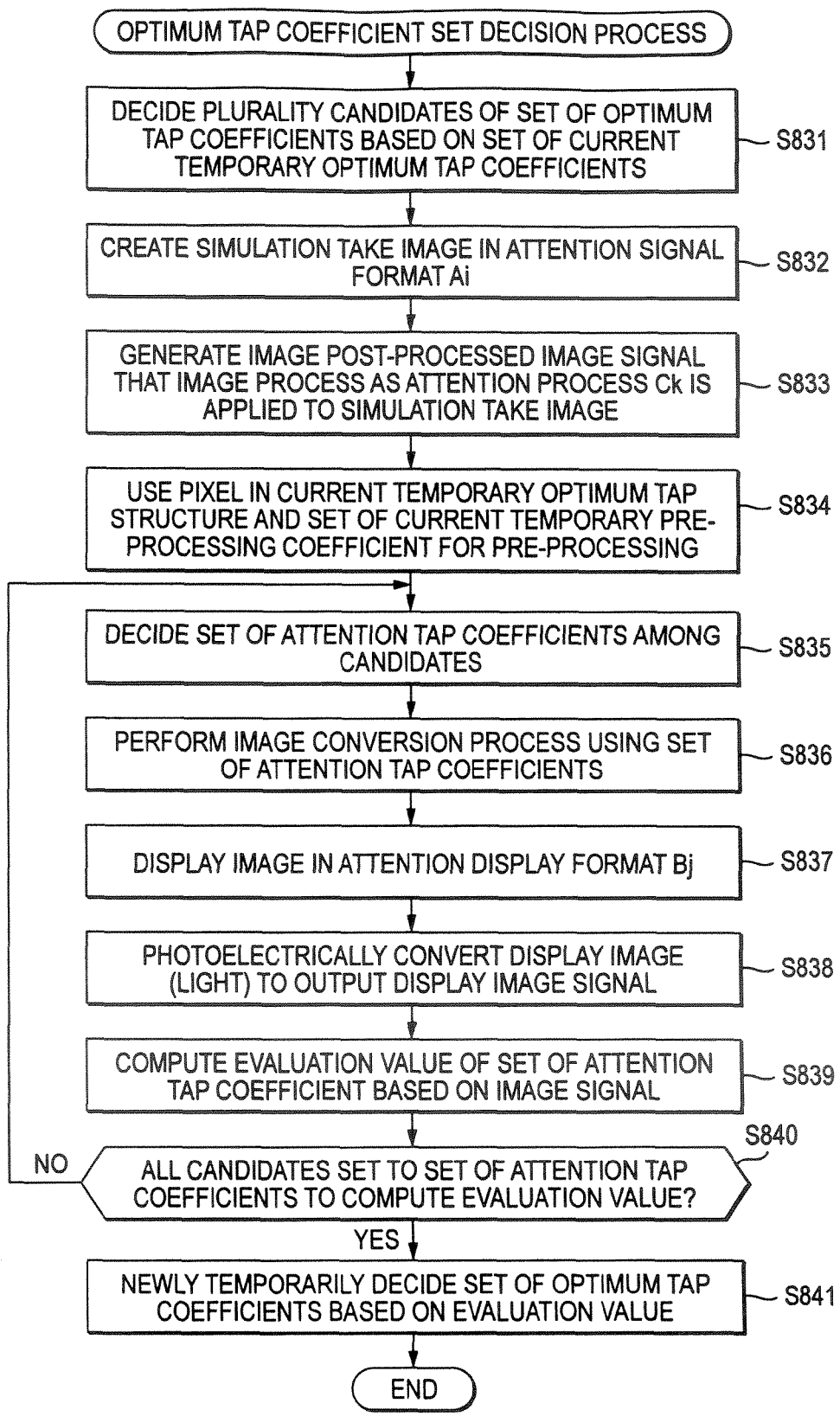
FIG. 50 shows a flow chart illustrative of the detail of the process steps of Step S748.

Next, the optimum tap coefficient set decision process at Step S749 shown in FIG. 46 will be described in detail with reference to a flow chart shown in FIG. 50.

At Step S831, as similar to Step S111 shown in FIG. 23, the control part 752 decides a plurality of candidates of a set of the optimum tap coefficients in accordance with the set of the current temporary optimum tap coefficients based on a predetermined rule.

After the process steps of Step S831, the process goes to Step S832. From learning data stored in the learning data storage part 61, the learning pair data creating part 751 generates the image signal in the attention signal format $A_i$ indicated by signal format information from the control part 752 (the simulation take image signal) as the pupil signal, and the process goes to Step S833. At Step S833, from learning data stored in the learning data storage part 61, the learning pair data creating part 751 generates the ideal image signal as the image post-processed image signal that is obtained by applying the image process as the attention process $C_k$ indicated by process information from the control part 752 to the pupil signal as the teacher signal. Then, the learning pair data creating part 751 supplies a set of the image signal as the pupil signal and the image signal as the teacher signal corresponding to the pupil signal (the teacher signal obtained by applying the image process as the attention process $C_k$ indicated by process information to the pupil signal) as learning pair data to the evaluation value computing part 71 and to the learning part 255, and the process goes Step S833 to Step S834.

At Step S834, the control part 752 controls the pre-processing part 261 (FIG. 44) to perform the pre-process based on the current temporary optimum tap structure and a set of the current temporary optimum pre-processing coefficients. Therefore, under control performed by the control part 752, the pre-processing part 261 pre-processes the simulation take image signal as the pupil signal in learning pair data supplied from the learning pair data creating part 751 to the learning part 255, and supplies the resulted pre-processed shot image signal to the image converting part 262.

In other words, the pre-processing part 261 sequentially sets the pixels configuring the pre-processed shot image signal corresponding to the simulation take image signal supplied from the learning pair data creating part 751 to the attention pixel, and extracts the pixel value of a plurality of the pixels to be the pre-processing tap in the current temporary optimum tap structure from the simulation take image signal supplied from the learning pair data creating part 751 with respect to the attention pixel. Furthermore, the pre-processing part 261 uses the pixel value that is the pre-processing tap as an argument to perform a computation of the pre-processing function defined by a set of the current temporary optimum pre-processing coefficients, and supplies the computed result of the pre-processing function as the pixel value of the attention pixel of the pre-processed shot image signal to the image converting part 262.

At Step S835, the control part 752 decides one set that is not set to a set of the attention tap coefficients among a plurality of the candidates of a set of the optimum tap coefficients as a set of the attention tap coefficients, and supplies the set of the attention tap coefficients to the image converting part 262, and the process goes to Step S836.

At Step S836, the image converting part 262 sets the pre-processed shot image signal supplied from the pre-processing part 261 to the first image signal as well as sets the image post-processed image signal obtained by applying the image process as the attention process $C_k$ to the pre-processed shot image signal to the second image signal, and uses a set of the attention tap coefficients supplied from the control part 752 at the next previous Step S835 to perform the image conversion process in which the pre-processed shot image signal is converted into the image post-processed image signal. Then, the image converting part 262 supplies the image post-processed image signal obtained in the image conversion process to the display control part 68.

After the process steps of Step S836, the process goes to Step S837. The display control part 68 displays the image corresponding to the image post-processed image signal outputted from the learning part 255 in the attention display format $B_j$ indicated by display format information from the control part 752 on the display 69, and the process goes to Step S838.

At Step S838, the photodetector 70 detects the light as the display image displayed on the display 69 (by photoelectric conversion), and outputs the display image signal that is the electrical signal corresponding to the light to the evaluation value computing part 71, and the process goes to Step S839.

At Step S839, the evaluation value computing part 71 evaluates the display image signal from the photodetector 70, which results in the evaluation of the image displayed on the display 69.

In other words, from learning pair data supplied from the learning pair data creating part 751, the evaluation value computing part 71 obtains the teacher signal corresponding to the display image signal from the photodetector 70, and compares the display image signal with the corresponding teacher signal. Thus, it computes the evaluation value as the evaluation of the display image signal, which results in the evaluation of the image quality felt by a user who views the image displayed on the display 69, and supplies it to the control part 752.

Here, the process steps of Step S834, and Steps S836 to S839 are performed for all of the items of learning pair data created at Steps S832 and S833. Then, the control part 752 determines the total sum of the evaluation value obtained for all of the items of learning pair data with respect to a set of the attention tap coefficients, and temporarily stores the total sum as the final evaluation value of the a set of the attention tap coefficients.

After that, the process goes from Step S839 to Step S840. The control part 752 determines whether the evaluation value is computed for all of a plurality of the candidates of a set of the optimum tap coefficients.

At Step S840, when it is determined that the evaluation value is not computed for all of a plurality of the candidates of a set of the optimum tap coefficients, the process returns to Step S83. The control part 752 newly decides one set that is not set to a set of the attention tap coefficients among a plurality of the candidates of a set of the optimum tap coefficients as a set of the attention tap coefficients, and hereinafter, the similar process steps are repeated.

In addition, at Step S840, when it is determined that the evaluation value is computed for all of a plurality of the candidates of a set of the optimum tap coefficients, the process goes to Step S841. The control part 752 newly temporarily decides a candidate having the greatest evaluation value among a plurality of the candidates of a set of the optimum tap coefficients as a set of the optimum tap coefficients for the combination of the current temporary optimum tap structure and a set of the current temporary optimum pre-processing coefficients, and the process is returned.

Figure 51:
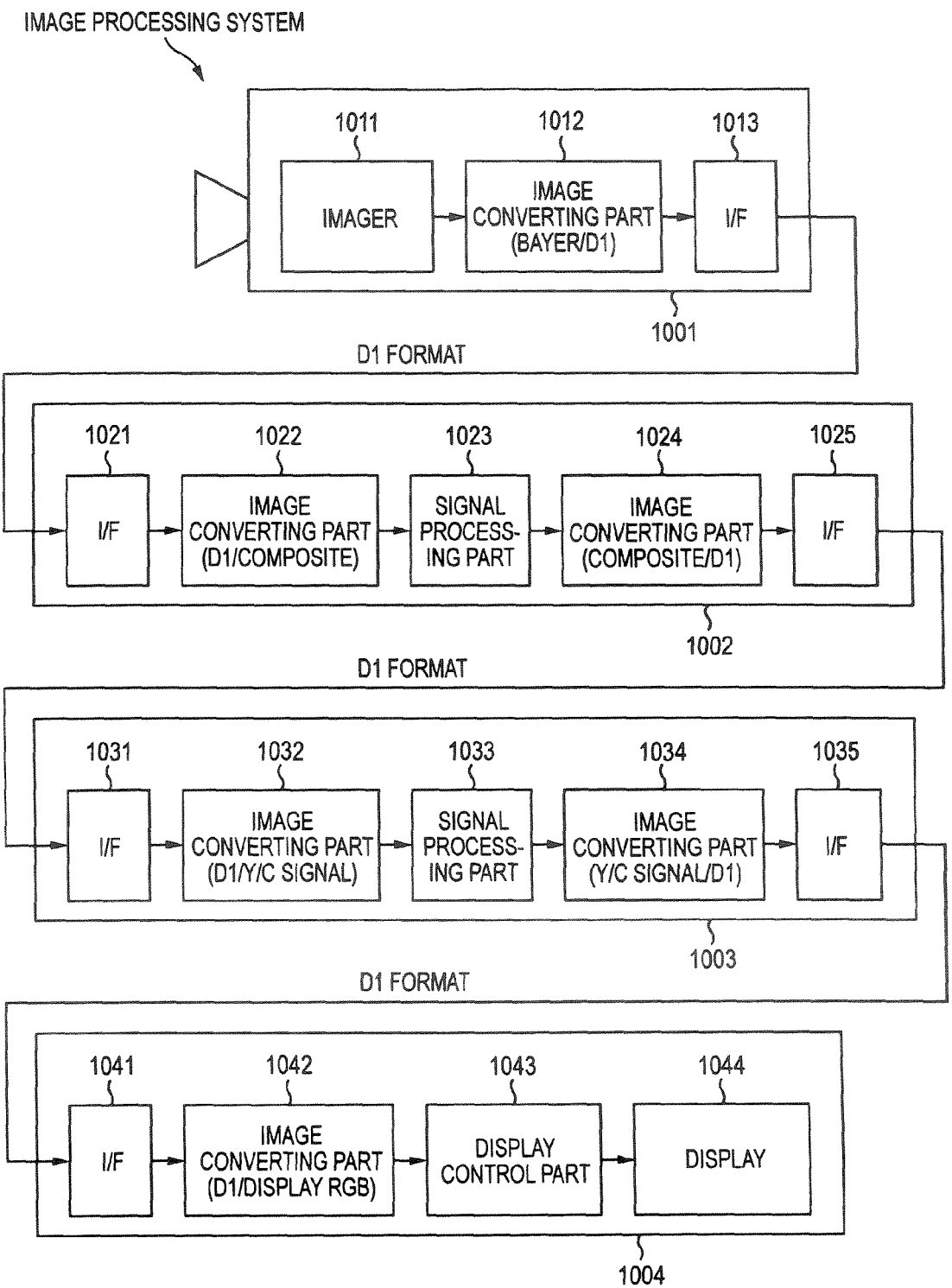
FIG. 51 shows a block diagram depicting a fifth exemplary configuration of an image processing system which performs image processing.

Next, FIG. 51 shows a fifth exemplary configuration of an image processing system for image processing.

In FIG. 51, the image processing system is configured of a camera 1001, a transmitter 1002, a receiver 1003, and a display device 1004.

The camera 1001 shoots an object (subject), and outputs an SD image signal in the D1 format, for example, that is the existing signal format, as an image signal obtained by the shooting.

In other words, the camera 1001 is configured of an imager 101, an image converting part 1012, and an I/F (Interface) 1013.

For example, the imager 1011 is a photoelectric conversion element such as a CCD and CMOS imager, which photoelectrically converts the incident light and outputs the SD image signal in a predetermined signal format, that is, for example, the SD image signal in the Bayer format that is the resulted electrical signal.

The SD image signal in the Bayer format outputted from the imager 1011 is supplied to the image converting part 1012. The image converting part 1012 performs the image conversion process in which the SD image signal in the Bayer format from the imager 1011 is converted into the SD image signal in the D1 format to be outputted from the I/F 1013 in the later stage, and supplies the SD image signal in the D1 format obtained in the image conversion process to the I/F 1013.

The I/F 1013 is an interface which inputs and outputs the SD image signal in the D1 format, and externally outputs the SD image signal in the D1 format supplied from the image converting part 1012.

The SD image signal in the D1 format outputted from the I/F 1013 of the camera 1001 is sent to the transmitter 1002 over a communication cable or radio.

The transmitter 1002 receives the SD image signal in the D1 format from the camera 1001, and sends it as the television broadcast signal, for example.

In other words, the transmitter 1002 is configured of an I/F 1021, an image converting part 1022, a signal processing part 1023, an image converting part 1024, and an I/F 1025.

The I/F 1021 is an interface which inputs and outputs the SD image signal in the D1 format, receives the SD image signal in the D1 format from (the I/F 1013 of) the camera 1001, and supplies it to the image converting part 1022.

The image converting part 1022 performs an image conversion process in which the SD image signal in the D1 format from the I/F 1021 that is a component signal is converted into the SD image signal of the composite signal, for example, that can be processed at the signal processing part 1023 in the later stage, and supplies the SD image signal of the resulted composite signal to the signal processing part 1023.

The signal processing part 1023 performs a predetermined signal process for the SD image signal of the composite signal from the image converting part 1022, and supplies the SD image signal of the composite signal resulted from the signal process to the image converting part 1024.

The image converting part 1024 performs an image conversion process in which the SD image signal of the composite signal from the signal processing part 1023 is converted into the SD image signal in the D1 format to be outputted from the I/F 1025 in the later stage, and supplies the SD image signal in the D1 format obtained in the image conversion process to the I/F 1025.

The I/F 1025 is an interface which inputs and outputs the SD image signal in the D1 format, and externally outputs the SD image signal in the D1 format supplied from the image converting part 1024.

The SD image signal in the D1 format outputted from the I/F 1025 of the transmitter 1002 is sent to the receiver 1003 as the television broadcast signal over a communication cable or radio.

For example, the receiver 1003 is a tuner which receives the television broadcast signal, which receives the SD image signal in the D1 format sent from the transmitter 1002.

In other words, the receiver 1003 is configured of an I/F 1031, an image converting part 1032, a signal processing part 1033, an image converting part 1034, and an I/F 1035.

The I/F 1031 is an interface which inputs and outputs the SD image signal in the D1 format, receives the SD image signal in the D1 format from (the I/F 1025 of) the transmitter 1002, and supplies it to the image converting part 1032.

The image converting part 1032 performs an image conversion process in which the SD image signal in the D1 format from I/F 1031 is converted into a brightness signal and a color difference signal (hereinafter, both combined to call as Y/C signals), for example, that are processed at the signal processing part 1033 in the later stage, and supplies the resulted Y/C signals to the signal processing part 1033.

The signal processing part 1033 performs a predetermined signal process for the Y/C signals from the image converting part 1032, and supplies the Y/C signals resulted from the signal process to the image converting part 1034.

The image converting part 1034 performs an image conversion process in which the Y/C signals from the signal processing part 1033 is converted into the SD image signal in the D1 format to be outputted from the I/F 1035 in the later stage, and supplies the SD image signal in the D1 format obtained in the image conversion process to the I/F 1035.

The I/F 1035 is an interface which inputs and outputs the SD image signal in the D1 format, and externally outputs the SD image signal in the D1 format supplied from the image converting part 1034.

The SD image signal in the D1 format outputted from the I/F 1035 of the receiver 1003 is sent to the display device 1004 over a communication cable or radio.

For example, the display device 1004 receives the SD image signal in the D1 format from the receiver 1003, and displays a matched image.

In other words, the display device 1004 is configured of an I/F 1041, an image converting part 1042, a display control part 1043, and a display 1044.

The I/F 1041 is an interface which inputs and outputs the SD image signal in the D1 format, receives the SD image signal in the D1 format from (the I/F 1035 of) the receiver 1003, and supplies it to the image converting part 1042.

The image converting part 1042 performs an image conversion process in which the SD image signal in the D1 format from the I/F 1041 is converted into an RGB image signal having the color components of R, G, and B components as the pixel value per single pixel, for example, that can be displayed on the display 1044 by the display control part 1043 in the later stage, and supplies the resulted RGB image signal to the display control part 1043.

The display control part 1043 displays an image corresponding to the RGB image signal from the image converting part 1042 on the display 1044.

The display 1044 is configured of a CRT or an LCD panel, and displays the image in the stripe array that is the existing display format, for example.

In the image processing system thus configured, the SD image signal in the Bayer format obtained by shooting in the camera 1001 is converted into the SD image signal in the format suited for exchange between the units by the image conversion process performed by the image converting part 1012 for output.

The SD image signal in the D1 format outputted from the camera 1001 is supplied to the transmitter 1002. The transmitter 1002 performs the image conversion process performed by the image converting part 1022 in which the SD image signal in the D1 format from the camera 1001 is converted into the SD image signal of the composite signal suited for the signal process performed by the signal processing part 1023 thereinside for signal processing. Furthermore, the transmitter 1002 converts the SD image signal of the composite signal after signal processed into the SD image signal in the D1 format suited for exchange between the units by the image conversion process performed by the image converting part 1024, and sends it.

The SD image signal in the D1 format sent from the transmitter 1002 is received at the receiver 1003. The receiver 1003 performs the image conversion process by the image converting part 1032 in which the SD image signal in the D1 format from the transmitter 1002 is converted into the Y/C signals suited for the signal process performed by the signal processing part 1033 thereinside for signal processing. Furthermore, the receiver 1003 converts the Y/C signals after signal processed into the SD image signal in the D1 format suited for exchange between the units by the image conversion process performed by the image converting part 1034 for output.

The SD image signal in the D1 format outputted from the receiver 1003 is supplied to the display device 1004. The display device 1004 converts the SD image signal in the D1 format from the receiver 1003 into the RGB image signal suited for display on the display 1044, and displays an image corresponding to the RGB image signal.

As described above, since the camera 1001, the transmitter 1002, and the receiver 1003 configuring the image processing system shown in FIG. 51 all output the SD image signal in the D1 format that is the existing signal format, a unit having the I/F which inputs the image signal in the D1 format can receive the output (input) from any of the camera 1001, the transmitter 1002, and the receiver 1003.

In addition, the transmitter 1002, the receiver 1003, and the display device 1004 configuring the image processing system shown in FIG. 51 can all receive the SD image signal in the D1 format that is the existing signal format, a unit having the I/F which outputs the image signal in the D1 format can receive the output of any units.

In the image processing system shown in FIG. 51, the process is performed in which one signal is converted into another signal in the camera 1001, the transmitter 1002, the receiver 1003, and the display device 1004.

In other words, in the camera 1001, the process is performed in which the SD image signal in the Bayer format is converted into the SD image signal in the D1 format. In the transmitter 1002, the process is performed in which the SD image signal in the D1 format is converted into the SD image signal of the composite signal, and the process is performed in which the SD image signal of the composite signal is converted into the SD image signal in the D1 format. In addition, in the receiver 1003, the process is performed in which the SD image signal in the D1 format is converted into the Y/C signals, and the process is performed in which the Y/C signals is converted into the SD image signal in the D1 format. In the display device 1004, the process is performed in which the SD image signal in the D1 format is converted into the RGB image signal.

In the process in which one signal is converted into another signal, generally, the loss of the signal component occurs (including a reduction in the signal to noise ratio). However, according to the image conversion process by the classification adaptive process, as described above, the classification adaptive process is the process having the effect of creating the signal component. Thus, the loss of the signal component can be suppressed at the minimum (can be further decreased).

Then, in the camera 1001, the transmitter 1002, the receiver 1003, and the display device 1004 in the image processing system shown in FIG. 51, the image conversion process according to the classification adaptive process is adapted to the process in which one signal is converted into another signal.

In other words, in FIG. 51, the image converting part 1012 of the camera 1001, the image converting parts 1022 and 1024 of the transmitter 1002, the image converting parts 1032 and 1034 of the receiver 1003, and the image converting part 1042 of the display device 1004 perform the image conversion process according to the classification adaptive process.

Figure 52:
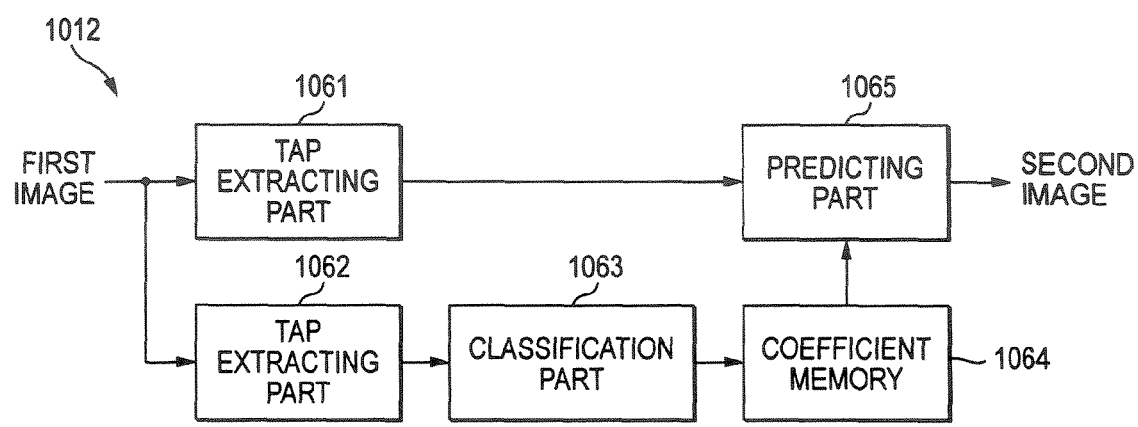
FIG. 52 shows a block diagram depicting an exemplary configuration of an image converting part 1012.

FIG. 52 shows an exemplary configuration of the image converting part 1012 shown in FIG. 51.

The image converting part 1012 is configured of tap extracting parts 1061 and 1062, a classification part 1063, a coefficient memory 1064, and a predicting part 1065.

To the image converting part 1012, the SD image signal in the Bayer format is supplied from the imager 1011 as the first image signal. Then, the SD image signal as the first image signal is supplied to the tap extracting parts 1061 and 1062.

The tap extracting part 1061 sets the SD image signal in the Bayer format to the first image signal, sets the SD image signal in the D1 format that is to be obtained by converting the SD image signal to the second image signal (since the HD image signal as the second image signal is an image signal that is to be found and it does not exist at the current stage, it is virtually assumed), and sequentially sets the pixels configuring the second image signal to the attention pixel. Furthermore, it extracts from the first image signal the prediction tap that is the pixel value of a plurality of the pixels for use in predicting the pixel value of the attention pixel.

More specifically, the tap extracting part 1061 extracts the pixel value of a plurality of the pixels having the spatially or temporally close positional relation (for example, a pixel closest to the position on the image of the first image signal corresponding to the attention pixel, a pixel spatially adjacent to the pixel, etc.) as a prediction tap with respect to the position of the image of the first image signal corresponding to the attention pixel (for example, the position on the image of the first image signal at which a subject portion is seen that us the same as the one seen at the position of the attention pixel).

The tap extracting part 1062 extracts from the first image signal a class tap which is the pixel value of a plurality of pixels for use in classification to classify the attention pixel into any one of some (a plurality of) classes.

The prediction tap obtained at the tap extracting part 1061 is supplied to the predicting part 1065, and the class tap obtained at the tap extracting part 1062 is supplied to the classification part 1063.

The classification part 1063 classifies the attention pixel based on the class tap from the tap extracting part 1062, and supplies the class of the resulted attention pixel to the coefficient memory 1064.

Here, for a scheme of classification, a scheme can be adapted that is the similar scheme as described in the classification part 43 shown in FIG. 4.

The coefficient memory 1064 stores (a set of) the tap coefficient for every class that is determined by learning with the use of learning pair data which is a combination of the image signal as the pupil signal and the image signal as the teacher signal each conformable to the first image signal and the second image signal that are generated from a high quality image signal prepared as learning data for use in learning. In other words, the coefficient memory 1064 stores therein a set of the tap coefficients for each of a plurality of classes into which the attention pixel is possibly classified by the classification part 1063. The coefficient memory 1064 outputs the class indicated by the class code supplied from the classification part 1063 among the sets of the tap coefficients for every class, that is, a set of the tap coefficients for the class of the attention pixel.

The predicting part 1065 acquires the prediction tap outputted from the tap extracting part 1061 and the tap coefficient outputted from the coefficient memory 1064, and uses the prediction tap and the tap coefficient to perform a predetermined prediction computation to determine the predicted value of the true value of the attention pixel. Therefore, the predicting part 1065 outputs it for finding (the predicted value of) the pixel value of the attention pixel, that is, the pixel value of the pixel configuring the second image signal.

Figure 53:
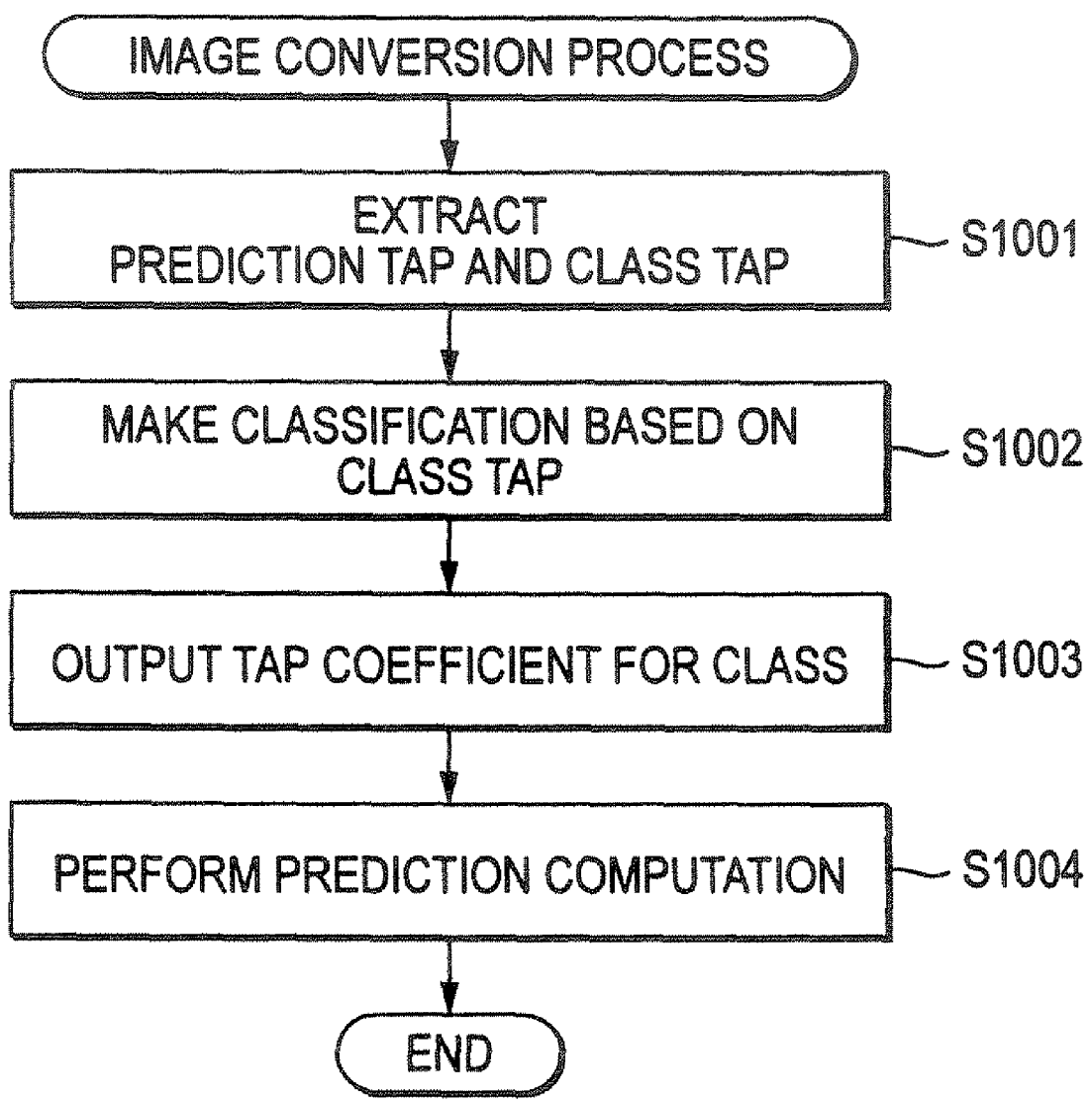
FIG. 53 shows a flow chart illustrative of the process steps performed by the image converting part 1012.

Next, the image conversion process performed by the image converting part 1012 shown in FIG. 52 will be described with reference to a flow chart shown in FIG. 53.

The tap extracting part 1061 sequentially sets to the attention pixel each of the pixels configuring the SD image signal in the D1 format as the second image signal corresponding to the SD image signal as the first image signal supplied from the imager 1011. Then, at Step S1001, the tap extracting parts 1061 and 1062 each extract the pixel value of the pixel to be the prediction tap and the class tap of the attention pixel from the first image signal supplied thereto. Then, the prediction tap is supplied from the tap extracting part 1061 to the predicting part 1065, and the class tap is supplied from the tap extracting part 1062 to the classification part 1063.

The classification part 1063 receives the class tap of the attention pixel from the tap extracting part 1062. At Step S1002, it classifies the attention pixel based on the class tap. Furthermore, the classification part 1063 outputs the class of the attention pixel resulted from the classification to the coefficient memory 1064, and the process goes to Step S1003.

At Step S1003, the coefficient memory 1064 reads and outputs the tap coefficient for the class indicted by the class code supplied from the classification part 1063, that is, the tap coefficient for the class of the attention pixel, and the process goes to Step S1004. The tap coefficient outputted from the coefficient memory 1064 is received at the predicting part 1065.

At Step S1004, the predicting part 1065 uses the prediction tap outputted from the tap extracting part 1061 and the tap coefficient acquired from the coefficient memory 1064 to perform a computation of Equation (1) as a predetermined prediction computation to determine the pixel value of the attention pixel, that is, the pixel value of the pixel of the second image signal. As described above, the predicting part 1065 outputs the SD image signal in the D1 format that is the second image signal every time when the pixel value of the pixel of the second image signal is determined for every a single frame, for example.

Figure 54:
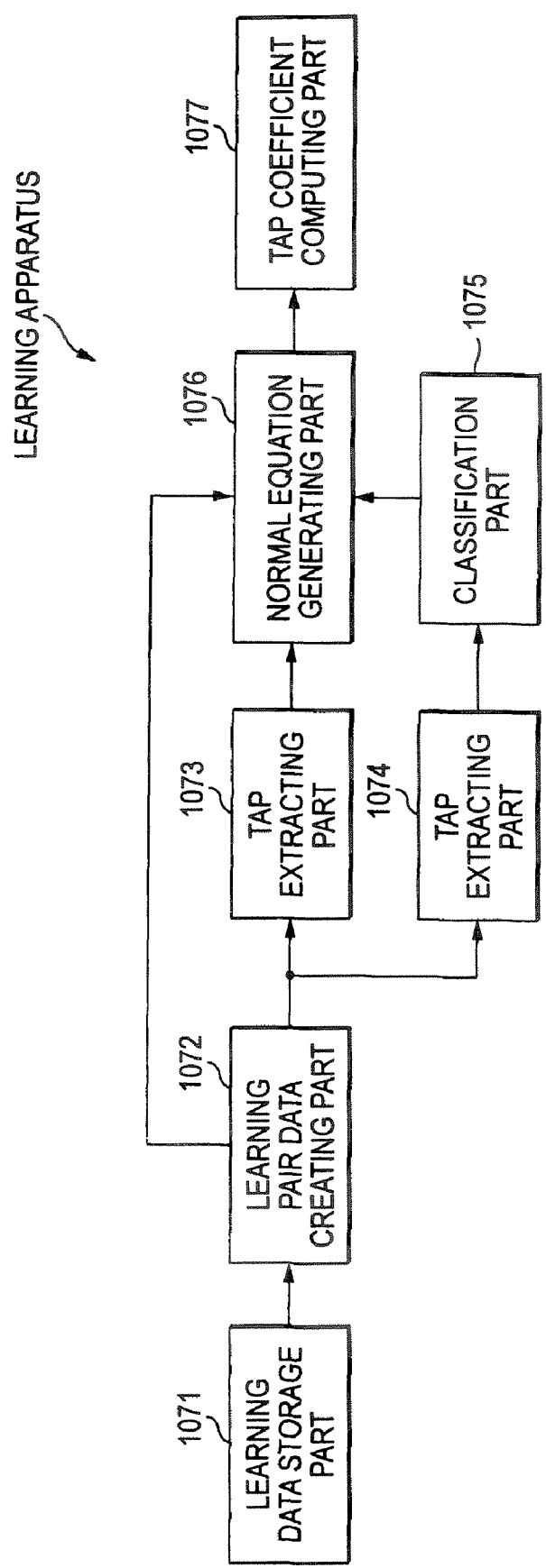
FIG. 54 shows a block diagram depicting an exemplary configuration of the learning apparatus which learns a tap coefficient used by the image converting part 1012.

Next, FIG. 54 shows an exemplary configuration of a learning apparatus which performs a learning process in which a set of the tap coefficients stored in the coefficient memory 1064 shown in FIG. 52.

The learning apparatus shown in FIG. 54 is configured of a learning data storage part 1071, a learning pair data creating part 1072, tap extracting parts 1073 and 1074, a classification part 1075, a normal equation generating part 1076, and a tap coefficient computing part 1077. The learning method using the normal equation, that is, learning is performed in accordance with the learning method in which the normal equation in Equation (8) is formed and solved for every class, whereby the tap coefficient for every class is determined.

For example, the learning data storage part 1071 stores the SHD image signal, the HD image signal, or the SD image signal as learning data.

The learning pair data creating part 1072 sequentially sets the frame of the image signal as learning data stored in the learning data storage part 1071 to the attention frame, generates from the attention frame the SD image signal in the Bayer format conformable to the first image signal as the pupil signal and the SD image signal in the D1 format conformable to the second image signal as the teacher signal, and supplies a set of the SD image signal as the pupil signal and the SD image signal as the teacher signal as learning pair data to the tap extracting parts 1073 and 1074 and to the normal equation generating part 1076.

The tap extracting part 1073 sequentially sets the pixel of the SD image signal in the D1 format as the teacher signal in learning pair data supplied from the learning pair data creating part 1072 to the attention pixel, extracts the pixel value of the pixel that is to be the prediction tap from the SD image signal as the pupil signal in the Bayer format in learning pair data with respect to the attention pixel, and supplies the prediction tap in the same tap structure as that obtained at the tap extracting part 1061 configuring the image converting part 1012 shown in FIG. 52 to the normal equation generating part 1076.

The tap extracting part 1074 extracts the pixel value of the pixel that is to be the class tap from the SD image signal in the Bayer format supplied from the learning pair data creating part 1072 with respect to the attention pixel, and supplies the class tap in the same tap structure as that obtained at the tap extracting part 1062 configuring the image converting part 1012 shown in FIG. 52 to the classification part 1075.

The classification part 1075 classifies the attention pixel as similar to the classification part 1063 configuring the signal converting part 1012 shown in FIG. 52 based on the class tap supplied from the tap extracting part 1074, and supplies the resulted class of the attention pixel to the normal equation generating part 1076.

The normal equation generating part 1076 performs additions for every class supplied from the classification part 1075 in which the targets are (the pixel value of) the attention pixel $y_k$ in the SD image signal in the D1 format as the teacher signal in learning pair data supplied from the learning pair data creating part 1072 and (the pixel value of) the pixels $x_{n,k}$ configuring the prediction tap of the attention pixel supplied from the tap extracting part 1061.

In other words, for every class supplied from the classification part 1075, the normal equation generating part 1076 uses the pixel $x_{n,k}$ of the SD image signal in the first signal format configuring the prediction tap of the attention pixel supplied from the tap extracting part 1073 (the first pixel), and performs multiplications $(x_{n,k} x_{n',k})$ of the first pixels on the left-hand side matrix in Equation (8) and computations conformable to the summation ($\Sigma$).

Furthermore, for every class supplied from the classification part 1075, the normal equation generating part 1076 uses the first pixel $x_{n,k}$ and the pixel (the attention pixel) $y_k$ of the SD image signal in the D1 format, and performs multiplications $(x_{n,k}y_k)$ of the first pixel $x_{n,k}$ and the attention pixel $y_k$ in the right-hand side vectors in Equation (8) and computations conformable to the summation ($\Sigma$).

In other words, the normal equation generating part 1076 stores the components of the left-hand side matrix $(\Sigma x_{n,k}x_{n',k})$ and the right-hand side vector components of $(\Sigma x_{n,k}y_k)$ in Equation (8) determined for the pixel of the SD image signal in the D1 format that is set to the attention pixel last time (the second pixel) in its incorporated memory (not shown).

Then, the normal equation generating part 1076 performs additions in which the corresponding component $x_{n,k+1}x_{n',k+1}$ that is computed by using a first pixel $x_{n,k+1}$ configuring the prediction tap of the second pixel newly set as the attention pixel is added to the component $(\Sigma x_{n,k}x_{n',k})$ stored in the memory the matrix (the addition expressed by the summation of the left-hand side matrix in Equation (8) is performed) as well as performs additions in which the corresponding component $x_{n,k+1}y_{k+1}$ that is computed by using a second pixel $y_{k+1}$ and a first pixel $x_{n,k+1}$ for the second pixel newly set to the attention pixel is added to the vector component $(\Sigma x_{n,k}y_k)$ stored in the memory the matrix (the addition expressed by the summation in the right-hand side vector in Equation (8) is performed).

The normal equation generating part 1076 sets to the attention pixel all of the pixels of the SD image signal in the D1 format as the teacher signal in learning pair data supplied from the learning pair data creating part 1072, and performs the additions. Thus, it forms the normal equation expressed in Equation (8) for every class, and supplies the normal equation to the tap coefficient computing part 1077.

The tap coefficient computing part 1077 solves the normal equation for every class supplied from the normal equation generating part 1076 to determine a set of the optimum tap coefficients $w_n$ (the tap coefficient that minimizes the total sum E of the square errors in Equation (4)) for every class.

Next, the learning process performed by the learning apparatus shown in FIG. 54 in which a set of the tap coefficients is determined will be described with reference to a flow chart shown in FIG. 55.

At Step S1011, in the learning apparatus shown in FIG. 54, the learning pair data creating part 1072 generates the SD image signal in the Bayer format as the pupil signal and the SD image signal in the D1 format as the teacher signal from learning data stored in the learning data storage part 1071, and supplies a set of the SD image signal as the pupil signal and the SD image signal as the teacher signal as learning pair data to the tap extracting parts 1073 and 1074, and to the normal equation generating part 1076, and the process goes to Step S1012.

At Step S1012, the tap extracting part 1073 sequentially sets to the attention pixel the pixel of the SD image signal in the D1 format as the teacher signal in learning pair data supplied from the learning pair data creating part 1072, extracts the pixel value of the pixel that is to be the prediction tap from the SD image signal as the pupil signal in the Bayer format in learning pair data with respect to the attention pixel, and supplies it to the normal equation generating part 1076.

In addition, the tap extracting part 1074 extracts the pixel value of the pixel to be the class tap from the SD image signal as the pupil signal in the Bayer format in learning pair data with respect to the attention pixel, and supplies it to the classification part 1075.

At Step S1013, the classification part 1075 classifies the attention pixel based on the class tap from the tap extracting part 1074, and supplies the class of the resulted attention pixel to the normal equation generating part 1076, and the process goes to Step S1014.

At Step S1014, as described above, the normal equation generating part 1076 performs the additions of Equation (8) for every class supplied from the classification part 1075 in which in learning pair data from the learning pair data creating part 1072, the targets are (the pixel value of) the attention pixel and (the pixel value of) the pixels of the SD image signal in the Bayer format configuring the prediction tap of the attention pixel supplied from the tap extracting part 1073.

Then, the normal equation generating part 1076 sets to the attention pixel all of the pixels of the SD image signal in the D1 format as the teacher signal in learning pair data supplied from the learning pair data creating part 1072, and performs the additions at Step S1014. It supplies the normal equation (the left-hand side matrix and the right-hand side vector in Equation (8) for every class) for every class obtained by the additions to the tap coefficient computing part 1077, and the process goes from Step S1014 to Step S1015.

At Step S1015, the tap coefficient computing part 1077 solves the normal equation (the normal equation for every class configured of the left-hand side matrix and the right-hand side vector in Equation (8) for every class) for every class supplied from the normal equation generating part 1076 to determine a set of the tap coefficients for every class.

The sets of the tap coefficients determined at the tap coefficient computing part 1077 in the learning process are stored in the coefficient memory 1064 configuring the image converting part 1012 shown in FIG. 52.

Moreover, in addition to the image converting part 1012 of the camera 1001 shown in FIG. 51, the image converting parts 1022 and 1024 of the transmitter 1002, the image converting parts 1032 and 1034 of the receiver 1003, and the image converting part 1042 of the display device 1004 are also configured as shown in FIG. 52. However, the sets of the tap coefficients stored in the coefficient memory 1064 are varied at each of the image converting parts 1012, 1022, 1024, 1032, 1034, and 1042.

Figure 55:
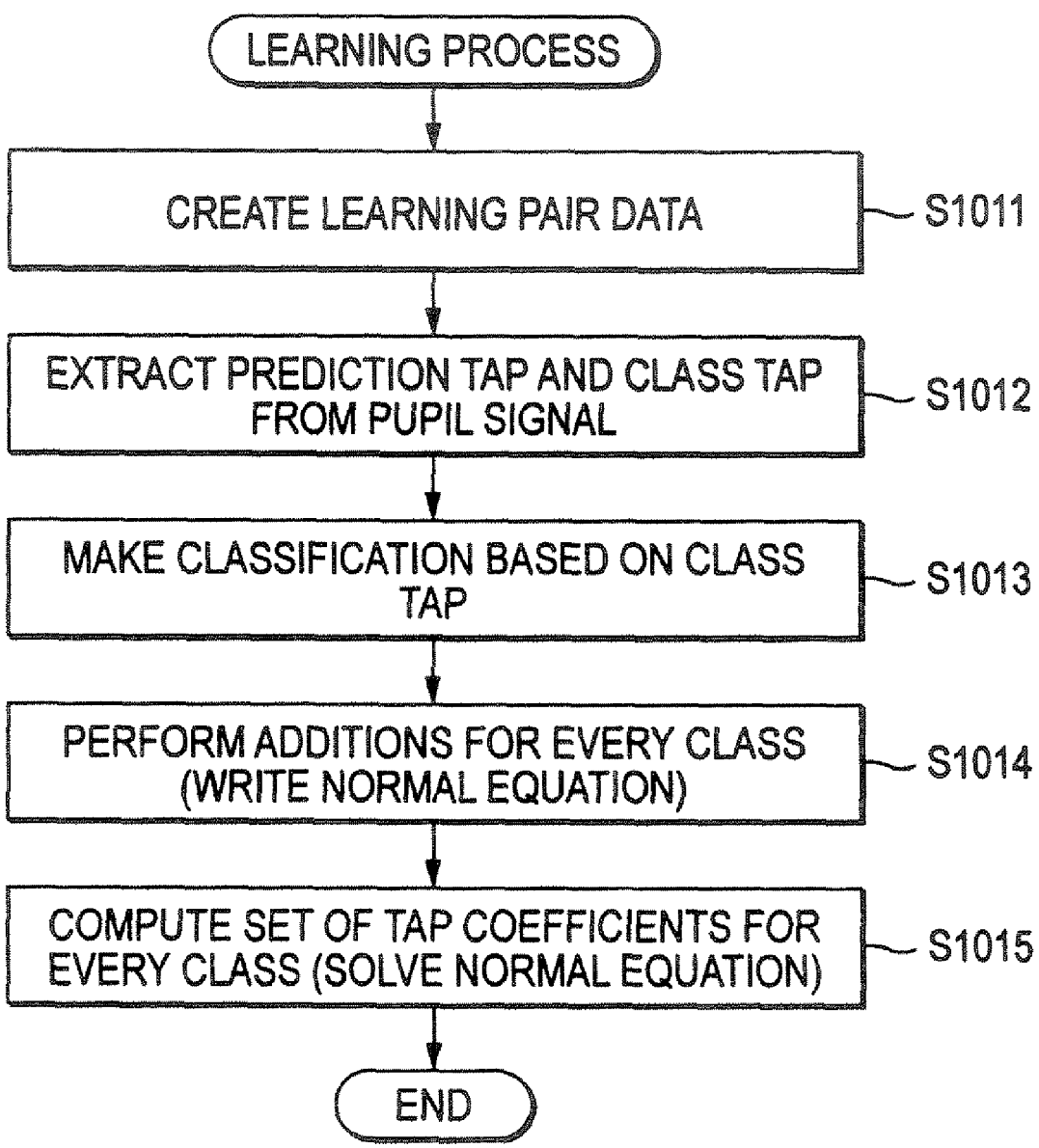
FIG. 55 shows a flow chart illustrative of the process steps performed by the learning apparatus which learns a tap coefficient used by the image converting part 1012.

In other words, as described above, in the coefficient memory 1064 configuring the image converting part 1012 which converts the SD image signal in the Bayer format into the image signal in the D1 format, a set of the tap coefficients is stored that is obtained by the learning process shown in FIG. 55 as the SD image signal in the Bayer format and the SD image signal in the D1 format generated from the image signal as learning data are set to the pupil signal and the teacher signal, respectively.

In addition, in the coefficient memory 1064 configuring the image converting part 1022 which converts the SD image signal in the D1 format into the SD image signal of the composite signal, a set of the tap coefficients is stored that is obtained by the learning process shown in FIG. 55 as the SD image signal in the D1 format and the SD image signal of the composite signal generated from the image signal as learning data are set to the pupil signal and the teacher signal, respectively.

Furthermore, in the coefficient memory 1064 configuring the image converting part 1024 which converts the SD image signal of the composite signal into the SD image signal in the D1 format, a set of the tap coefficients is stored that is obtained by the learning process shown in FIG. 55 as the SD image signal of the composite signal and the SD image signal in the D1 format generated from the image signal as learning data are set to the pupil signal and the teacher signal, respectively.

Similarly, in the coefficient memory 1064 configuring the image converting part 1032 which converts the SD image signal in the D1 format into the Y/C signals, a set of the tap coefficients is stored that is obtained by the learning process shown in FIG. 55 as the SD image signal in the D1 format and the Y/C signals generated from the image signal as learning data are set to the pupil signal and the teacher signal, respectively. In the coefficient memory 1064 configuring the image converting part 1034 which converts the Y/C signals into the SD image signal in the D1 format, a set of the tap coefficients is stored that is obtained by the learning process shown in FIG. 55 as the Y/C signals and the SD image signal in the D1 format generated from the image signal as learning data are set to the pupil signal and the teacher signal, respectively.

In addition, in the coefficient memory 1064 configuring the image converting part 1042 which converts the SD image signal in the D1 format into the RGB image signal, a set of the tap coefficients is stored that is obtained by the learning process shown in FIG. 55 as the SD image signal in the D1 format and the RGB image signal generated from the image signal as learning data are set to the pupil signal and the teacher signal, respectively.

Figure 56:
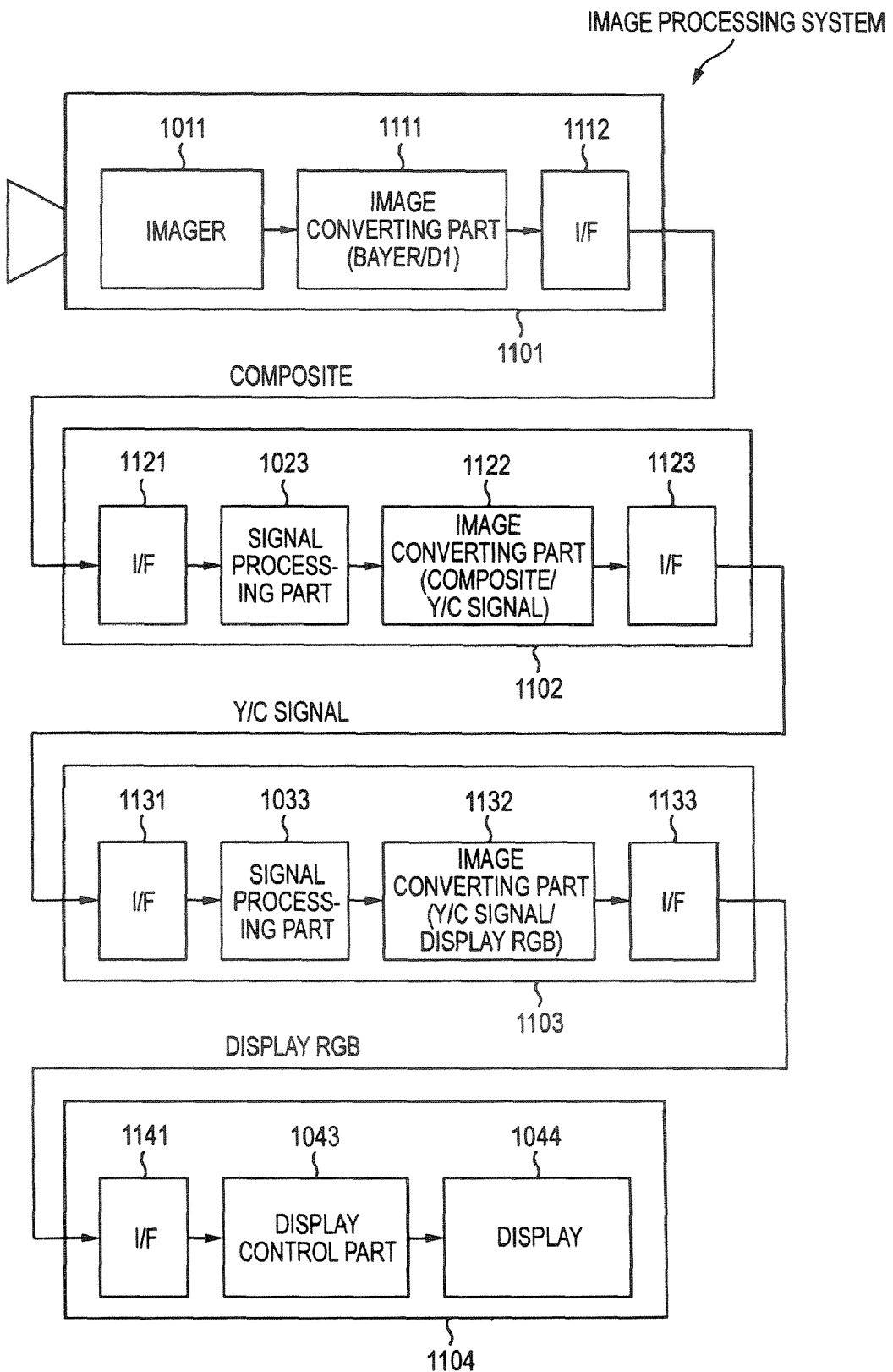
FIG. 56 shows a block diagram depicting a sixth exemplary configuration of an image processing system which performs image processing.

Next, FIG. 56 shows a sixth exemplary configuration of an image processing system for image processing.

Moreover, in the drawing, the portions corresponding to those shown in FIG. 51 are assigned the same numerals and signs, properly omitting the descriptions.

In FIG. 56, the image processing system is configured of a camera 1101, a transmitter 1102, a receiver 1103, and a display device 1104.

The camera 1101 shoots an object (subject), and outputs as an image signal obtained by the shooting an SD image signal in the D1 format, for example, that is the existing signal format.

In other words, the camera 1101 is configured of an imager 1011, an image converting part 1111, and an I/F (Interface) 1112.

To the image converting part 1111, an SD image signal in the Bayer format outputted is supplied from the imager 1011. The image converting part 1111 performs the image conversion process in which the SD image signal in the Bayer format from the imager 1011 is converted into the SD image signal of the composite signal to be processed at the transmitter 1102 in the later stage, and supplies the SD image signal of the composite signal obtained in the image conversion process to the I/F 1112.

The I/F 1112 is an interface which inputs and outputs the SD image signal of the composite signal, and externally outputs the SD image signal of the composite signal supplied from the image converting part 1111.

The SD image signal of the composite signal outputted from the I/F 1112 of the camera 1101 is sent to the transmitter 1102 over a communication cable or radio.

The transmitter 1102 receives the SD image signal of the composite signal from the camera 1101, and sends it as the television broadcast signal, for example.

In other words, the transmitter 1102 is configured of an I/F 1121, a signal processing part 1023, an image converting part 1122, and an I/F 1123.

The I/F 1121 is an interface which inputs and outputs the SD image signal of the composite signal, receives the SD image signal of the composite signal from (the I/F 1112 of) the camera 1101, and supplies the signal processing part 1023 which can process the composite signal.

The image converting part 1122 performs the image conversion process in which the SD image signal of the composite signal outputted from the signal processing part 1023 into the Y/C signals to be processed at the receiver 1103 in the later stage, and supplies the Y/C signals obtained in the image conversion process to the I/F 1123.

The I/F 1123 is an interface which inputs and outputs the Y/C signals, and externally outputs the Y/C signals supplied from the image converting part 1122.

The Y/C signals outputted from the I/F 1123 of the transmitter 1102 is sent to the receiver 1103 as the television broadcast signal over a communication cable or radio.

For example, the receiver 1103 is a tuner which receives the television broadcast signal, and receives the Y/C signals sent from the transmitter 1102.

In other words, the receiver 1103 is configured of an I/F 1131, a signal processing part 1033, an image converting part 1132, and an I/F 1133.

The I/F 1131 is an interface which inputs and outputs the Y/C signals, receives the Y/C signals from (the I/F 1123 of) the transmitter 1102, and supplies the Y/C signals to the signal processing part 1033, which can process the Y/C signals.

The image converting part 1132 performs the image conversion process in which the Y/C signals outputted from the signal processing part 1033 is converted into the RGB image signal to be used for display on the display device 1104 in the later stage, and supplies the RGB image signal obtained in the image conversion process to the I/F 1133.

The I/F 1133 is an interface which inputs and outputs the RGB image signal, and externally outputs the RGB image signal supplied from the image converting part 1132.

The RGB image signal outputted from the I/F 1133 of the receiver 1103 is sent to the display device 1104 over a communication cable or radio.

For example, the display device 1104 receives the RGB image signal from the receiver 1103, and displays a matched image.

In other words, the display device 1104 is configured of an I/F 1141, a display control part 1043, and a display 1044.

The I/F 1141 is an interface which inputs and outputs the RGB image signal, receives the RGB image signal from (the I/F 1133 of) the receiver 1103, and supplies it to the display control part 1043, which controls display of an image corresponding to the RGB image signal.

In the image processing system thus configured, in the camera 1101, the SD image signal in the Bayer format obtained by shooting is converted into the SD image signal of the composite signal suited for the process performed by the transmitter 1102 in the later stage in accordance with the image conversion process performed by the image converting part 1111 for output.

In the transmitter 1102, the signal processing part 1023 signal-processes the SD image signal of the composite signal from the camera 1101 to convert the SD image signal of the composite signal after signal-processed into the Y/C signals suited for the process at the receiver 1103 in the later stage in accordance with the image conversion process performed by the image converting part 1122.

In the receiver 1103, the signal processing part 1033 signal-processes the Y/C signals from the transmitter 1102, and converts the Y/C signals after signal-processed into the RGB image signal suited for the process at the display device 1104 in the later stage in accordance with the image conversion process performed by the image converting part 1132.

Then, in the display device 1104, the display control part 1043 displays an image corresponding to the RGB image signal from the receiver 1103 on the display 1044.

As described above, in the image processing system shown in FIG. 56, the camera 1101 outputs the SD image signal of the composite signal suited for the process at the transmitter 1102 in the later stage, and the transmitter 1102 outputs the Y/C signals suited for the process at the receiver 1103 in the later stage. Similarly, the receiver 1103 also outputs the RGB image signal suited for the process at the display device 1104 in the later stage.

Therefore, in the image processing system shown in FIG. 56, the transmitter 1102 can be configured without providing the image converting part 1022 (FIG. 51) which converts the SD image signal in the D1 format into the SD image signal of the composite signal suited for the process at the signal processing part 1023.

In addition, the receiver 1103 can be configured without providing the image converting part 1032 (FIG. 51) which converts the SD image signal in the D1 format into the Y/C signals suited for the process at the signal processing part 1033.

Similarly, the display device 1104 can be also configured without providing the image converting part 1042 (FIG. 51) which converts the SD image signal in the D1 format into the RGB image signal suited for display of the image at the display control part 1043.

Moreover, also in the image converting part 1111 of the camera 1101, the image converting part 1122 of the transmitter 1102, and the image converting part 1132 of the receiver 1103 in the image processing system shown in FIG. 56, the classification adaptive process can be adapted to the image conversion process in order to suppress the loss of the signal component at the minimum (further decrease it).

In this case, the image converting parts 1111, 1122, and 1132 are configured as similar to the image converting part 1012 shown in FIG. 52. However, the sets of the tap coefficients stored in the coefficient memory 1064 (FIG. 51) are varied at each of the image converting parts 1111, 1122, and 1132.

In other words, in the coefficient memory 1064 configuring the image converting part 1111 which converts the SD image signal in the Bayer format into the image signal in the composite format, a set of the tap coefficients is stored that is obtained by the learning process shown in FIG. 55 as the SD image signal in the Bayer format and the SD image signal of the composite signal generated from the image signal as learning data are set to the pupil signal and the teacher signal, respectively.

In addition, in the coefficient memory 1064 configuring the image converting part 1122 which converts the SD image signal of the composite signal into the Y/C signals, a set of the tap coefficients is stored that is obtained by the learning process shown in FIG. 55 as the SD image signal of the composite signal and the Y/C signals generated from the image signal as learning data are set to the pupil signal and the teacher signal, respectively.

Furthermore, in the coefficient memory 1064 configuring the image converting part 1132 which converts the Y/C signals into the RGB image signal, a set of the tap coefficients is stored that is obtained by the learning process shown in FIG. 55 as the Y/C signals and the RGB image signal generated from the image signal as learning data are set to the pupil signal and the teacher signal, respectively.

Figure 57:
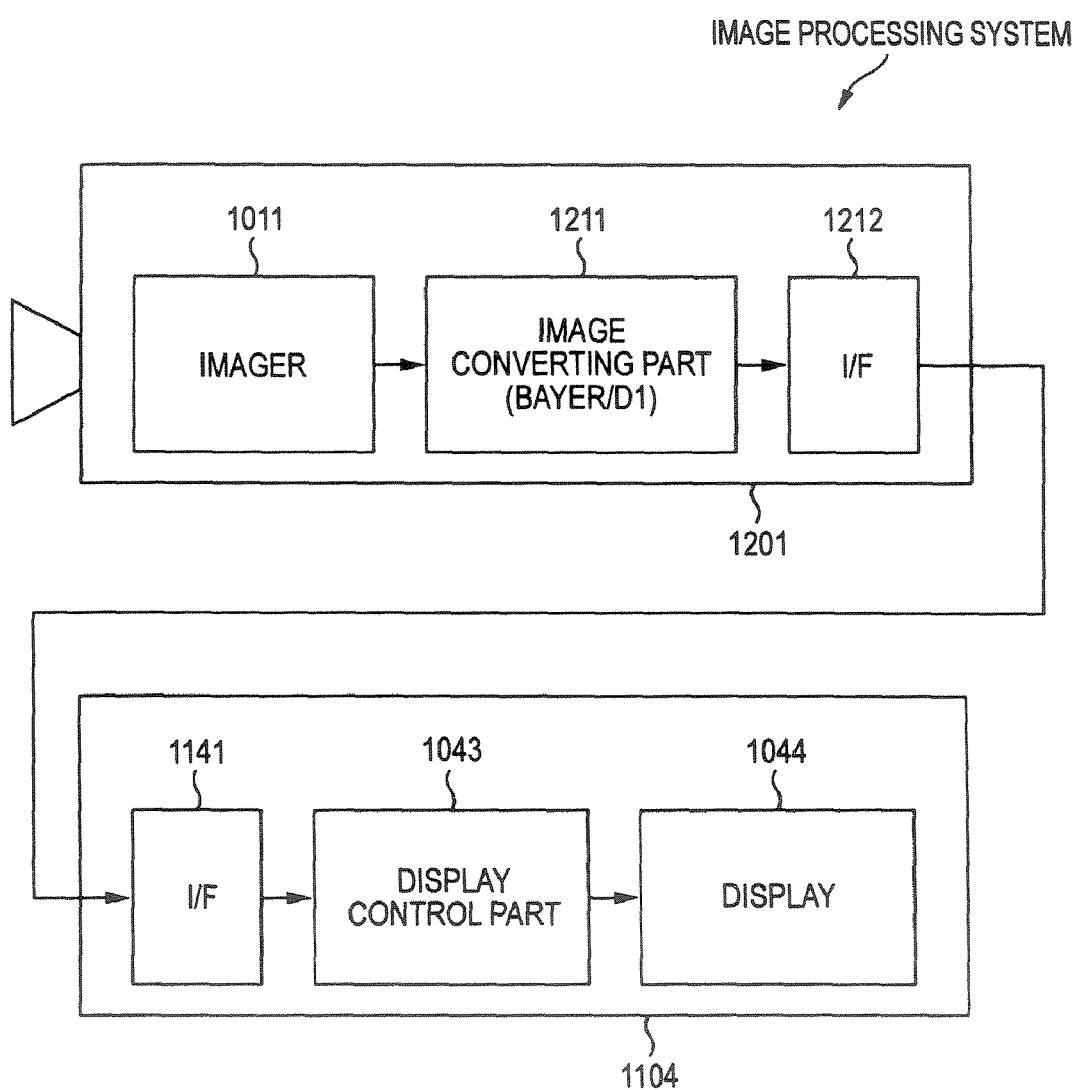
FIG. 57 shows a block diagram depicting a seventh exemplary configuration of an image processing system which performs image processing.

Next, FIG. 57 shows a seventh exemplary configuration of an image processing system for image processing.

Moreover, in the drawing, the portions corresponding to those shown in FIG. 51 or 56 are assigned the same numerals and signs, properly omitting the descriptions.

In FIG. 57, the image processing system is configured of a camera 1201 and a display device 1104.

The camera 1201 shoots an object (subject), and outputs an RGB image signal as the image signal obtained by the shooting which can be used for display on the display device 1104 in the later stage.

In other words, the camera 1201 is configured of an imager 1011, an image converting part 1211, and an I/F 1212.

To the image converting part 1211, the SD image signal in the Bayer format outputted is supplied from the imager 1011. The image converting part 1211 performs the image conversion process in which the SD image signal in the Bayer format from the imager 1011 is converted into the RGB image signal to be displayed on the display device 1104 in the later stage, and supplies the RGB image signal obtained in the image conversion process to the I/F 1212.

The I/F 1212 is an interface which inputs and outputs the RGB image signal, and externally outputs the RGB image signal supplied from the image converting part 1211.

The RGB image signal outputted from the I/F 1212 of the camera 1201 is supplied to the display device 1202 over a communication cable or radio.

In the image processing system thus configured, in the camera 1201, the SD image signal in the Bayer format obtained by shooting is converted into the RGB image signal suited for the process at the display device 1104 in the later stage in accordance with the image conversion process performed by the image converting part 1211.

Then, in the display device 1104, the display control part 1043 displays an image corresponding to the RGB image signal from the camera 1201 on the display 1044.

As described above, in the image processing system shown in FIG. 57, the camera 1201 outputs the RGB image signal suited for the process at the display device 1104 in the later stage.

Therefore, in the image processing system shown in FIG. 57, as similar to that shown in FIG. 56, the display device 1104 can be configured without providing the image converting part 1042 (FIG. 51) which converts the SD image signal in the D1 format into the RGB image signal suited for display of the image at the display control part 1043.

Moreover, also in the image converting part 1211 of the camera 1201 in the image processing system shown in FIG. 57, the classification adaptive process can be adapted to the image conversion process in order to suppress the loss of the signal component at the minimum (further decrease it).

In this case, the image converting part 1211 are configured as similar to the image converting part 1012 shown in FIG. 52. However, it is necessary for a set of the tap coefficients stored in the coefficient memory 1064 (FIG. 52) to be a set of the tap coefficients that can be obtained by performing the learning process shown in FIG. 55 in which the SD image signal in the Bayer format and the RGB image signal generated from the image signal as learning data are set to the pupil signal and the teacher signal, respectively.

As the image processing system shown in FIG. 56 or 57, in the unit in the previous stage (for example, the camera 1201 shown in FIG. 57), the image signal in a certain signal format internally obtained (for example, the SD image signal in the Bayer format) is converted into the image signal in the signal format (for example, the RGB image signal) suited for the process in the unit in the later stage (for example, the display device 1104 shown in FIG. 57) for output. Therefore, although the unit in the later stage can be connected only to such a unit that outputs the image signal in the signal format suited for the process in the unit in the later stage as the unit in the previous stage (although the unit in the previous stage can be connected only to such a unit that can be connected only to the unit in the later stage which can receive the image signal in the signal format outputted from its previous stage unit), in the unit in the later stage, the signal process can be performed without converting the signal format for the image signal from the unit in the previous stage.

Moreover, in the image processing system shown in FIG. 56 or 57, the unit in the previous stage is configured to convert the image signal in a certain signal format internally obtained into the image signal in the signal format suited for the process in the unit in the later stage for output. However, in addition to this, this scheme may be performed in which the unit in the previous stage outputs the image signal in a certain signal format internally obtained as it is, and the unit in the later stage first converts the image signal outputted from the unit in the previous stage into the image signal in the signal format suited for the process in the unit in the later stage, and then performs the signal process.

Next, the series of the process steps described above can be implemented by hardware, or by software. When the series of the process steps is implemented by software, the program configuring the software is installed into a multi-purpose computer.

Figure 58:
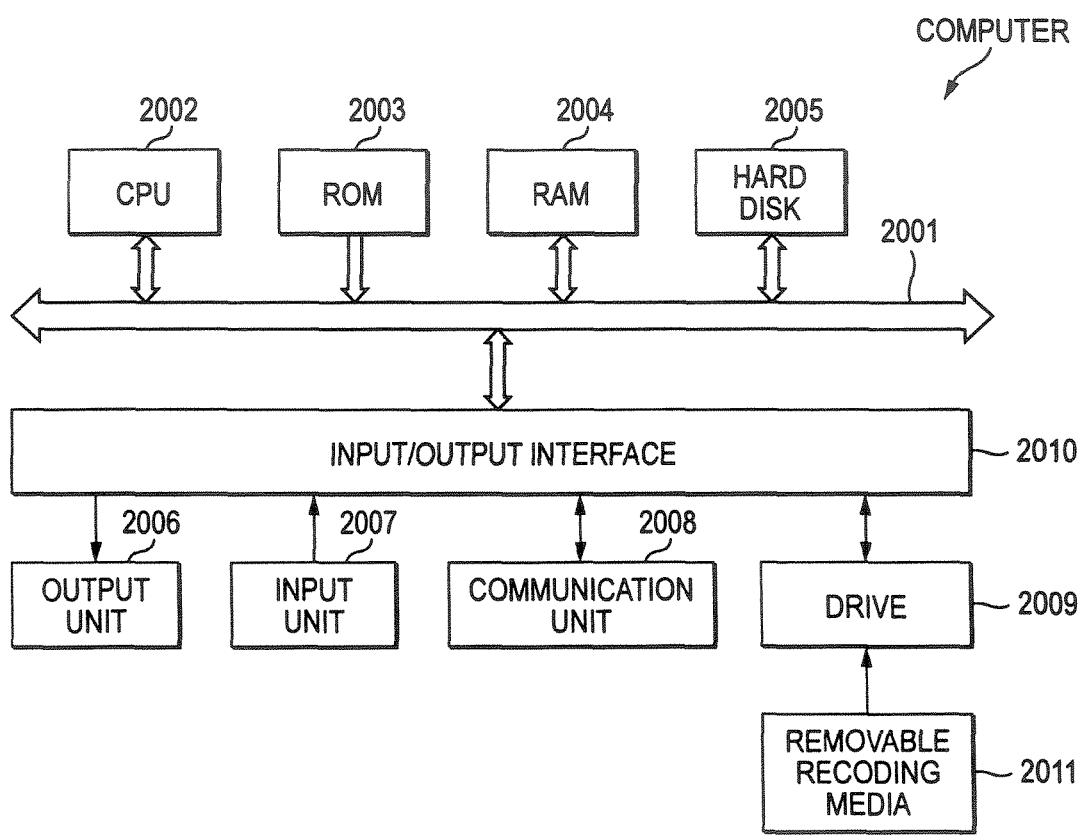
FIG. 58 shows a block diagram depicting an exemplary configuration of a computer which runs a program for image processing.

Then, FIG. 58 shows an exemplary configuration of an implementation of a computer into which the program installed that runs the series of the process steps described above.

The program can be recorded beforehand on a hard disk 2005 or a ROM 2003 as a recording medium incorporated in the computer.

Alternatively, the program can be temporarily or permanently stored (recorded) on a removable recording medium 2011 such as a flexible disc, a CD-ROM (Compact Disc Read Only Memory), an MO (Magneto-optical) disc, a DVD (Digital Versatile Disc), a magnetic disc, and a semiconductor memory. The removable recording medium 2011 like this can be provided as so-called package software.

Moreover, the program is installed into the computer through the removable recording medium 2011 as described above, as well as it can be installed into the hard disk 2005 incorporated in the computer from a download site through an artificial satellite for digital satellite broadcast over radio transmission, or installed into the computer through a network such as a LAN (Local Area Network) and the Internet over cable transmission, or installed into the incorporated hard disk 2005 by receiving the program thus transmitted by a communicating part 2008 in the computer.

The computer has a CPU (Central Processing Unit) 2002 therein. To the CPU 2002, an I/O interface 2010 is connected through a bus 2001. When a user manipulates an input part 2007 configured of a keyboard, a mouse, a microphone, etc., to enter an instruction to the CPU 2002 through the I/O interface 2010, it runs the program stored in the ROM (Read Only Memory) 2003. Alternatively, the CPU 2002 loads into a RAM (Random Access Memory) 2004 the program that is transmitted through a satellite or a network, received at the communicating part 2008, and installed in the hard disk 2005, or the program that is read out of the removable recording medium 2011 mounted on a drive 2009 and installed into the hard disk 2005 for implementation. Thus, the CPU 2002 performs the process steps in accordance with the flow charts described above, or runs the process steps performed by the configurations in the block diagrams shown.

Then, the CPU 2002 outputs the process results from an output part 2006 configured of an LCD (Liquid Crystal Display) and a speaker through the I/O interface 2010, etc., as necessary, or transmits the process results from the communicating part 2008, or further records the process results on the hard disk 2005.

Here, in the specification, the process steps describing the program to allow the computer to run various processes are not necessarily performed in time series along the order described in flow charts, which include the process steps performed in parallel or separately (for example, parallel processing or processing by an object)

In addition, the program may be processed in a single computer, or may be processed by a plurality of computers in distributed processing. Furthermore, the program may be forwarded to a remote computer for implementation.

Moreover, an embodiment of the invention is not limited to the embodiments described above, which can be modified within the scope not deviating from the teaching of an embodiment of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for processing an image, comprising:
    means for acquiring a display format operable to acquire a display format in which an image is displayed on means for displaying an image;
    means for acquiring a shot image signal operable to acquire a shot image signal from a shooting means for shooting an object; and
    means for converting a signal operable to convert the shot image signal in a first signal format into an image signal in a second signal format associated with the display format, based on correspondence information which associates the first signal format for the shot image signal with the display format,
    wherein an image conversion process converts the image signal in the second signal format into a high quality image signal corresponding to the image displayed on the means for displaying an image, which is of a higher quality than an image corresponding to the image signal, in the second signal format, and
    wherein the image corresponding to the high quality image signal obtained in the image conversion process is displayed in the display format.

2. The image processing apparatus according to claim 1, further comprising the shooting means.

3. The image processing apparatus according to claim 1, wherein the means for converting a signal comprises:
    means for extracting a prediction tap operable to extract a prediction tap that is a set of pixel values of a plurality of pixels for predicting a pixel value of an attention pixel of the image signal in the second signal format, from the shot image signal;
    class tap extracting means operable to extract a class tap that is a set of pixel values of a plurality of pixels for classifying the attention pixel into any one of a plurality of classes, from the shot image signal;
    means for classification operable to classify the attention pixel based on the class tap;
    means for outputting a coefficient operable to output a set of tap coefficients for a class of the attention pixel from a plurality of sets of tap coefficients each corresponding to each of a plurality of classes and determined by a learning process performed before outputting the set of tap coefficients; and means for computation operable to determine a pixel value of the attention pixel by a prediction computation using the set of tap coefficients for the class of the attention pixel and the prediction tap.

4. An image processing method of processing an image comprising the steps of:
acquiring a display format in which an image is displayed on means for displaying an image;
acquiring a shot image signal from means for shooting an object; and
converting the shot image signal in a first signal format into an image signal in a second signal format associated with the acquired display format, based on correspondence information which associates the first signal format for the shot image signal with the display format,
converting the image signal into a high quality image signal corresponding to the image displayed on the means for displaying an image, which is of a higher quality than an image corresponding to the image signal, in the second signal format, and
displaying the image corresponding to the high quality image signal.

5. A non-transitory computer readable medium on which a sound quality display program is recorded, which, when executed by a computer, causes the computer to perform an image process for image processing comprising the steps of:
acquiring a display format in which an image is displayed on means for displaying an image;
acquiring a shot image signal from means for shooting an object; and
converting the shot image signal in a first signal format into an image signal in a second signal format associated with the acquired display format, based on correspondence information which associates the first signal format for the shot image signal with the display format,
converting the image signal into a high quality image signal corresponding to the image displayed on the means for displaying an image, which is of a higher quality than an image corresponding to the image signal, in the second signal format, and
displaying the image corresponding to the high quality image signal.

6. An image processing apparatus for processing an image comprising:
means for deciding an image process to operable to decide an image process to be applied to a shot image signal from means for shooting an object;
means for acquiring a signal format operable to acquire a signal format for the shot image signal;
means for acquiring a display format operable to acquire a display format in which an image is displayed on means for display, the image obtained by applying, to the shot image signal, an image process decided by the means for deciding an image process; and
means for processing an image operable to apply the decided image process to the shot image signal by performing different processes, the different processes differing in accordance with the signal format of the shot image signal, the display format, and the decided image process.

7. The image processing apparatus according to claim 6, wherein the means for processing an image comprises:
pre-processing means operable to pre-process the shot image signal to output a pre-processed image signal; and
means for converting an image operable to convert the pre-processed image signal to a second image signal by a computation with a set of tap coefficients obtained by a learning process performed before converting the pre-processed image signal.

8. The image processing apparatus according to claim 7, wherein the pre-processing means comprises:
means for extracting a pre-processing tap operable to extract a pre-processing tap that is a set of pixel values of a plurality of pixels for determining a pixel value of an attention pixel of the pre-processed image signal, from the shot image signal, during the pre-processing; and
means for pre-processing computation operable to determine a pixel value of the attention pixel by a computation using a set of pre-processing coefficients and the pre-processing tap.

9. The image processing apparatus according to claim 8, wherein the means for extracting a pre-processing tap extracts pixel values of the plurality of pixels, which are in different positional relations with respect to the attention pixel, as the pre-processing tap, in accordance with the signal format of the shot image signal, the display format, and the decided image process.

10. The image processing apparatus according to claim 8, wherein the means for pre-processing computation determines the pixel value of the attention pixel by the computation, which uses the set of pre-processing coefficients that differs in accordance with the signal format of the shot image signal, the display format, and the decided image process.

11. The image processing apparatus according to claim 7, wherein the means for converting an image comprises:
means for extracting a prediction tap operable to extract a prediction tap that is a set of pixel values of a plurality of pixels for predicting a pixel value of an attention pixel of the image signal in the second signal format, from the shot image signal;
class tap extracting means operable to extract a class tap that is a set of pixel values of a plurality of pixels for classifying the attention pixel into any one of a plurality of classes, from the shot image signal;
means for classification operable to classify the attention pixel based on the class tap;
means for outputting a coefficient operable to output a set of tap coefficients for a class of the attention pixel from a plurality of sets of tap coefficients each corresponding to each of a plurality of classes and determined by a learning process performed before outputting the set of tap coefficients; and
means for computation operable to determine a pixel value of the attention pixel by a prediction computation using the set of tap coefficients for the class of the attention pixel and the prediction tap.

12. The image processing apparatus according to claim 11, wherein the means for converting an image determines the pixel value of the attention pixel by the computation, which uses the set of tap coefficients that differs in accordance with the signal format of the shot image signal, the display format, and the decided image process.

13. An image processing method of processing an image comprising the steps of:
deciding an image process to be applied to a shot image signal from means for shooting an object;
acquiring a signal format for the shot image signal;
acquiring a display format in which an image is displayed on means for display, the image obtained by applying the decided image process; and performing different processes, the different processes differing in accordance with the signal format of the shot image signal, the display format, and the decided image process.

14. A non-transitory computer readable medium on which a sound quality display program is recorded, which, when executed by a computer, causes the computer to perform a process comprising the steps of:
    deciding an image process to be applied to a shot image signal from means for shooting an object;
    acquiring a signal format for the shot image signal;
    acquiring a display format in which an image is displayed on means for display, the image obtained by applying the decided image process; and
    performing different processes, the different processes differing in accordance with the signal format of the shot image signal, the display format, and the decided image process.

15. An image processing apparatus for processing an image comprising:
    a mechanism configured to acquire a display format in which an image is displayed on a mechanism configured to display the image;
    a mechanism configured to acquire a shot image signal from a mechanism configured to shoot an object; and
    a mechanism configured to convert the shot image signal in a first signal format into an image signal in a second signal format associated with a display format, based on correspondence information which associates the first signal format for the shot image signal with the display format,
    wherein an image conversion process converts the image signal in the second signal format into a high quality image signal corresponding to the image displayed on the mechanism configured to display the image, which is of a higher quality than an image corresponding to the image signal, in the second signal format, and
    wherein the image corresponding to the high quality image signal obtained in the image conversion process is displayed in the display format.

16. An image processing apparatus for processing an image comprising:
    a mechanism configured to decide an image process to be applied to a shot image signal from a mechanism configured to shoot an object;
    a mechanism configured to acquire a signal format for the shot image signal;
    a mechanism configured to acquire a display format in which an image is displayed, the image obtained by applying, to the shot image signal, an image process decided at the mechanism configured to decide an image process; and
    a mechanism configured to process an image by applying the decided image process to the shot image signal by performing different processes, the different processes differing in accordance with the signal format of the shot image signal, the display format, and the decided image process.

17. The image processing apparatus according to claim 1, wherein the shot image signal and the image signal in the second signal format are standard definition image signals having a standard resolution, and the high quality image signal is a high definition image signal having a high resolution.

18. The image processing apparatus according to claim 6, wherein the shot image signal and the image signal in the second signal format are standard definition image signals having a standard resolution, and the high quality image signal is a high definition image signal having a high resolution.

\* \* \* \* \*